US007738510B2

(12) United States Patent
Kwon et al.

(10) Patent No.: US 7,738,510 B2
(45) **Date of Patent: *Jun. 15, 2010**

(54) DIGITAL COMMUNICATION METHOD AND SYSTEM

(75) Inventors: Jae-Kyun Kwon, Daegu (KR); Kang-Soo Shin, Seoul (KR); Jae-Hoon Chung, Daejeon (KR); Ji-Young Yun, Daejeon (KR); Sung-Ho Moon, Daejeon (KR); Soo-Mee Park, Busan (KR); Dan-Keun Sung, Daejeon (KR); Su-Won Park, Daejeon (KR); Mun-Geon Kyeong, Daejeon (KR); Jae-Sang Cha, Seoul (KR); Seo-Young Lee, Daejeon (KR); Seog-Ill Song, Daejeon (KR); In-Soo Sohn, Daejeon (KR); Ju-Phil Cho, Jeonju (KR); Jae-Joon Kim, Daegu (KR); Hee-Soo Lee, Daejeon (KR)

(73) Assignees: Electronics and Telecommunications Research Institute (KR); Korea Advanced Institute of Science and Technology (KR)

( * ) Notice: Subject to any disclaimer, the term of this patent is extended or adjusted under 35 U.S.C. 154(b) by 1390 days.

This patent is subject to a terminal disclaimer.

(21) Appl. No.: 10/490,566

(22) PCT Filed: Sep. 18, 2002

(86) PCT No.: PCT/KR02/01774

§ 371 (c)(1), (2), (4) Date: Dec. 28, 2004

(87) PCT Pub. No.: WO03/026159

PCT Pub. Date: Mar. 27, 2003

(65) Prior Publication Data

US 2006/0239334 A1 Oct. 26, 2006

(30) Foreign Application Priority Data

Sep. 18, 2001 (KR) .......................... 2001-0057421

(51) Int. Cl.
*H04J 3/02* (2006.01)

(52) U.S. Cl. ...................... 370/535; 370/342; 370/335; 370/203; 375/130; 455/450

(58) Field of Classification Search ................ 455/522, 455/502; 370/329, 312, 335
See application file for complete search history.

(56) References Cited

U.S. PATENT DOCUMENTS

| | | | | |
|---|---|---|---|---|
| 5,586,120 | A | 12/1996 | Cadd | |
| 6,049,561 | A | 4/2000 | Pezzlo et al. | |
| 6,112,094 | A | 8/2000 | Dent | |
| 6,130,885 | A | 10/2000 | Izumi et al. | |
| 6,240,073 | B1 | 5/2001 | Reichman et al. | |
| 6,831,910 | B1 * | 12/2004 | Moon et al. | 370/342 |
| 7,349,447 | B1 * | 3/2008 | Sung et al. | 370/535 |

FOREIGN PATENT DOCUMENTS

| | | | |
|---|---|---|---|
| JP | 07 086987 | A | 3/1995 |
| JP | 08-256087 | | 10/1996 |
| JP | 11-041143 | | 2/1999 |
| KR | 1020010016948 | A | 3/2001 |
| WO | WO 00/03502 | | 1/2000 |
| WO | WO 01/11897 | | 2/2001 |
| WO | WO 01/93479 | | 12/2001 |

OTHER PUBLICATIONS

Zulfiquar Sayeed, "Throughput analysis and design of fixed and adaptive ARQ/diversity systems for slow fading channels", Global Telecommunications Conference, 1998, Globecom 1998, USA, IEEE, vol. 6 (Nov. 8, 1998) XP-010339471, p. 3686.

* cited by examiner

*Primary Examiner*—Temica M Beamer
(74) *Attorney, Agent, or Firm*—Blakely, Sokoloff, Taylor & Zafman

(57) ABSTRACT

This invention is concerned with a transmission control method and apparatus in a collision interval for a collision of multidimensional hopping patterns. In the present invention, each orthogonal wireless resource in the coordinate of the multidimensional orthogonal resource can hop according to the hopping pattern negotiated between a transmitter and a receiver, and each corresponding channel is distinguished by the hopping pattern. A specific multidimensional hopping pattern is allocated to each secondary station. The hopping pattern is either permanently allocated to the secondary stations or temporarily allocated from the primary station during a call set-up. The permanent allocation of the hopping pattern to the secondary stations is achieved when the hopping pattern is identified based on a unique identifier, such as ESN of the secondary station. The hopping patterns of the secondary stations are mutually independent so that the coordinates of the same orthogonal resource is allocated to different secondary stations in a simultaneous manner in a specific moment. Through this invention, in order to improve the performance of the multidimensional resource hopping multiplexing system, refining transmission and perforation mechanisms for the collisions of multidimensional resource hopping patterns can reduce the overall perforation probability.

31 Claims, 144 Drawing Sheets

Fig. 20A(1)
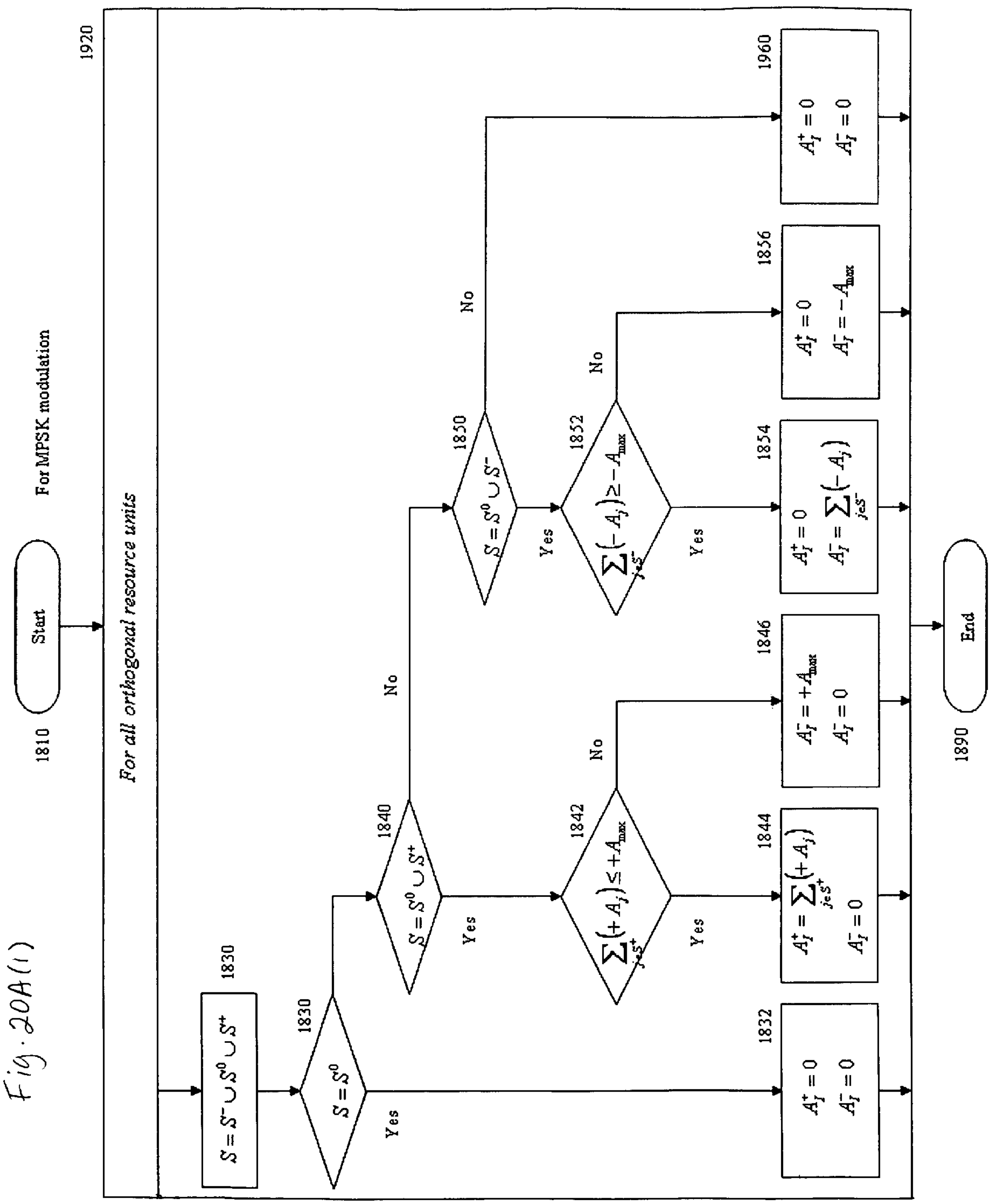

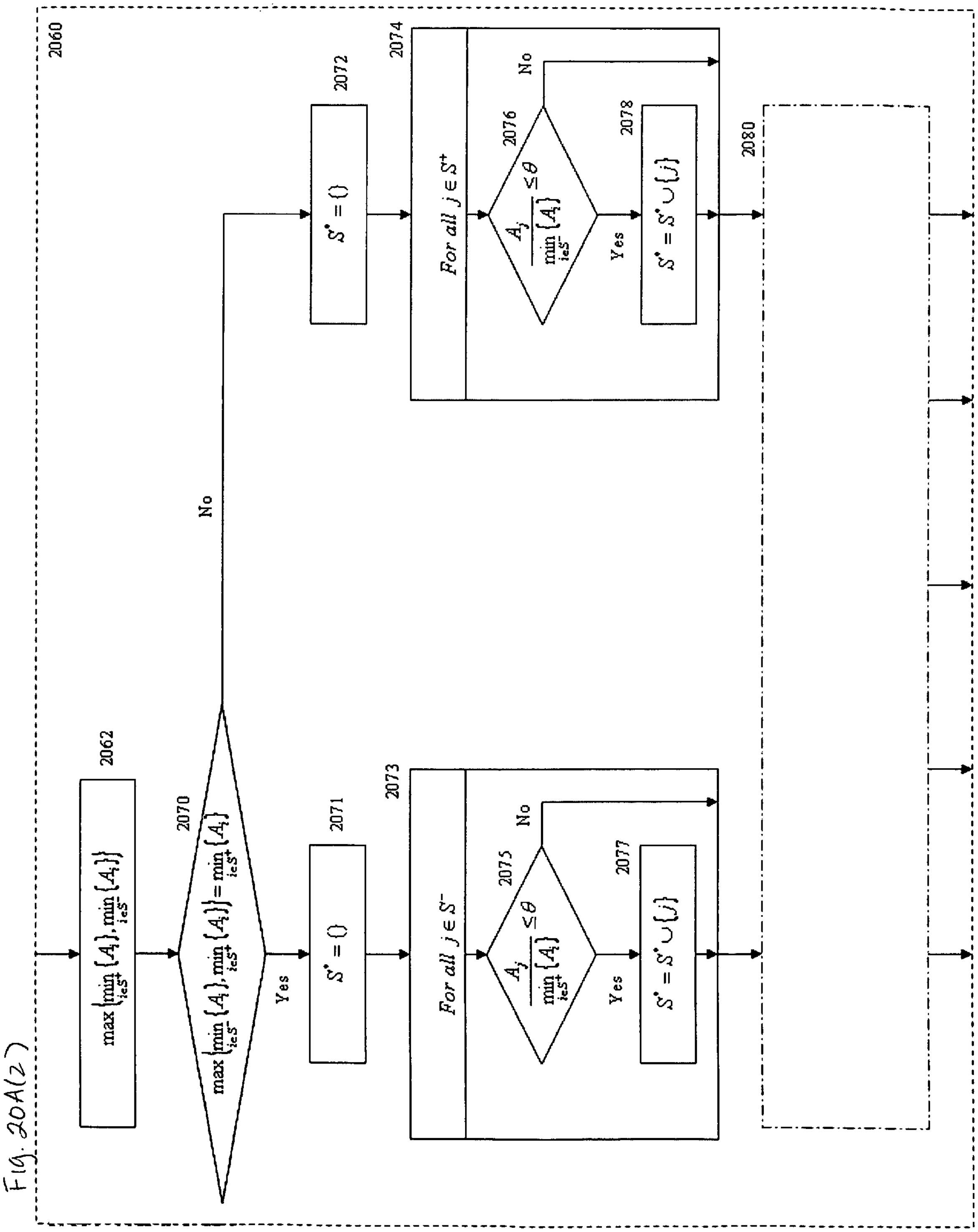
FIG. 20A(2)

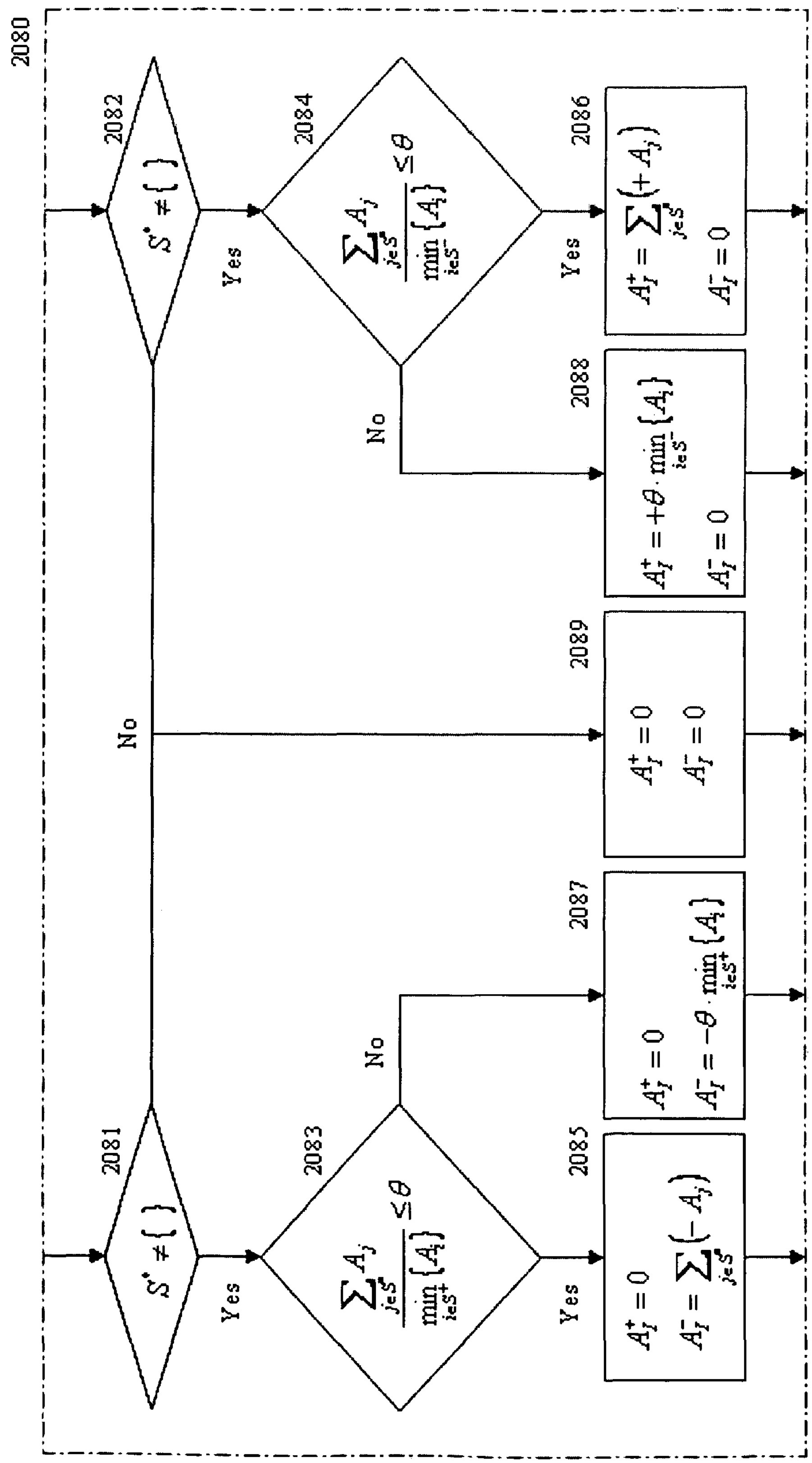
Fig. 20A(3)

Spread encoded symbols with the same orthogonal codeword at the n-th symbol time
(with transmission power control)

Spread encoded symbols with the same orthogonal codeword at the n-th symbol time
(with transmission power control)

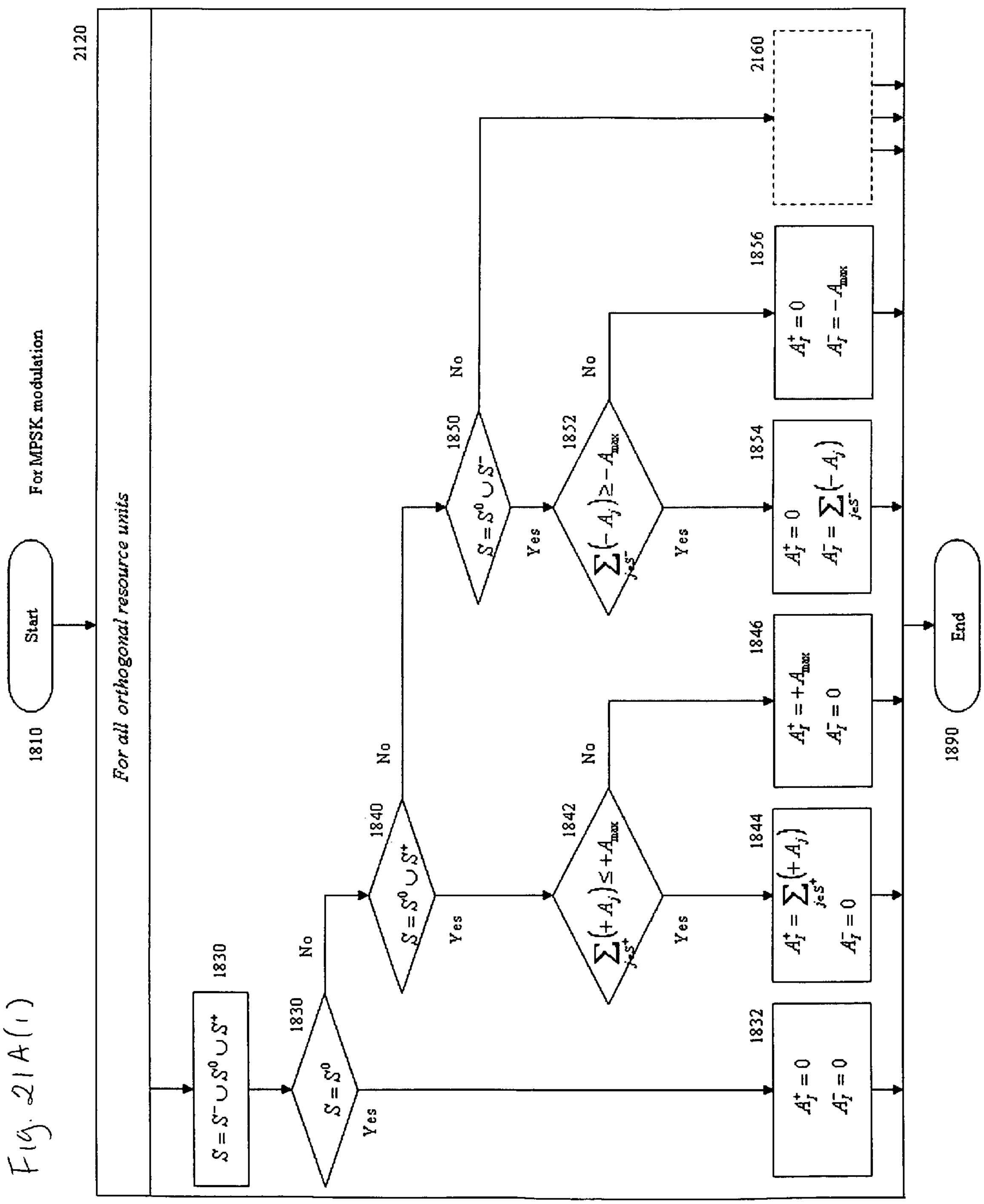
Fig. 21A(1)

Fig. 21A(2)
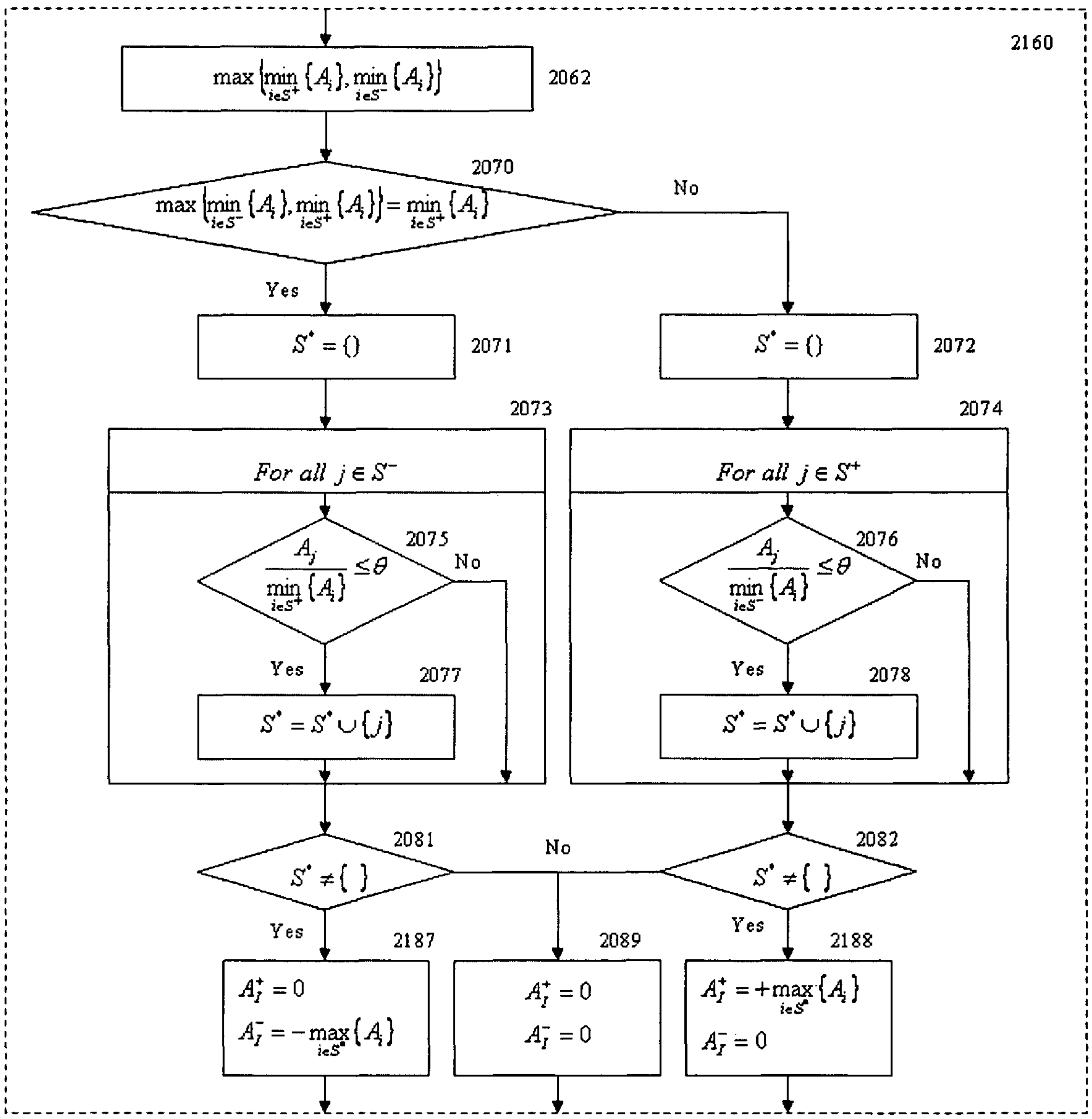

Spread encoded symbols with the same orthogonal codeword at the n-th symbol time
(with transmission power control)

Fig. 22A(1)
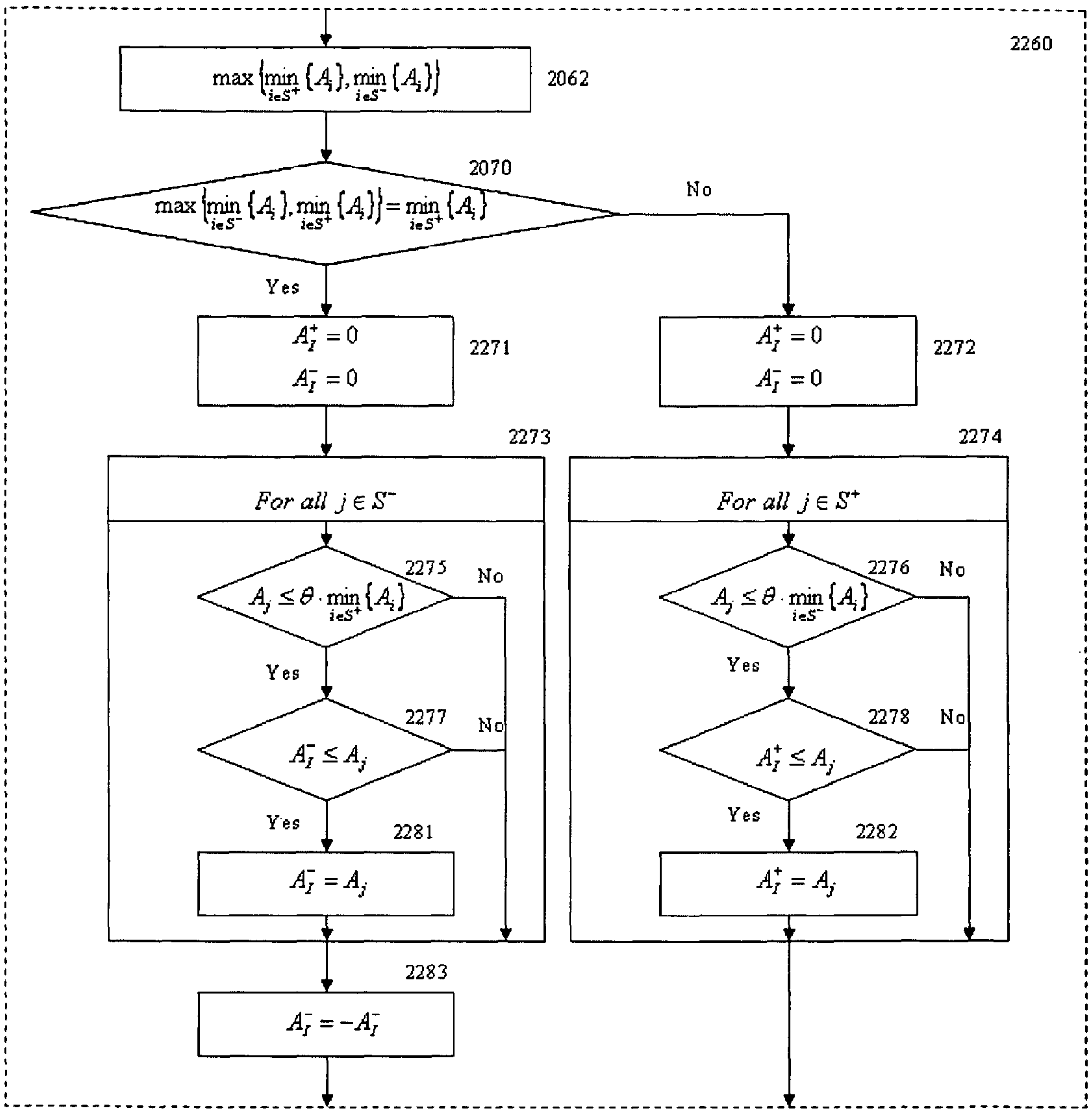

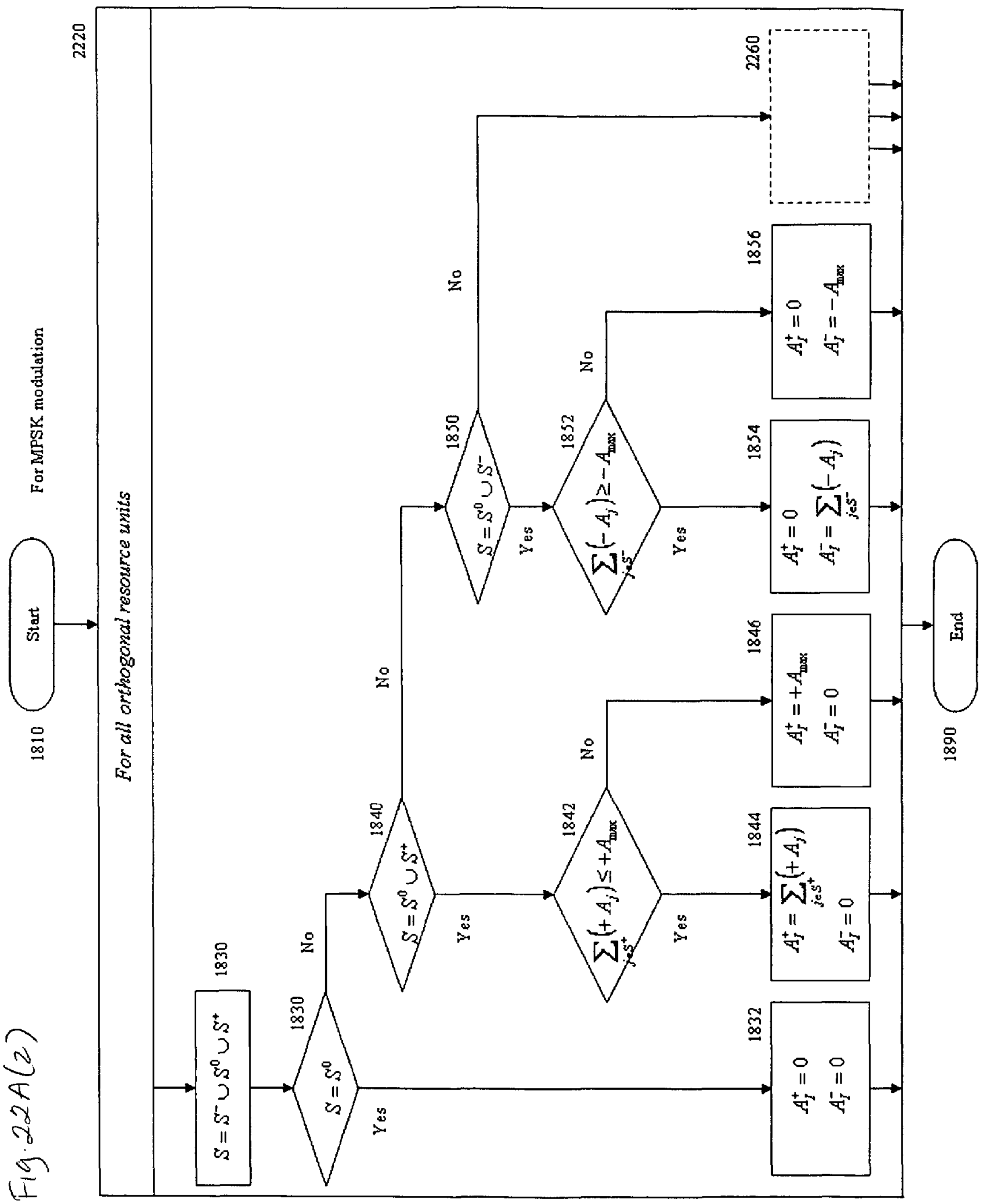
Fig. 22A(2)

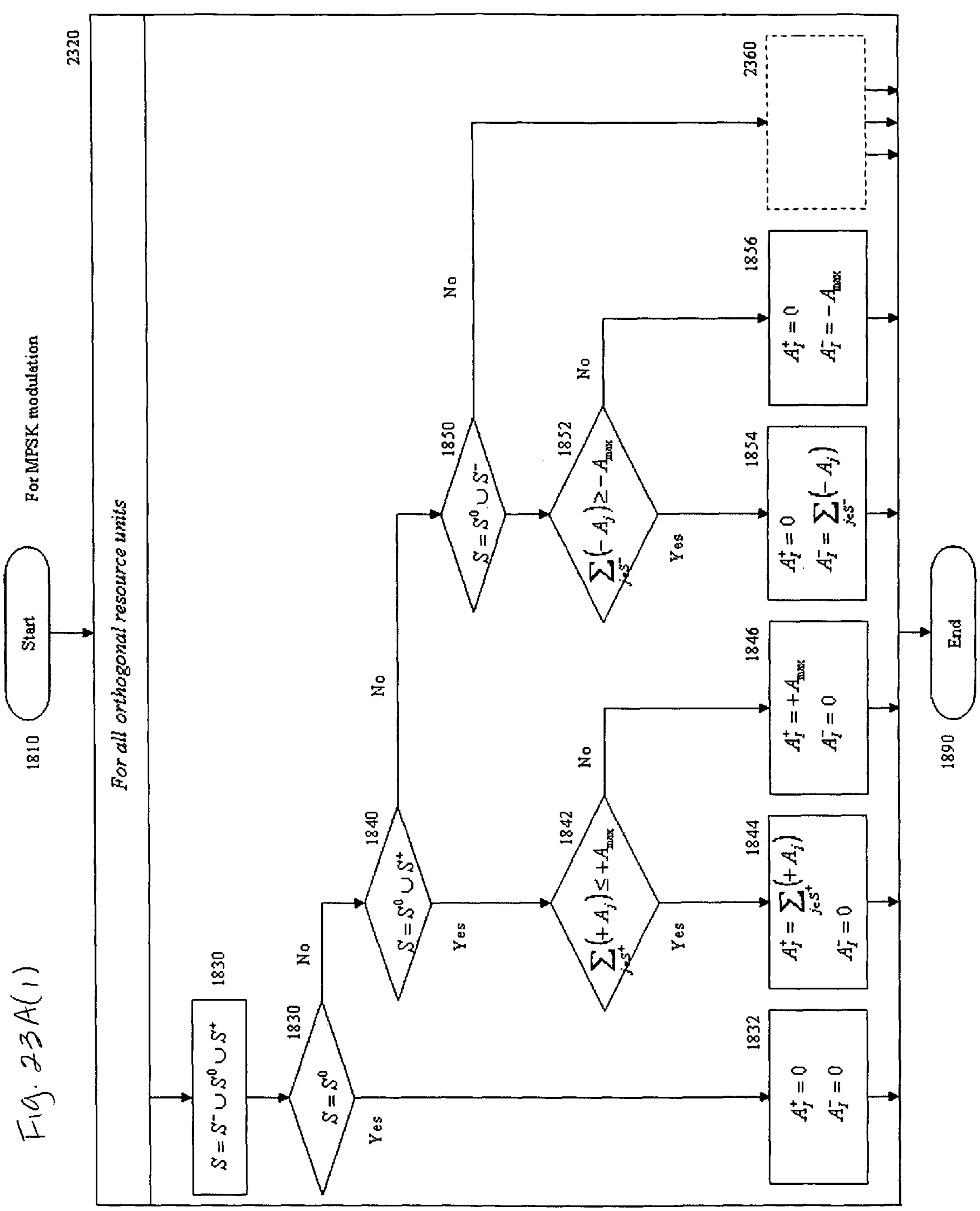
Fig. 23A(1)

Fig. 23A(2)
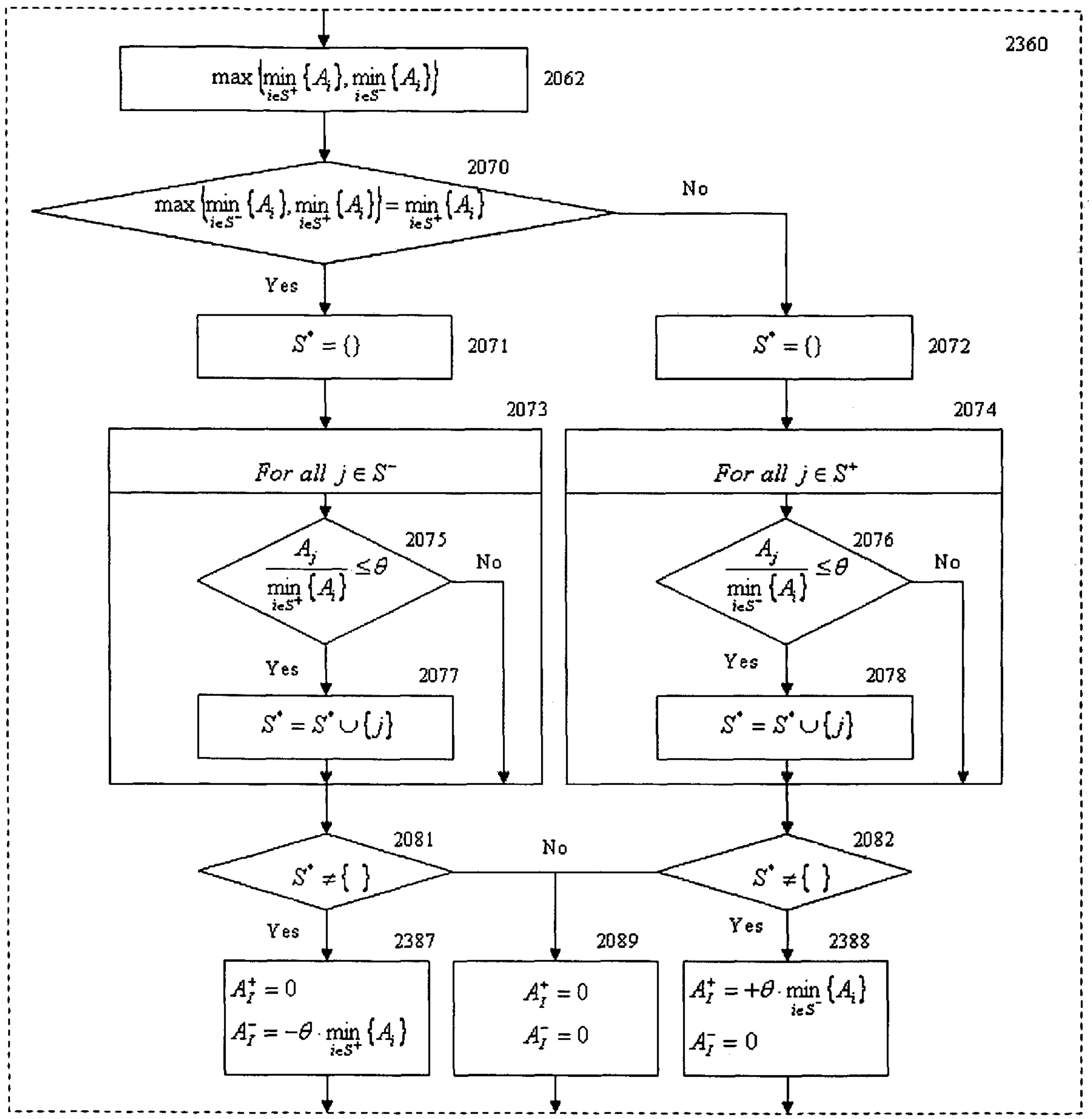

Spread encoded symbols with the same orthogonal codeword at the n-th symbol time
(with transmission power control)

Spread encoded symbols with the same orthogonal codeword at the n-th symbol time
(with transmission power control)

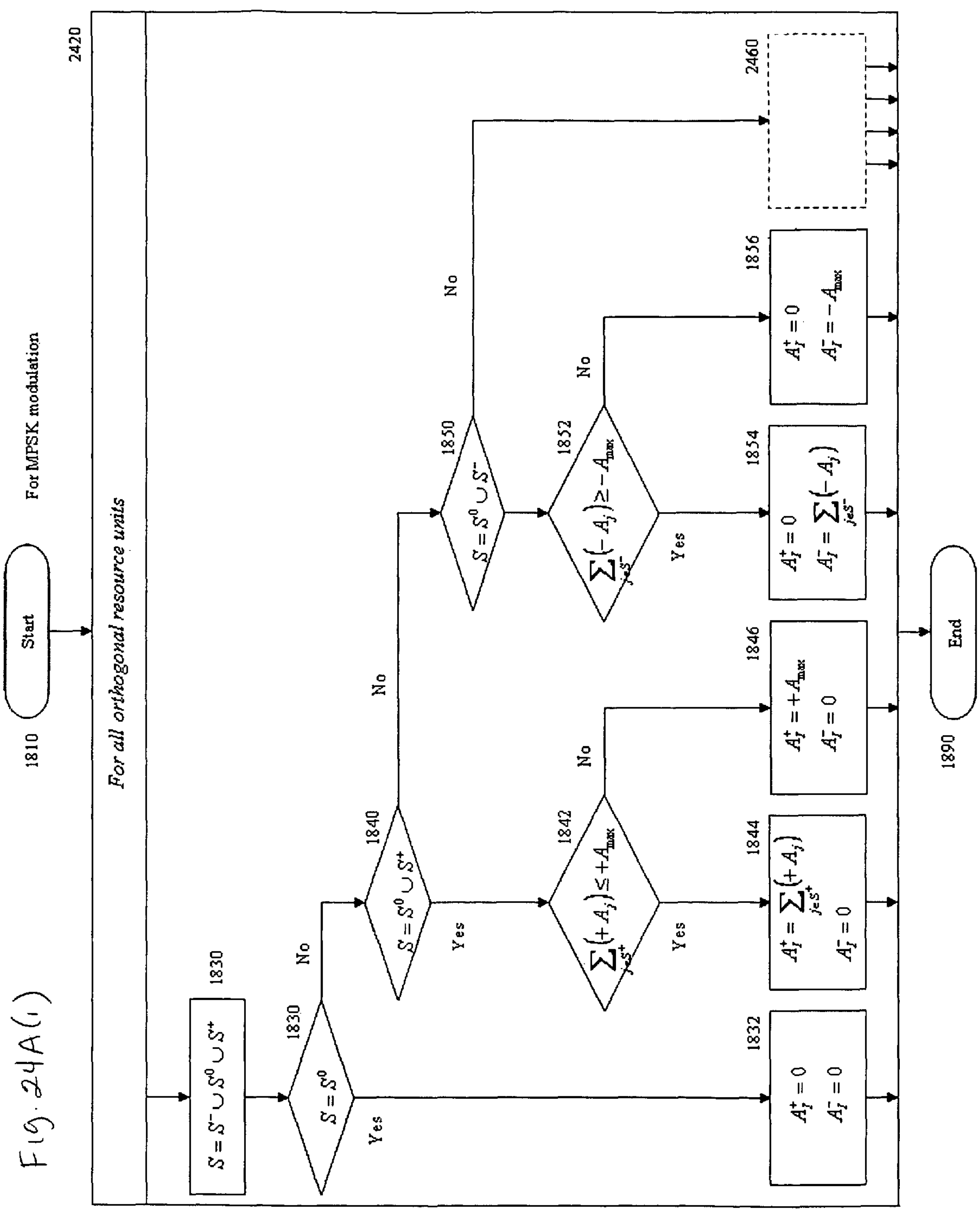
Fig. 24A(1)

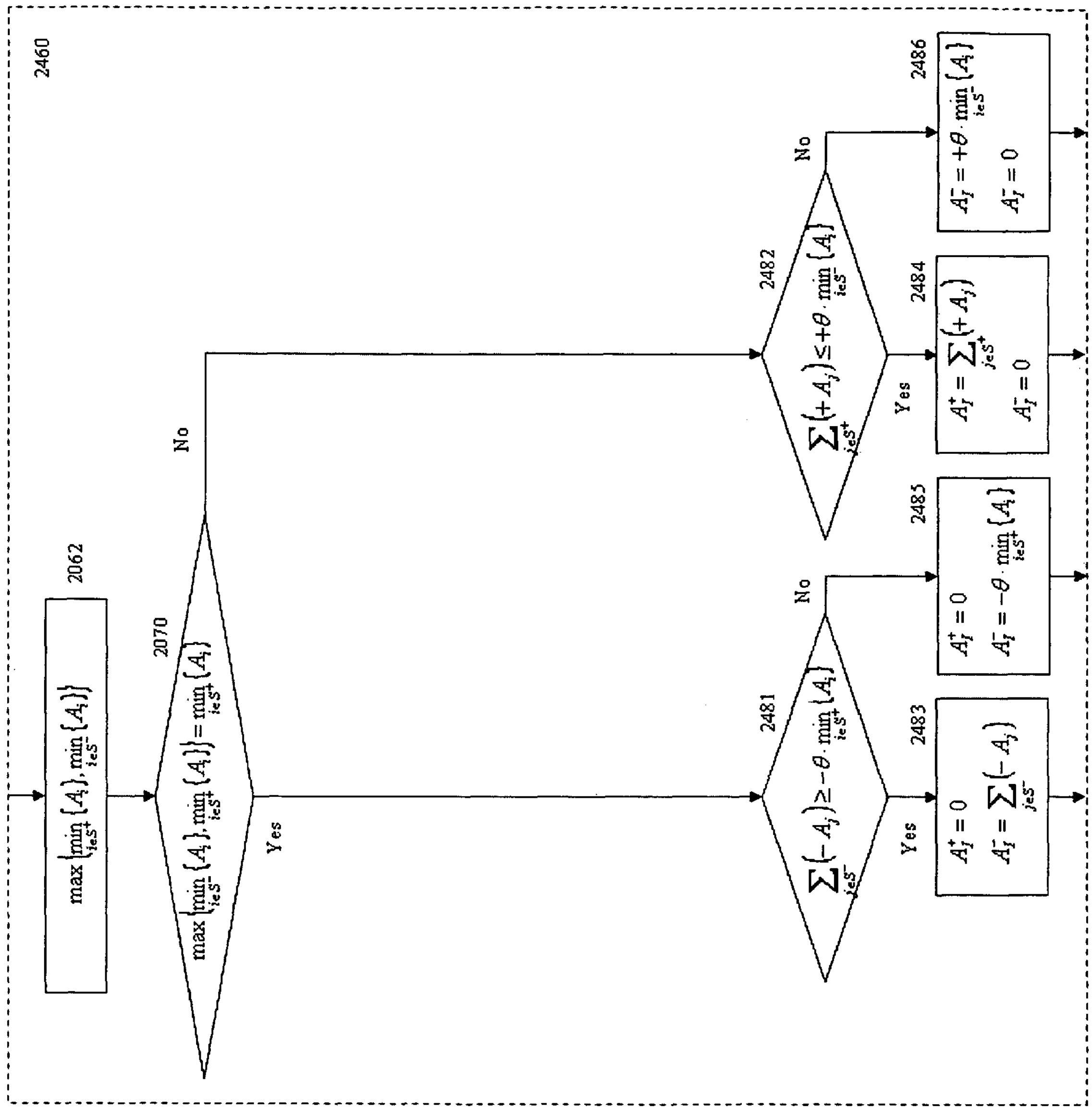
Fig. 24A(2)

Spread encoded symbols with the same orthogonal codeword at the n-th symbol time
(with transmission power control)

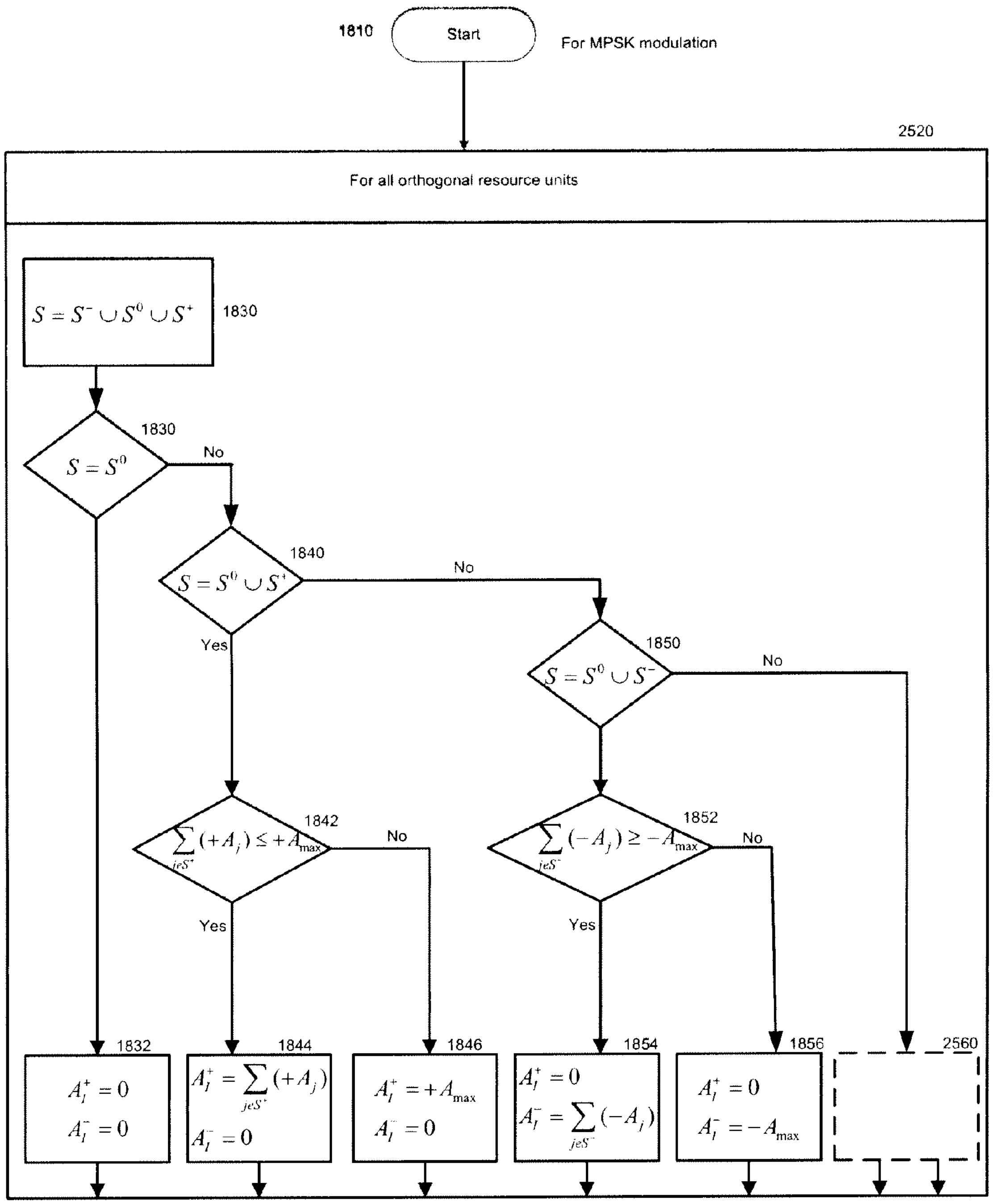
Fig. 25a(1)

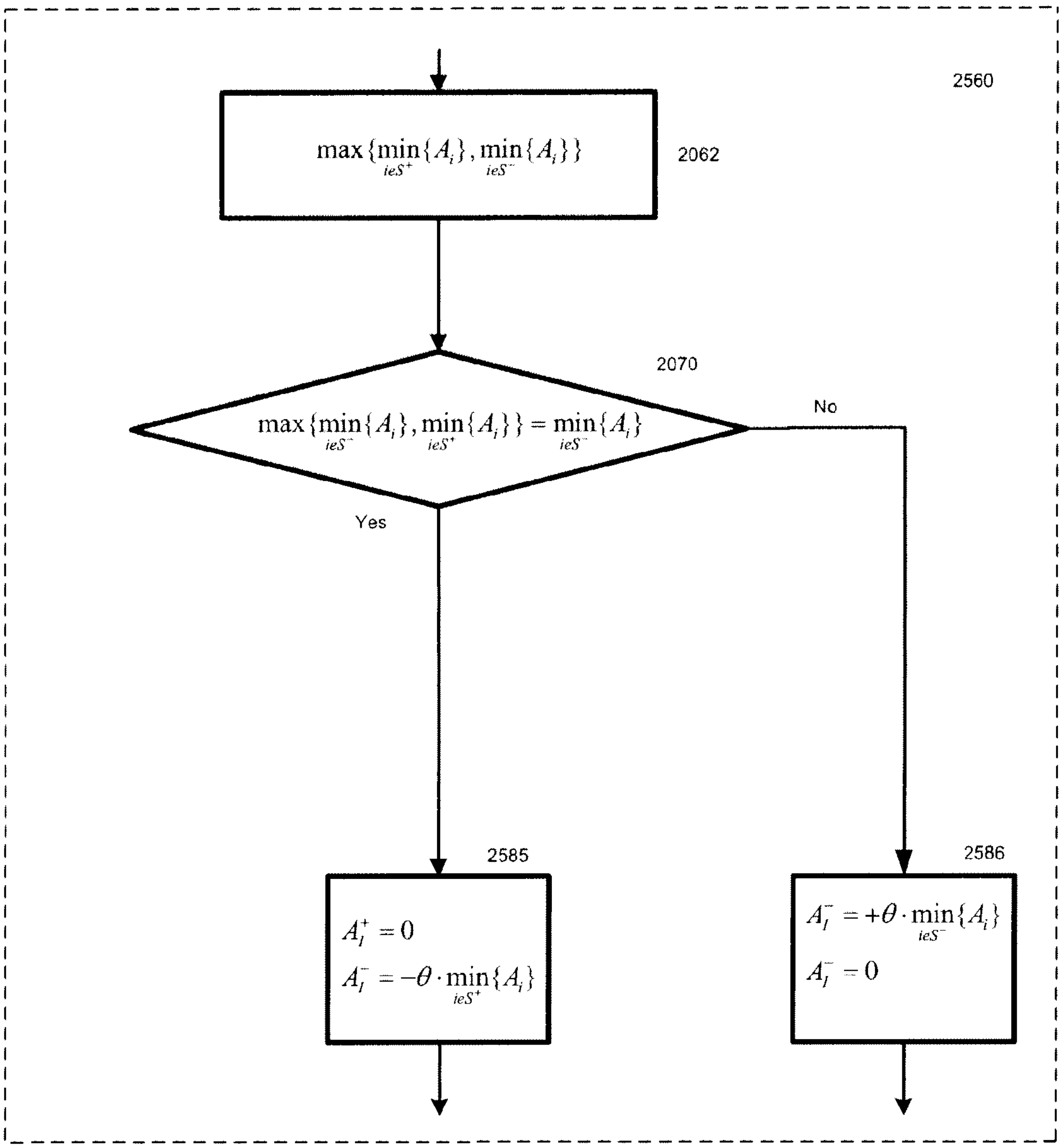
Fig. 25a(2)

Spread encoded symbols with the same orthogonal codeword at the n-th symbol time
(with transmission power control)

Intentional frame erasure at transmitter for reducing the puncturing probability

DIGITAL COMMUNICATION METHOD AND SYSTEM

The present patent application is a non-provisional application of International Application No. PCT/KR02/01774, filed Sep. 18, 2002.

BACKGROUND OF THE INVENTION (a) Field of the Invention

The present invention relates to a digital communication method and a system thereof, and specifically to an apparatus and method for a statistical multiplexing of channels based on a multidimensional orthogonal resource hopping method in case where each channel has a variable transmission rate less than a basic transmission rate R in wire/wireless communication systems using a plurality of low-activity communication channels mutually synchronized through a single medium.

More specifically, the present invention relates to a multiplexing apparatus and method in a system composed of a primary station and a plurality of secondary stations mutually synchronized, the primary station identifying a channel to each secondary station using a multidimensional orthogonal resource hopping pattern, the multidimensional orthogonal resource hopping pattern corresponding to the secondary station including an intentional(non-random) hopping pattern allocated by the primary station during a call set up or a pseudo-random hopping pattern unique to the secondary station. The coordinates of the multidimensional orthogonal resources in hopping patterns of a different channel can be identical(matched) (this phenomenon will be referred to as a "multidimensional hopping pattern collision"). In this case, whether or not the channels are matched is determined from the transmit data symbols for all transmit channels of the primary station related to the multidimensional hopping pattern collision. If a data symbol having at least one unmatched channel is transmitted, the corresponding data symbol interval is turned off and the transmission power of all channels off in data symbol transmission may be increased as much as a predetermined amount for a predetermined time as defined by the protocols so as to compensate for a loss of the average bit energy of missing data of all the related channels.

In this description, the primary and secondary stations correspond to a base station and mobile stations, respectively, in the existing systems. The primary station is in communication with multiple secondary stations. The present invention relates to a statistical multiplexing method applicable in a synchronized channel group maintaining orthogonality in the direction from the primary station to the secondary stations.

(b) Description of the Related Art

The present invention can be embodied independently in each channel group for a system maintaining orthogonality only in each channel group, e.g., a quasi-orthogonal code (QOC) used in the cdma2000 system that is a candidate technology of the next generation mobile communication system under standardization, i.e., IMT-2000, or a multi-scrambling code (MSC) to be used in the WCDMA system. With the channels of a primary station classified into channel groups having a same transmitter antenna beam as in a sectorizing or smart antenna system, the present invention can also be embodied independently in each channel For expediency in explaining which part of the prior art is modified in the embodiment of the multiplexing system of the present invention, the following description will be given on the basis of the IS-95 (cdmaOne) system that is a conventional mobile communication system now in commercial use.

In the digital/analog FDM (Frequency Division Multiplexing) communication system according to prior art, a primary station allocates available FA (Frequency Allocation) to a secondary station irrespective of the channel activity during a call set up, and the secondary station returns the FA to the primary station for another secondary station after termination of the call.

In the TDM (Time Division Multiplexing) communication system according to prior art, a primary station allocates one of available time slots in one FA to a secondary station irrespective of the channel activity during a call set up, and the secondary station returns the time slot to the primary station for another secondary station after termination of the call.

In the FHM (Frequency Hopping Multiplexing) communication system according to prior art, a primary station is in communication with a secondary station using a negotiated frequency hopping pattern irrespective of the channel activity during a call set up, and determines whether to allocate a new channel according to the number of allocated channels. But the FHM system has no control function of the present invention for not sending symbols of the related channel in order to reduce possible errors at the channel decoder of the receiver in the case of a hopping pattern collision.

In the OCDM (Orthogonal Code Division Multiplexing) communication system according to prior art, a primary station allocates an available orthogonal code symbol in an orthogonal code to a secondary station irrespective of the channel activity during a call set up, and the secondary station returns the orthogonal code symbol to the primary station for another secondary station after termination of the call.

In the description of the prior art, the same reference number will be assigned to the parts having the same function as in the description of the present invention.

FIG. 1 is a schematic of a system according to an example of the prior art and an embodiment of the present invention, in which channels 121, 122 and 123 formed from a primary station 101 to secondary stations 111, 112 and 113 are in synchronization with one another and have mutual orthogonality.

FIG. 2*a* is a schematic of a transmitter of the primary station for a part corresponding to the common component between the prior art and the present invention, and FIG. 2*b* is a schematic of a transmitter of the primary station for a traffic channel in the example of the prior art. A pilot channel 200 must be present by the respective subcarriers SCs, because it is used as a channel estimation signal for initial synchronization acquisition and search and synchronous demodulation at the secondary stations of FIG. 1. The pilot channel 200 is a channel shared among all secondary stations in an area that is under the control of the primary station. As illustrated in FIG. 2*a*, the pilot channel 200 is used to provide a phase reference for synchronous demodulation by transmitting a symbol of a known pattern without channel coding or channel interleaving. Like the pilot channel 200, a synchronous channel 210 is a broadcasting channel uni-directionally transferred to all the secondary stations in an area that is under the control of the primary station. The synchronous channel 210 is used for the primary station to transfer information (e.g., visual information, the identifier of the primary station, etc.) required in common to all the secondary stations. The data through the synchronous channel are sent to a spreader and modulator, which will be described later in FIG. 3, via a convolutional encoder 214, a repeater 216 for symbol rate control, a block interleaver 218 to overcome burst errors, and a repeater 219 to control a transmit data symbol rate. A paging channel 220 is a common channel used in the presence of an incoming message to the secondary station or for the purpose of responding to the request of the secondary station. Plural paging channels can be used.

The data transmitted through the paging channel are sent to an exclusive OR operator 236 via a convolutional encoder 224, a symbol repeater 226 and a block interleaver 228. The output of a long code generator 232 is sent to a decimator 234, which decimates the output of the long code generator 232 using a long code mask for paging channel 230. The exclusive OR operator 236 exclusive-OR operates the data from the block interleaver 248 with the decimated output of the long code generator 232 and then sent to the spreader and modulator of FIG. 3. A traffic channel 240 of FIG. 2*b* is a channel allocated to each secondary station during a call set up and exclusively used by the secondary station until a call termination. The traffic channel is used to transfer data from the primary station to each secondary station. The traffic channel is sent to a CRC (Cyclic Redundancy Check) encoder 241 to check errors in the unit of a predetermined time called a frame (e.g., 20 ms in the IS-95 (cdmaOne) system), a tail bit inserter 252 to insert tail bits that are all "0" for independent channel coding in the unit of frames, a convolutional encoder 244 and then a symbol repeater 246 to correct the transmit data symbol rate according to the transmit data rate.

Subsequent to symbol repetition, the traffic channel is sent to a block interleaver 248 to convert burst errors to uniformly distributed errors, and then to a scrambler 256. The output of the long code generator 232 is decimated into a PN (Pseudo-Noise) sequence by the decimator 234 using the long code mask 250 generated from an ESN (Electronic Serial Number) allocated by the respective secondary stations. The scrambler 256 scrambles the traffic channel from the block interleaver 248 using the PN sequence.

The scrambled traffic channel is sent to a PCB (Power Control Bit) position extractor 258 to extract a PCB position from the PN sequence to insert a PCB for controlling the transmission power from the secondary station. A PCB puncture and insert section 260 punctures a data symbol corresponding to the PCB position among the scrambled data symbols from the scrambler 256, and inserts a PCB. The PCB-inserted traffic channel is sent to the spreader and modulator of FIG. 3.

The position of the transmit data symbol for transmission time hopping multiplexing according to the present invention can also be detected using the decimated PN sequence as described above.

FIGS. 3*a*, 3*b* and 3*c* illustrate an example of the spreader and modulator using the conventional code division multiplexing technology.

The spreader and modulator of FIG. 3*a* uses the existing IS-95 (cdmaOne) system based on a BPSK (Binary Phase Shift Keying) data modulation system.

The spreader and modulator of FIG. 3*b* spreads I/Q channel transmit data with a different orthogonal code symbol in the structure of FIG. 3*a*. The spreader and modulator of FIG. 3*c* employs a QPSK (Quadrature Phase Shift Keying) data modulation system so as to transmit double the data of FIG. 3*a* with the same bandwidth. The QPSK data modulation system is adapted to cdma2000, one of the candidate technologies of the IMT-2000 system.

The spreader and modulator of FIG. 3*d* use the QPSK data modulation system in order to transmit double the data of FIG. 3*b* with the same bandwidth. FIG. 3*e* shows a spreader and modulator using a QOC (Quasi-Orthogonal Code) modulation system usually adapted in cdma2000, one of the candidate technologies of the IMT-2000 system.

FIG. 3*f* shows that I/Q channel transmit data are spread with a different orthogonal code symbol in the structure of FIG. 3*e*.

Referring to FIG. 3*a*, signal converters 310, 330, 326, 346 and 364 convert logic signals of "0" and "1" to actual transmit physical signals of "+1" and "−1", respectively. The individual channels of FIG. 2 are sent to spreaders 312 and 332 via the signal converters and spread with the output of a corresponding Walsh code generator 362. The spread channels are then sent to amplifiers 314 and 334 to control their relative transmission power.

After passing through the spreaders 312 and 332 using an orthogonal Walsh function 362 fixedly allocated to each channel and the amplifiers 314 and 334, the channels of the primary station are all sent to orthogonal code division multiplexers 316 and 336.

The multiplexed signals are then sent to QPSK spreader and modulators 318 and 338 using short PN sequences generated from short PN sequence generators 324 and 344 for discrimination of the primary station. The spread and modulated signals are sent to low-pass filters 320 and 340 and modulators 322 and 342 for transition to a transmit band. The signals modulated with carriers are sent to a wireless section (not shown) such as a high power amplifier and then transferred via an antenna.

Referring to FIG. 3*b*, signal converters 310, 330, 326, 346 and 364 convert logic signals of "0" and "1" to actual transmit physical signals of "+1" and "−1", respectively. The individual channels of FIG. 2 are sent to spreaders 312 and 332 via the signal converters and spread with the output of a corresponding Walsh code generator 362 by the I/Q channels. The spread channels are then sent to amplifiers 314 and 334 to control their relative transmission power. After passing through the spreaders 312 and 332 using an orthogonal Walsh function 362 fixedly allocated to each channel and the amplifiers 314 and 334, all the channels of the primary station are sent to orthogonal code division multiplexers 316 and 336. The multiplexed signals are then sent to QPSK spreader and modulators 318 and 338 using short PN sequences generated from short PN sequence generators 324 and 344 for discrimination of the primary station. The spread and modulated signals are sent to low-pass filters 320 and 340 and modulators 322 and 342 using carriers for transition to a transmit band. The signals modulated with carriers are sent to a wireless section (not shown) such as a high power amplifier and then transferred via an antenna.

FIG. 3*c* is the same as FIG. 3*a*, excepting that the signals generated in FIG. 2 are sent to a demultiplexer 390 for QPSK, rather than BPSK, using an in-phase (I) channel and a quadrature phase (Q) channel in sending different information data. The demultiplexer 390 and the signal converters 310 and 330 are used to realize QAM (Quadrature Amplitude Modulation) instead of QPSK.

FIG. 3*d* is the same as FIG. 3*b*, excepting that the signals generated in FIG. 2 are sent to a demultiplexer 390 for QPSK, rather than BPSK, using an in-phase (I) channel and a quadrature phase (Q) channel in sending different information data.

FIG. 3*e* shows that the transmit data are spread with a spreading code generated using the quasi-orthogonal code mask for discrimination of a channel from the primary station to the secondary station in FIG. 3*c*. Orthogonality is not maintained in the code symbol group using a different quasi-orthogonal code but in the code symbol group using a same orthogonal code mask.

Accordingly, the system proposed in the present invention is applied only to the orthogonal code symbol group using a same quasi-orthogonal code mask and maintaining orthogonality.

FIG. 3*f* is the same as FIG. 3*e*, excepting that a separate Walsh code generator is used for I- and Q-channels so as to spread I/Q channel transmit data with a different orthogonal code symbol.

FIGS. 4*b* and 4*c* show a signal diagram explaining a multiplexing method in which orthogonal resources are allocated to the signals generated in FIGS. 2 and 3 by the respective channels to transmit the signals.

With a primary station in communication with secondary stations, the data rate by the respective secondary stations may be variable over time. Let the channel-based maximum transmission rate allocated to the secondary stations by the primary station be a basic transmission rate R, the frame-based average transmission rate may be R, R/2, R/4, . . . , or 0 according to the frame-based amount of data transferred from the primary station to the secondary stations.

FIG. 4*b* is a signal diagram showing that the frame-based instantaneous transmission rate is adjusted to the average transmission rate, which method is applied on the forward link in the IS-95 (cdmaOne) orthogonal code division multiplexing communication systems.

In FIG. 4*b*, when the frame-base transmit data have a transmission rate below the basic transmission rate, dummy information is used to compensate for the deficient part and thereby match the frame-based instantaneous transmission rate to the average transmission rate.

FIG. 4*c* shows that the instantaneous transmission rate is classified into a basic transmission rate R and 0 (no transmission) and that an average transmission rate for a given frame is adjusted according to the percentage of an interval having a transmission rate of R or 0.

In FIG. 4*c*, instead of the ON/OFF switching of transmit symbol units that are spreading units used in the present invention, the ON/OFF switching of time slot units that are power control units is used in adjusting the frame-based average transmission rate, while maintaining the amplitude of the reference signal for a closed loop power control of the reverse link in the IS-95 (cdmaOne) system.

Contrary to the present invention, there is no orthogonality between channels on the IS-95 (cdmaOne) reverse link.

In FIGS. 4*b* and 4*c*, the common pilot channel is used in parallel with a channel to the secondary stations. But the pilot channel, which is used at the receiver as a reference for synchronization, channel estimation and power control, can be transmitted by time division multiplexing as in the conventional GSM (Global System for Mobile) or WCDMA (Wideband CDMA) system. The pilot channel in this case is called "pilot symbol" or another various names such as preamble, midamble or post-amble according to the multiplexed position.

FIG. 4*d* illustrates the conventional frequency division multiplexing system, in which communication channels from a primary station to plural secondary stations use a different frequency allocation (FA). The frequency division multiplexing system of the present invention includes the OFDM (Orthogonal Frequency Division Multiplexing) system actively studied for satellite broadcasting.

For OFDM, the FA of the individual subcarrier channels is not completely independent but overlapped, but may be included in the orthogonal resource of the present invention, because orthogonality between the subcarrier channels is secured.

FIG. 4*e* illustrates the conventional time division multiplexing system such GSM, in which communication channels from a primary station to plural secondary stations use a same frequency allocation (FA) but the time slots in the frame are exclusively allocated by the respective secondary stations.

FIGS. 4*f*, 4*g* and 4*h* apply a frequency hopping system to the conventional frequency division multiplexing system of FIG. 4*d* for the purpose of strengthening frequency diversity and security. FIG. 4*f* shows frequency hopping in the unit of time slots. FIG. 4*g* shows regular frequency hopping in the unit of transmit data symbols. FIG. 4*h* shows irregular frequency hopping in the unit of transmit data symbols. The system of FIG. 4*g* brings focus into frequency diversity, and that of FIG. 4*h* has importance on frequency diversity and security for preventing a monitoring by an unauthorized receiver.

Frequency hopping multiplexing includes fast frequency hopping multiplexing in the unit of symbols or partial symbols and slow frequency hopping multiplexing in the unit of several symbols. The systems of FIGS. 4*f*, 4*g* and 4*h* applied to the time division multiplexing system of FIG. 4*e* provide frequency diversity.

In fact, the use of frequency hopping in the unit of time slots or frames is optionally given in the next-generation mobile communication system, i.e., GSM for the purpose of strengthening frequency diversity rather than security.

FIG. 4*i* illustrates the conventional orthogonal code division multiplexing system such as cdma2000 or WCDMA systems. In FIG. 4*i*, the communication channels from a primary station to the respective secondary stations are established using the same frequency allocation (FA) and all time slots in the frame. The primary station allocates a fixed orthogonal code symbol to each channel during a call set up, and each secondary station returns the orthogonal code symbol to the primary station for another secondary station involving another call set up. Accordingly, all the data symbols in the frame are spread with the same orthogonal code symbol. The transmitters of the primary station corresponding to FIG. 4*i* are presented in FIGS. 3*a* to 3*f*.

FIG. 4*j* is a signal diagram of a transmit signal from the primary station in the conventional ORDM (Orthogonal Resource Division Multiplexing) system, in which channel-based fixed allocation of orthogonal resources is illustrated. ORDM is applied to most of the conventional digital communication systems.

The receiver of the secondary station corresponding to the transmitter of the primary station according to the example of the prior art as shown in FIG. 4*i* is similar to the transmitters of FIGS. 3*a* to 3*f* except for the despreading part. Thus, FIG. 5 shows a schematic view of a receiver corresponding to the transmitter of FIG. 3*a*. The received signal through an antenna is demodulated with carriers at demodulators 510 and 530 and low-pass filtered at low-pass filters 512 and 533 into a baseband signal. The sequences, which are generated from PN-I/Q short code generators 520 and 540 and the same with PN sequences used at the transmitter, are synchronized and multiplied by the received baseband signal at multipliers 514 and 534. The multiplied sequences are cumulated for a transmit data symbol interval and sent to despreaders 516 and 536. A channel estimator 550 extracts a pilot channel component from the baseband signal with an orthogonal code symbol allocated to the pilot channel to estimate a transmit channel, and a phase recovery section 560 compensates for the phase distortion of the baseband signal using the estimated phase distortion value. If the pilot channel is subject to time division multiplexing rather than code division multiplexing, a demultiplexer is used to extract the pilot signal part and the intermittent phase change between the extracted pilot signals is then estimated by interpolation.

FIG. 6 shows the structure of a receiver for a channel without a PCB insertion from the primary station like the above-stated paging channel, where the PCB is a command for controlling the transmission power from the secondary stations to the primary station. After the phase compensation in FIG. 5, the signals are fed into maximum ratio combiners 610 and 620. With a QPSK data modulation at the transmitter as illustrated in FIG. 3*b*, the combined signal is sent to a multiplexer 614 for multiplexing; alternatively, with a BPSK data modulation, the two signals are added. The resulting signal is then sent to a soft decision section 616 for soft decision. The output of a long code generator 622 formed by a long code mask 620 is sent to a decimator 624. The signal from the soft decision section 616 is multiplied by the decimated output of the long code generator 622 by a multiplier 618 for descrambling. The receiver of the secondary station for a channel subject to orthogonal code hopping multiplexing according to the embodiment of the present invention is similar in structure to the receiver of FIG. 6. For the synchronous channels, the components related to the long code descrambling process are omitted.

FIG. 7 shows the structure of a receiver for a channel with a PCB insertion from the primary station like the above-stated traffic channel, where the PCB is a command for controlling the transmission power from the secondary stations to the primary station. After the phase compensation in FIG. 5, the signals are fed into maximum ratio combiners 710 and 720. With a QPSK data modulation at the transmitter as illustrated in FIG. 3*c*, the in-phase (I) component and the quadrature (Q) phase component are sent to a multiplexer 714 for multiplexing; alternatively, with a BPSK data modulation as illustrated in FIG. 3*a*, the in-phase (I) component and the quadrature phase (Q) component are added. The resulting signal is sent to an extractor 740 for extraction of a signal component corresponding to the PCB from the primary station and then to a hard decision section 744 for hard decision. The signal from the hard decision section 744 is transferred to the transmission power controller of the secondary station. The data symbol generated by removing the PCB from the received signal of the multiplexer 714 is sent to a soft decision section 742 for soft decision. The output of a long code generator 722 formed by a long code mask 720 generated from the identifier of the secondary station is sent to a decimator 724. The signal from the soft decision section 742 is multiplied by the decimated output of the long code generator 722 by a multiplier 718 for descrambling.

FIG. 8 illustrates that the received signal processed in FIG. 7 is subject to channel deinterleaving at block deinterleavers 818, 828 and 838 and channel decoding at convolutional decoders 814, 824 and 834 to reconstitute data transferred from the primary station. For a synchronous channel 810, the signal from the soft decision section is sent to a sampler 819 for symbol compression that is a reversed process of the symbol repeater 219 by accumulation of the received signals, thereby reducing a symbol rate. The signal from the sampler 819 is sent to the block deinterleaver 818 for channel deinterleaving. Before a channel decoding at the convolutional decoder 814, the channel-deinterleaved signal is sent to a sampler 816 for another symbol compression that is a reversed process of the symbol repeater 216. The signal from the sampler 816 is sent to the convolutional decoder 814 for channel decoding, thereby reconstituting the synchronous channel received from the primary station. For a paging channel 820, the signal from the soft decision section is sent to the block deinterleaver 828 for channel deinterleaving. The channel-deinterleaved signal is sent to a sampler 826 for symbol compression according to the transmit data rate that is a reversed process of the symbol repeater 226. The signal from the sampler 826 is sent to the convolutional decoder 824 for channel decoding, thereby reconstituting the paging channel received from the primary station. For a traffic channel 830, the signal from the soft decision section is sent to the block deinterleaver 838 for channel deinterleaving irrespective of the transmit data rate. The channel-deinterleaved signal is sent to a sampler 836 for symbol compression according to the transmit data rate that is a reversed process of the symbol repeater 246. The signal from the sampler 836 is sent to the convolutional decoder 834 for channel decoding and removed of a tail bit for frame-based independent transmit signal generation by a tail bit remover 832. As in the transmitter for the transmit data part, a CRC bit is generated and compared with a CRC bit reconstituted by channel decoding to determine whether or not there is an error. When the two CRC bits are matched, it is determined that there is no error, thereby reconstituting traffic channel data. If information about the transmit data rate in the unit of 20-ms frames is not stored at the transmitter, the channel deinterleaved signals are channel-decoded independently for all possible transmit data rates and then the CRC bits are compared to determined the transmit data rate from the primary station. For a system in which the transmit data rate is separately transferred, only the channel decoding process for a corresponding data rate is needed.

There are four conventional methods for maintaining orthogonality between channels from the primary station to the secondary stations as shown in FIG. 1. The first method is to use the frequency division multiplexing so that the primary station fixedly allocates FA to the secondary stations during a call set up as illustrated in FIG. 4*d*. The second method is to use the time division multiplexing so that the primary station fixedly allocates time slots to the secondary stations during a call set up as illustrated in FIG. 4*e*. The third method is to allocate a hopping pattern controlled to avoid a collision of the primary station during a call set up as illustrated in FIGS. 4*f*, 4*g* and 4*h* to the secondary stations, or to use the total bandwidth composed of multiple subcarriers for a single secondary station at a given time in a given area, as in the military use. The fourth method is to allocate unoccupied orthogonal code symbols by the primary station during a call set up and spreading channels as illustrated in FIG. 4*i*.

Apart from the frequency hopping multiplexing method, the other three methods have a common feature that the primary station allocates fixedly orthogonal resources (e.g., frequency, time, or orthogonal code) to the secondary stations. The frequency hopping multiplexing method is primarily used for the security purpose in many applications supporting a sufficient quantity of resources, as in the military use. Hence, the frequency hopping multiplexing is not aimed at an efficient use of resources.

It is therefore difficult in the above methods to efficiently use the resources when the limited orthogonal resource is allocated to the channels having a low activity or a variable transmit data rate less than or equal to a basic transmission rate.

A rapid channel allocation and release is required in order to fixedly allocate the resources as in the prior methods and increase the utilization of the resources. But, a considerable part of the confined resources are not used for actual data transmission but allocated to the control information for data transmission because the control signal information for frequent channel allocation and release is transferred.

Even with a rapid procedure of channel allocation and release, the data to be transmitted must be buffered during a period from its arrival at the primary station to transmission via the steps of channel allocation (or release) message transmission and confirmation. The required buffer capacity in this case increases with an increase in the processing time of the procedures.

In the method of fixedly allocating resources during a handoff to an adjacent cell, the handoff is hardly acquired even when the channels in the adjacent cell have a low activity, because there is no available resource to be allocated.

Furthermore, important information such as control information that necessarily requires a confirmation step after a transmission must be buffered for retransmission. But the required buffer capacity can be reduced only by transmitting the resources with a shortest delay in the transmission such as datagram transmission that does not require a confirmation step.

SUMMARY OF THE INVENTION

One objective of the present invention is to provide a system and method for statistical multiplexing of traffics having a low activity or a variable transmit data rate by a multidimensional orthogonal resource hopping multiplexing in consideration of the activity of transmit data and the transmit data rate, instead of the prior art, which involves fixed allocation of orthogonal resources such as frequency, time, and orthogonal code to acquire a one-to-one correspondence relationship of the orthogonal resources and channels, thereby allowing allocation of channels from a primary station to secondary stations, increasing the use efficiency of limited orthogonal resources, reducing signal traffic for unnecessary channel allocation and release, eliminating a transmission scheduling step, reducing the required buffer capacity of the primary station and data transmission delay time, and achieving a simple handoff to an adjacent cell.

Another objective of the present invention to a method and system is statistical multiplexing that applies a multidimensional orthogonal resource hopping multiplexing with an orthogonal axis of frequency, time, or orthogonal code in case of a low activity of synchronized channels maintaining orthogonality or a variable transmit data rate changed to below a basic transmission rate, thereby allowing allocation of channels from a primary station to secondary stations, increasing the utilization of limited orthogonal resources, reducing signal traffic for unnecessary channel allocation and release, eliminating a transmission scheduling step, reducing the required buffer capacity of the primary station and data transmission delay time, and achieving a simple handoff to an adjacent cell.

In an aspect of the present invention, there is provided a digital communication method, which is to perform a statistical multiplexing by allocating communication channels from a primary station to a plurality of secondary stations in synchronization based on a multidimensional orthogonal resource hopping method, the digital communication method including: determining whether or not signs of transmit data symbols are matched, when a collision between hopping patterns of multidimensional orthogonal resources occurs; transmitting all the data symbols, when the signs of the transmit data symbols are matched; and perforating all the data symbols, when the signs of the transmit data symbols are unmatched.

In another aspect of the present invention, there is provided a hopping multiplexing method for a multidimensional orthogonal resource, which method is a digital communication method that includes allocating communication channels from a primary station to a plurality of secondary stations in synchronization based on the hopping method of the multidimensional orthogonal resources and then subjecting the allocated communication channels to statistical multiplexing, the hopping multiplexing method including: (a) with a collision between hopping patterns of the multidimensional orthogonal resource, controlling a transmit signal of each orthogonal wireless resource unit according to a transmit data symbol of the channel involved in the collision and a transmit signal amplitude of the channel; (b) determining signs of data symbols transmitted in the units of the orthogonal wireless resource of the channel having a collision of the hopping patterns; and (c) classifying the channels into a set $S^0$ of channels allocated but not transmitted in the units of the orthogonal wireless resource, a set $S^+$ of channels having a positive data symbol transmitted in the units of the orthogonal wireless resource, and a set $S^-$ of channels having a negative data symbol transmitted in the units of the orthogonal wireless resource, and determining data symbols to be transmitted in the units of the orthogonal wireless resource.

In still another aspect of the present invention, there is provided a digital communication method, which is to perform a statistical multiplexing by allocating communication channels from a primary station to a plurality of secondary stations in synchronization based on a multidimensional orthogonal resource hopping method, the digital communication method including: (a) determining the distance from the primary station to each secondary station; and (b) using a transmit diversity of the primary station to compensate for a signal loss to the secondary station being relatively far from the primary station.

The present invention fixedly allocates spreading orthogonal code symbols in an orthogonal code used as a limited resource to a channel (hereinafter, referred to as "a sparse channel") having a low transmit data activity, generating a relatively low traffic, or a variable transmission rate of less than or equal to a basic transmission rate R based on the statistical characteristic of a required service, and thereby emerges from the system in which channels are an orthogonal resource, and achieving statistical multiplexing by distinguishing channels with a multidimensional orthogonal resource hopping pattern. To prevent an erroneous data reception at the secondary stations due to a collision of multidimensional orthogonal resource coordinates possibly caused by mutually independent hopping patterns by the respective secondary stations, the present invention compares transmit data symbols of all channels involved in the collision and does not transmit them except for the case where the transmit data symbols are all matched. To compensate for the average received energy required because of the non-transmitted data symbols, the primary station increases the transmission energy to the related secondary stations for a predetermined interval.

Additionally, the method of the present invention is compatible with the existing systems because the sustained orthogonality of all resources makes it possible to operate a set of resources used for a multidimensional orthogonal resource hopping multiplexing independently to a set of resources used for the conventional methods.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 14*o* is an illustration showing that the data symbols of the collided coordinates in FIG. 14*n* are compared with one another to determine whether to be transmitted (the black square means transmission; and the dotted line square means no transmission);

FIG. 14*aa* is an illustration showing that the data symbols of the collided coordinates in FIG. 14*z* are compared with one another to determine whether to be transmitted (the white cuboid means transmission; and the dotted cuboid means no transmission);

FIG. 20*a* is a flow chart showing the third method for determining a transmit signal by the respective orthogonal wireless resource units at a transmitter from the primary station to the secondary station according to an embodiment of the present invention;

FIG. 21*a* is a flow chart showing the fourth method for determining a transmit signal by the respective orthogonal wireless resource units at a transmitter from the primary station to the secondary station according to an embodiment of the present invention;

FIG. 22*a* is a flow chart showing the fifth method for determining a transmit signal by the respective orthogonal wireless resource units at a transmitter from the primary station to the secondary station according to an embodiment of the present invention;

FIG. 23*a* is a flow chart showing the sixth method for determining a transmit signal by the respective orthogonal wireless resource units at a transmitter from the primary station to the secondary station according to an embodiment of the present invention;

FIG. 24*a* is a flow chart showing the seventh method for determining a transmit signal by the respective orthogonal wireless resource units at a transmitter from the primary station to the secondary station according to an embodiment of the present invention;

Figure 25B:
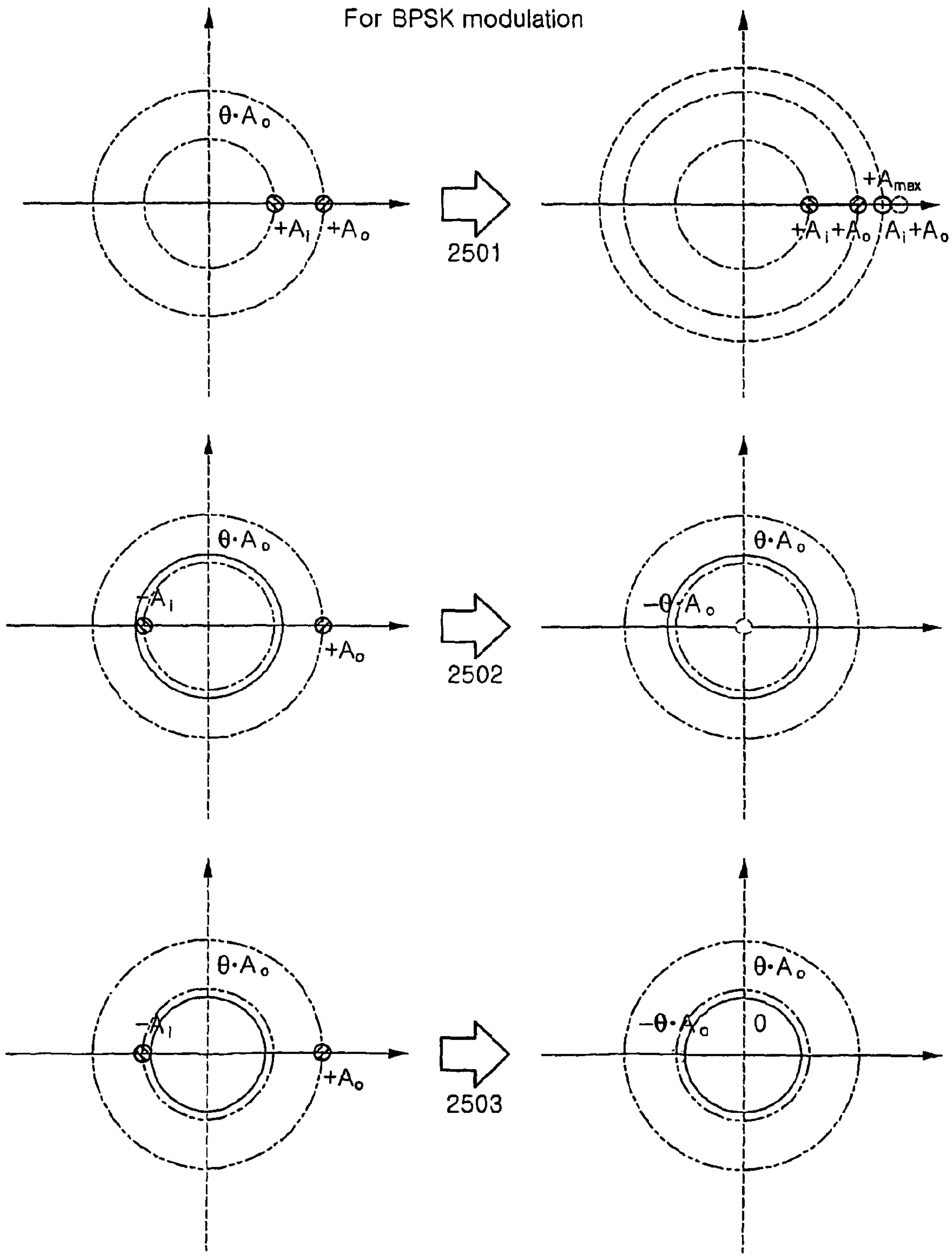
FIG. 25*b* illustrates the determination of the final transmit signal using the method of FIG. 25*a* in the case of a multidimensional orthogonal resource hopping pattern collision between two channels.
Figure 25C:
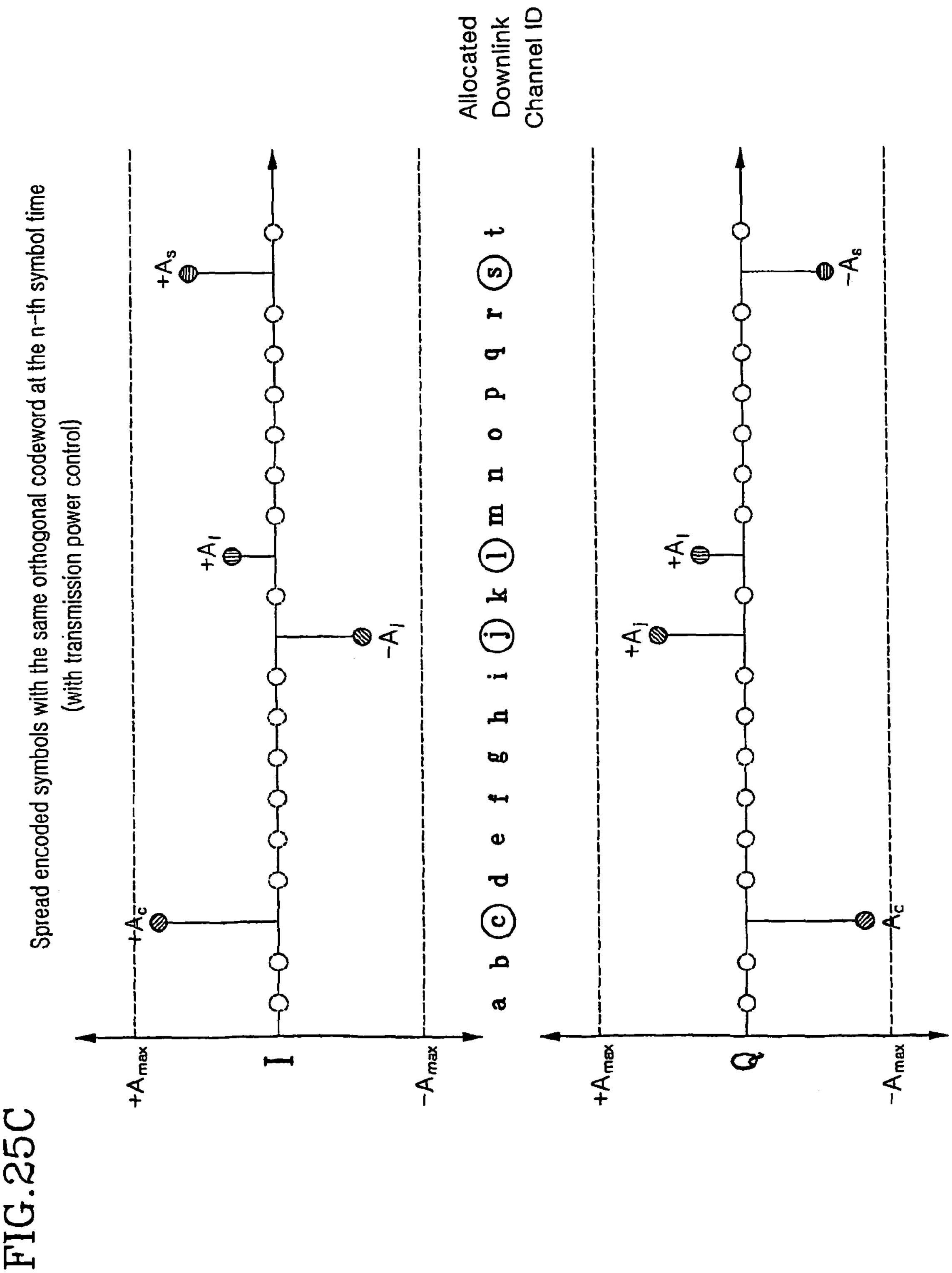
FIG. 25*c* illustrates a multidimensional orthogonal resource hopping pattern collision among four channels c, j, I and s for explaining the determination of the final transmit signal using the method of FIG. 25*a;*
Figure 25D:
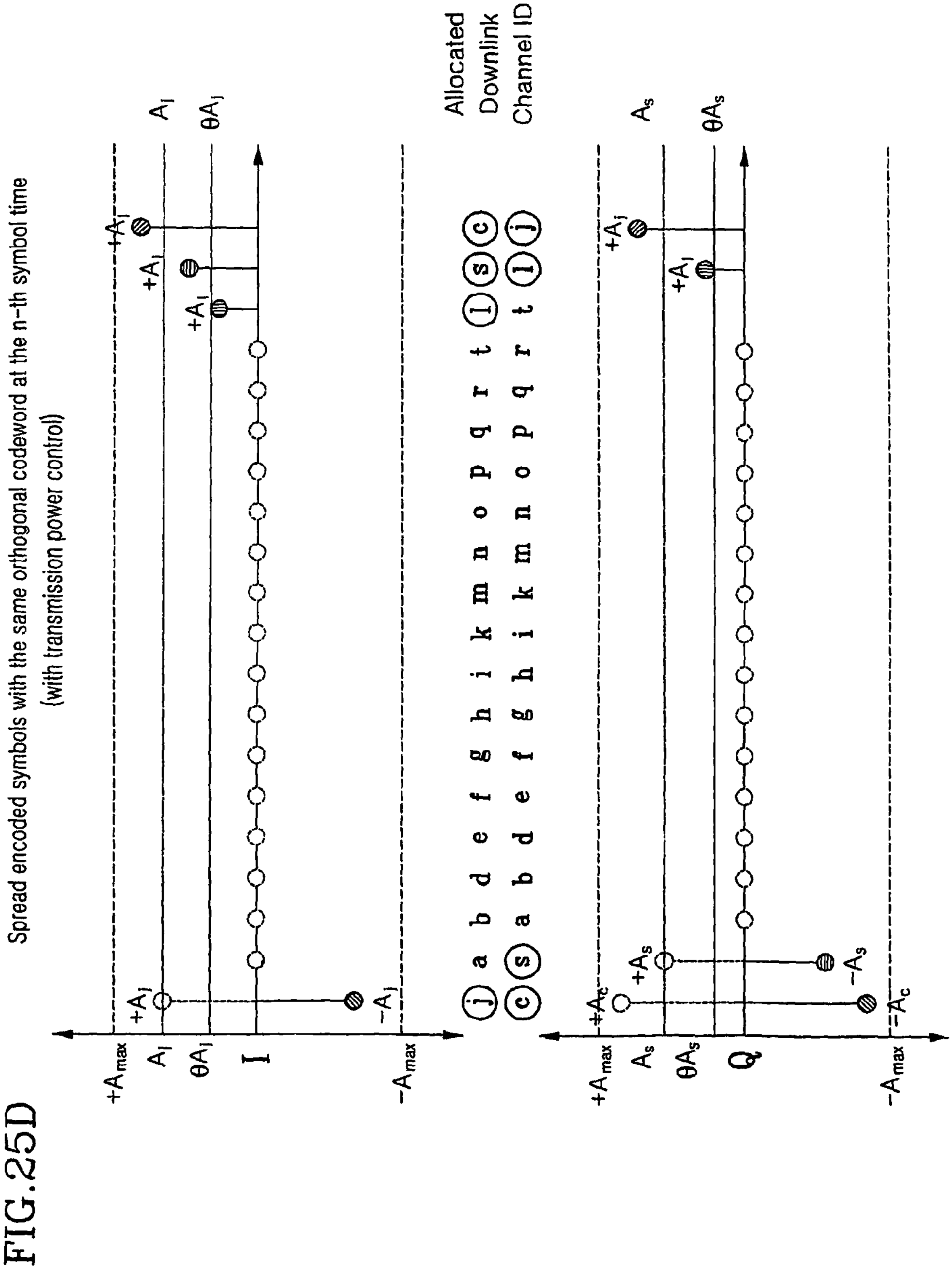
FIGS. 25*a*(1) and 25*a*(2) referred to collectively as FIG. 25*a* is a flow chart showing the eighth method for determining a transmit signal by the respective orthogonal wireless resource units at a transmitter from the primary station to the secondary station according to an embodiment of the present invention.

FIG. 25*d* shows a channel arrangement for comparing the amplitudes of channels selecting the orthogonal wireless resource unit in case of FIG. 25*c;*

Figure 25E:
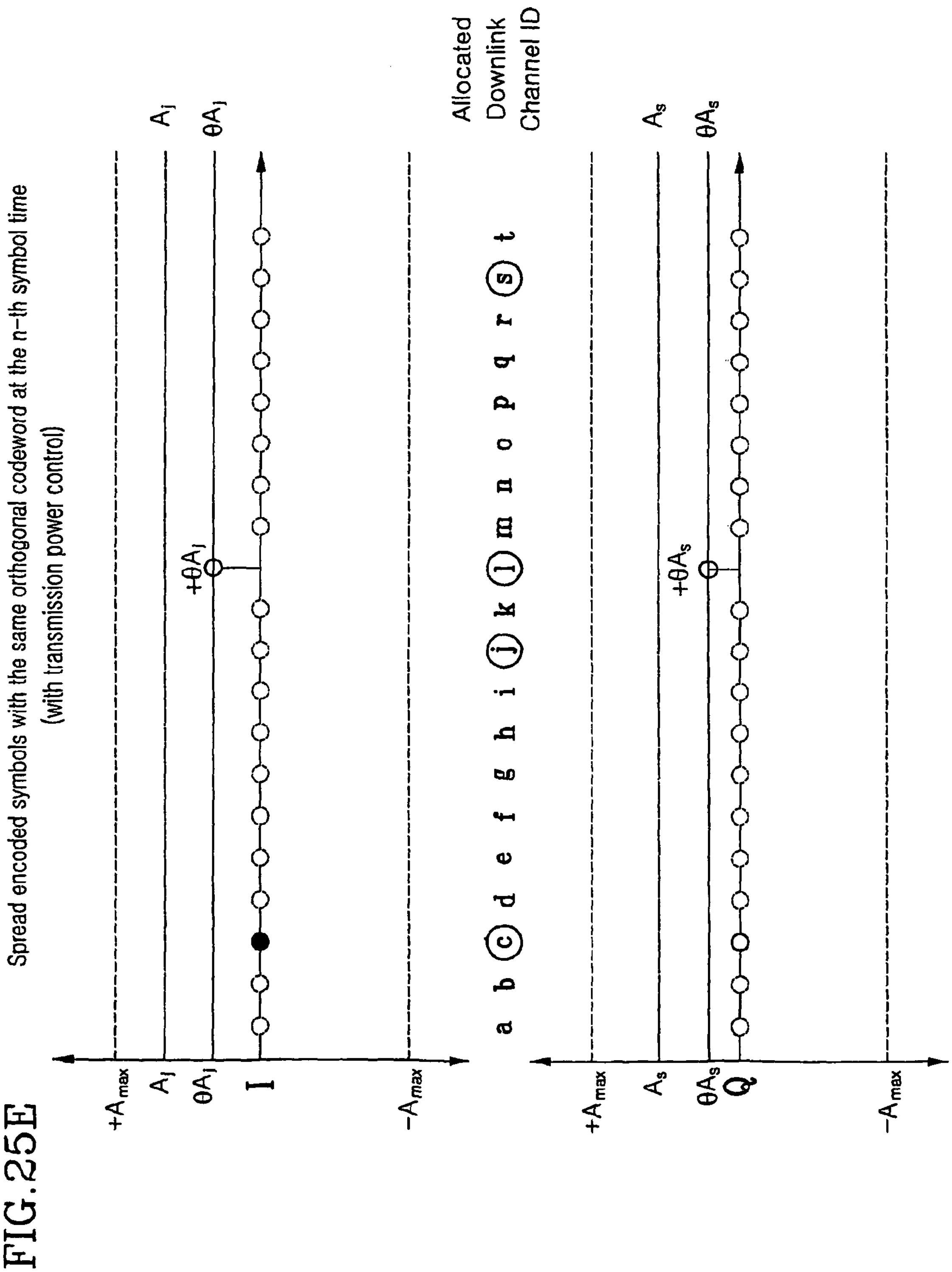

FIG. 25*e* illustrates the final transmit signal determined according to the algorithm of FIG. 25*a* in case of FIG. 25*c;*

Figure 4A:
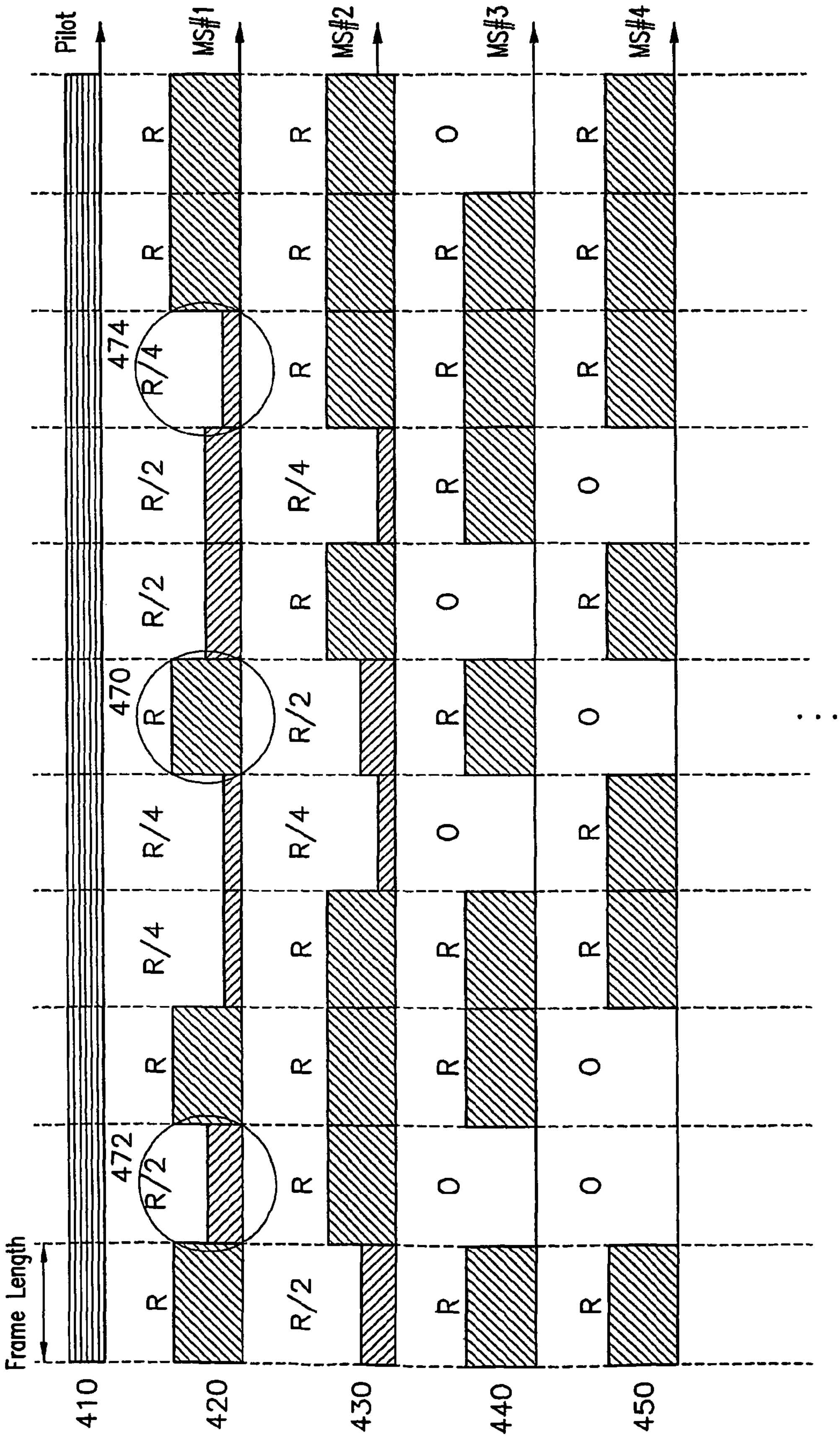
FIG. 4*a* is a signal diagram showing a transmit signal from the primary station by the respective frames according to an example of the prior art.
Figure 4B:
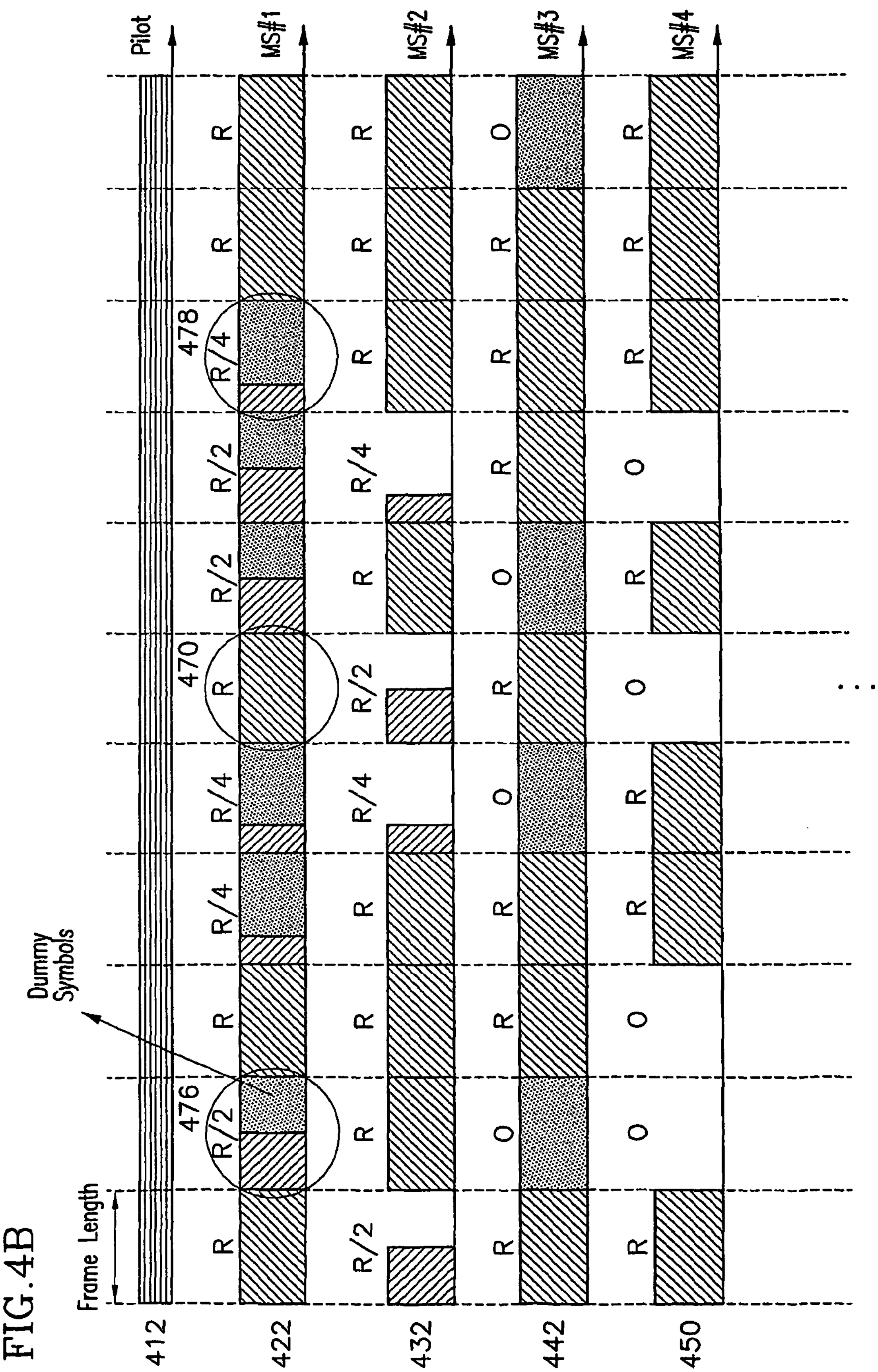
FIG. 4*b* is a signal diagram showing a transmit signal from the primary station by the respective frames according to another example of the prior art.
Figure 4C:
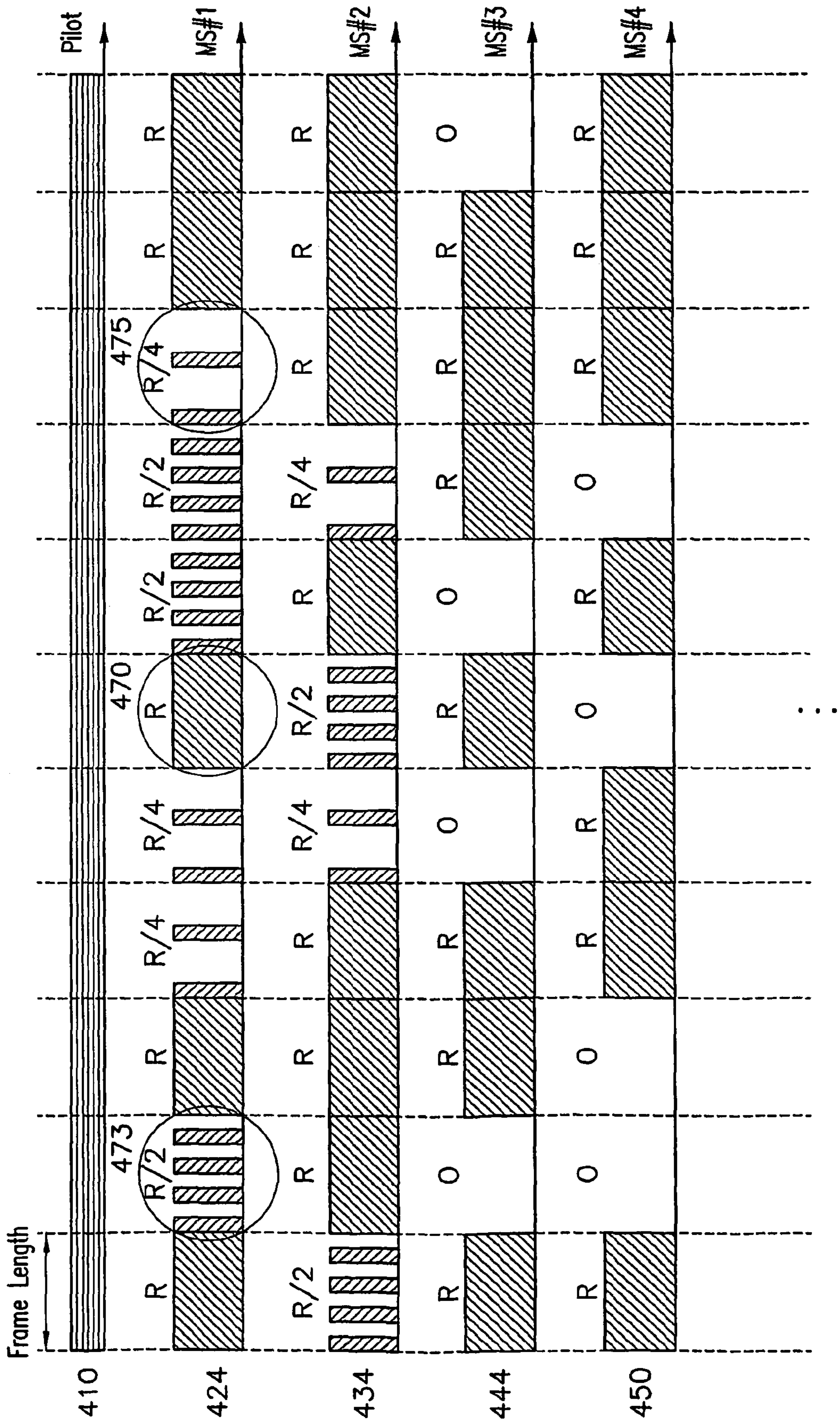
FIG. 4*c* is a signal diagram showing a transmit signal from the primary station by the respective frames according to further another example of the prior art.
Figure 4D:
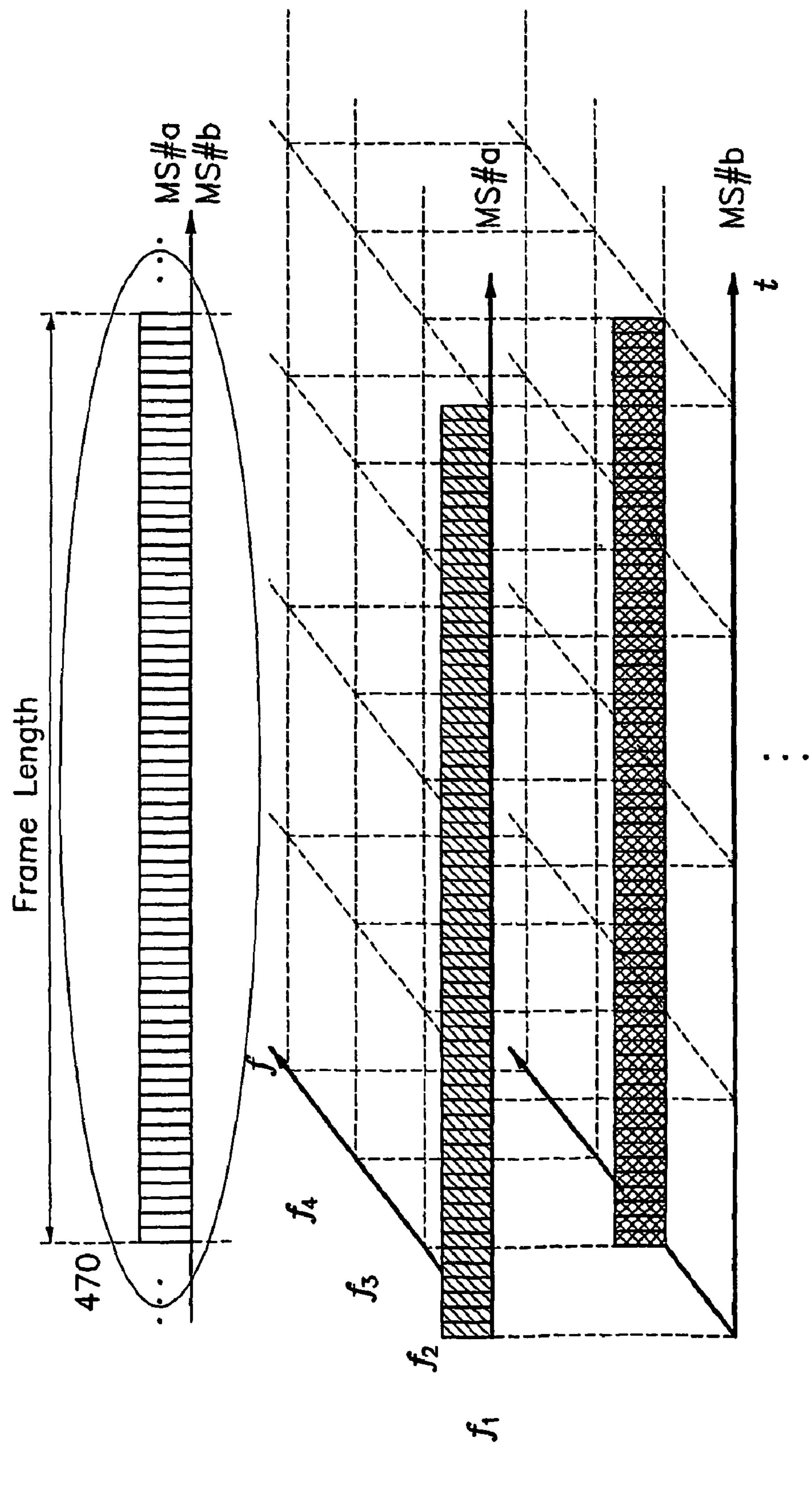
FIG. 4*d* is a signal diagram showing a transmit signal from the primary station according to the conventional FDM (Frequency Division Multiplexing) system.
Figure 26:
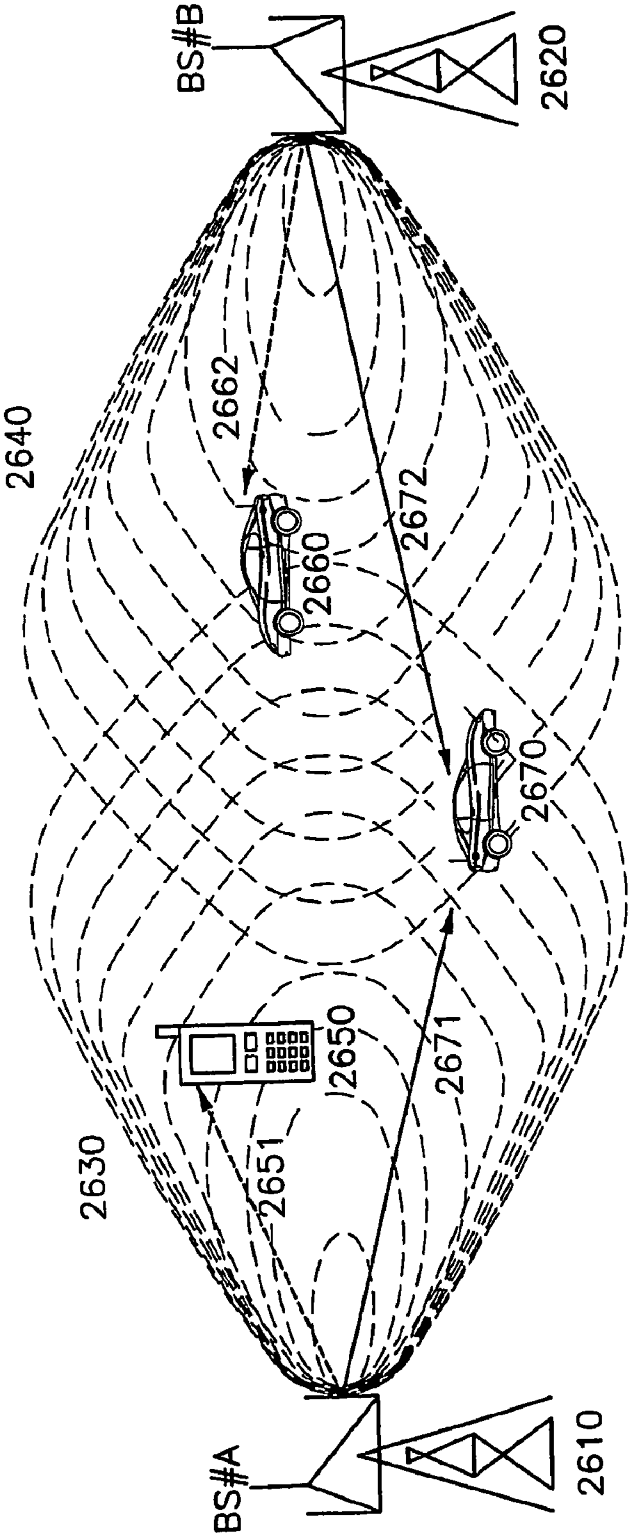
Figure 27A:
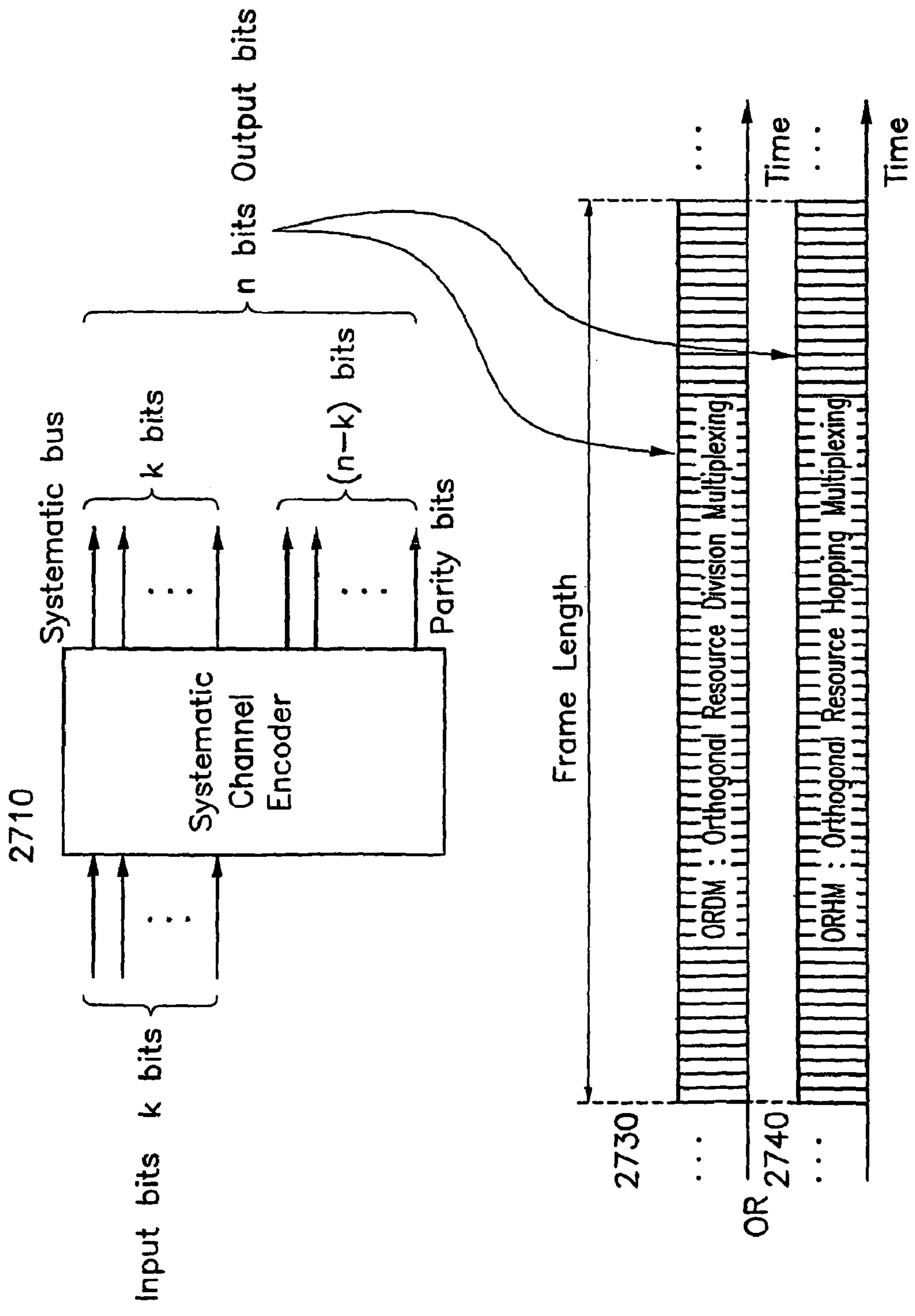
Figure 27B:
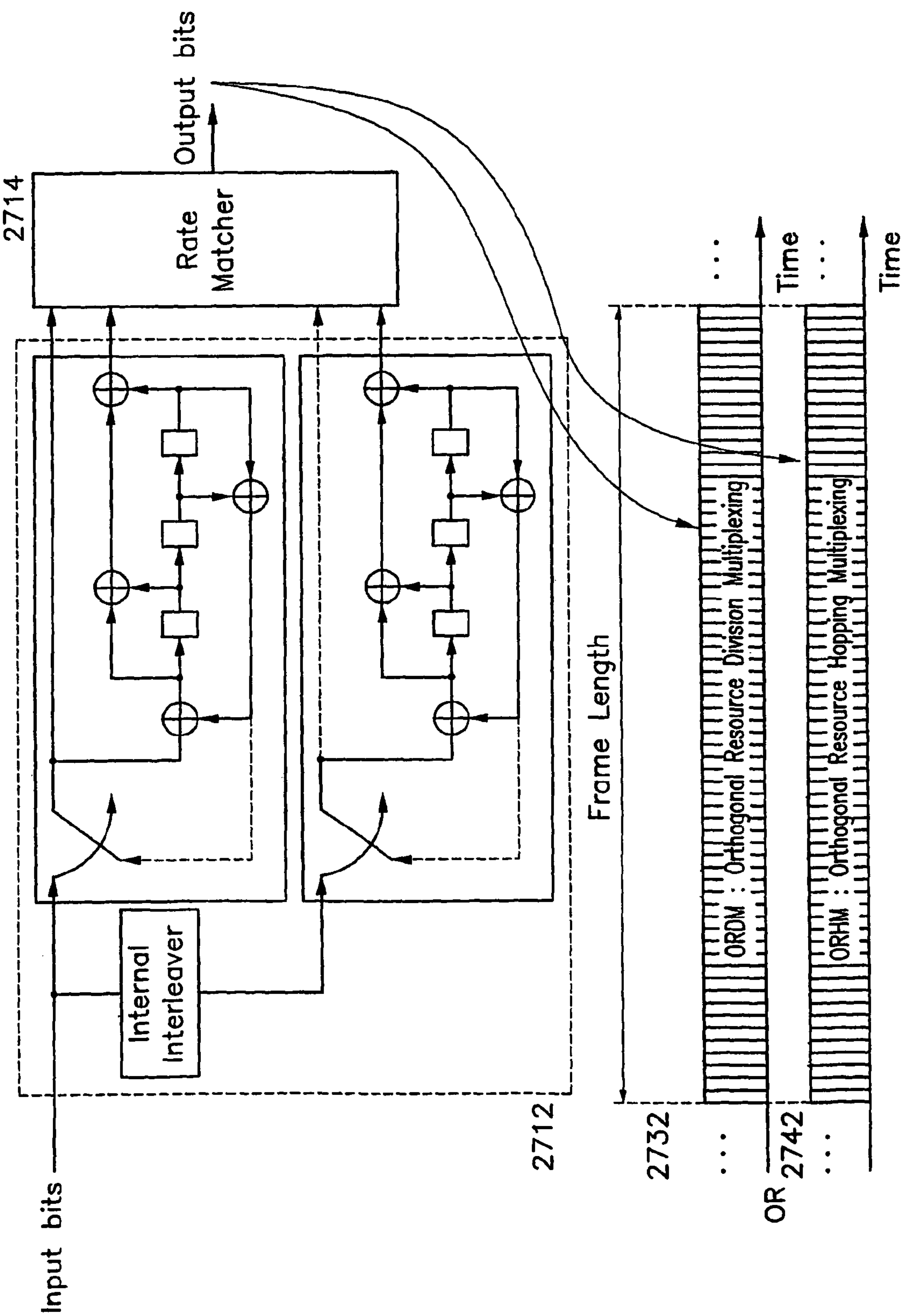
Figure 27C:
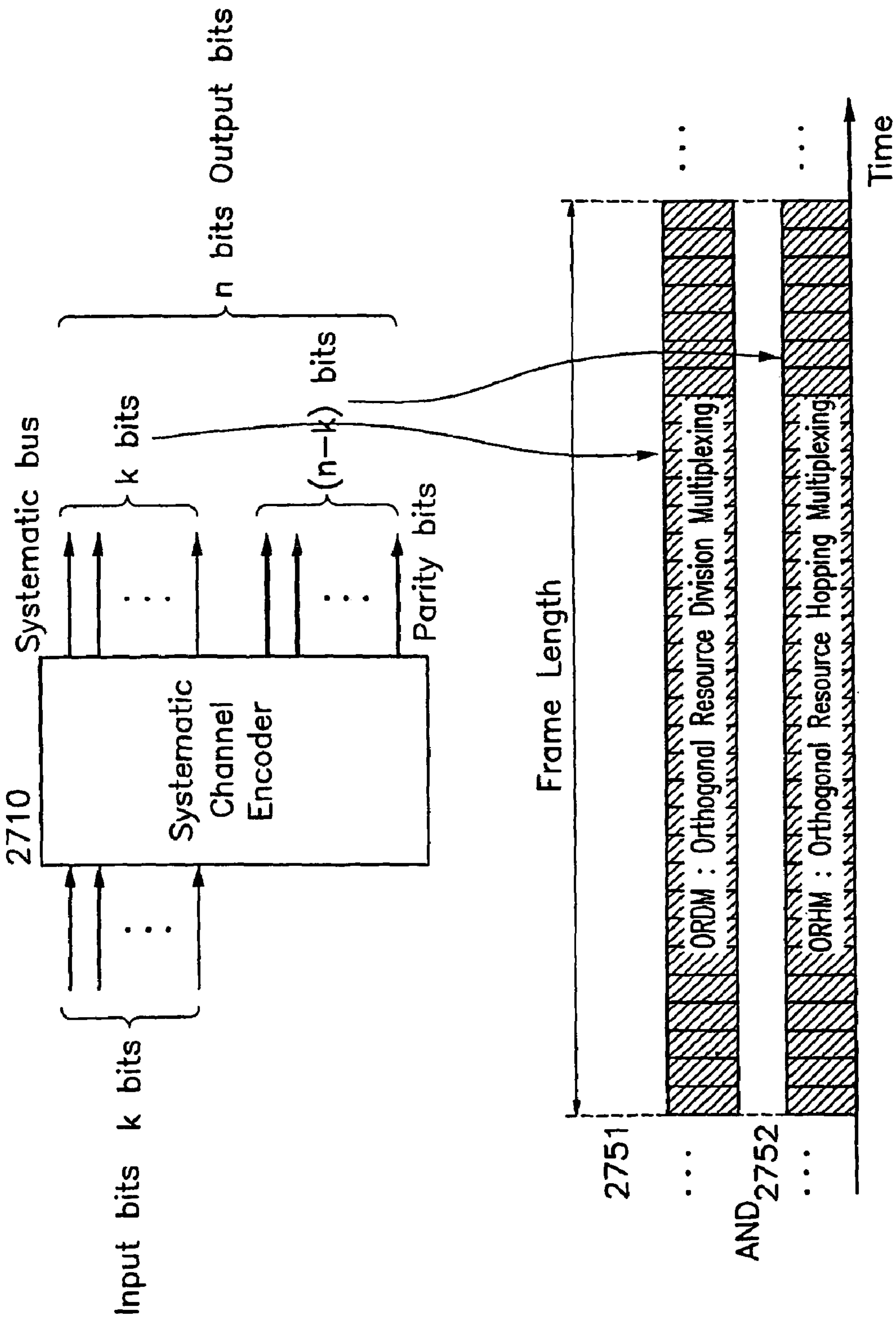
Figure 27D:
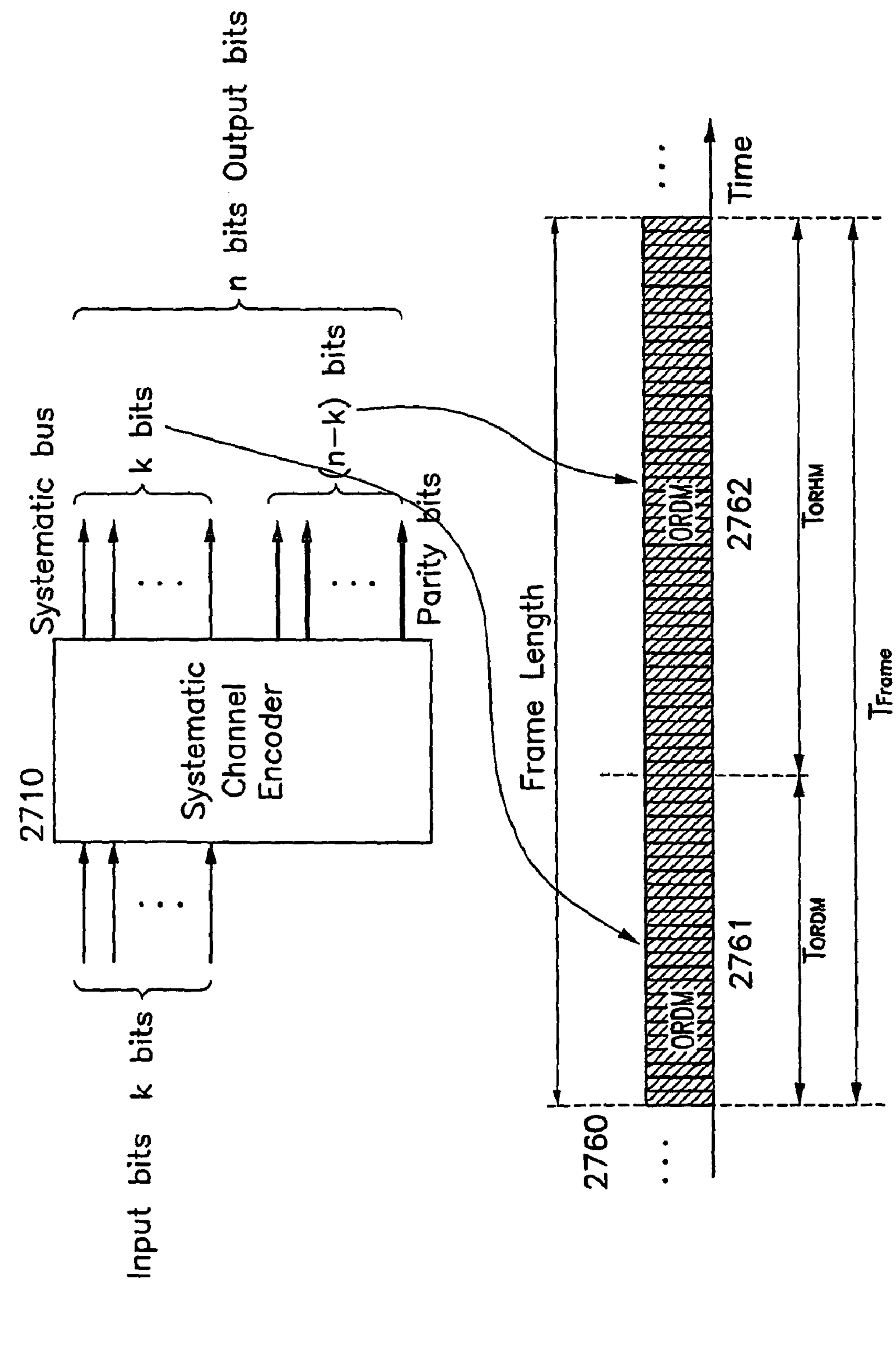
Figure 27E:
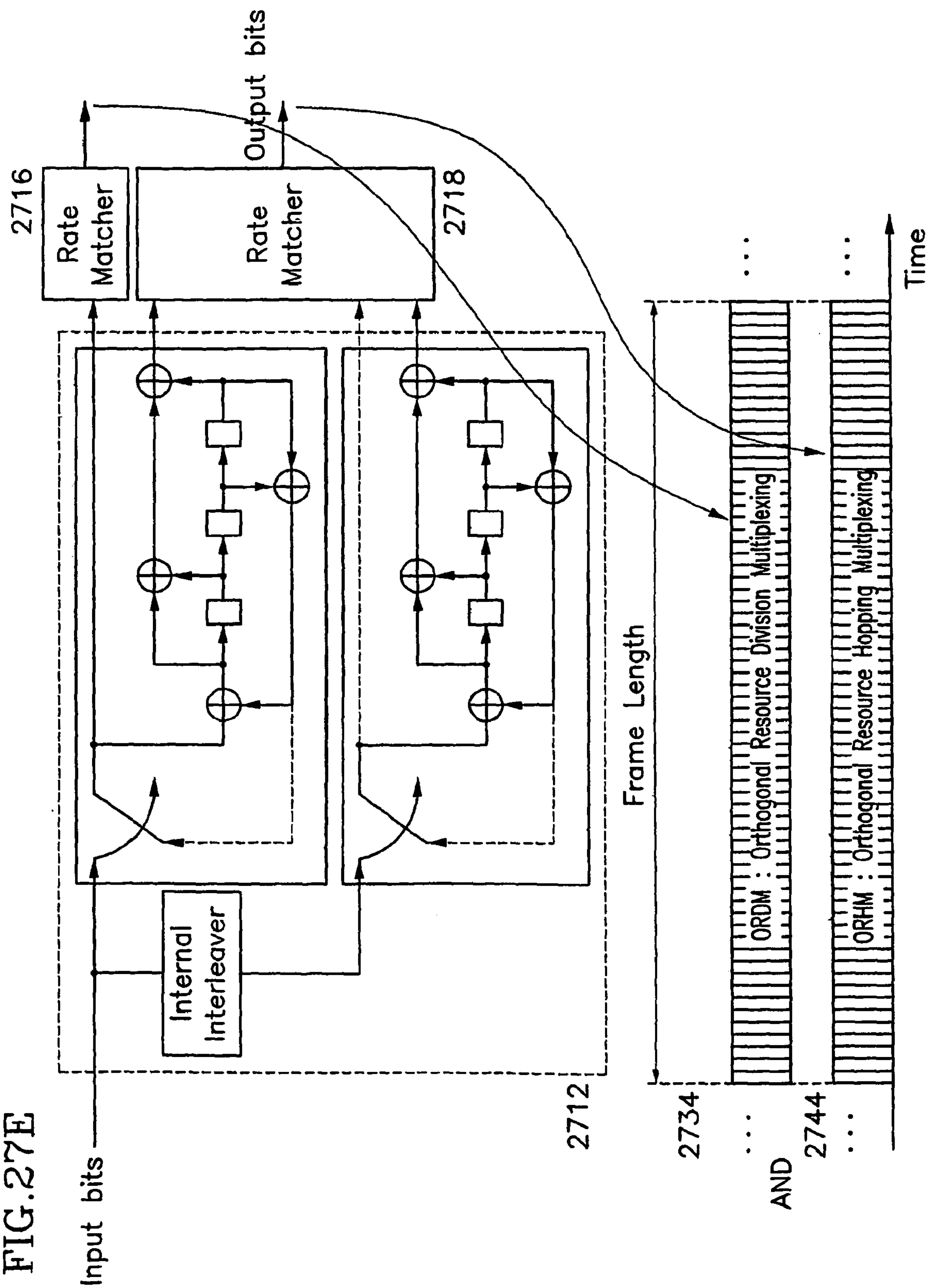
Figure 28A:
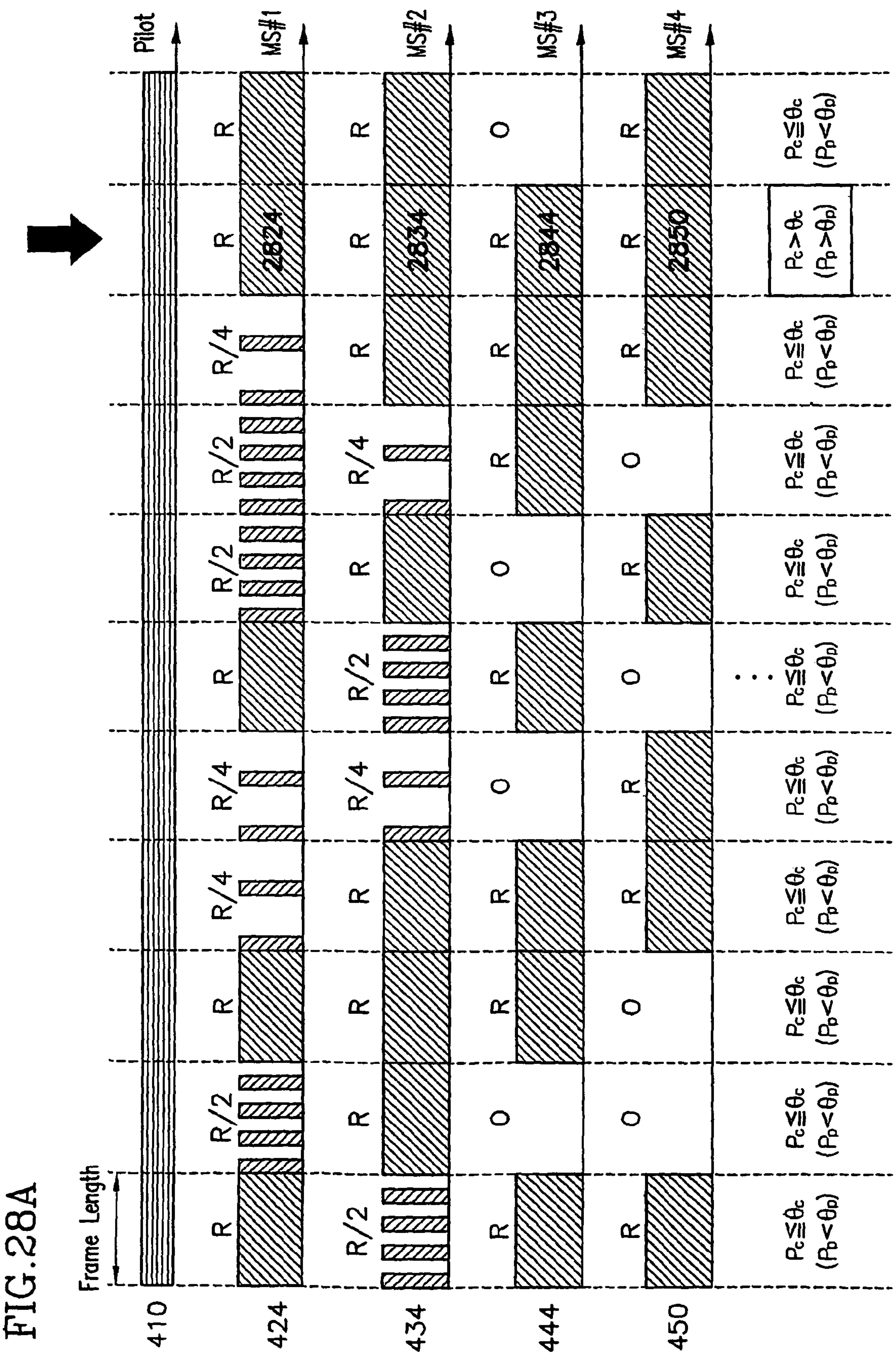
Figure 28B:
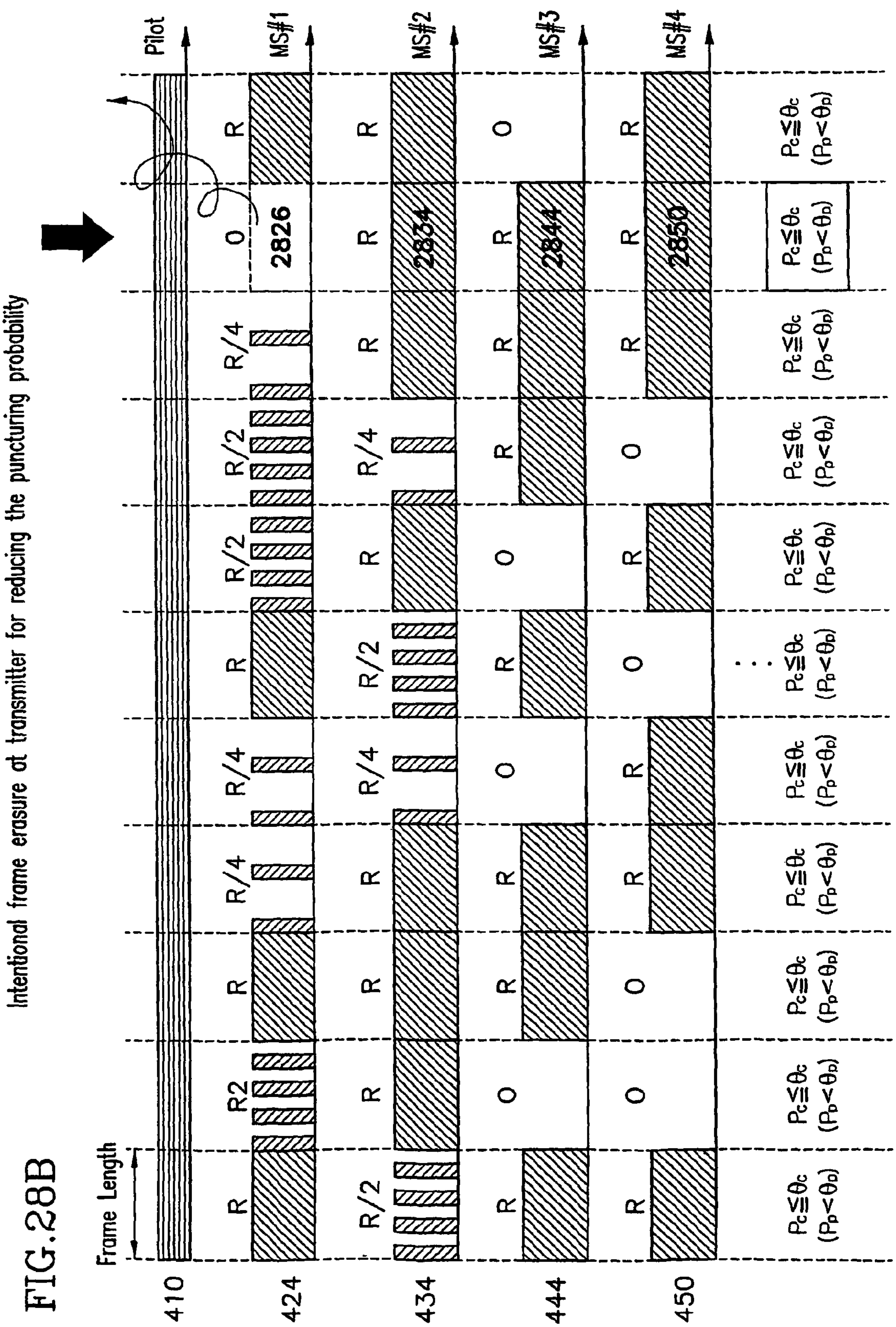
Figure 29A:
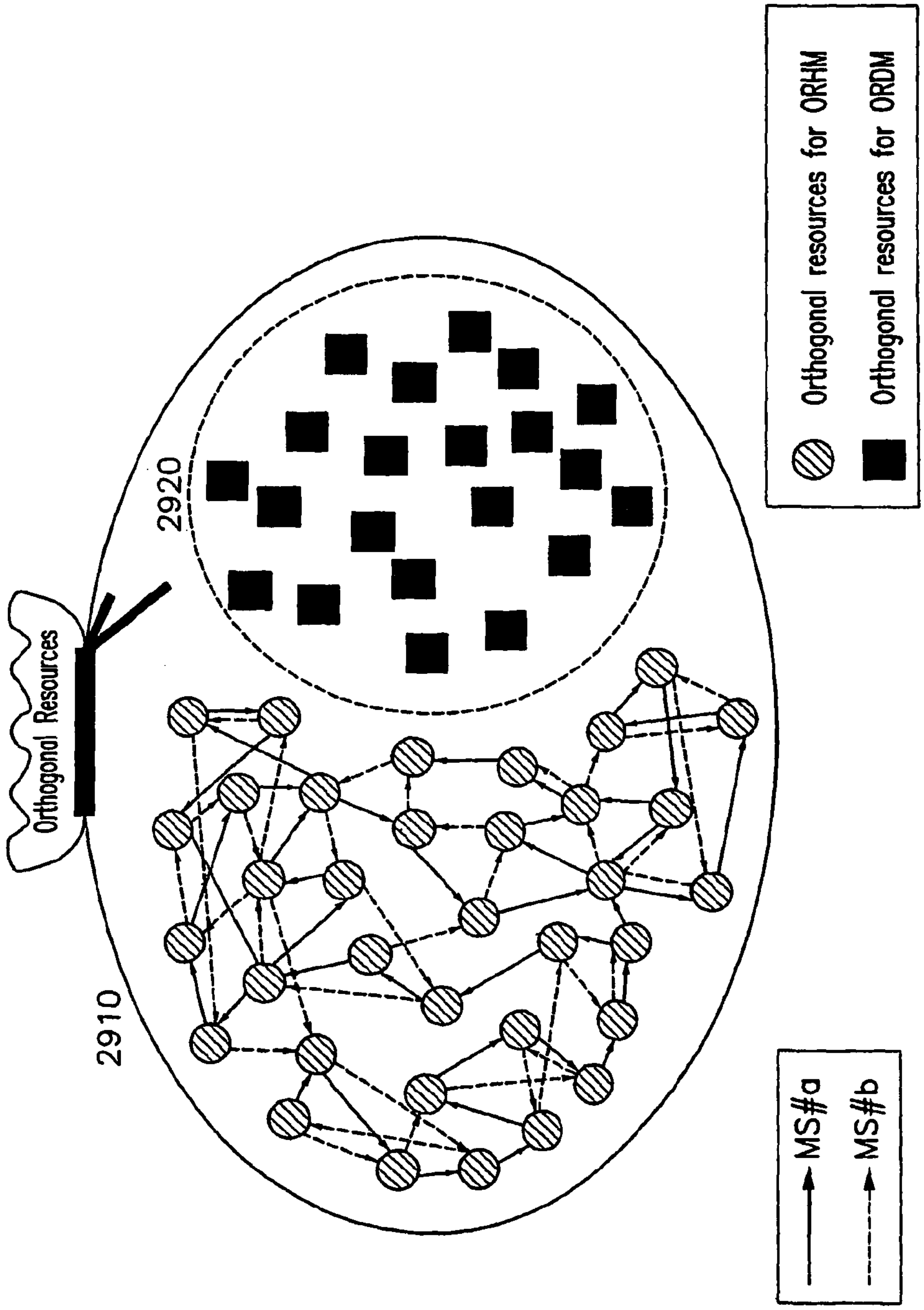
Figure 29B:
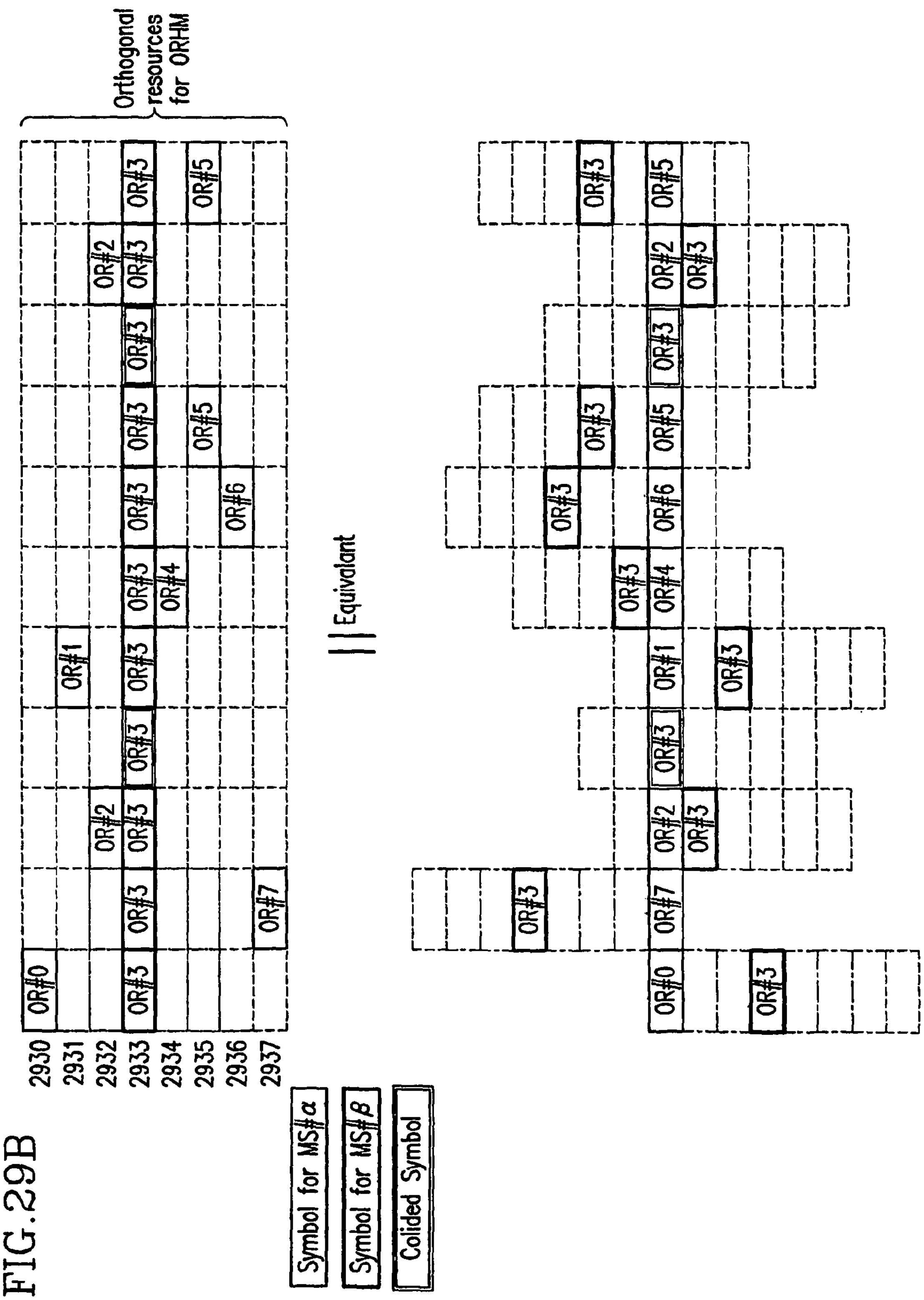
Figure 29C:
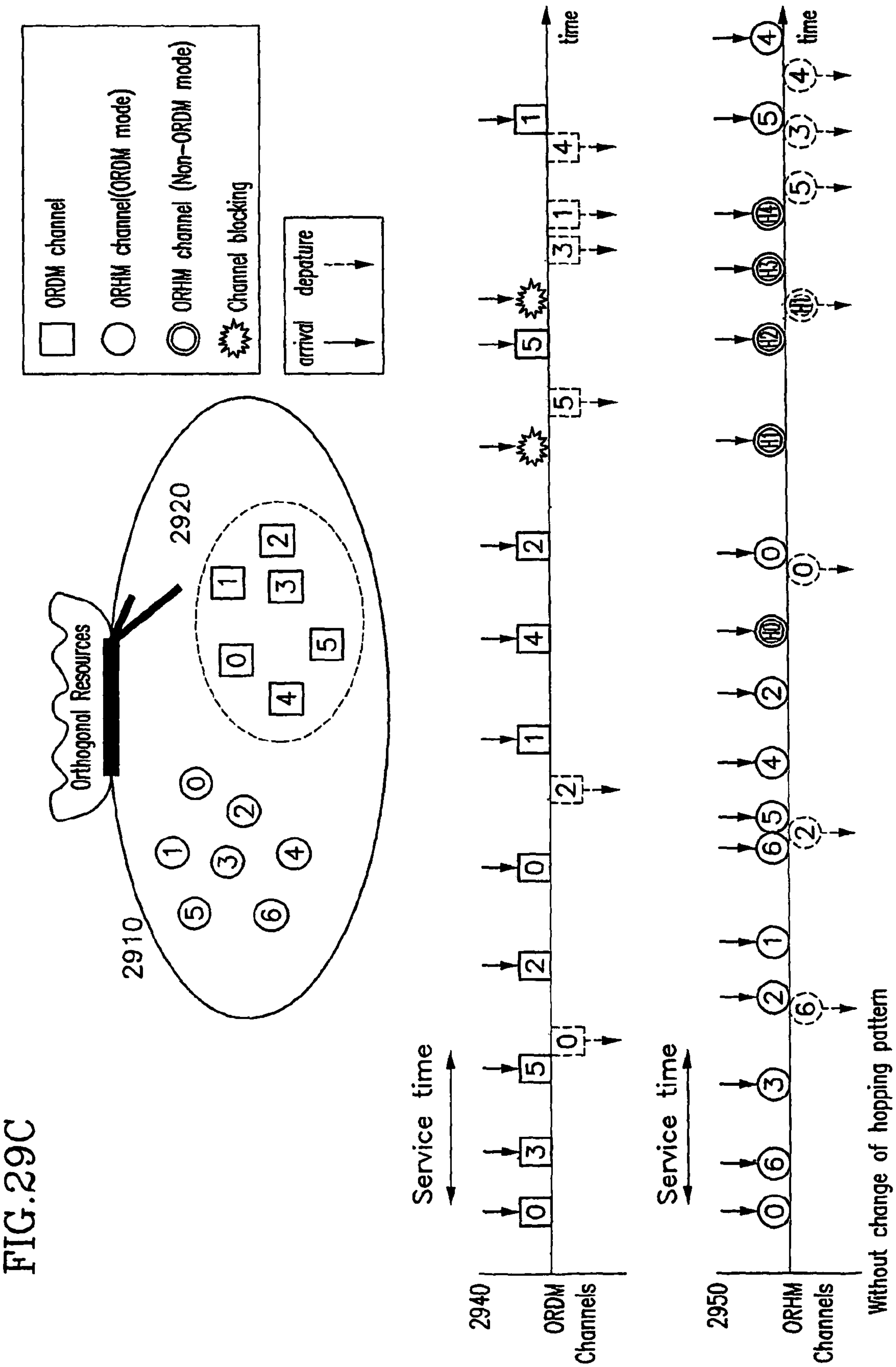
Figure 29D:
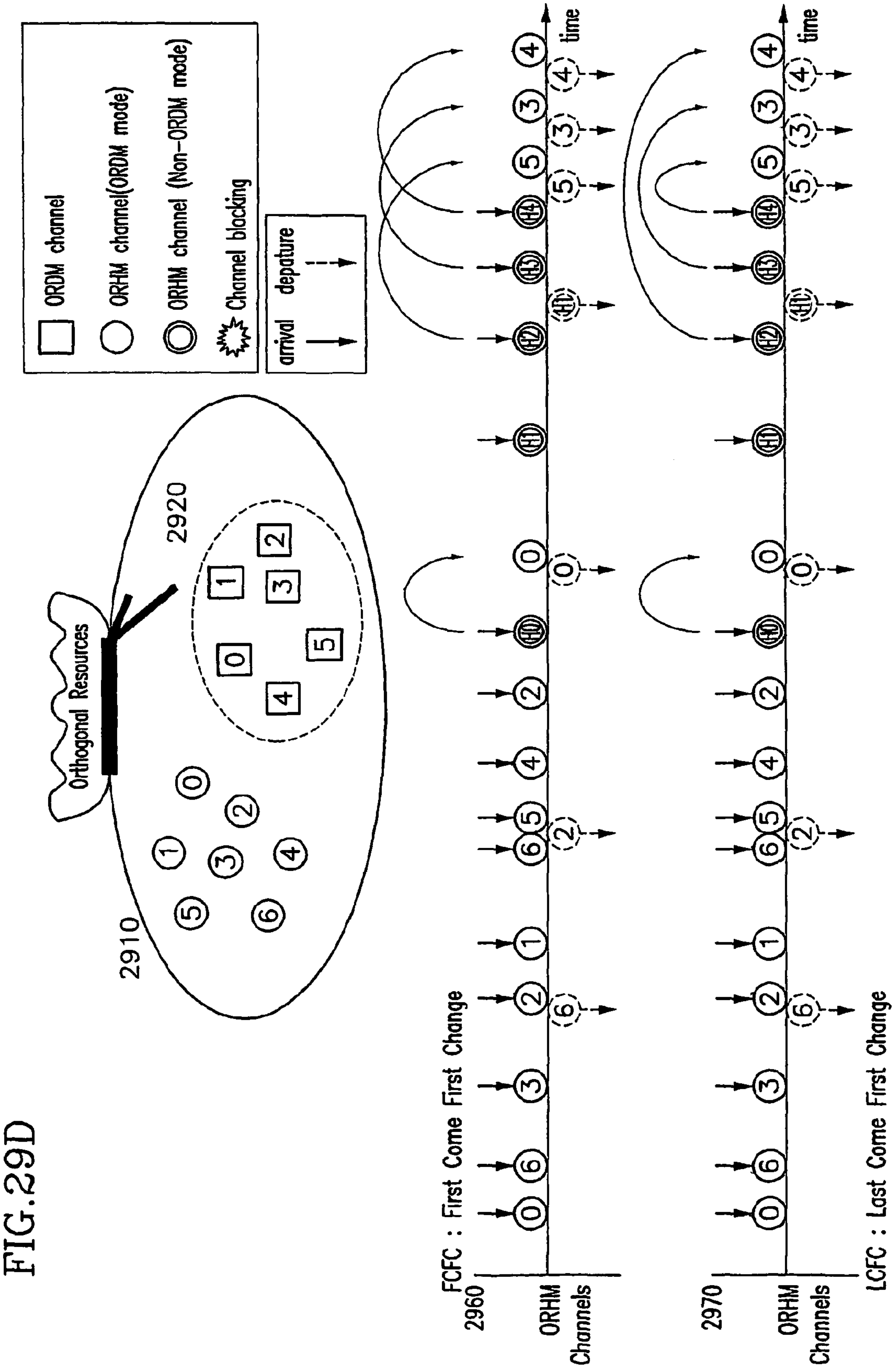
Figure 30A:
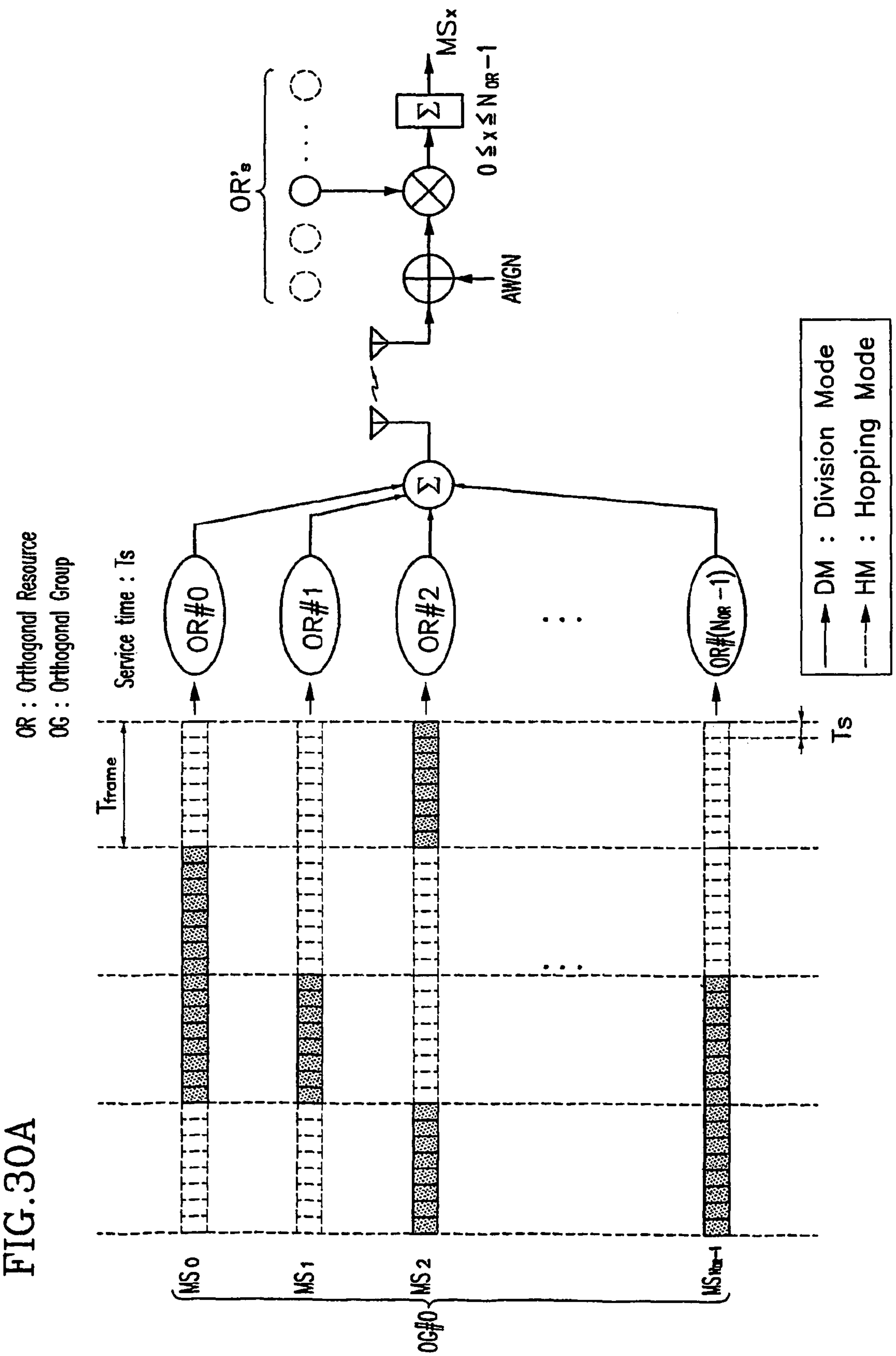
Figure 30B:
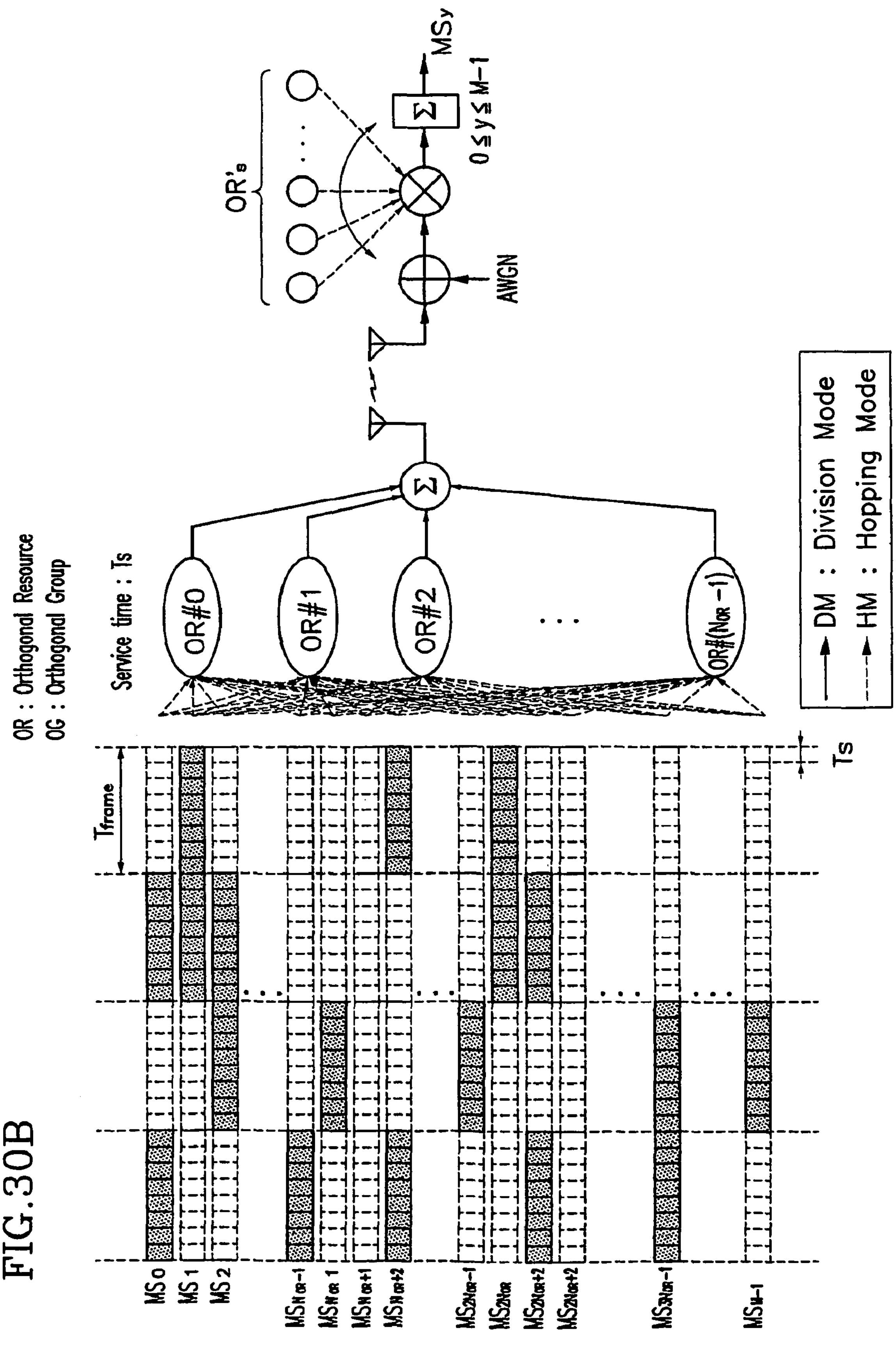
Figure 30C:
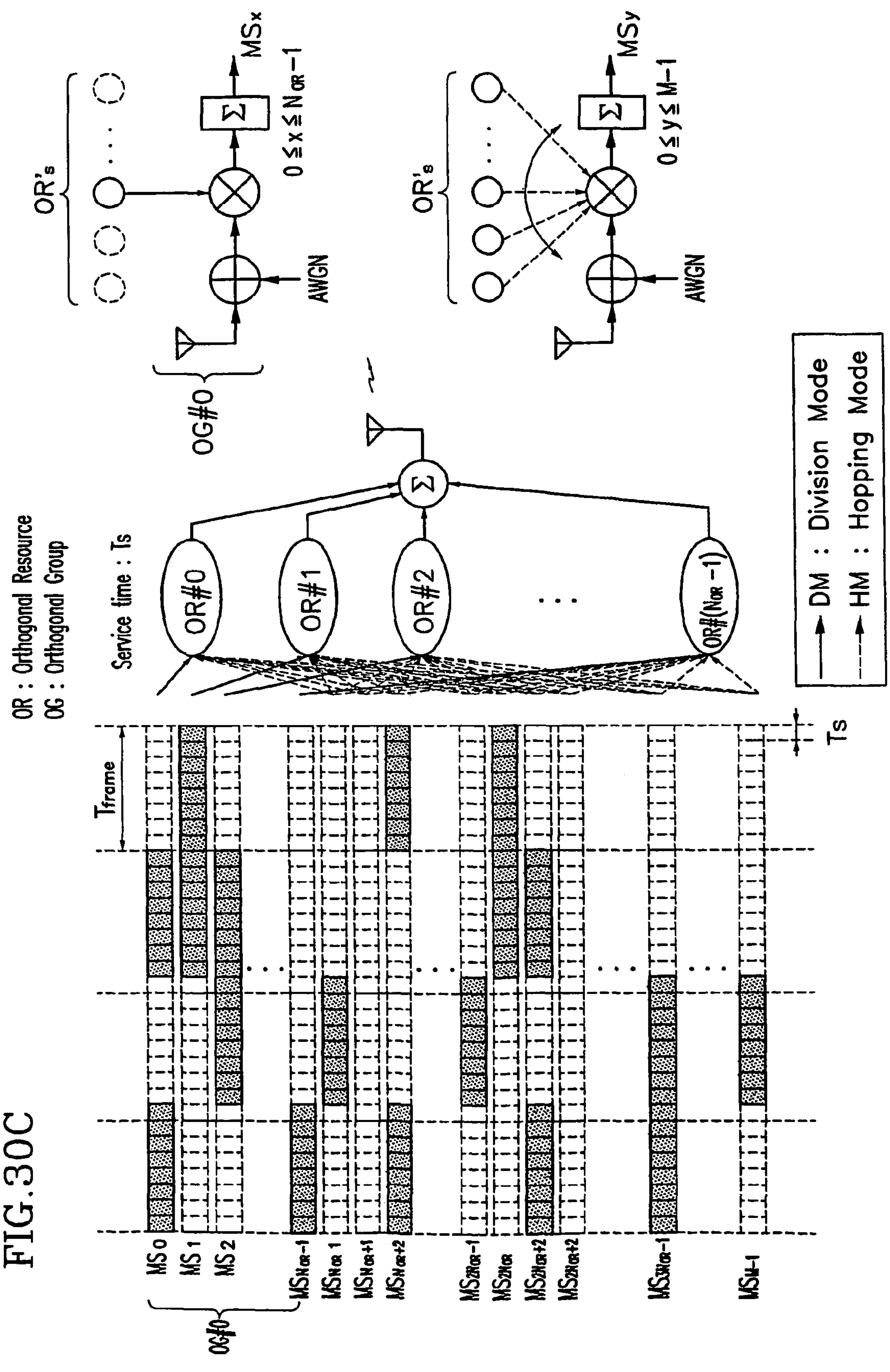
Figure 30D:
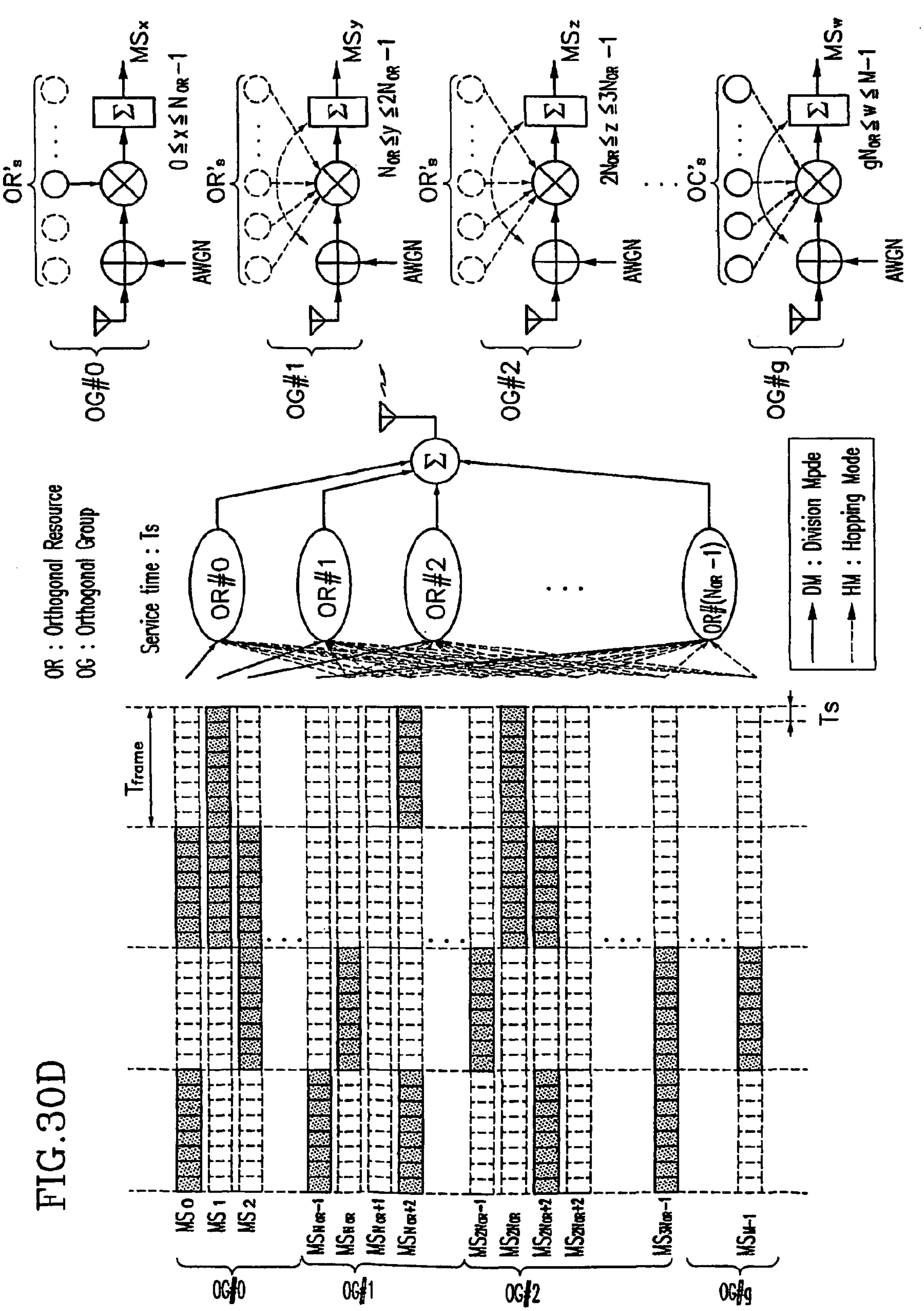
Figure 30E:
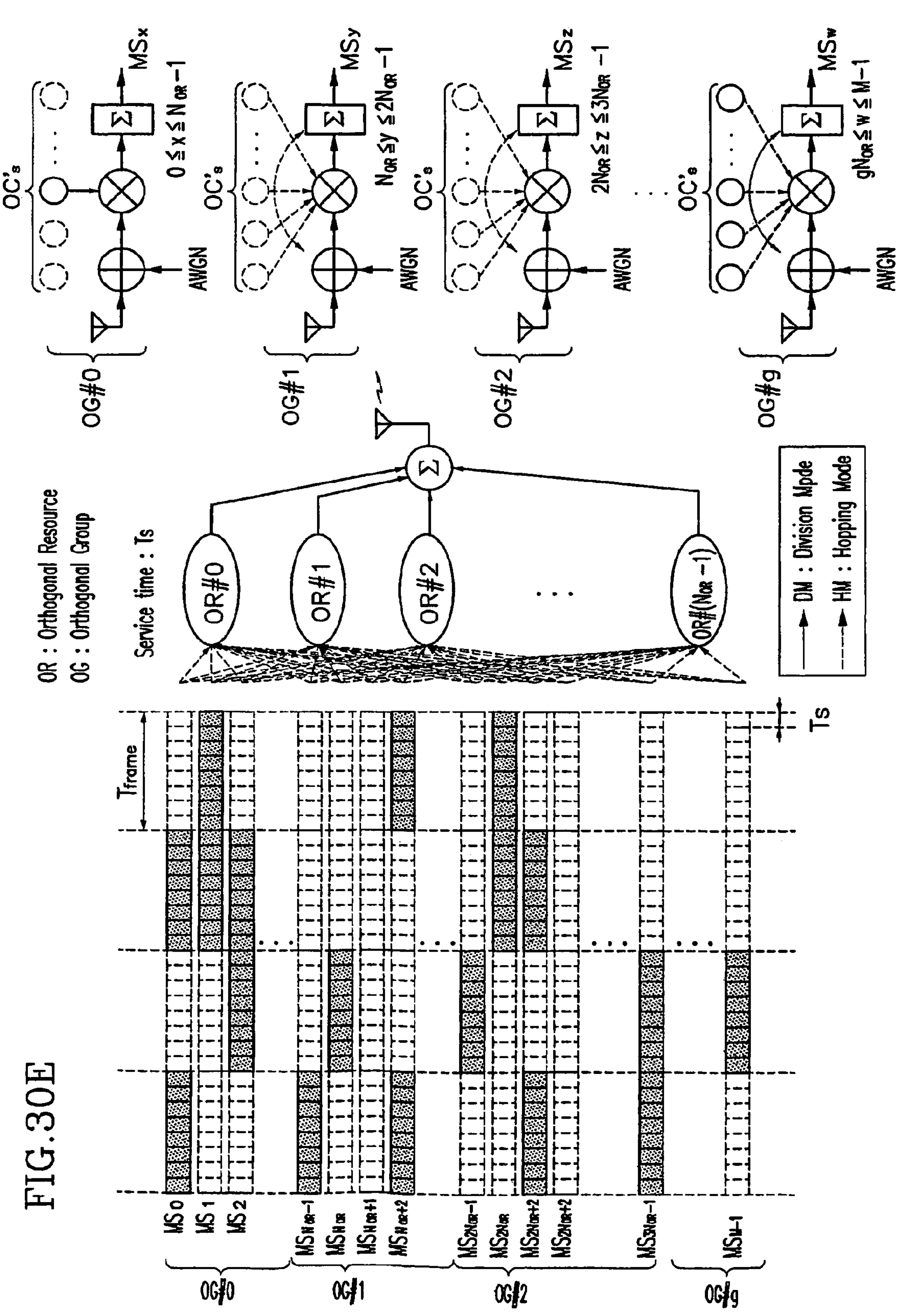

FIG. 26 illustrates that a transmitter from the primary station to the secondary station uses a soft hand-off to compensate for the disadvantageous aspect of the first to eighth transmit signal determination methods by the respective orthogonal wireless resource units on a secondary station positioned at an area (e.g., a cell boundary) having a relatively weak received signal from the primary station in accordance with an embodiment of the present invention;

FIG. 27*a* illustrates an example of the prior art and an embodiment of the present invention for orthogonal resource division multiplexing of all output bits from a systematic channel encoder without distinguishing systematic bits, which are the same as input bits, from parity bits generated from a channel encoder;

FIG. 27*b* illustrates, as the embodiment of FIG. 27*a*, an example of the prior art and an embodiment of the present invention for orthogonal resource hopping multiplexing of all output bits from a turbo encoder;

FIG. 27*c* illustrates that the systematic bits, which are the same as input bits, among the output bits of the systematic channel encoder are subject to an orthogonal resource division multiplexing, the parity bits generated from the systematic channel encoder being subject to an orthogonal resource hopping multiplexing;

FIG. 27*d* illustrates the embodiment of FIG. 27*c* that temporally distinguishes an orthogonal resource division multiplexing region from an orthogonal resource hopping multiplexing region;

FIG. 27*e* illustrates that the systematic bits, which are the same as input bits, among the output bits of the turbo encoder are subject to an orthogonal resource division multiplexing, the parity bits generated from the systematic channel encoder being subject to an orthogonal resource hopping multiplexing;

FIG. 28*a* illustrates in FIG. 4*c* that the collision probability or the perforation probability of frame-based multidimensional orthogonal resource hopping patterns are compared with a reference value in accordance with an embodiment of the present invention;

FIG. 28*b* illustrates that the primary station intentionally does not transmit the whole or a part of the transmit frame to a least influenced secondary station so that the collision probability or the perforation probability of the multidimensional orthogonal resource hopping pattern should be less than the reference value;

FIG. 29*a* illustrates that orthogonal wireless resource units for multidimensional orthogonal resource hopping multiplexing in a broad sense according to an embodiment of the present invention are divided into a set of orthogonal wireless resource units for orthogonal resource hopping multiplexing in a narrow sense and a set of orthogonal wireless resource units for orthogonal resource division multiplexing;

FIG. 29*b* illustrates that the channel with a fixedly allocated orthogonal wireless resource unit for multidimensional orthogonal resource hopping multiplexing in a narrow sense according to an embodiment of the present invention is relative to a channel with an orthogonal wireless resource unit allocated according to a hopping pattern;

FIG. 29*c* is a conceptual diagram sequentially showing the steps of channel request, wireless resource allocation and channel termination in the orthogonal resource division multiplexing according to an embodiment of the prior art and the multidimensional orthogonal resource hopping multiplexing according to an embodiment of the present invention;

FIG. 29*d* is a conceptual diagram sequentially showing the steps of channel request, wireless resource allocation and channel termination in the multidimensional orthogonal resource hopping multiplexing in a narrow sense according to another embodiment of the present invention;

FIG. 30*a* is a conceptual diagram of a division mode in the multidimensional orthogonal resource hopping multiplexing in a narrow sense according to an embodiment of the present invention;

FIG. 30*b* is a conceptual diagram of a hopping mode in a hopping mode in the multidimensional orthogonal resource hopping multiplexing in a narrow sense according to an embodiment of the present invention;

FIG. 30*c* is a conceptual diagram of a hybrid mode in the multidimensional orthogonal resource hopping multiplexing in a narrow sense according to an embodiment of the present invention;

FIG. 30*d* is a conceptual diagram of a group mode for a single channel in the multidimensional orthogonal resource hopping multiplexing in a narrow sense according to an embodiment of the present invention; and FIG. 30*e* is a conceptual diagram of a group mode for multiple channels in the multidimensional orthogonal resource hopping multiplexing in a narrow sense according to an embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Although the embodiment of the present invention has been described specifically in regard to a wireless mobile communication system, statistical multiplexing proposed in the present invention is applicable to wire communication systems as well as wireless communication systems.

In the description of the embodiment of the present invention, the same reference numbers are assigned to the same parts as in the example of the prior art. The corresponding parts have been described previously, so that the embodiment of the present invention will be described primarily in regard to the parts to be modified or added.

Figure 9A:
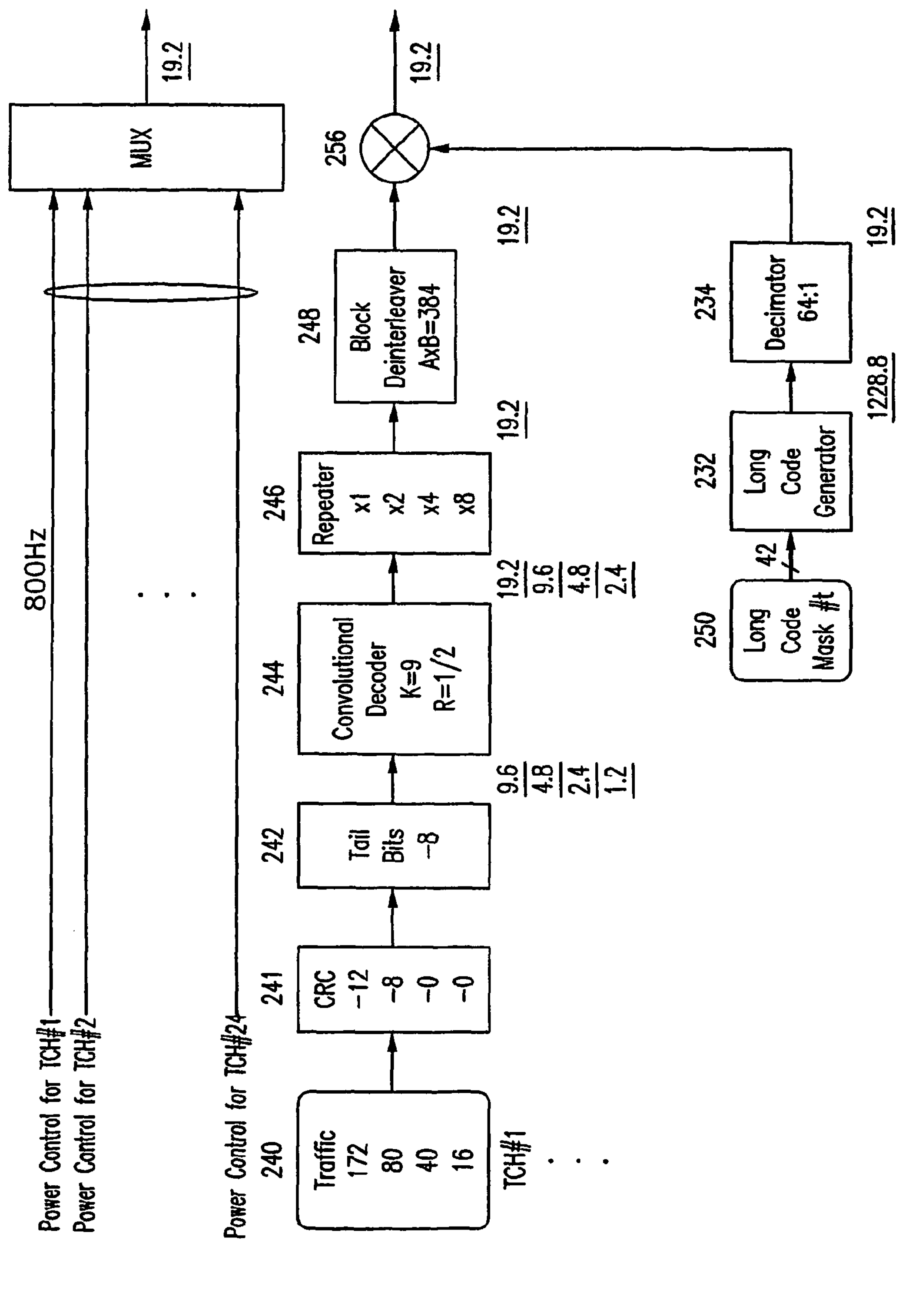
FIG. 9*a* presents a schematic of a transmitter in the primary station for traffic channels for orthogonal resource hopping multiplexing and a schematic of a CPCCH (Common Physical Control Channel) according to an embodiment of the present invention (orthogonal resource=orthogonal code)

FIG. 9*a* shows the structure of sparse channels for multidimensional orthogonal resource hopping multiplexing, in which the structure is the same as described in the prior art, except that a transmit power control command for a secondary station is punctured and inserted.

There are two types of communications, bidirectional communication and unidirectional communication. The transmit power control command for the secondary station is not necessarily transmitted in the unidirectional communication system. But the transmission power control is necessary to the bidirectional communication system, in which an efficient power control can maximize the system capacity.

For fast processing, the power control command is not channel-encoded in many cases. Due to a random orthogonal code hopping pattern, a collision of different channels inevitably occurs.

Thus the power control command must be transmitted through non-collided channels. For this purpose, the present invention introduces the concept of a common power control channel used in a candidate technology of the IMT-2000 system, cdma2000 and the non-collided channels are referred to as "common physical control channel (CPCCH)" in this description.

Figure 9B:
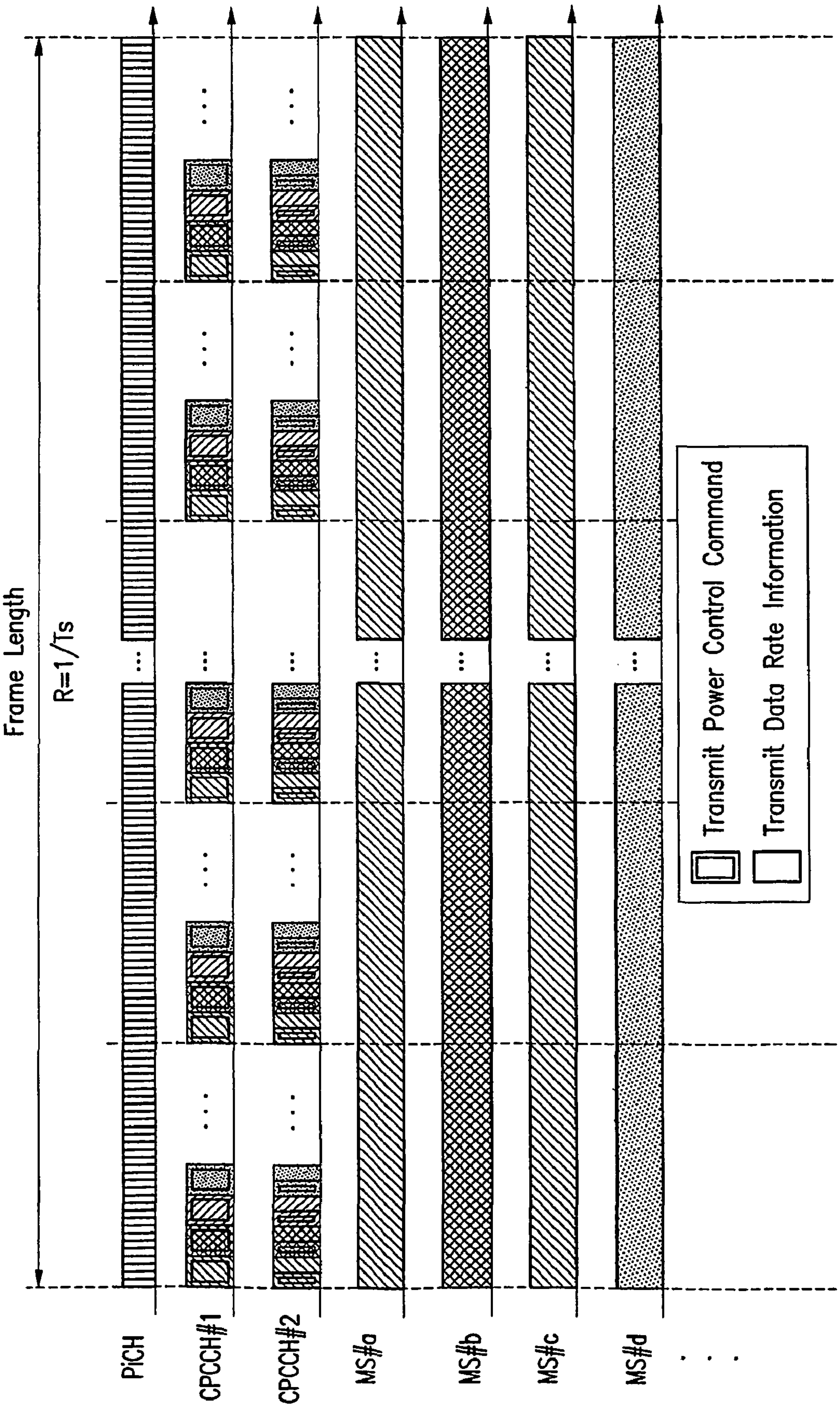
FIG. 9*b* is a signal diagram of the CPPCCH according to an embodiment of the present invention.

The CPCCH is spread with a separate orthogonal code symbol as the pilot channel and used to transmit the control command of the physical hierarchy by time division multiplexing for a plurality of secondary stations. The position of the power control command for each secondary station is allocated during a call set-up. FIG. 9*a* illustrates an embodiment of the CPCCH that controls, for example, 24 secondary stations in the IS-95 (cdmaOne) system. When the channel from the primary station to each secondary station has a variable transmission rate less than or equal to a basic transmission rate R, the information decided to be necessarily transferred without a collision is subject to time division multiplexing and transmitted through a common control channel as the transmit power control command of the secondary station. Without information about the actual transmission rate, the receiver determines the actual transmit data rate sequentially by channel decoding and CRC checking for all the combinations available. The combinations available are usually negotiated between the primary station and each secondary station during the initial call set-up. FIG. 9*b* is a signal diagram of a common physical control channel (CPCCH) according to an embodiment of the present invention, in which the CPCCH includes a CPCCH#1 for the primary station transferring a transmit power control command of the secondary station and a CPCCH#2 for transferring the transmit data rate information of the primary station.

Figure 1:
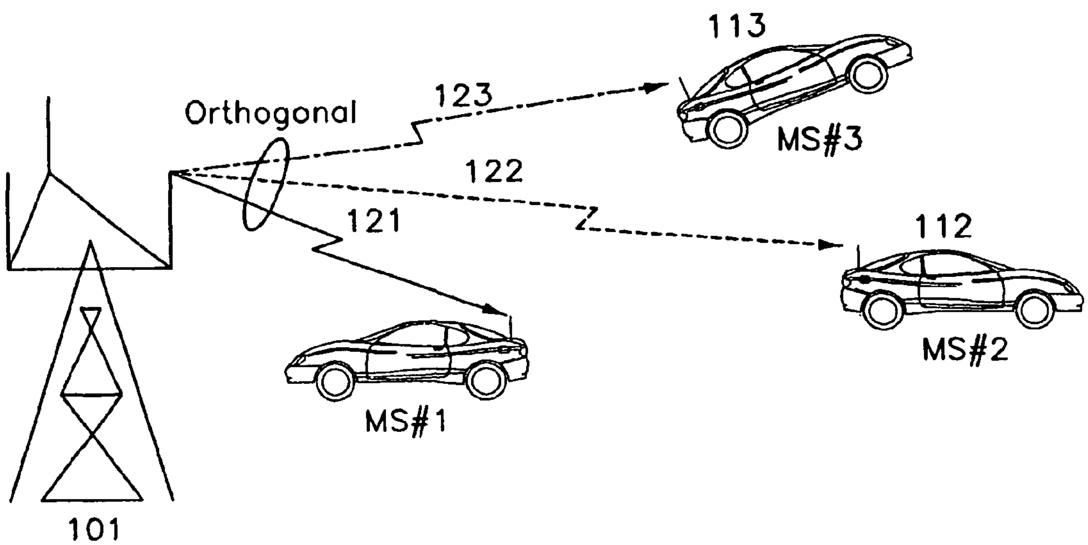
FIG. 1 is a conceptual diagram of a system including a primary station and a plurality of secondary stations in accordance with an example of the prior art and an embodiment of the present invention.
Figure 2A:
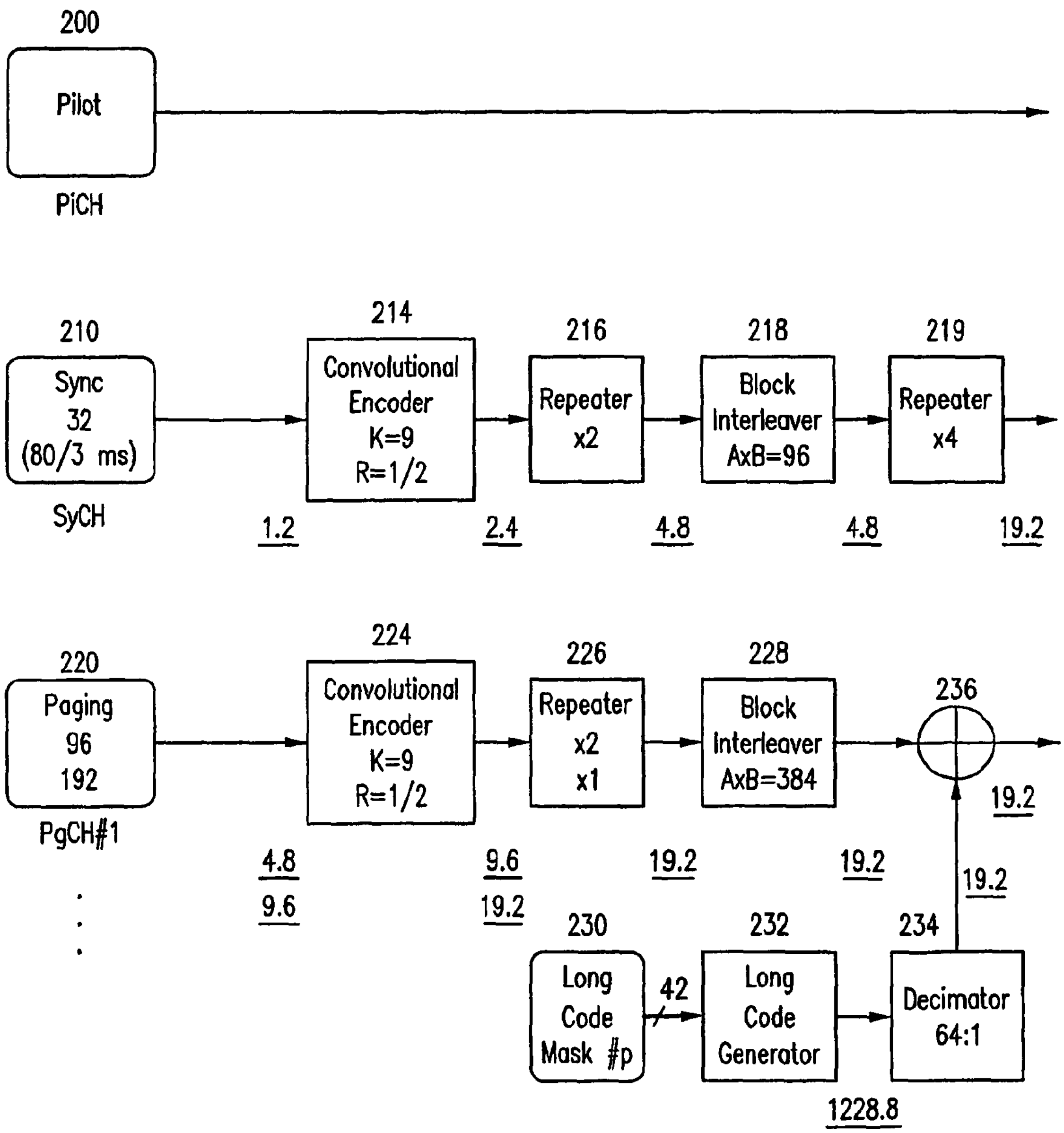
FIG. 2*a* is a schematic of a transmitter of the primary station corresponding to a common component between the prior art and the present invention.
Figure 2B:
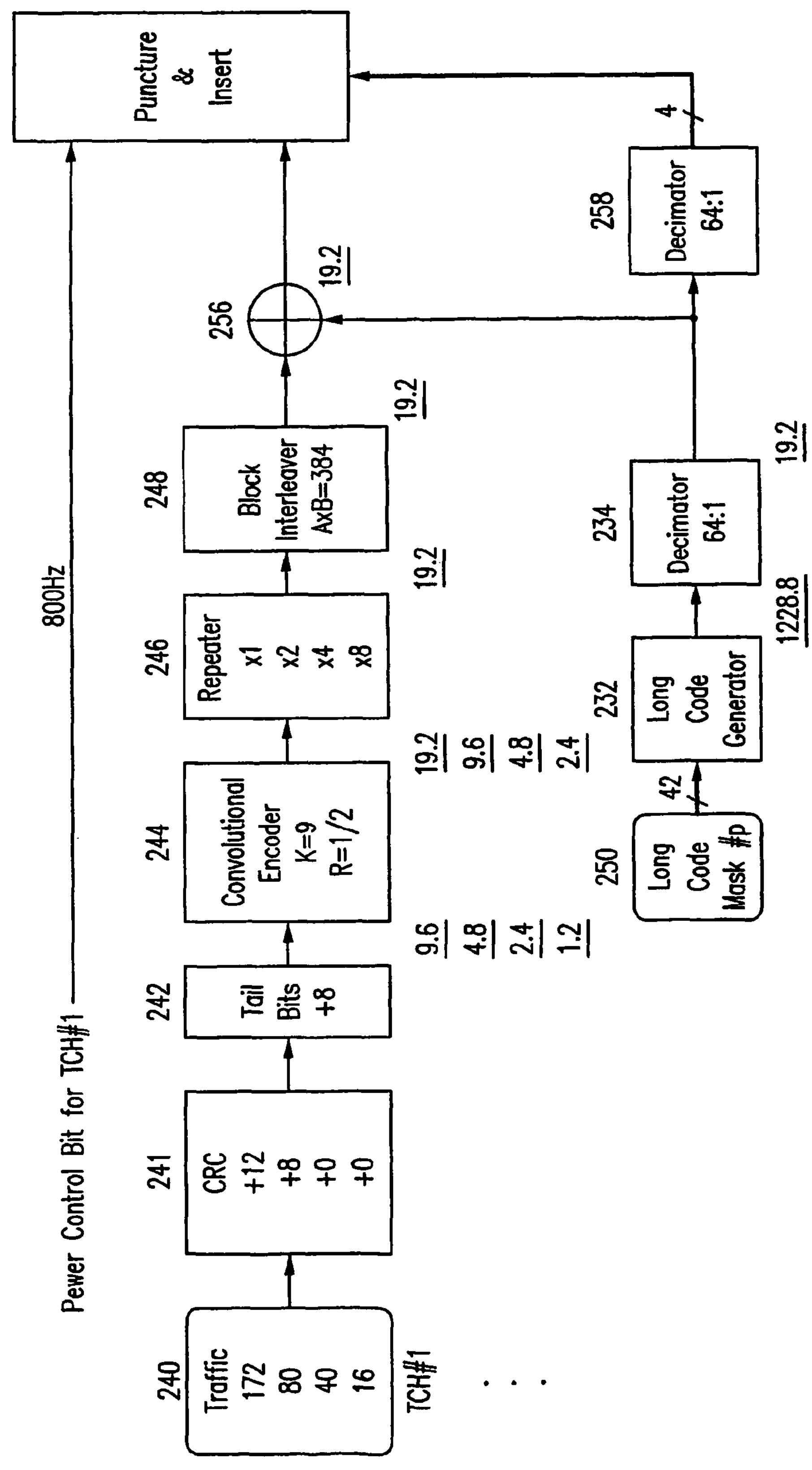
FIG. 2*b* is a schematic of a transmitter for traffic channels in the primary station according to an example of the prior art.
Figure 3A:
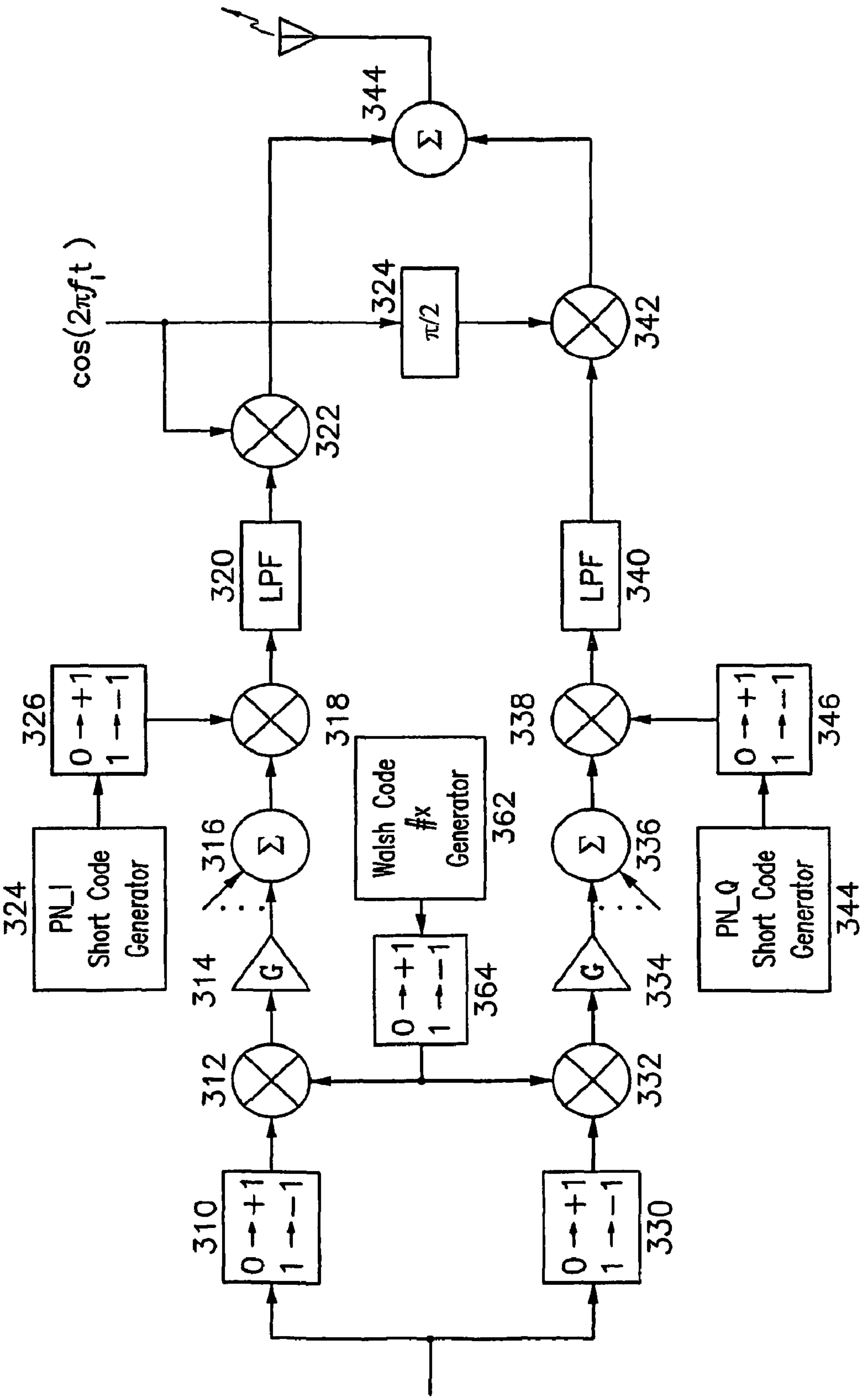
FIG. 3*a* is a schematic of a transmitter of the primary station for code division multiplexing according to an example of the prior art (based on BPSK data modulation and using the same orthogonal code symbol for I/Q channels)
Figure 10A:
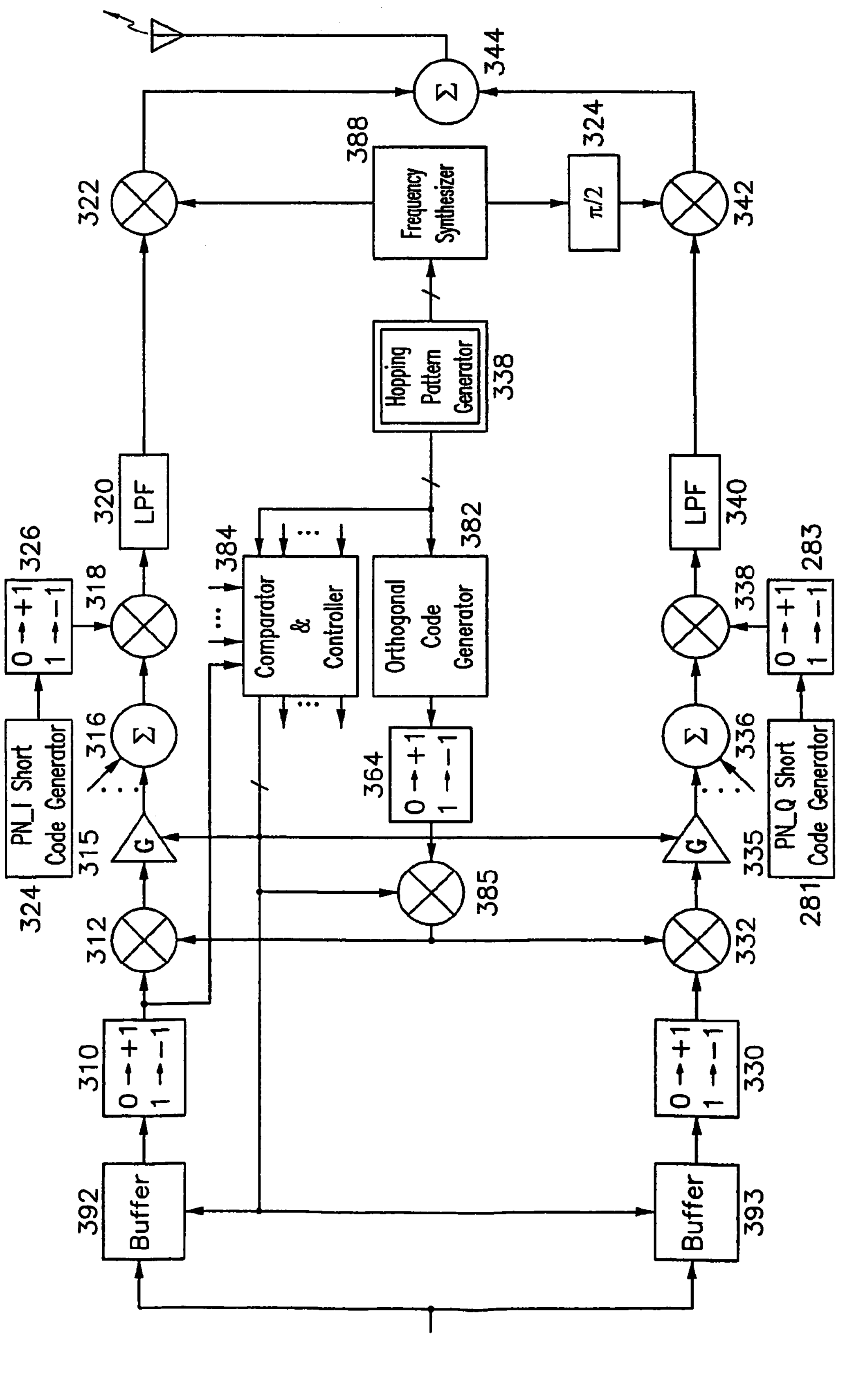
FIG. 10*a* is a schematic of a transmitter in the primary station for orthogonal resource hopping multiplexing according to an embodiment of the present invention (corresponding to FIG. 3*a*)
Figure 11:
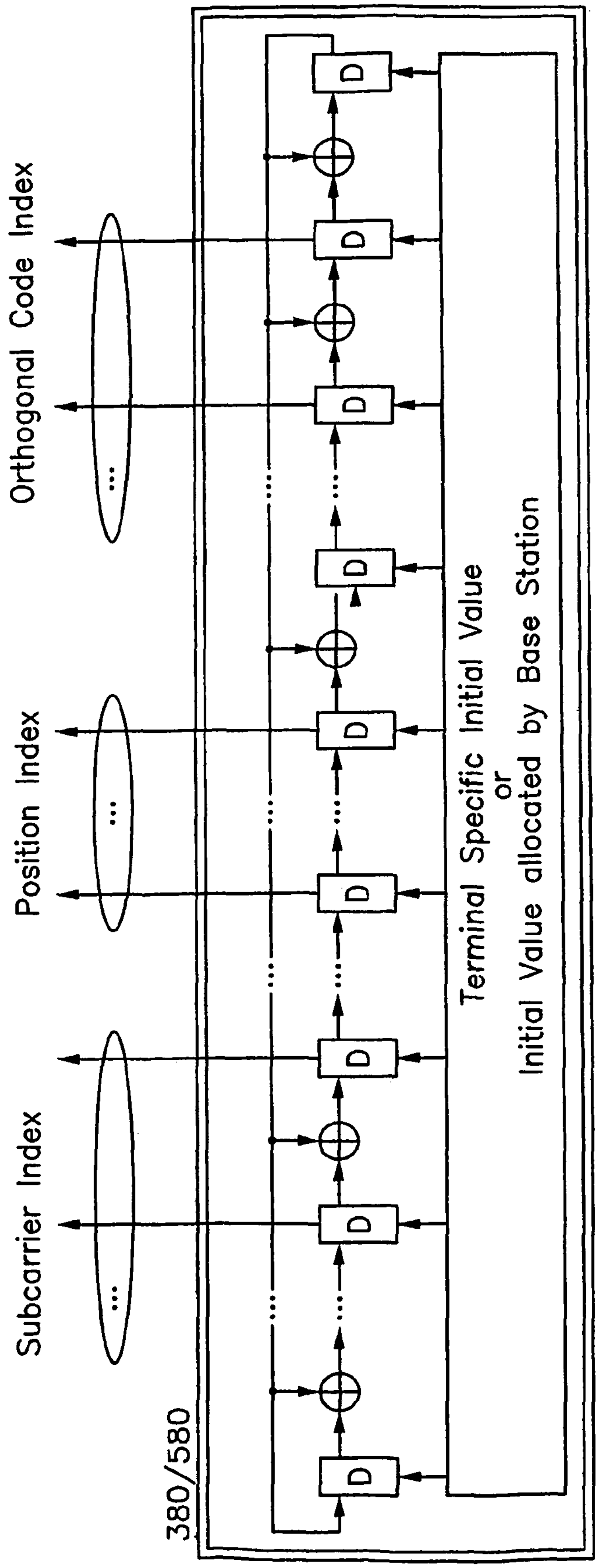
FIG. 11 is a schematic of a hopping pattern generator of a multidimensional orthogonal resource according to an embodiment of the present invention.

FIG. 10*a* shows an embodiment method adapting the present invention to the example of the prior art shown in FIG. 3*a*. For statistical multiplexing based on the multidimensional orthogonal resource hopping multiplexing proposed in the present invention, there is used a collision detector and controller 384 for detecting a collision of multidimensional hopping patterns formed from a multidimensional hopping pattern generator 380 and caused by generation of channel-independent hopping patterns and properly controlling the collision. An example of the multidimensional hopping pattern generator is illustrated in FIG. 11. The multidimensional hopping pattern generator of FIG. 11 has a structure of generating a multidimensional hopping pattern with a general PN sequence generator. The multidimensional hopping pattern can also be realized by another method. The multidimensional hopping pattern may include one-dimensional hopping patterns (e.g., frequency, transmission time, orthogonal code, etc.) two-dimensional hopping patterns (e.g., frequency/transmission time, frequency/orthogonal code, transmission time/orthogonal code, etc.) or three-dimensional hopping patterns (e.g., frequency/transmission time/orthogonal code, etc.). In the system development step, it is designed that only a part of the orthogonal resources are involved in hopping and the others are fixedly allocated. Alternatively, all the orthogonal resources are involved in the hopping multiplexing and then only a part of the orthogonal resources are involved in the hopping multiplexing based on a control command. According to the multidimensional hopping pattern generator 380, there are needed a frequency synthesizer for frequency hopping 388, buffers for transmission time hopping 392 and 393, or an orthogonal code generator 382 for generating spreading orthogonal code symbols for orthogonal code hopping.

Figure 12A:
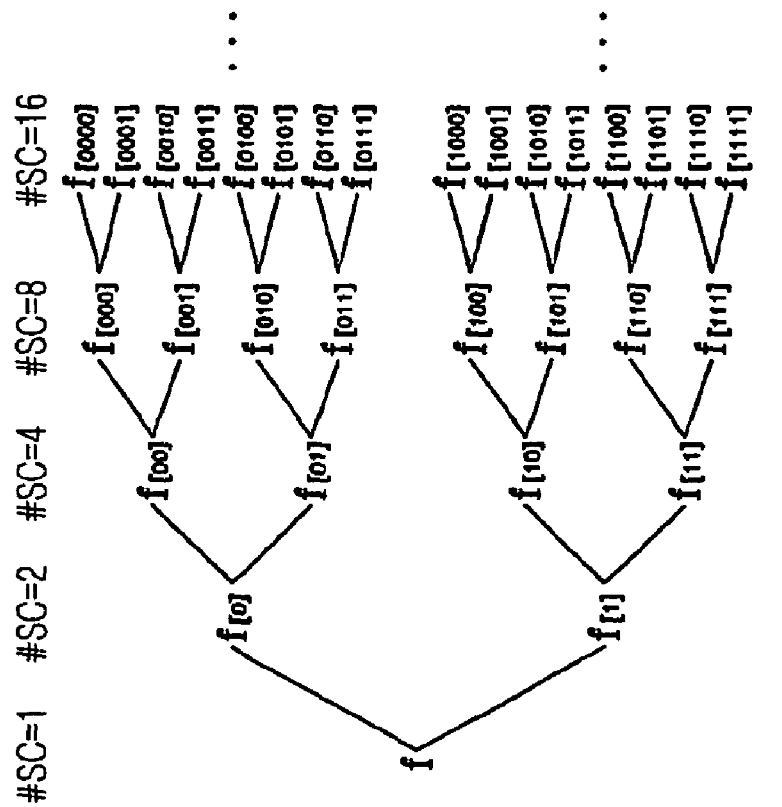
FIG. 12*a* is an illustration showing an example of a subcarrier group for frequency hopping according to an embodiment of the present invention (orthogonal resource=frequency)
Figure 12B:
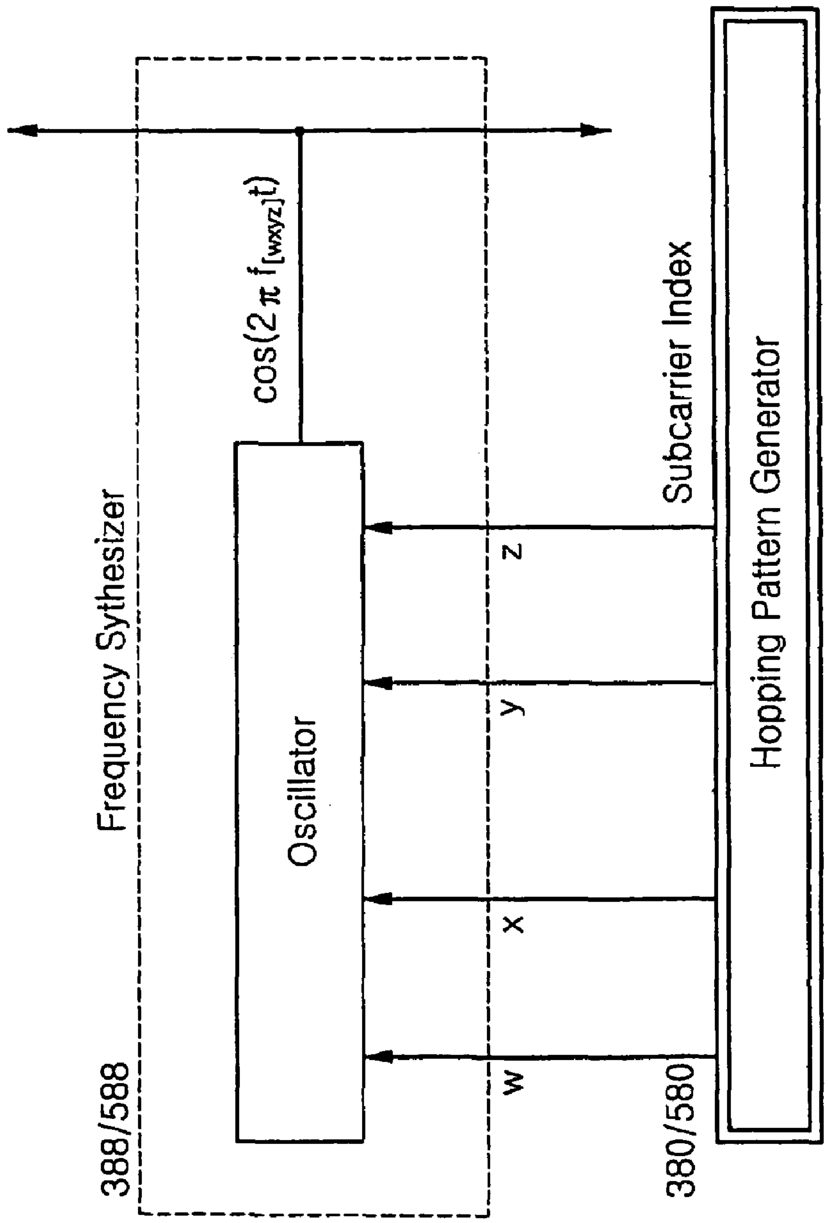
FIG. 12*b* is a schematic of a subcarrier synthesizer based on the output of a frequency hopping pattern generator according to an embodiment of the present invention.

For the carriers or subcarriers generated from the frequency synthesizer 388, the number of bits representing the coordinate value on the frequency axis for the output of the multidimensional hopping pattern generator 380 is different depending on the number of (sub)carriers used in the frequency hopping, as shown in FIG. 12*a*. Among the outputs of the hopping pattern generator 388, the signal corresponding to the coordinate value on the frequency axis is fed into the frequency synthesizer 388 to generate a defined (sub)carrier according to the input value. Unlike time hopping or orthogonal code hopping in which the frequency of the carrier is not variable, the frequency hopping in the multidimensional orthogonal resource hopping multiplexing system has a change in the frequency of the carrier, making it difficult to achieve channel estimation and phase compensation at the receiver. Accordingly, the frequency hopping multiplexing using subcarriers related to MCs (Multi-Carriers) as carriers capable of hopping is readily realized when multi-carriers are basically provided and channel estimation for the respective carriers is independently achieved at the receiver in parallel as in the MC method of the cdma2000 system.

Figure 12C:
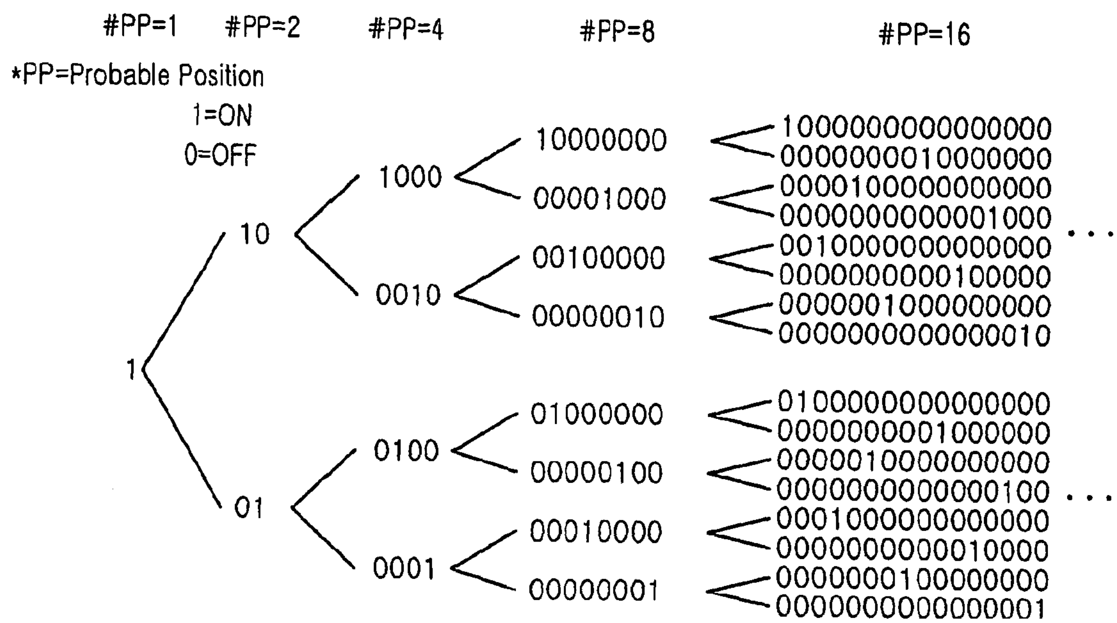
FIG. 12*c* is an illustration showing an example of a transmit data symbol position interval for symbol-based transmit time hopping according to an embodiment of the present invention (orthogonal resource=time; "1"=ON; and "0"=OFF)
Figure 12D:
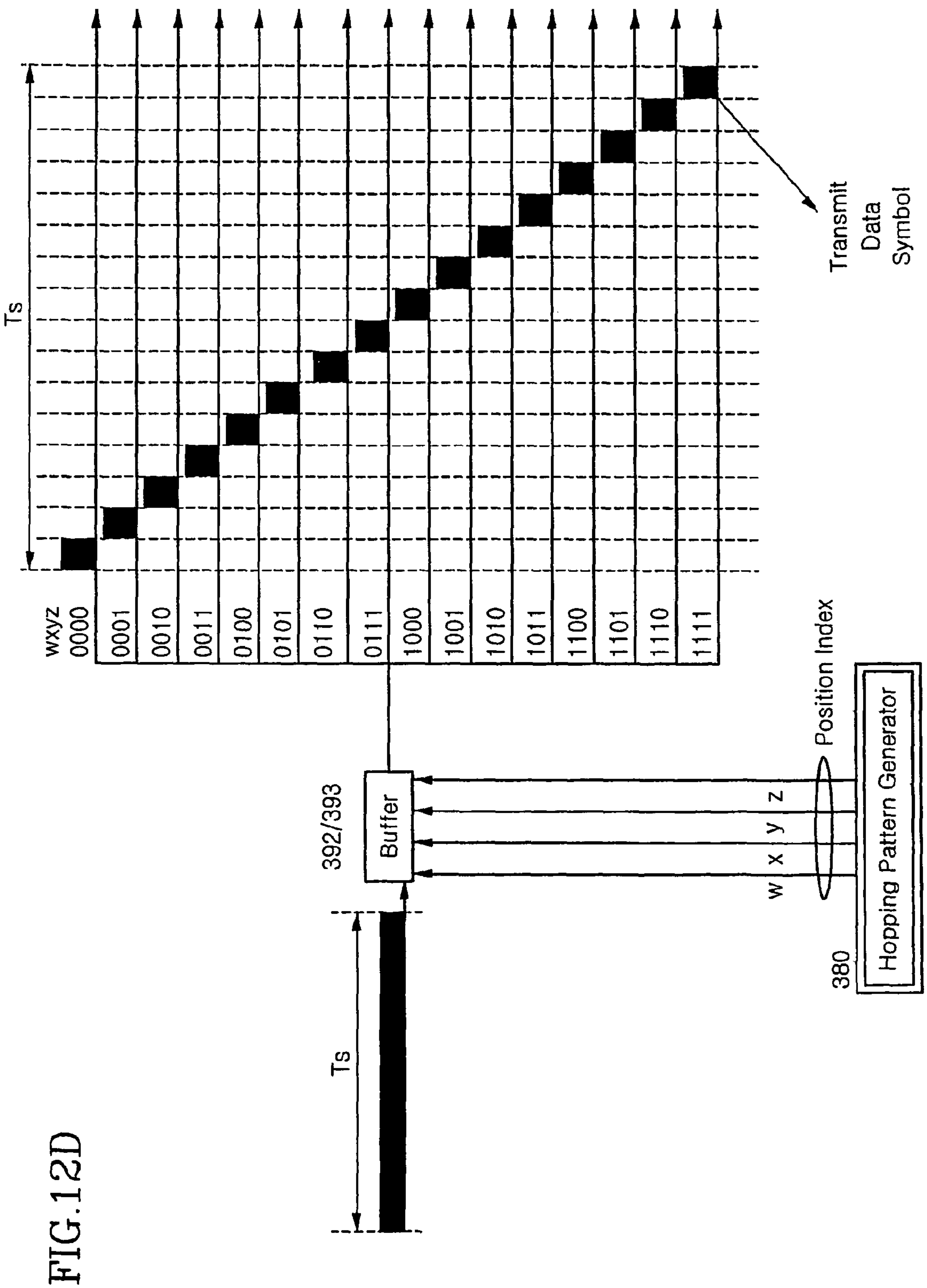
FIG. 12*d* is a schematic of a symbol position selector (or buffer) based on the output of a time hopping pattern generator at the transmitter of the primary station according to an embodiment of the present invention.

The buffers for transmission time hopping 392 and 393 receive the signal corresponding to the coordinate value on the time axis among the outputs of the multidimensional hopping pattern generator 380, and the transmission position of the data in the buffers is determined as shown in FIG. 12*c* according to the input value. In FIG. 12*c*, "1" means the presence of transmit data and "0" means the absence of transmit data. FIG. 12*d* shows an example that the transmit data has 16 probable positions (PPs) in FIG. 12*c*. In the multidimensional orthogonal resource hopping multiplexing, transmission time hopping is achieved in the unit of transmit symbols rather than frames or time slots using the basic transmission rate R as an instantaneous transmission rate in order to maximize statistical multiplexing and readily search communication channels to the secondary stations. The symbol-based hopping in one frame makes it easy to search the change of the channel at the receiver of the secondary station, because the transmit symbols are distributed in the frame uniformly from the aspect of probability.

Figure 12E:
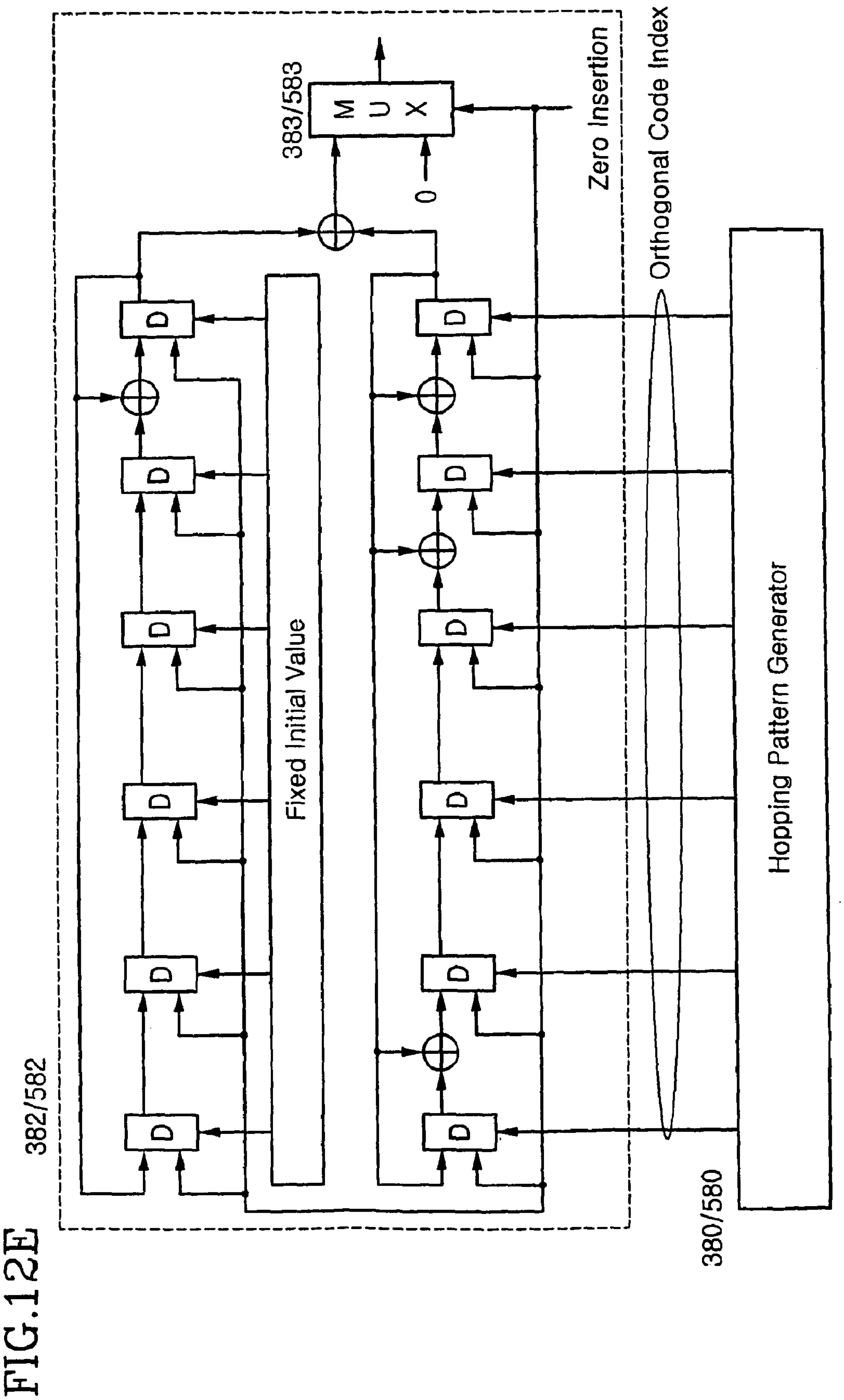
FIG. 12*e* is a schematic of an orthogonal gold code generator based on an orthogonal code hopping pattern according to an embodiment of the present invention (orthogonal resource=orthogonal gold code)
Figure 12F:
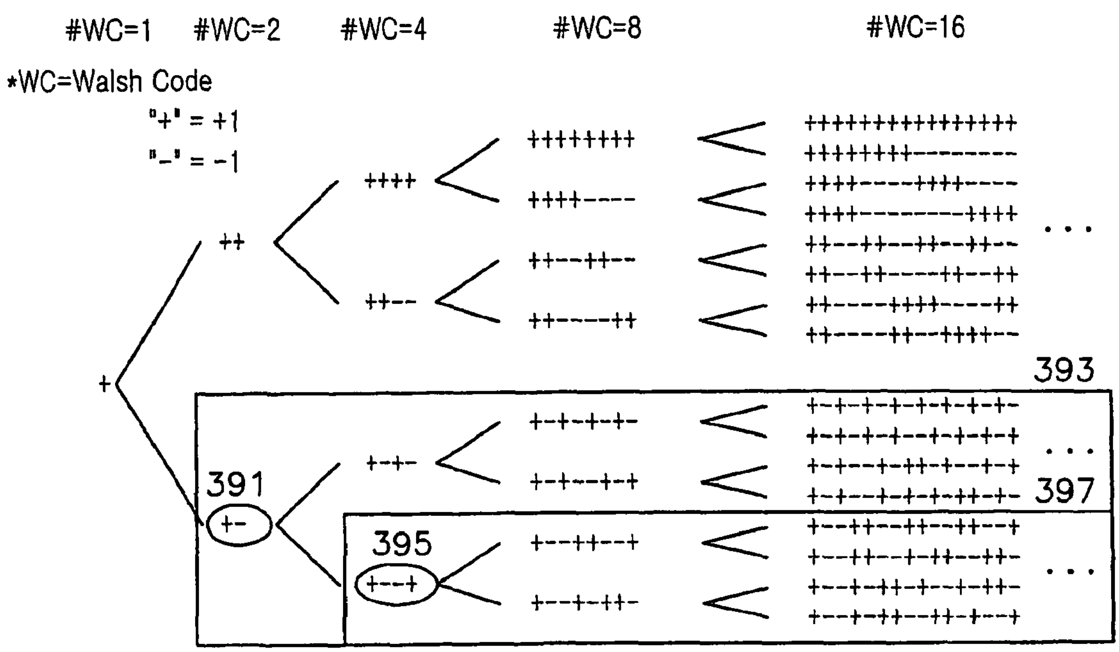
FIG. 12*f* is an illustration showing a tree-type orthogonal Walsh code based on different spreading factors (orthogonal resource=orthogonal Walsh code)
Figure 12G:
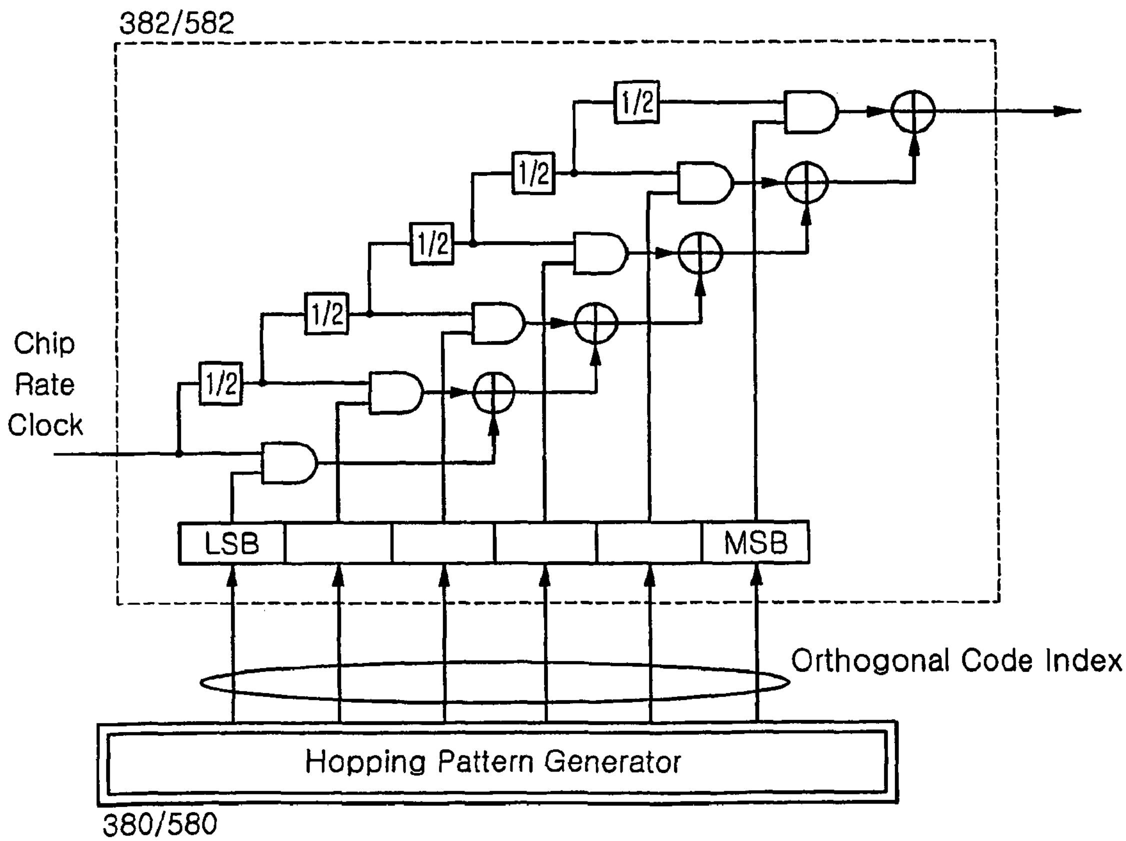
FIG. 12*g* is a schematic of an orthogonal Walsh code generator based on the orthogonal code hopping pattern according to an embodiment of the present invention (orthogonal resource=orthogonal Walsh code)
Figure 12H:
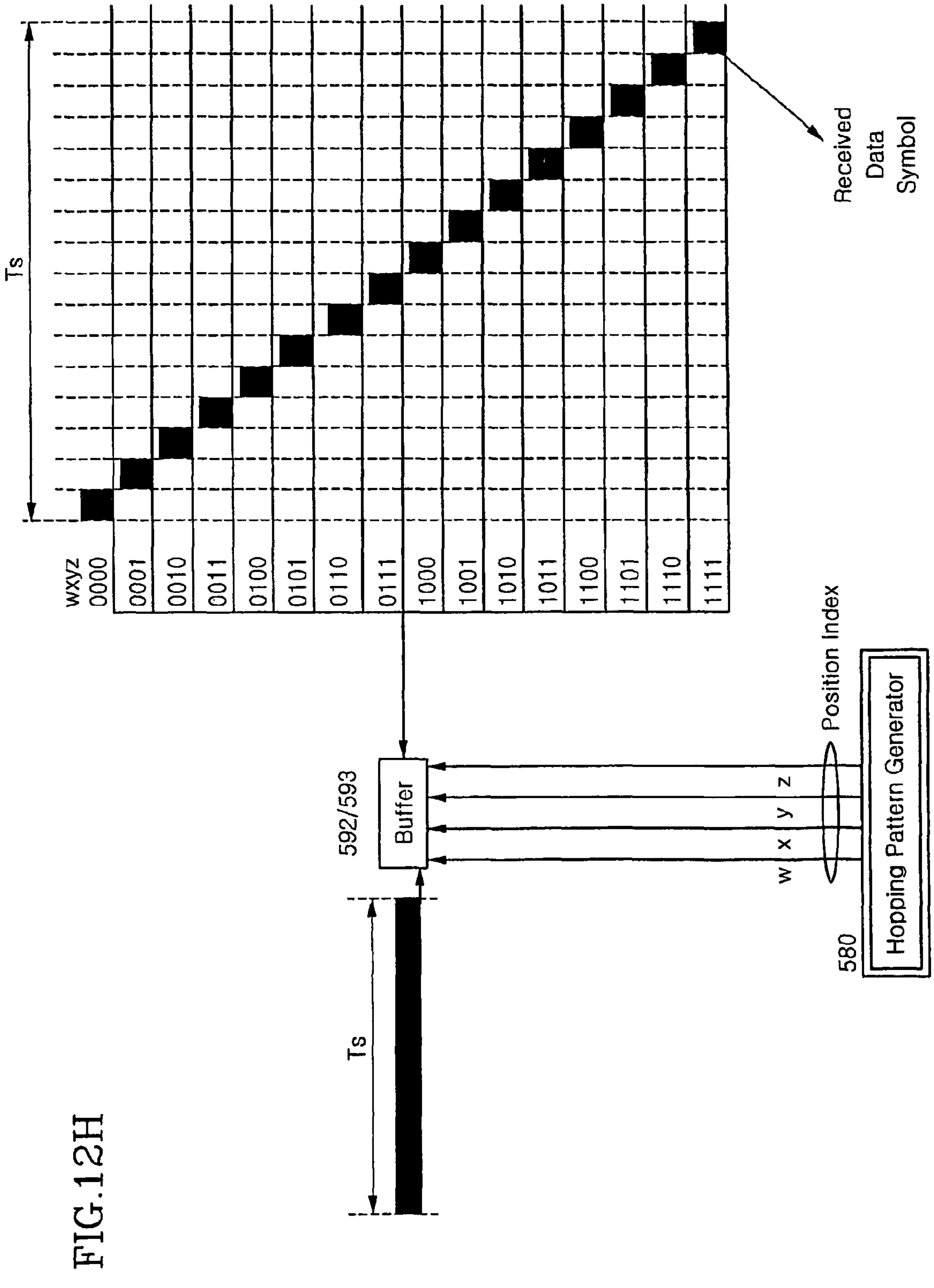
FIG. 12*h* is a schematic of a symbol position selector (or buffer) based on the output of a time hopping pattern generator at a receiver of the secondary station according to an embodiment of the present invention.

The orthogonal code generated from the orthogonal code generator 382 may be any orthogonal code maintaining orthogonality, such as an orthogonal gold code generated from the orthogonal gold code generator shown in FIG. 12*e* or an OVSF (Orthogonal Variable Spreading Factor) code of a hierarchical structure that becomes a Walsh code for a specific spreading factor as shown in FIG. 12*f*. The orthogonal code division multiplexing is the same as the prior art, only if the coordinates on the orthogonal code axis among the outputs of the multidimensional hopping pattern generator 380 are fixed. With one orthogonal code divided into two orthogonal code symbol groups, the one orthogonal code symbol group is used for orthogonal code division multiplexing by a fixed allocation and the other orthogonal code symbol group is used for orthogonal code hopping multiplexing by a hopping pattern. Alternatively, the one orthogonal code symbol group is used for orthogonal code hopping multiplexing using an intentional selected hopping pattern so as not to cause a hopping pattern collision, and the other orthogonal code symbol group is used for orthogonal code hopping multiplexing based on the statistical multiplexing using channel-independent hopping patterns possibly causing a hopping pattern collision. The former case involves allocation to relative important transmit data or high-activity channels, while the latter case involves allocation to channels causing a relatively sparse traffic, thereby acquiring a statistical multiplexing gain. When using a hierarchical orthogonal code supporting a variable spreading gain as in FIG. 12*f* as a spreading code, it is desirable in the aspect of orthogonal code division to divide the orthogonal code into orthogonal code symbol groups 393 and 397 composed of all the daughter code symbols having the same parent code symbols 391 and 395 as "01" or "0110".

As described above, there is no hopping pattern collision when the multidimensional hopping pattern generator 380 generates multidimensional hopping patterns intentionally so that the same orthogonal resource is not selected by different channels at the same time for the respective channels. But this method has the following problems: (1) the hopping pattern is not determined by the secondary station but allocated by the primary station during a call set-up; (2) the number of multidimensional hopping patterns allocable by the primary station is limited by the number of orthogonal resources; and (3) with a handoff to an adjacent cell, a new multidimensional hopping pattern must be allocated from the adjacent cell. The allocation of multidimensional hopping patterns between channels to the secondary stations without a collision is intended to acquire a diversity gain rather than to achieve statistical multiplexing. For high-activity and dense channels to the secondary stations, it is efficient not to cause a hopping pattern collision. But, for low-activity and sparse channels to the secondary stations according to the characteristic of services, there may occur a waste and inefficiency of resources, so that channel-independent multidimensional hopping patterns are generated in order to acquire a statistical multiplexing gain and a frequency and time diversity according to the data activity of each cannel. Inevitably, this results in a multidimensional hopping pattern collision that different channels determine the coordinates of the same multidimensional orthogonal resource at the same time. To solve this problem, the present invention uses the collision detector and controllers 384 and 386 to receive the hopping patterns for all channels and data symbols to be transmitted and thereby determine whether the hopping patterns are collided. The multidimensional hopping patterns by the respective secondary stations are generated in the primary station and the data to be transmitted to each secondary station are also sent to the primary station, so that it is possible to determine before the actual collision whether the hopping patterns are collided and whether the transmit data are matched. With a multidimensional hopping pattern collision, the transmit data symbols for all channels concerned are compared. If the transmit data symbols are all matched, then the data symbols present in the collision interval are transmitted. This is because no error occurs in the channel decoding process of the secondary station concerned. But with only one unmatched transmit data symbol, the data symbols in the collision interval of the related channel are not transmitted. That is, the input of multipliers 385 and 387 is "+1" or "0" according to the output of the collision detector and comparators 384 and 386. Transmission is stopped in the interval where the input of the multipliers is "0". This interruption of the transmission of the spread data symbols results in a lack of the average received energy from the secondary station required to meet a desired quality. To compensate for the insufficient average received energy, the transmission power of the primary station is increased by adjusting the gains of amplifiers 315 and 335 of the corresponding channel as much as a magnitude given as a system parameter for an interval given as a system parameter as denoted by reference numbers 1072 and 1074 of FIG. 15. Aside from this, the secondary station can perform transmission power control of the primary station by the conventional method.

Figure 10B:
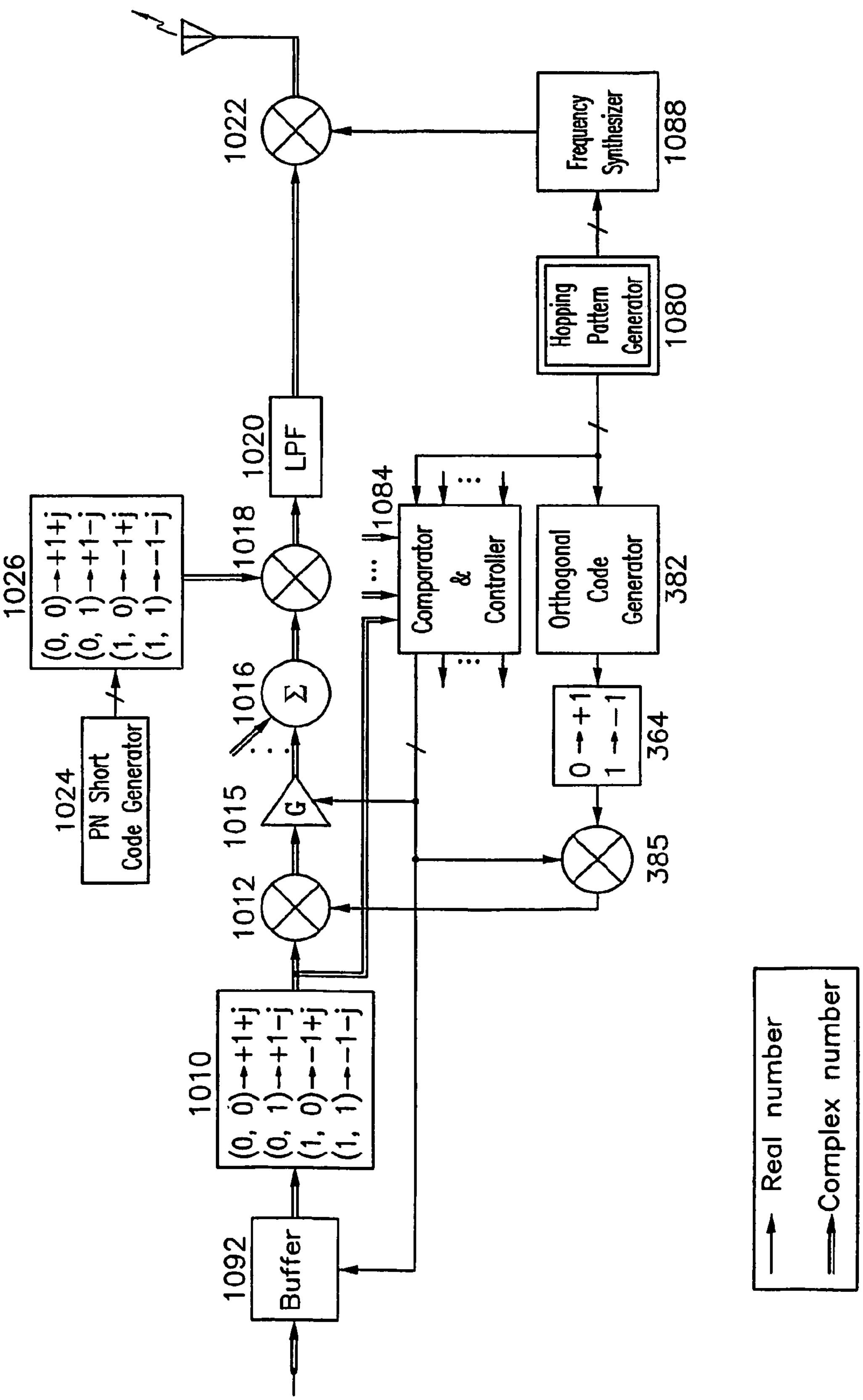
FIG. 10*b* is a schematic of a transmitter in the primary station for orthogonal resource hopping multiplexing according to an embodiment of the present invention (denotes the signal of FIG. 10*a* as a complex number signal)

FIG. 10*b* is a schematic of a transmitter in the primary station for orthogonal resource hopping multiplexing according to an embodiment of the present invention, in which the signal of FIG. 10*a* is denoted as a complex number signal.

Figure 3B:
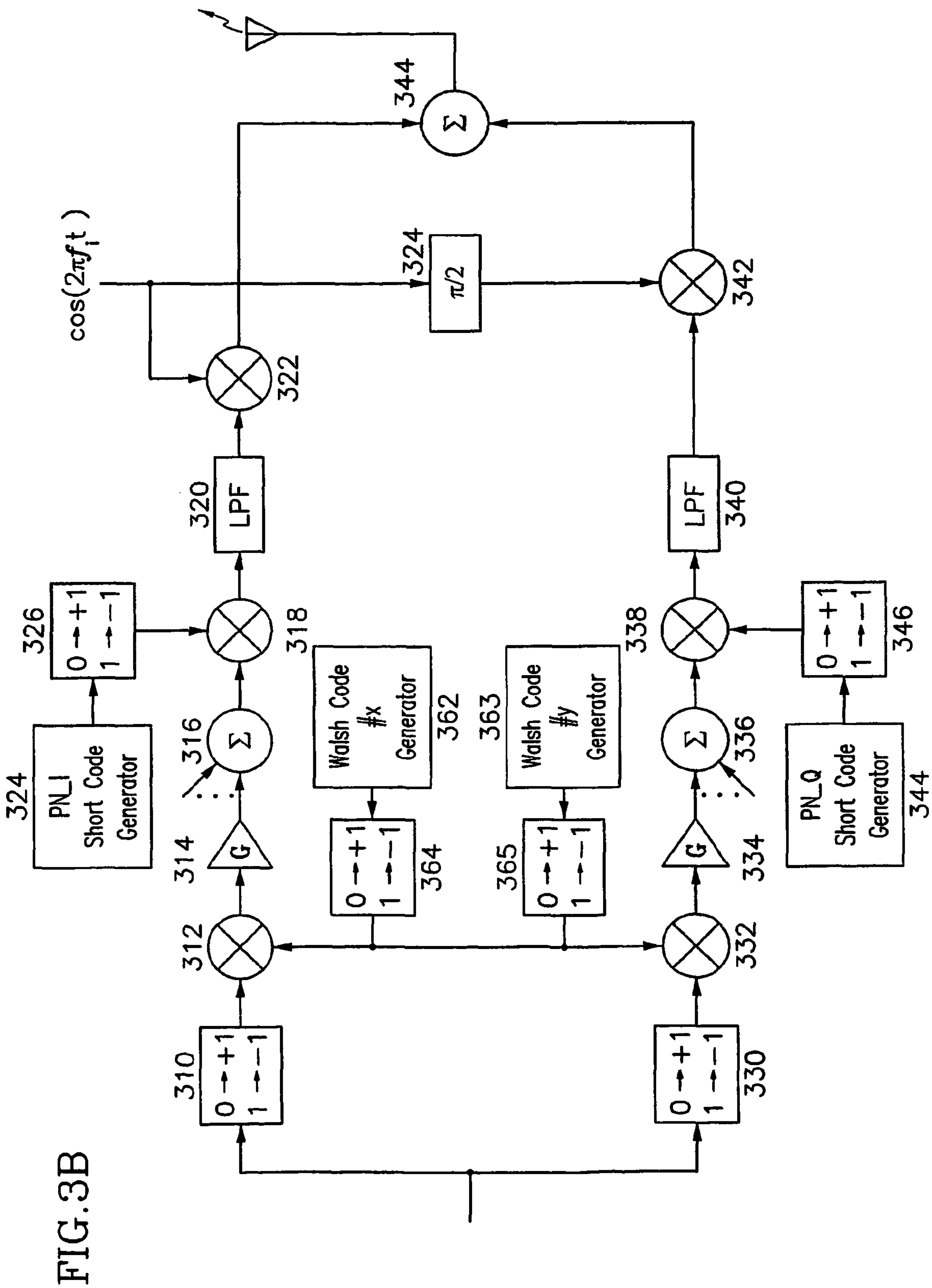
FIG. 3*b* is a schematic of a transmitter of the primary station for code division multiplexing according to an example of the prior art (based on BPSK data modulation and using a different orthogonal code symbol for I/Q channels)
Figure 10C:
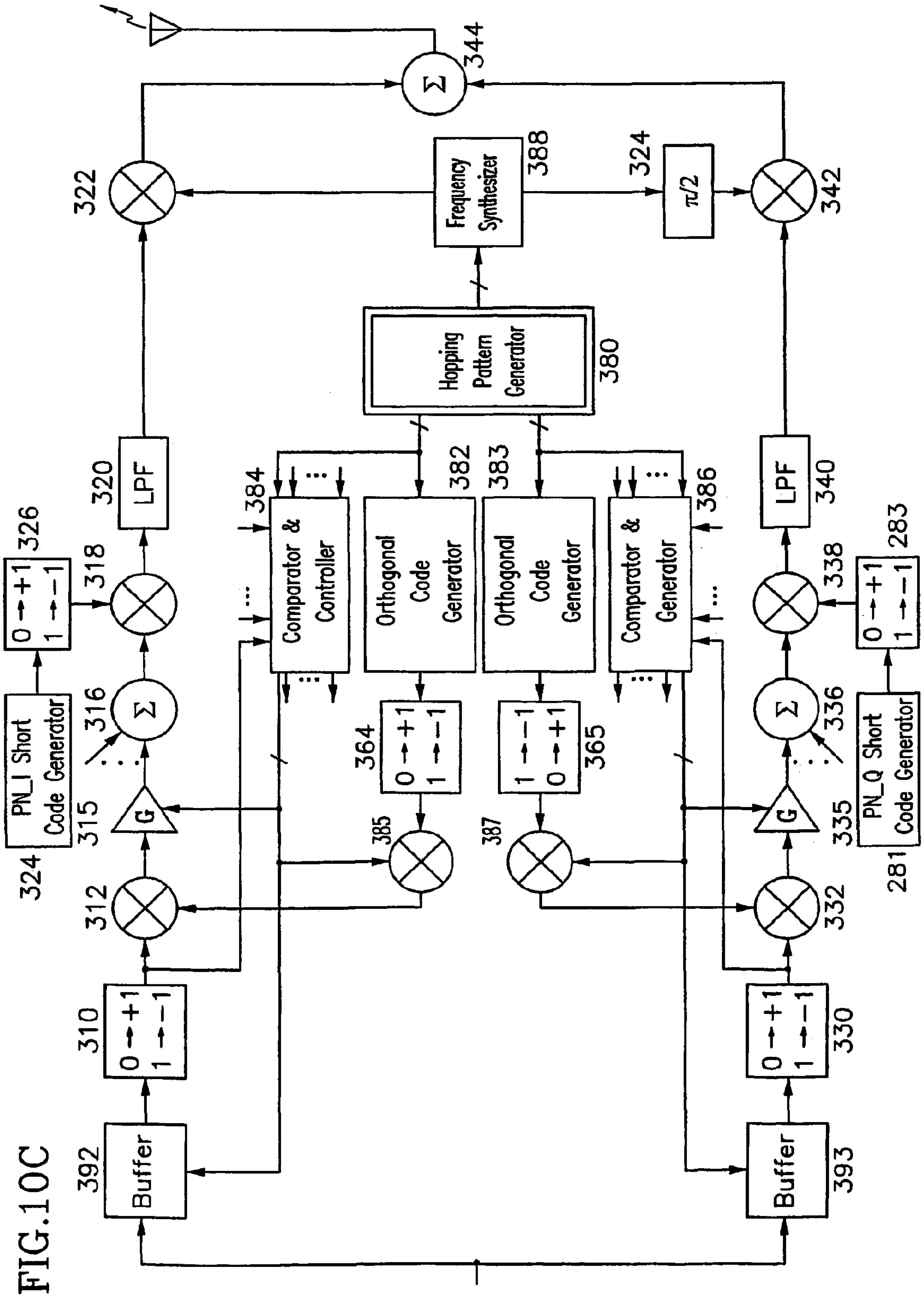
FIG. 10*c* is a schematic of a transmitter in the primary station for orthogonal resource hopping multiplexing according to an embodiment of the present invention (corresponding to FIG. 3*b*)

FIG. 10*c* illustrates an embodied method applying the present invention to the example of the prior art shown in FIG. 3*b*. The transmitter of FIG. 10*c* is the same in structure as that of FIG. 10*a*, excepting that a multidimensional hopping pattern generator 380 generates multidimensional hopping patterns independent to in-phase (I) and quadrature phase (Q) channels. For the statistical multiplexing based on the multidimensional orthogonal resource hopping multiplexing proposed in the present invention, there are needed the multidimensional hopping pattern generator 380 and collision detector and controllers 384 and 386 for detecting collision and transmission independent to I/Q channels.

Figure 10D:
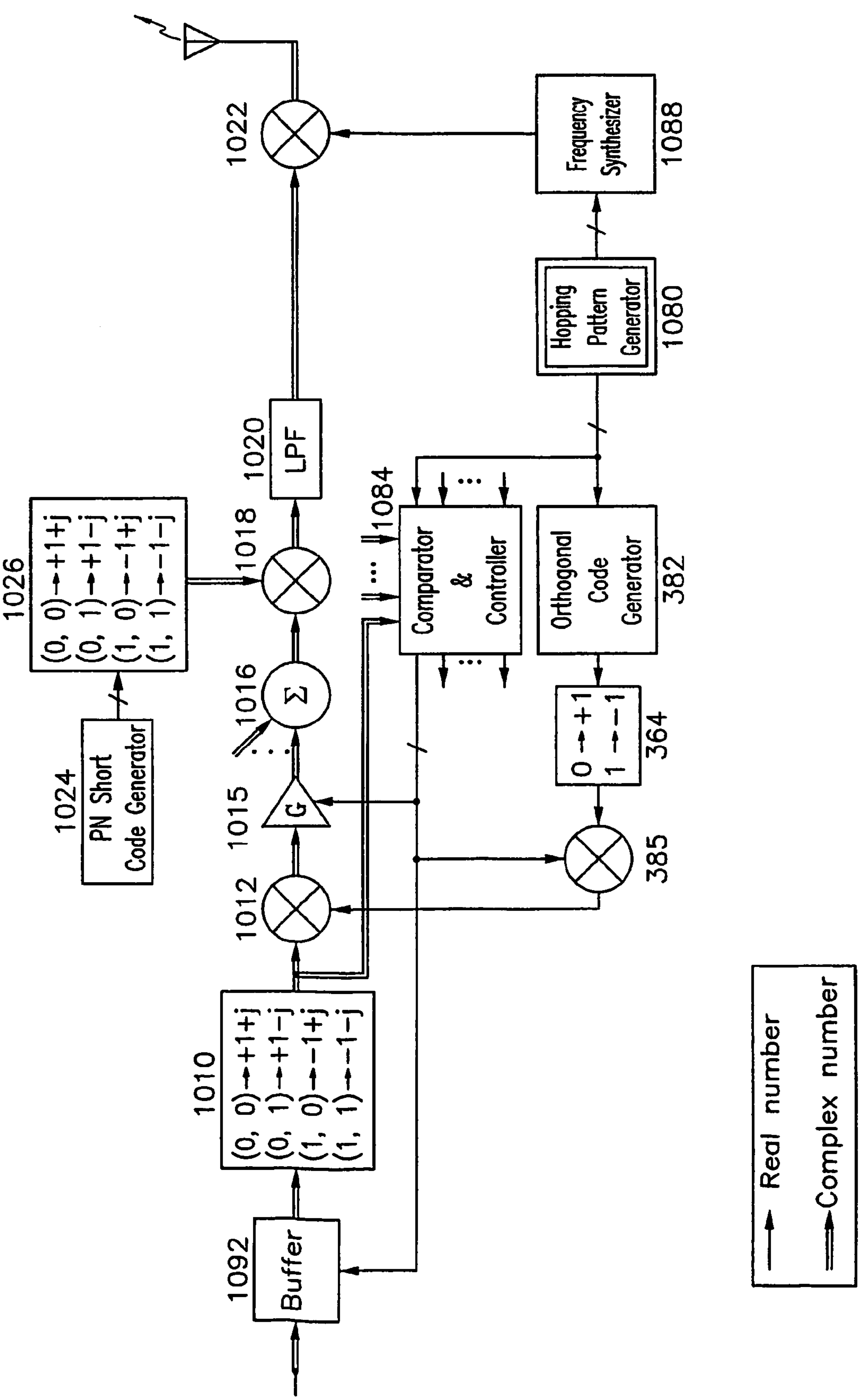
FIG. 10*d* is a schematic of a transmitter in the primary station for orthogonal resource hopping multiplexing according to an embodiment of the present invention (denotes the signal of FIG. 10*b* as a complex number signal)

FIG. 10*d* is a schematic of a transmitter in the primary station for orthogonal resource hopping multiplexing in accordance with an embodiment of the present invention, in which the signal of FIG. 10*c* is denoted as a complex number signal.

Figure 3C:
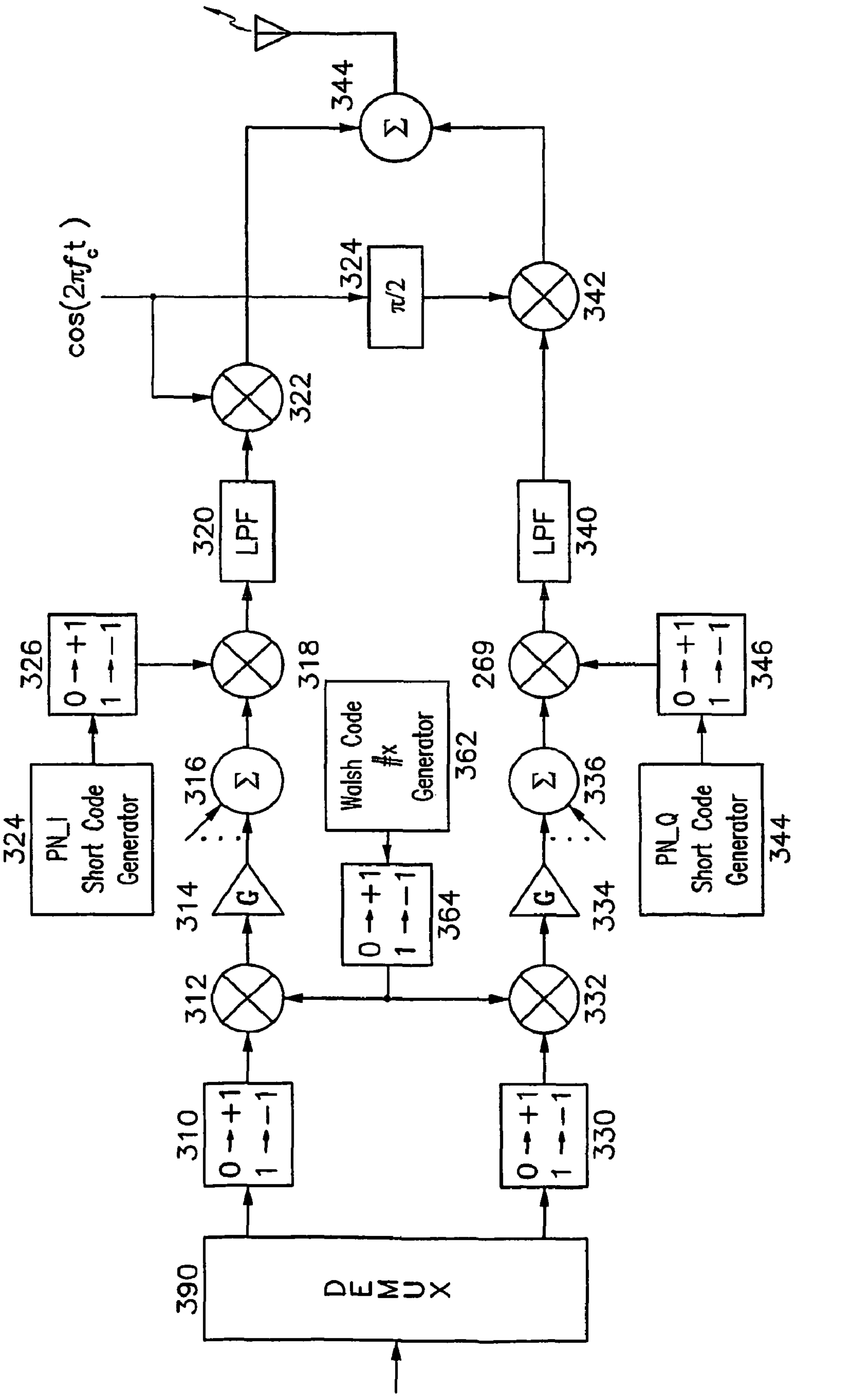
FIG. 3*c* is a schematic of a transmitter of the primary station for code division multiplexing according to an example of the prior art (based on QPSK data modulation and using the same orthogonal code symbol for I/Q channels)
Figure 10E:
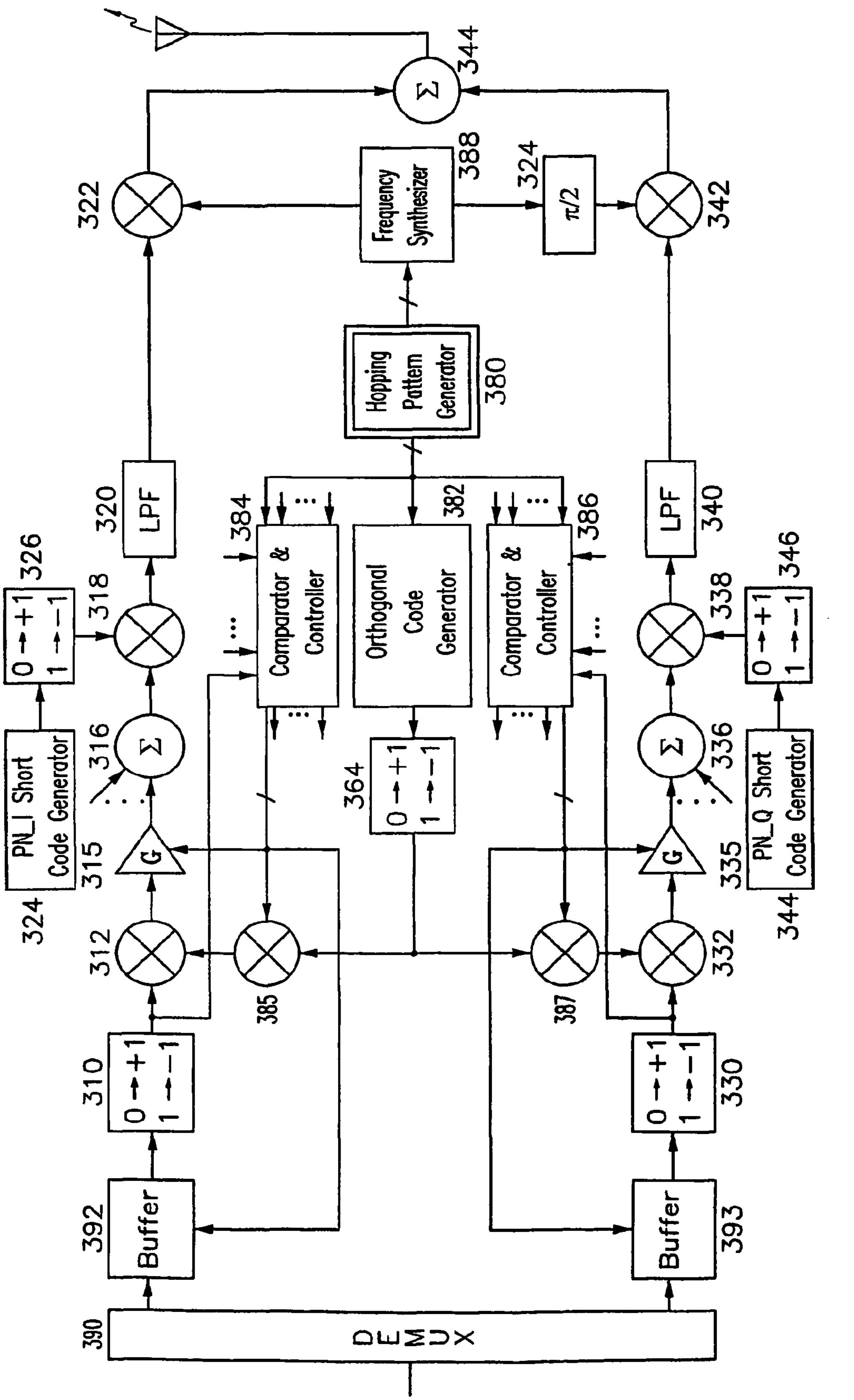
FIG. 10*e* is a schematic of a transmitter in the primary station for orthogonal resource hopping multiplexing according to an embodiment of the present invention (corresponding to FIG. 3*c*)

FIG. 10*e* illustrates an embodied method applying the present invention to the example of the prior art shown in FIG. 3*c*. The transmitter of FIG. 10*e* is the same in structure as that of FIG. 10*a*, excepting that transmit data are different between I-channel and Q-channel because QPSK data modulation is performed, unlike the transmitter of FIG. 10*a* performing BPSK data modulation.

Figure 10F:
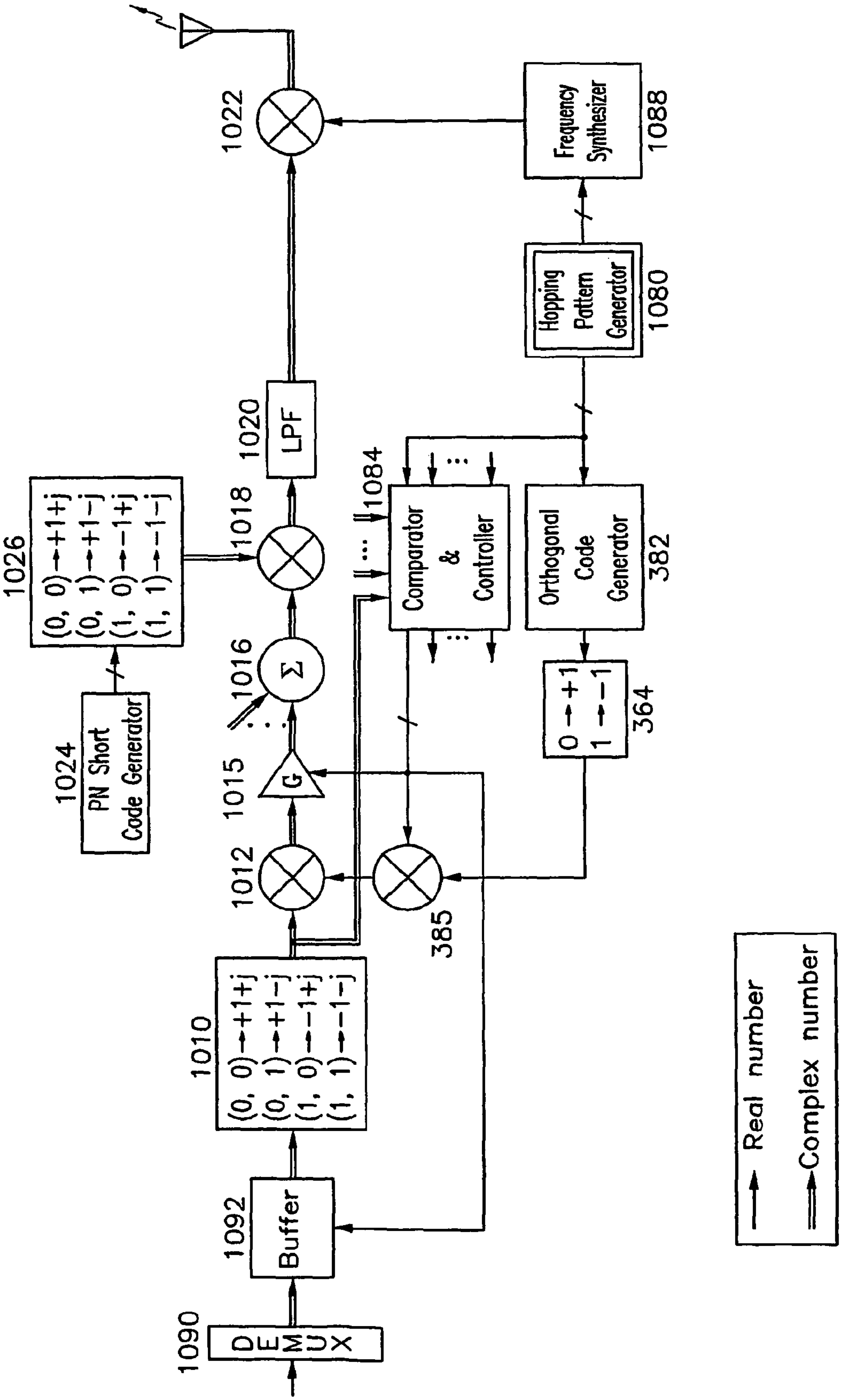
FIG. 10*f* is a schematic of a transmitter in the primary station for orthogonal resource hopping multiplexing according to an embodiment of the present invention (denotes the signal of FIG. 10*c* as a complex number signal)

FIG. 10*f* is a schematic of a transmitter in the primary station for orthogonal resource hopping multiplexing according to an embodiment of the present invention, in which the signal of FIG. 10*e* is denoted as a complex number signal.

Figure 3D:
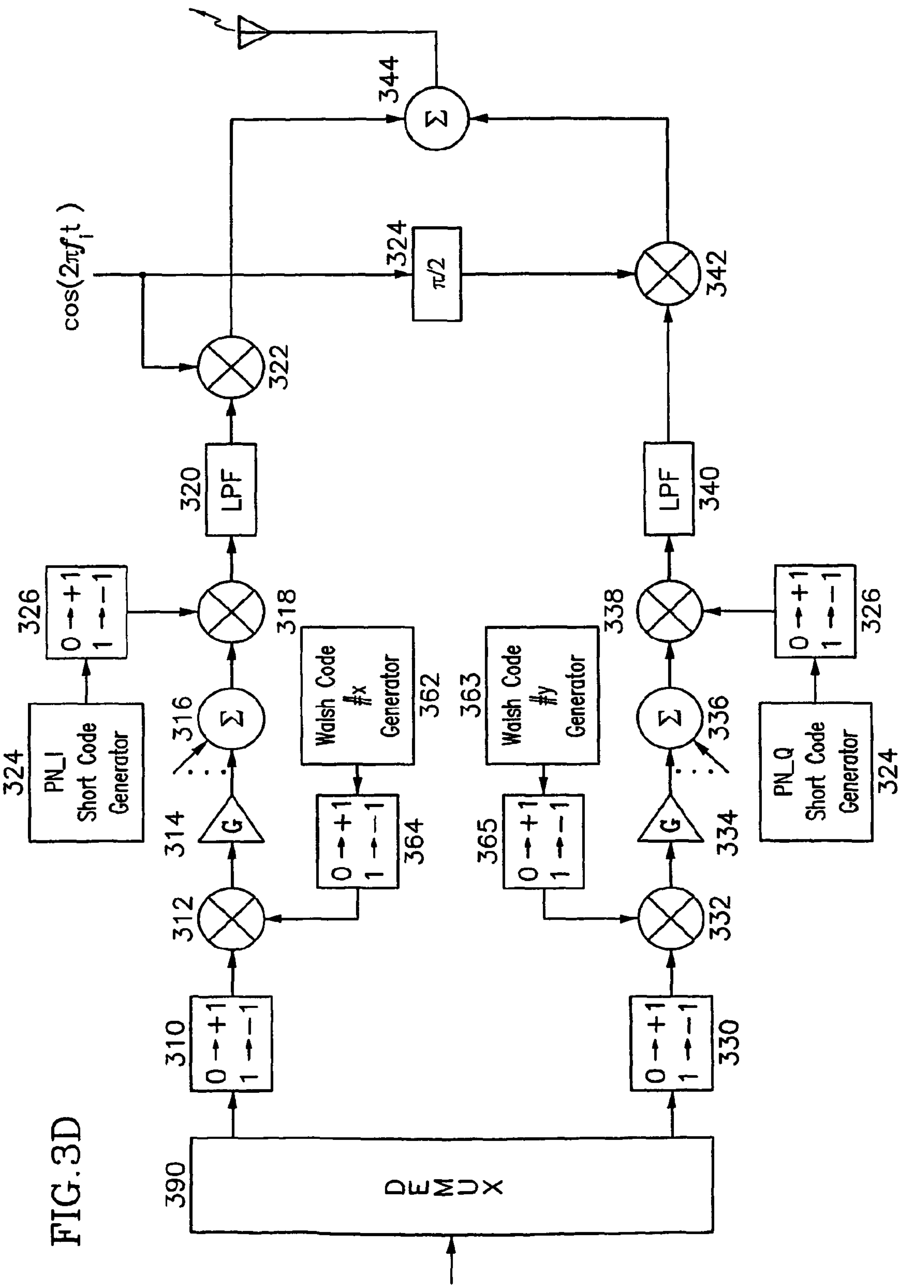
FIG. 3*d* is a schematic of a transmitter of the primary station for code division multiplexing according to an example of the prior art (based on QPSK data modulation and using a different orthogonal code symbol for I/Q channels)
Figure 10G:
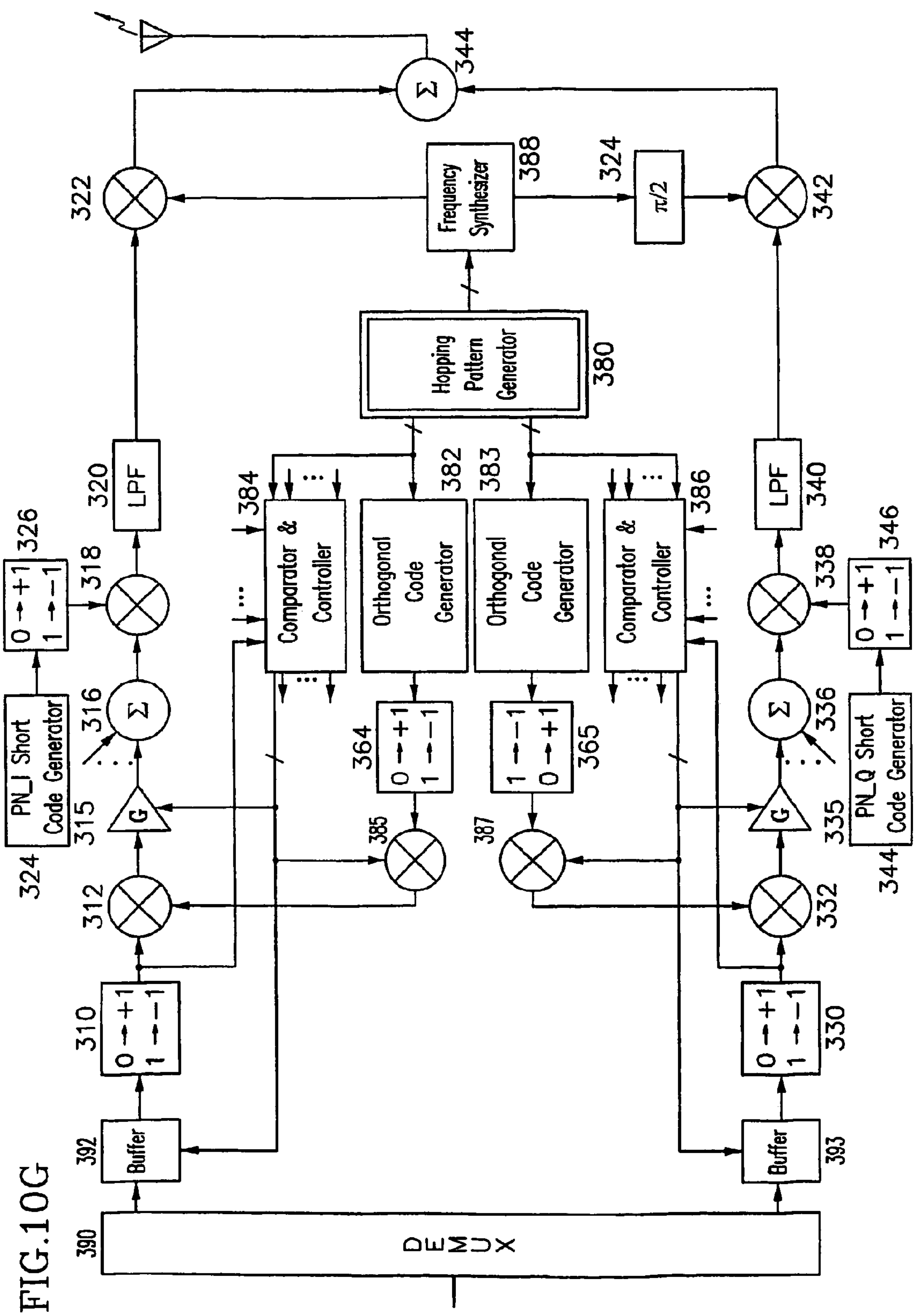
FIG. 10*g* is a schematic of a transmitter in the primary station for ORHM according to an embodiment of the present invention to the example of the prior art shown in FIG. 3*d;*

FIG. 10*g* illustrates an embodied method applying the present invention to the example of the prior art shown in FIG. 3*d*. The transmitter of FIG. 10*g* is the same in structure as that of FIG. 10*e*, excepting that a multidimensional hopping pattern generator 380 generates multidimensional hopping patterns independent to in-phase (I) and quadrature phase (Q) channels. For the statistical multiplexing based on the multidimensional orthogonal resource hopping multiplexing proposed in the present invention, there are needed the multidimensional hopping pattern generator 380 and collision detector and controllers 384 and 385 for detecting collision and transmission independent to I/Q channels.

Figure 10H:
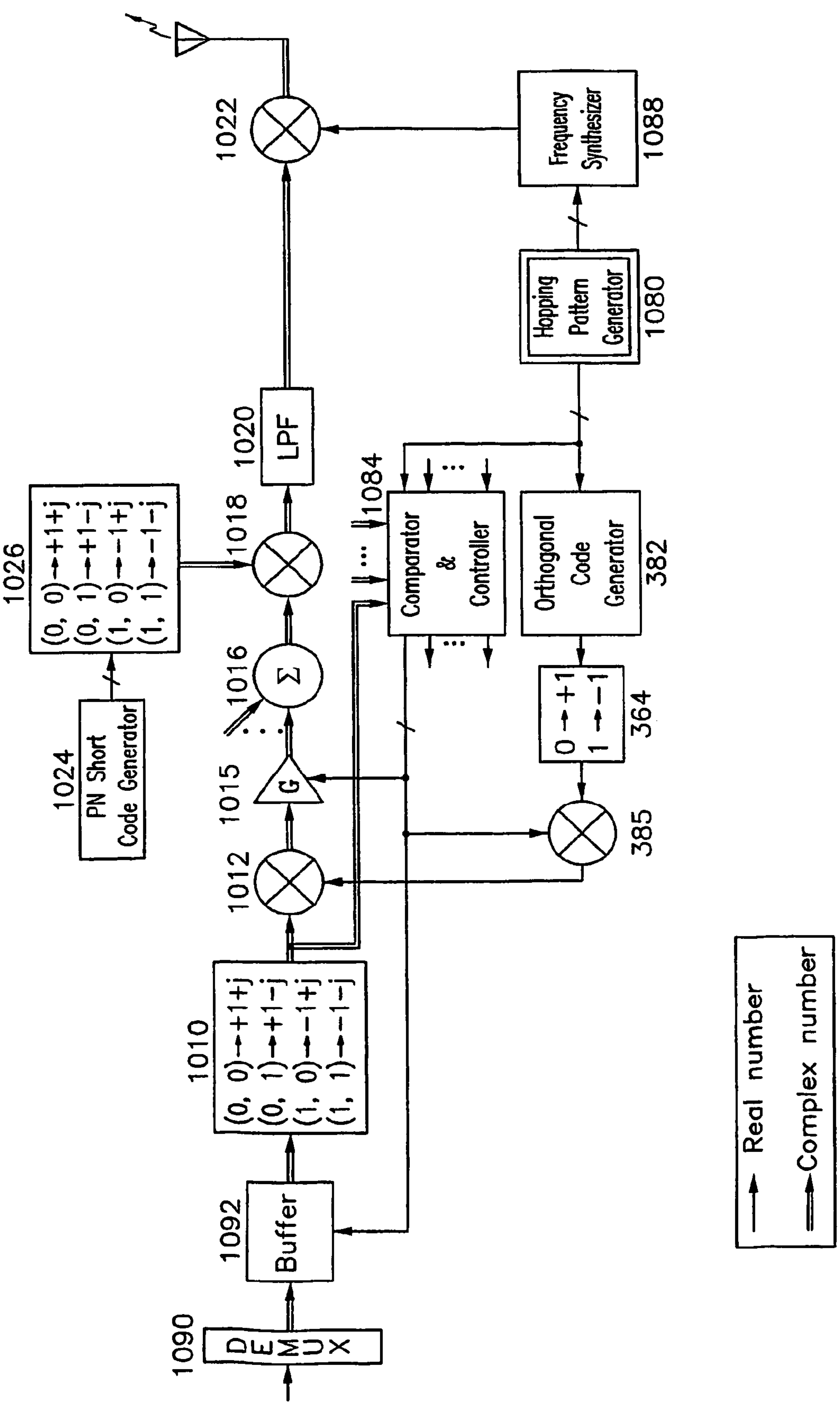
FIG. 10*h* is a schematic of a transmitter in the primary station for orthogonal resource hopping multiplexing according to an embodiment of the present invention (corresponding to FIG. 3*d*)

FIG. 10*h* is a schematic of a transmitter in the primary station for orthogonal resource hopping multiplexing in accordance with an embodiment of the present invention, in which the signal of FIG. 10*g* is denoted as a complex number signal.

Figure 3E:
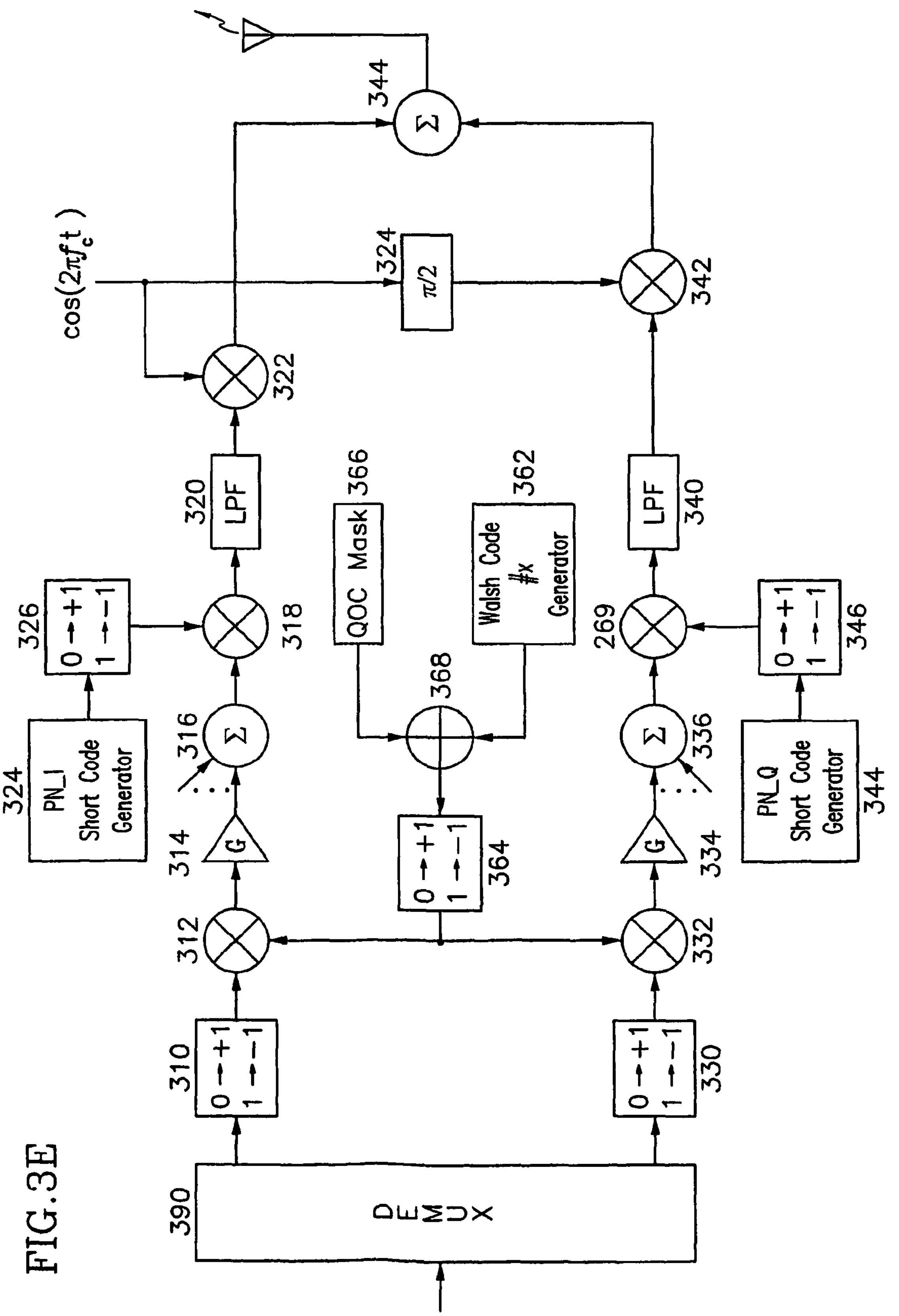
FIG. 3*e* is a schematic of a transmitter of the primary station for code division multiplexing according to an example of the prior art using quasi-orthogonal codes (based on QPSK data modulation and using the same orthogonal code symbol for I/Q channels)
Figure 10I:
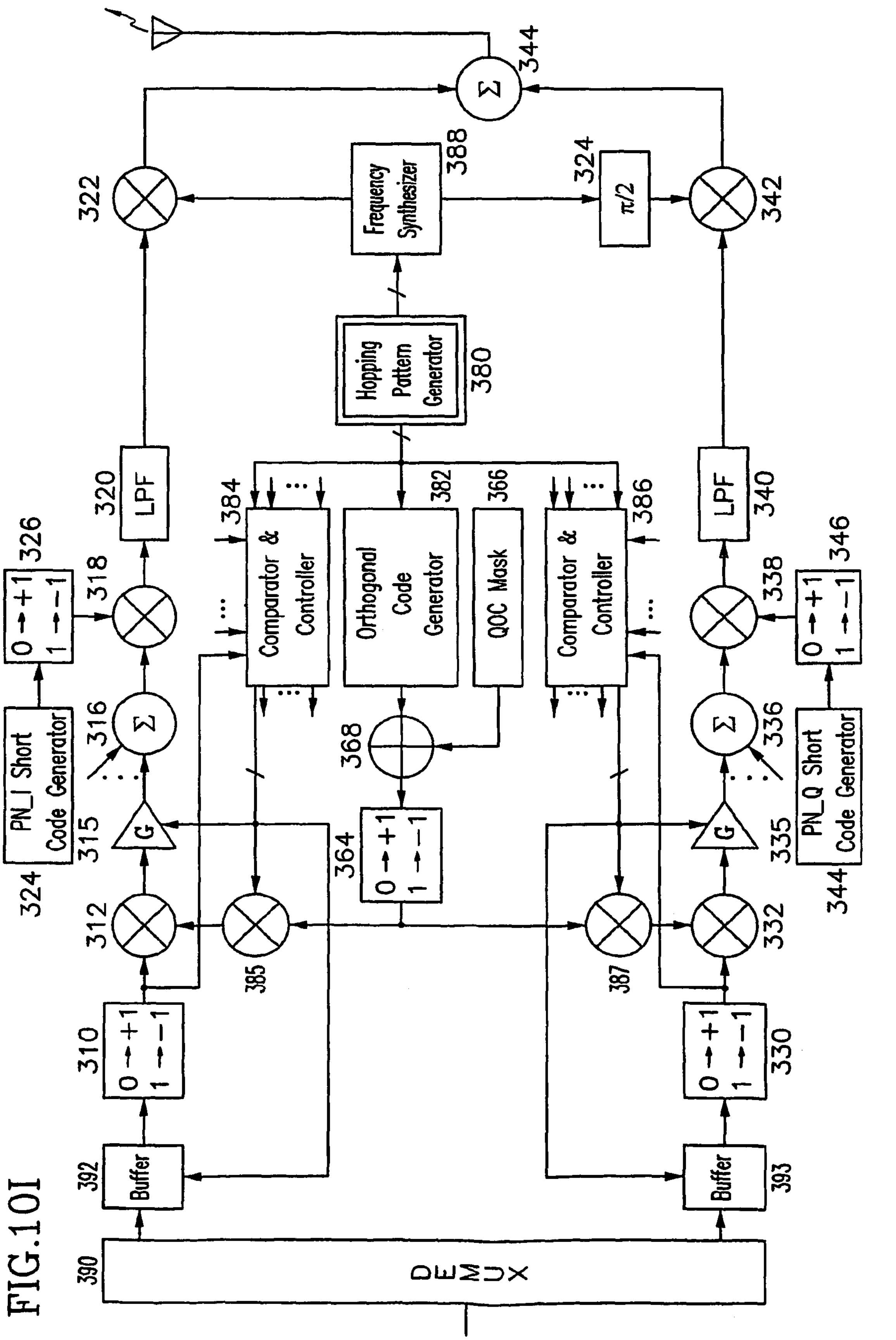
FIG. 10*i* is a schematic of a transmitter in the primary station for orthogonal resource hopping multiplexing according to an embodiment of the present invention (denotes the signal of FIG. 10*d* as a complex number signal)

FIG. 10*i* illustrates an embodied method applying the present invention to the example of the prior art shown in FIG. 3*e*. The transmitter of FIG. 10*i* is the same in structure as that of FIG. 10*e*, excepting that QOC (Quasi-Orthogonal Code) is used.

Figure 10J:
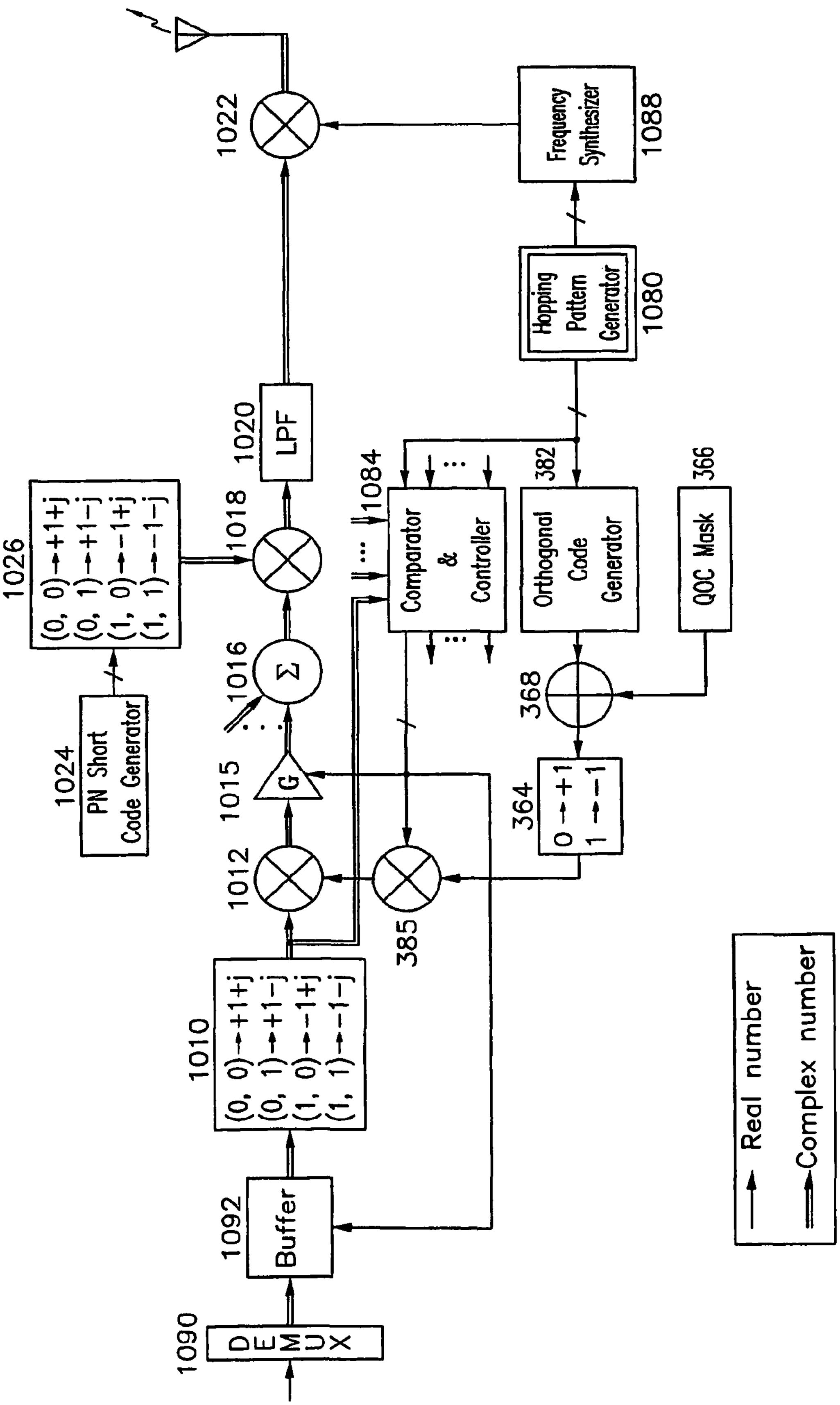
FIG. 10*j* is a schematic of a transmitter in the primary station for orthogonal resource hopping multiplexing according to an embodiment of the present invention (corresponding to FIG. 3*e*)

FIG. 10*j* is a schematic of a transmitter in the primary station for orthogonal resource hopping multiplexing in accordance with an embodiment of the present invention, in which the signal of FIG. 10*i* is denoted as a complex number signal.

Figure 3F:
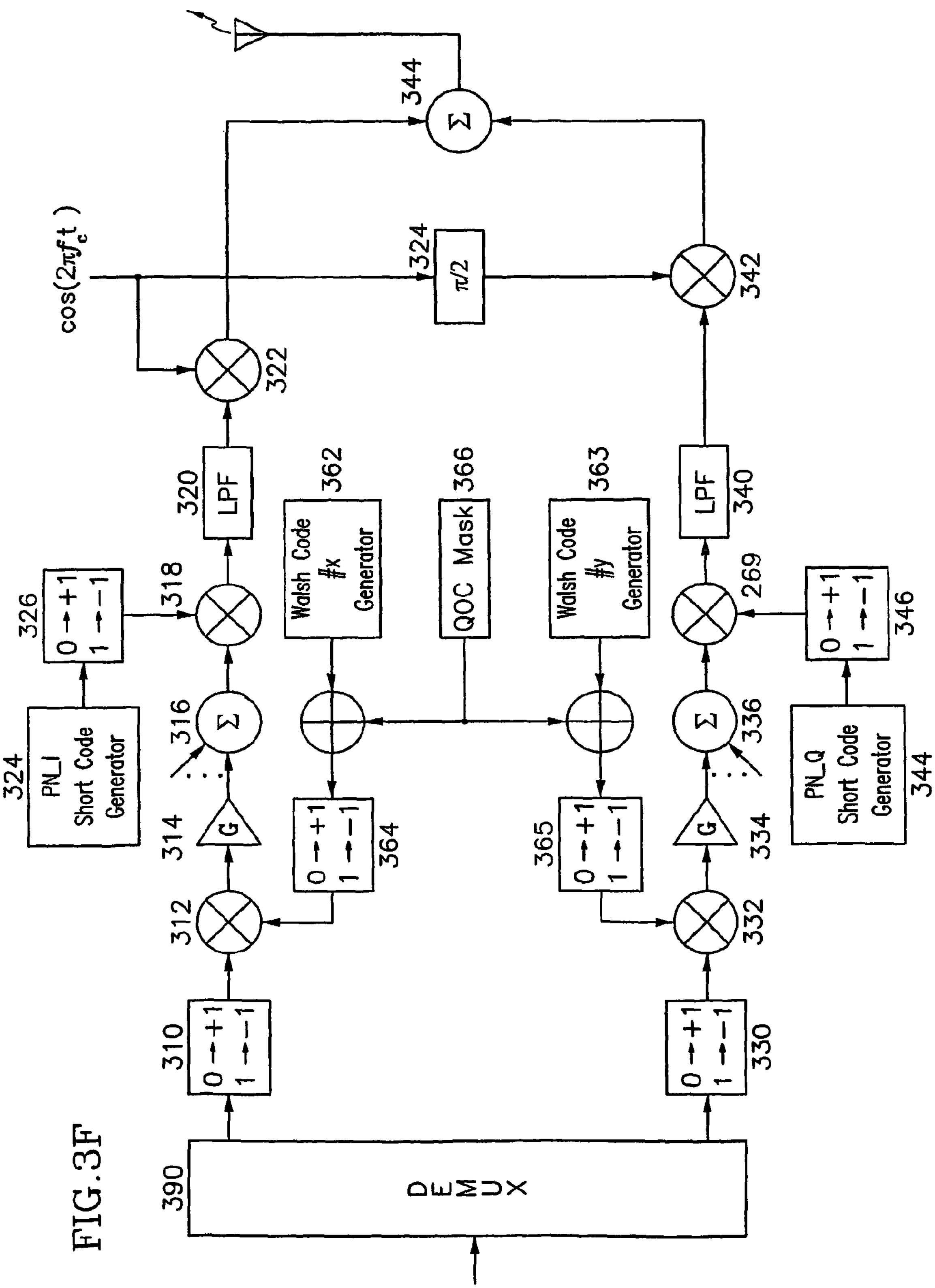
FIG. 3*f* is a schematic of a transmitter of the primary station for code division multiplexing according to an example of the prior art using quasi-orthogonal codes (based on QPSK data modulation and using a different orthogonal code symbol for I/Q channels)
Figure 10K:
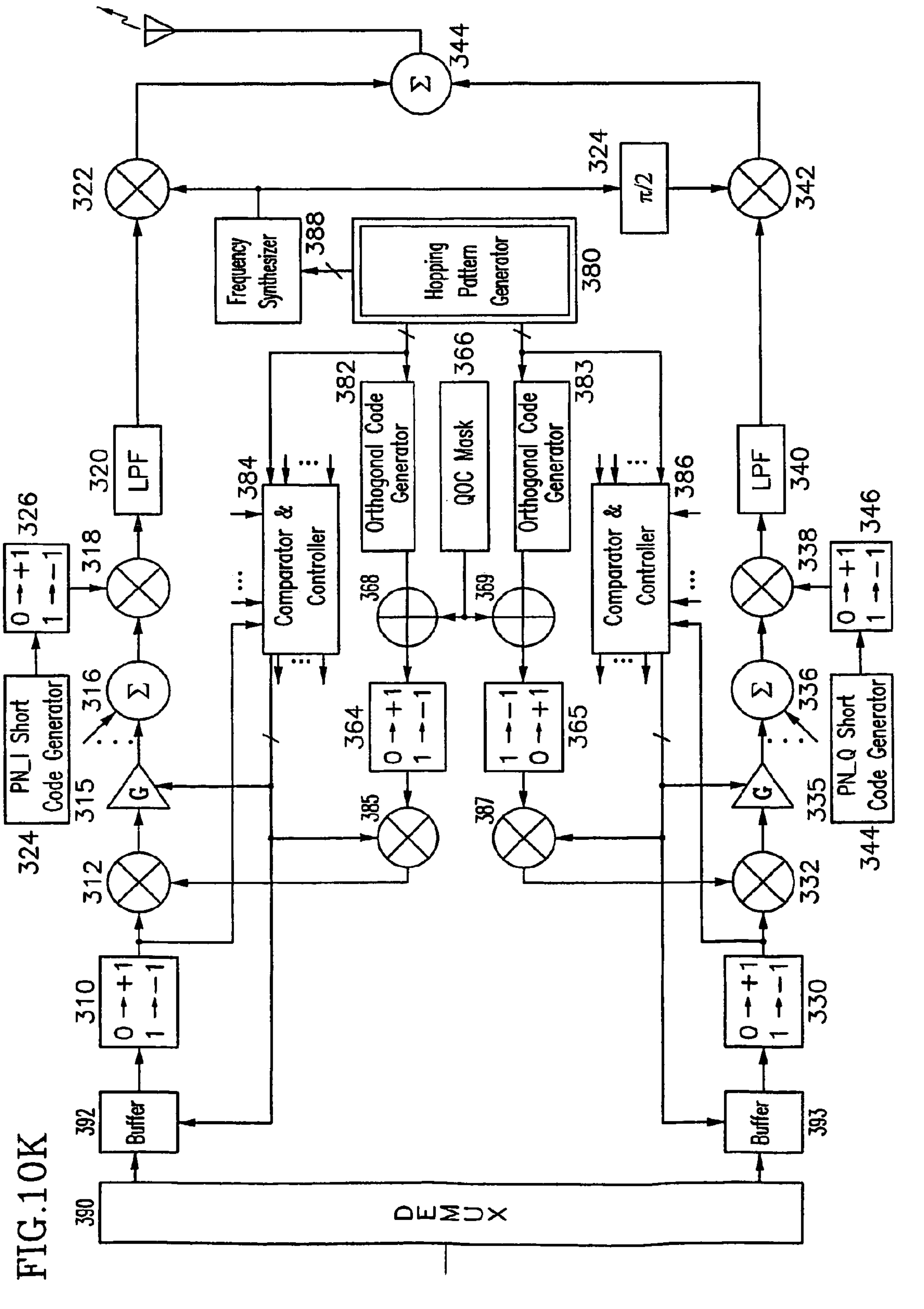
FIG. 10*k* is a schematic of a transmitter in the primary station for orthogonal resource hopping multiplexing according to an embodiment of the present invention (denotes the signal of FIG. 10*e* as a complex number signal)
Figure 10L:
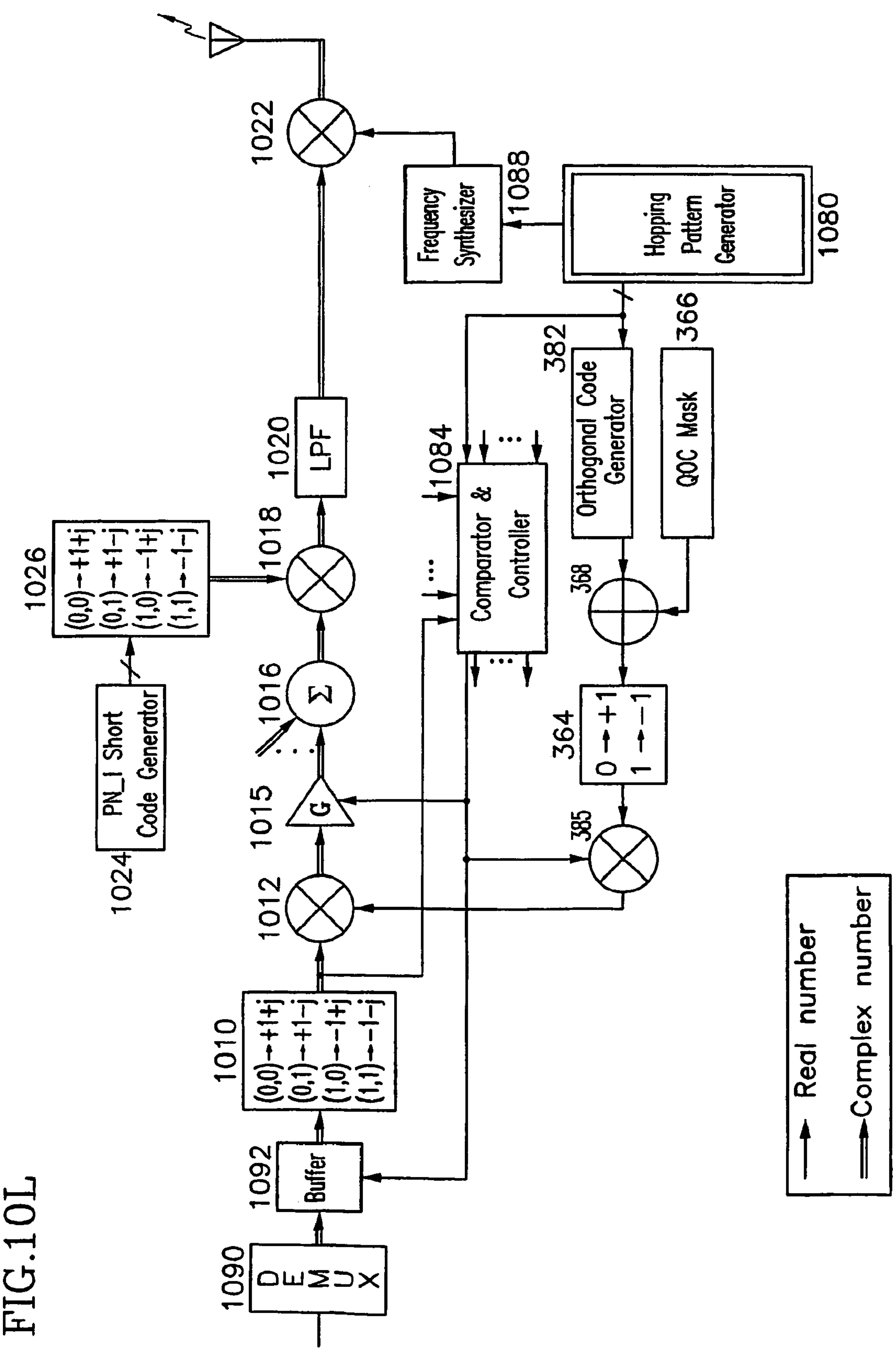
FIG. 10*l* is a schematic of a transmitter in the primary station for orthogonal resource hopping multiplexing according to an embodiment of the present invention (corresponding to FIG. 3*f*)

FIG. 10*k* illustrates an embodied method applying the present invention to the example of the prior art shown in FIG. 3*f*. The transmitter of FIG. 10*k* is the same in structure as that of FIG. 10*g*, excepting that QOC is used. FIG. 10*l* is a schematic of a transmitter in the primary station for orthogonal resource hopping multiplexing in accordance with an embodiment of the present invention, in which the signal of FIG. 10*k* is denoted as a complex number signal.

Figure 13A:
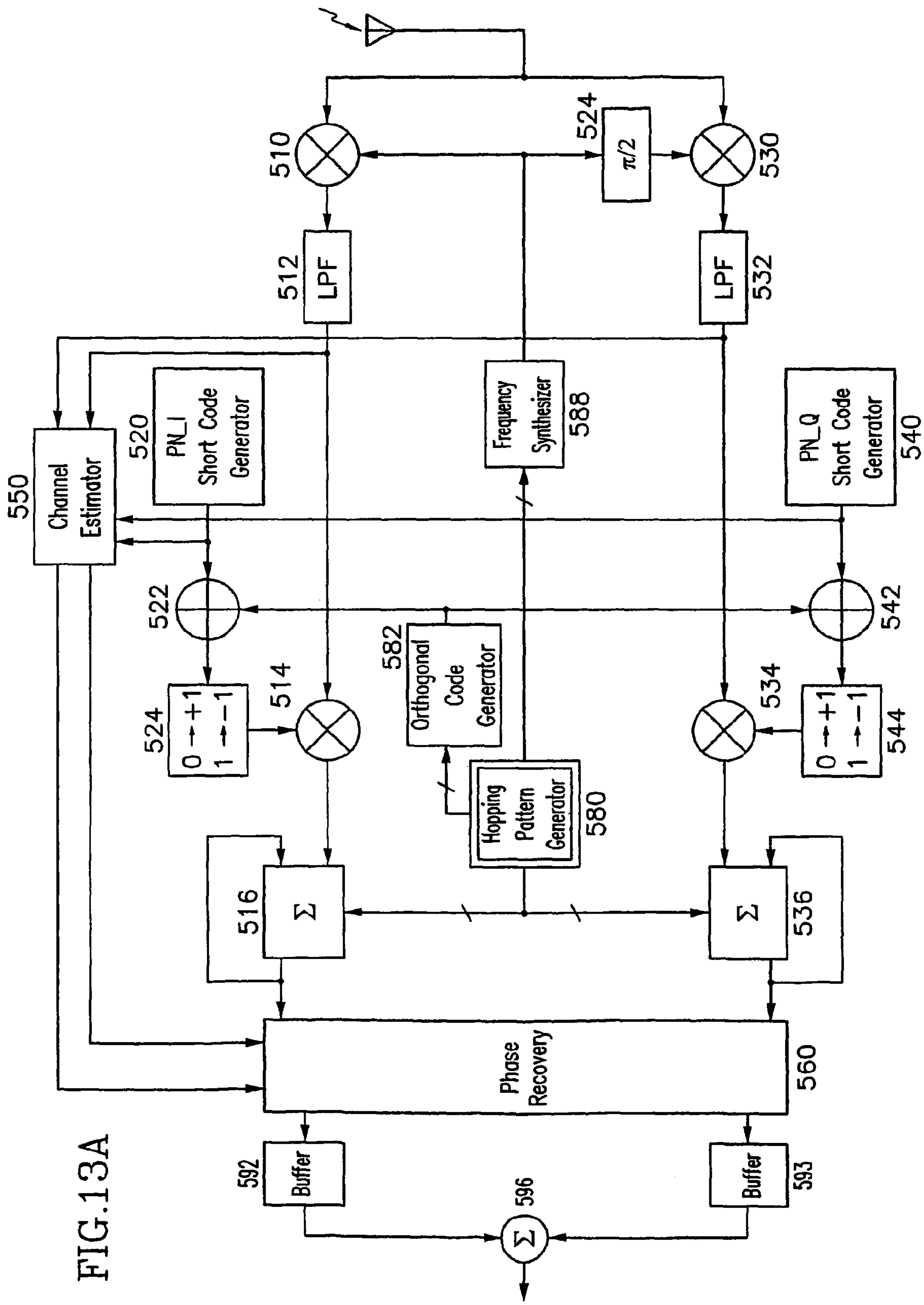
FIG. 13*a* is a schematic of a receiver in the secondary station for orthogonal resource hopping multiplexing according to the embodiment of the present invention shown in FIG. 10*a;*

FIG. 13*a* is a schematic of a receiver in the secondary station for orthogonal resource hopping multiplexing in accordance with the embodiment of the present invention illustrated in FIG. 10*a*. The signal received from the primary station via an antenna is sent to demodulators 510 and 530 for demodulation by a frequency synthesizer 588 under the control of a multidimensional hopping pattern generator 580. The demodulated signal is then sent to low-pass filters 512 and 532.

The low-pass filtered signal is sent to descramblers 522 and 542 for descrambling with the same scrambling codes generated from scrambling code generators 520 and 540 as in the transmitter. The descrambled signal is fed into multipliers 514 and 534 for multiplication by an orthogonal code symbol generated from an orthogonal code symbol generator 582 according to the coordinate value of the orthogonal code axis output from a multidimensional hopping pattern generator 580 synchronized with the transmitter of the primary station. The resulting signal is integrated for a corresponding symbol interval at integrators 516 and 536 for despreading. The despread signal is fed into a compensator 560 for compensating for a phase difference using a channel estimator 550, thereby achieving synchronous demodulation. The compensated data symbol is fed into buffers 592 and 593 in accord with the coordinate value of the transmission time axis of the multidimensional hopping pattern generator. Because the transmitter of the primary station shown in FIG. 10*a* performs BPSK data modulation, the receiver of the primary station corresponding to FIG. 13*a* adds I-channel and Q-channel received data having the same information at an adder 596. With independent interleavers by I-channels and Q-channels at the transmitter of the primary station in order to provide time diversity, the secondary station adds I-channel and Q-channel received data via a deinterleaver.

Figure 13B:
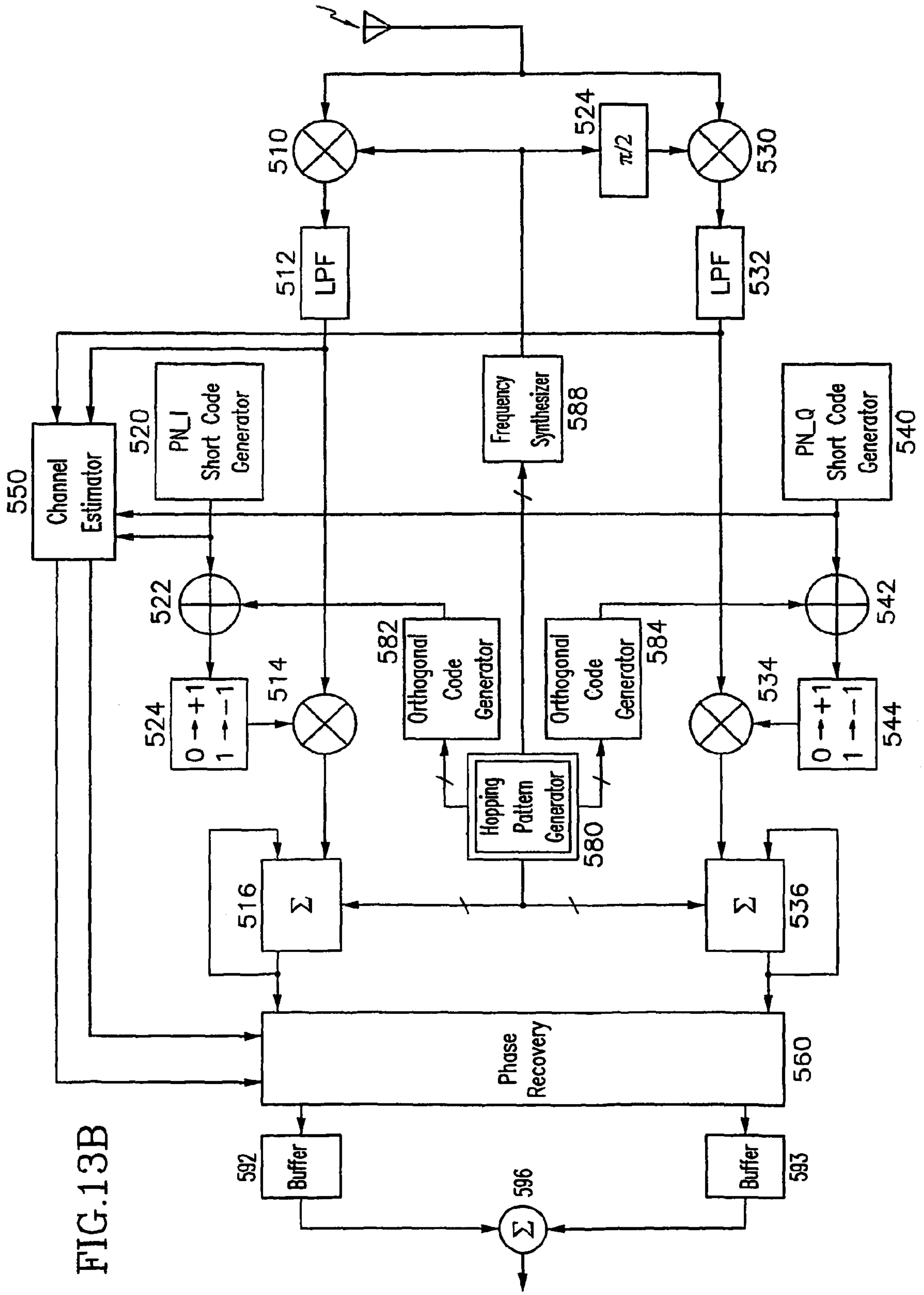
FIG. 13*b* is a schematic of a receiver in the secondary station for orthogonal resource hopping multiplexing according to the embodiment of the present invention shown in FIG. 10*c;*

FIG. 13*b* is a schematic of a receiver in the secondary station for orthogonal resource hopping multiplexing in accordance with the embodiment of the present invention illustrated in FIG. 10*b*. The receiver of FIG. 13*b* is the same in structure as that of FIG. 13*a*, excepting that independent orthogonal code generators 582 and 584 are present by I-channels and Q-channels.

Figure 13C:
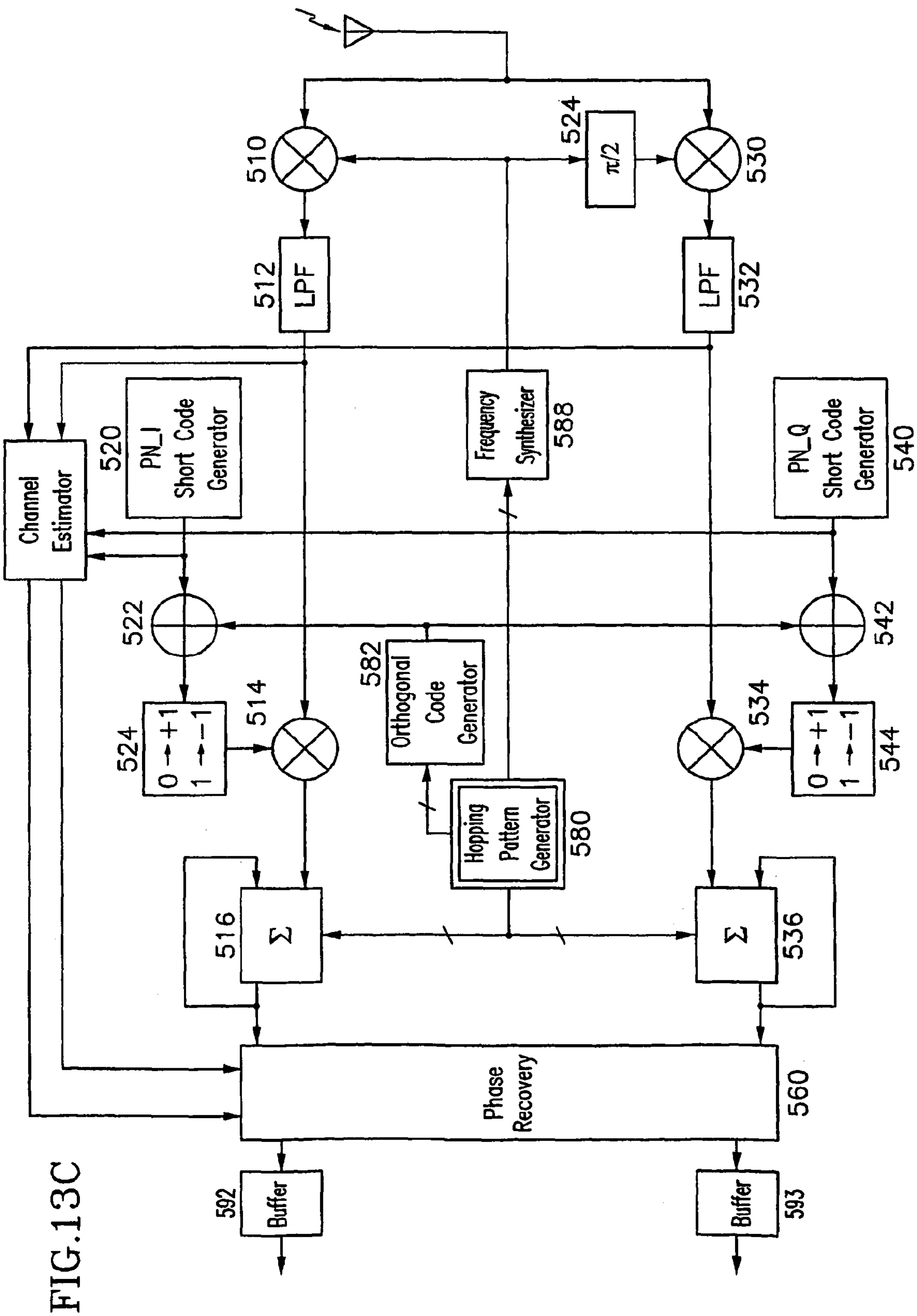
FIG. 13*c* is a schematic of a receiver in the secondary station for orthogonal resource hopping multiplexing according to the embodiment of the present invention shown in FIG. 10*e;*

FIG. 13*c* is a schematic of a receiver in the secondary station for orthogonal resource hopping multiplexing in accordance with the embodiment of the present invention illustrated in FIG. 10*c*. The receiver of FIG. 13*c* is the same in structure as that of FIG. 13*a*, excepting that the receiver of the secondary station corresponding to FIG. 13*c* does not add I-channel and Q-channel received data having a different information, because the receiver of the primary station shown in FIG. 10*c* performs QPSK data modulation.

Figure 13D:
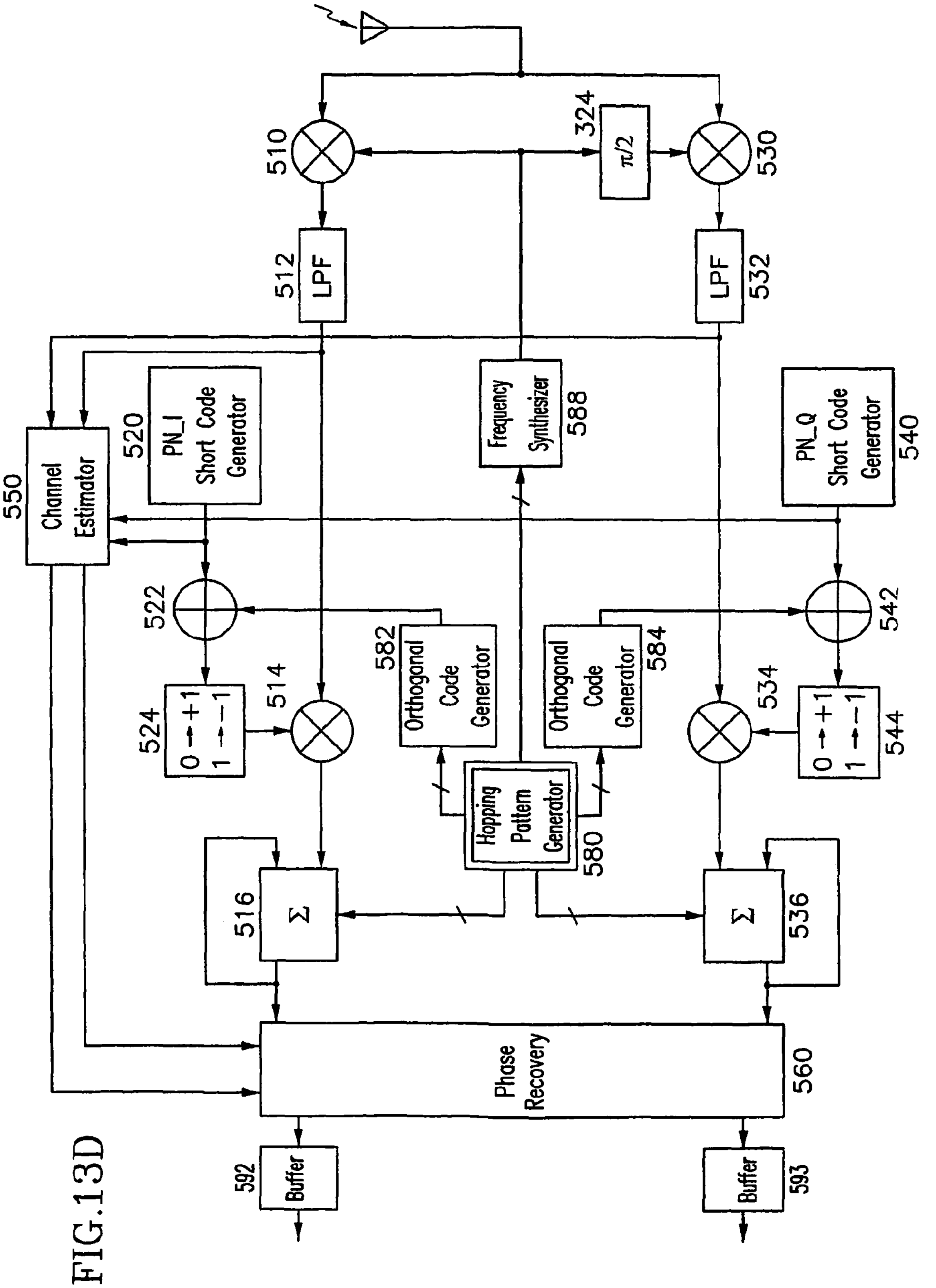
FIG. 13*d* is a schematic of a receiver in the secondary station for orthogonal resource hopping multiplexing according to the embodiment of the present invention shown in FIG. 10*g;*

FIG. 13*d* is a schematic of a receiver in the secondary station for orthogonal resource hopping multiplexing in accordance with the embodiment of the present invention illustrated in FIG. 10*d*. The receiver of FIG. 13*d* is the same in structure as that of FIG. 13*c*, excepting that independent orthogonal code generators 582 and 584 are present by I-channels and Q-channels.

Figure 13E:
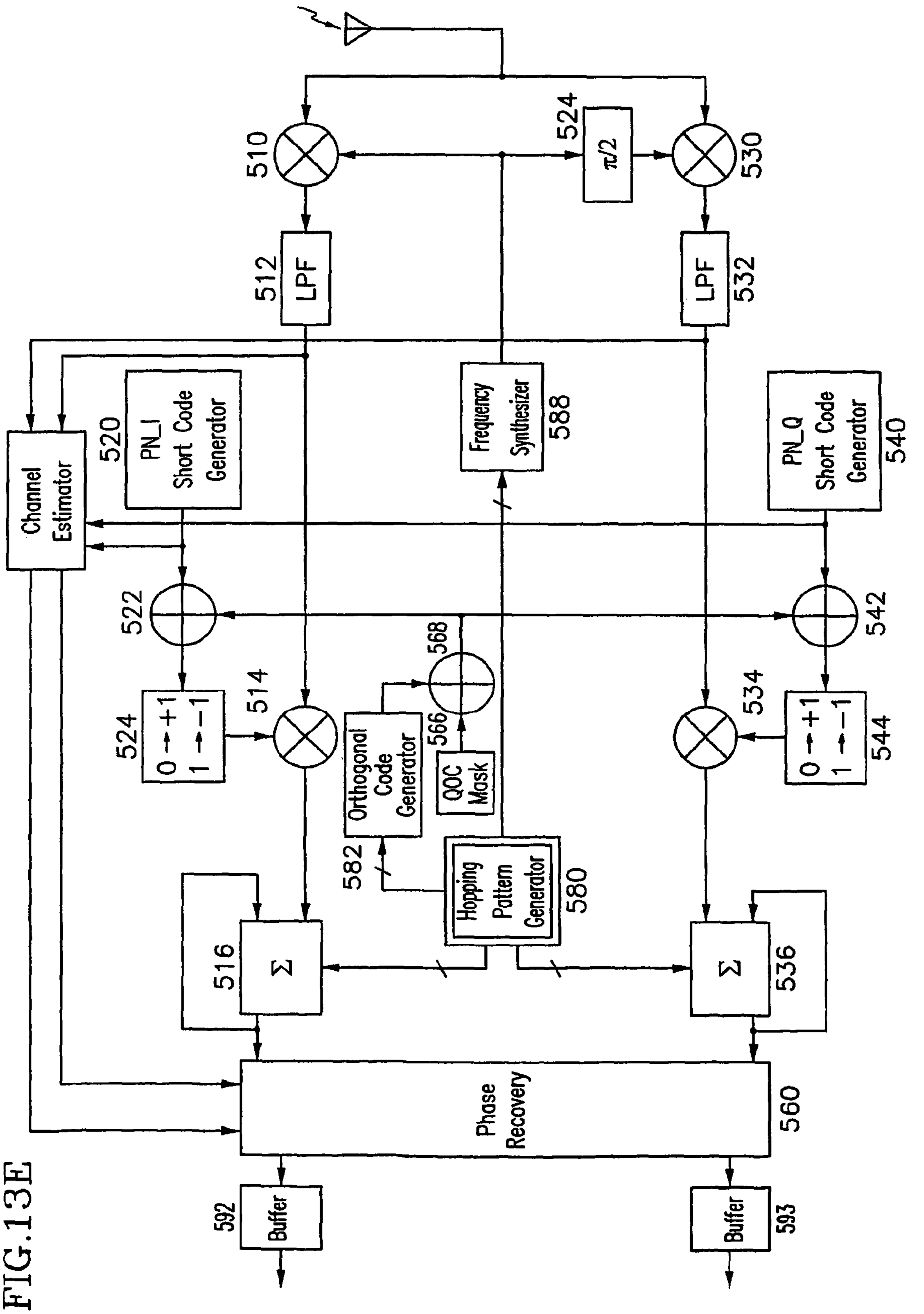
FIG. 13*e* is a schematic of a receiver in the secondary station for orthogonal resource hopping multiplexing according to the embodiment of the present invention shown in FIG. 10*i;*

FIG. 13*e* is a schematic of a receiver in the secondary station for orthogonal resource hopping multiplexing in accordance with the embodiment of the present invention illustrated in FIG. 10*e*. The receiver of FIG. 13*e* is the same in structure as that of FIG. 13*c*, excepting that QOC 566 is used for dispreading.

Figure 13F:
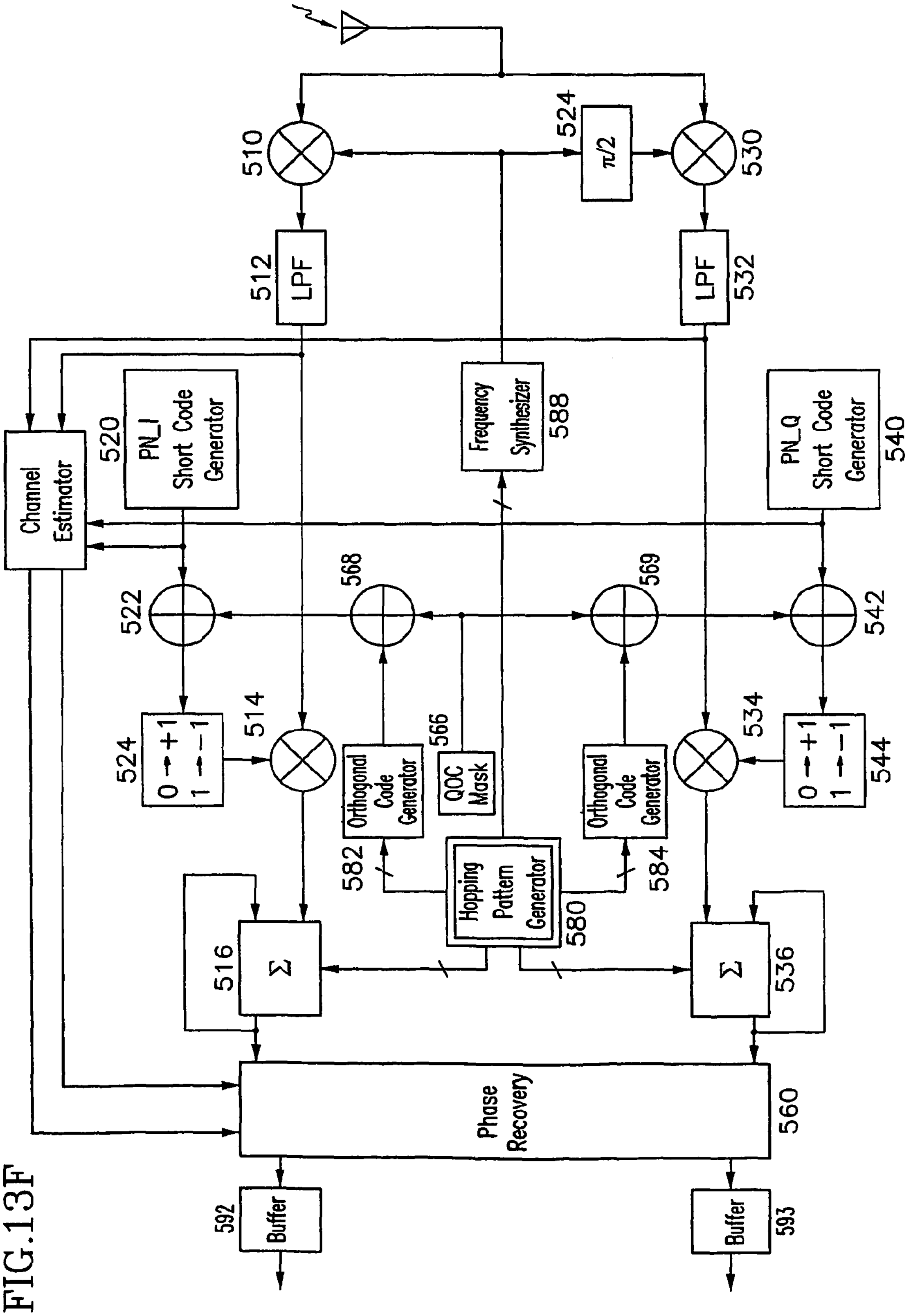
FIG. 13*f* is a schematic of a receiver in the secondary station for orthogonal resource hopping multiplexing according to the embodiment of the present invention shown in FIG. 10*k;*

FIG. 13*f* is a schematic of a receiver in the secondary station for orthogonal resource hopping multiplexing in accordance with the embodiment of the present invention illustrated in FIG. 10*f*. The receiver of FIG. 13*f* is the same in structure as that of FIG. 13*e*, excepting that independent orthogonal code generators 582 and 584 are present by I-channels and Q-channels.

FIG. 14 is a conceptual diagram of a transmit signal from the primary station in accordance with an embodiment of the present invention. The signal diagram of FIG. 14*a* is the same as the signal diagram showing a transmit signal from the primary station by the respective frames according to the example of the prior art as illustrated in FIG. 4*a*. According to the characteristic of the services, the channel from the primary station to each secondary station has a frame-based transmission rate changed to less than or equal to the basic transmission rate R allocated during a call set up as denoted by reference numbers 920 and 930, or to the basic transmission rate R as denoted by reference numbers 940 and 950, thereby repeating between transmission (ON) and non-transmission (OFF). The channels denoted by reference numbers 940 and 950 can be expressed in terms of channel activity. In the present invention, the channels denoted by reference numbers 920 and 930 are subject to transmission time hopping multiplexing according to the frame-based transmit data rate as the channels 924 and 934 of FIG. 14*b*. The transmission time hopping is realized by the method of FIG. 12*d*. FIGS. 14*c* and 14*d* illustrate the hopping type of the transmission time actually determined according to the example of the frame-based transmit data rate. FIG. 14*c* shows regular and periodic hopping, and FIG. 14*d* shows irregular and random hopping. FIG. 14*c* is favorable for time diversity and channel estimation but not for statistical multiplexing. FIG. 14*d* may cause a collision of channel-independent multidimensional hopping patterns but is favorable for statistical multiplexing.

Figure 14A:
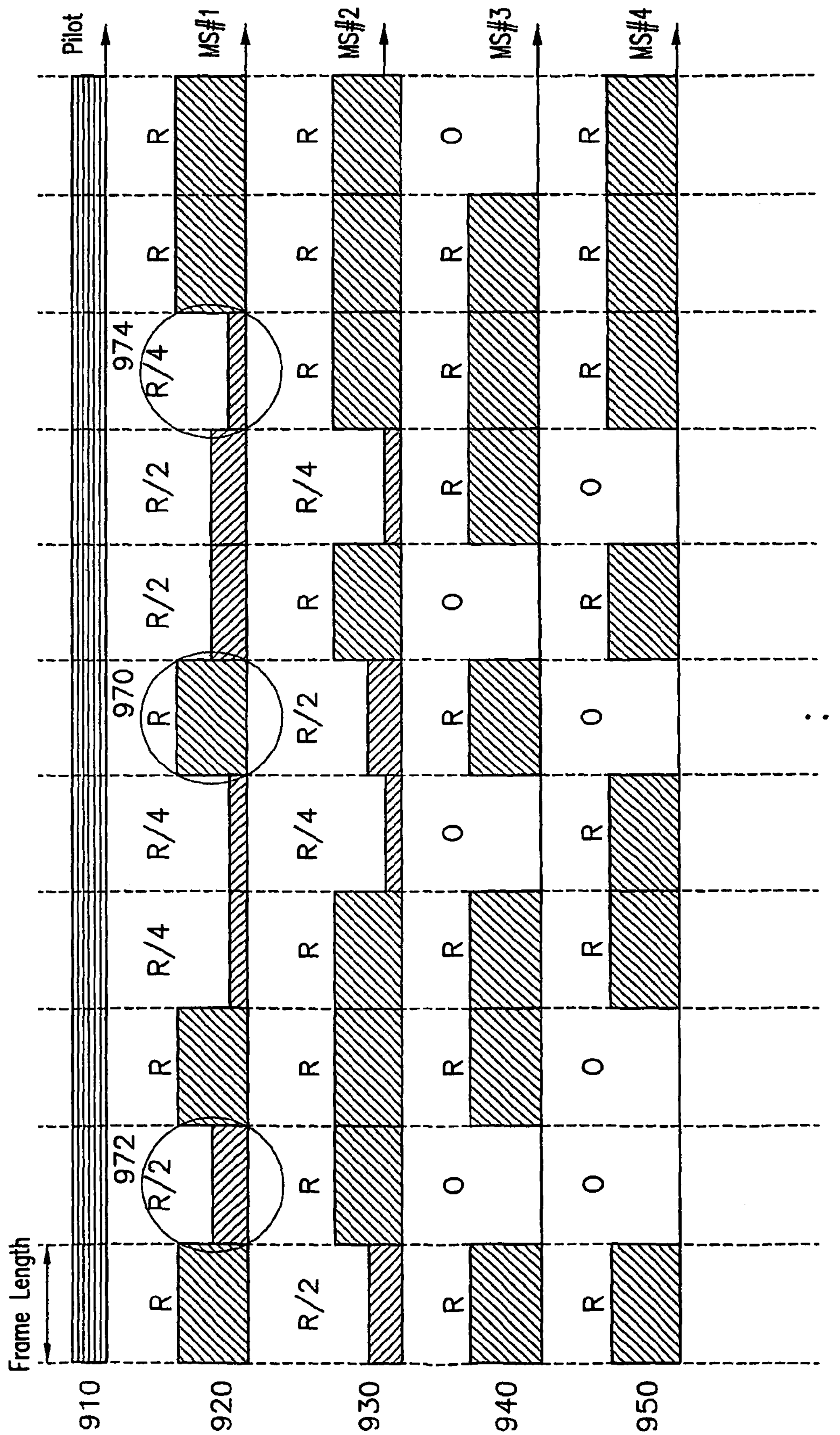
FIG. 14*a* is a signal diagram showing a transmit signal from the primary station by the respective frames according to an example of the prior art.
Figure 14B:
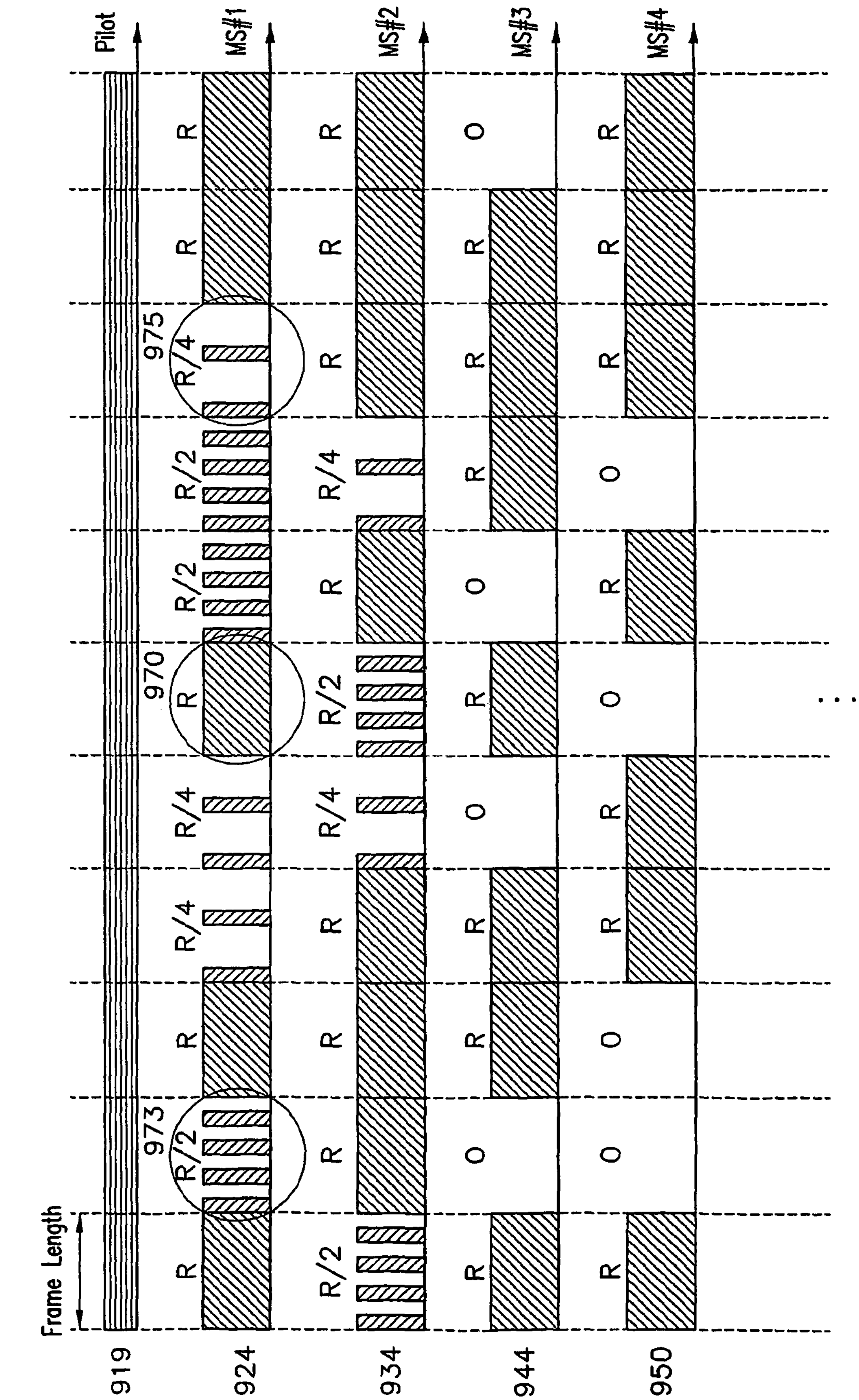
FIG. 14*b* is a signal diagram showing a transmit signal from the primary station by the respective frames according to an embodiment of the present invention.
Figure 14C:
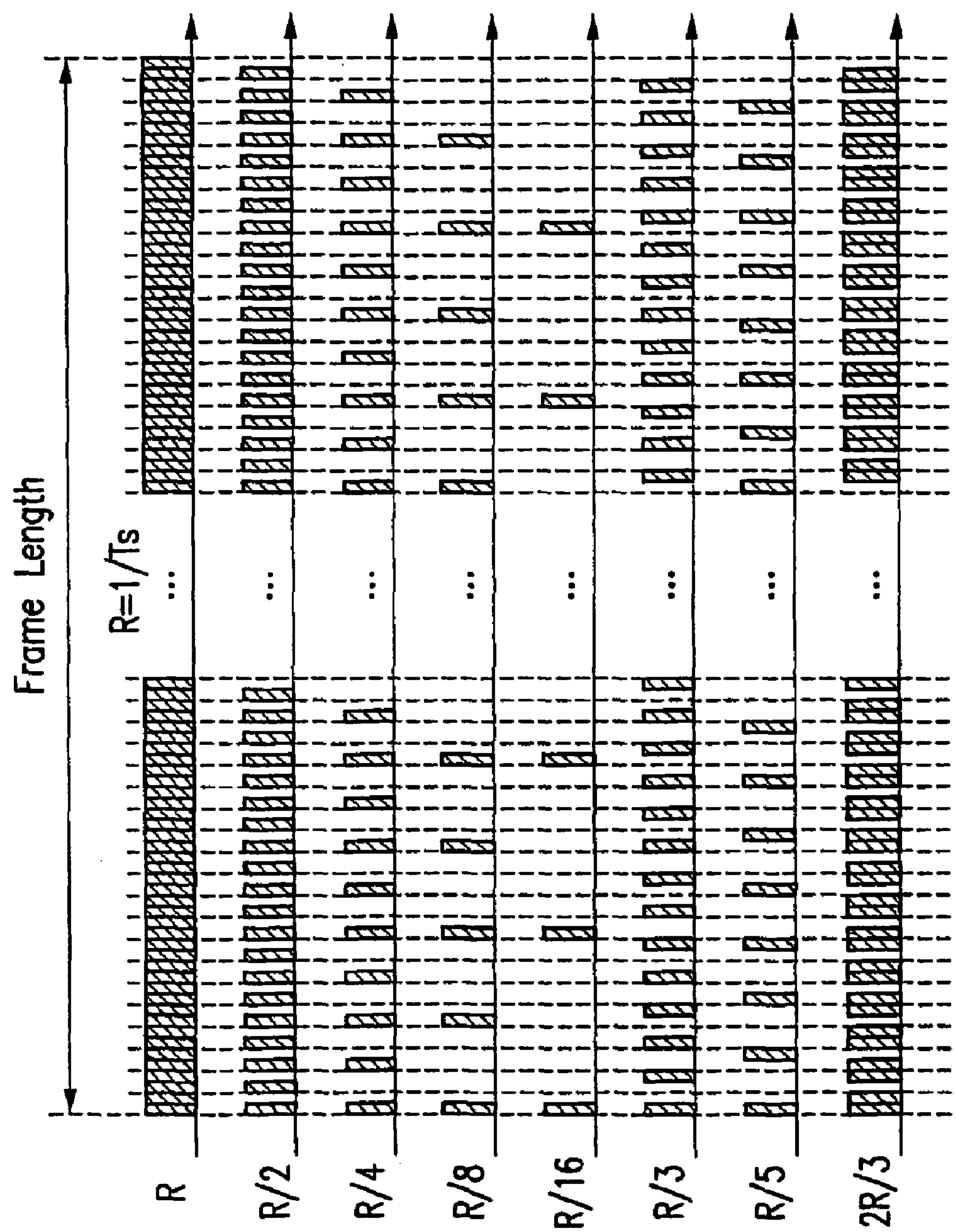
FIG. 14*c* is a signal diagram showing a transmit signal from the primary station in a frame having a transmission rate less than a basic transmission rate R according to an embodiment of the present invention (regular transmission time hopping)
Figure 14D:
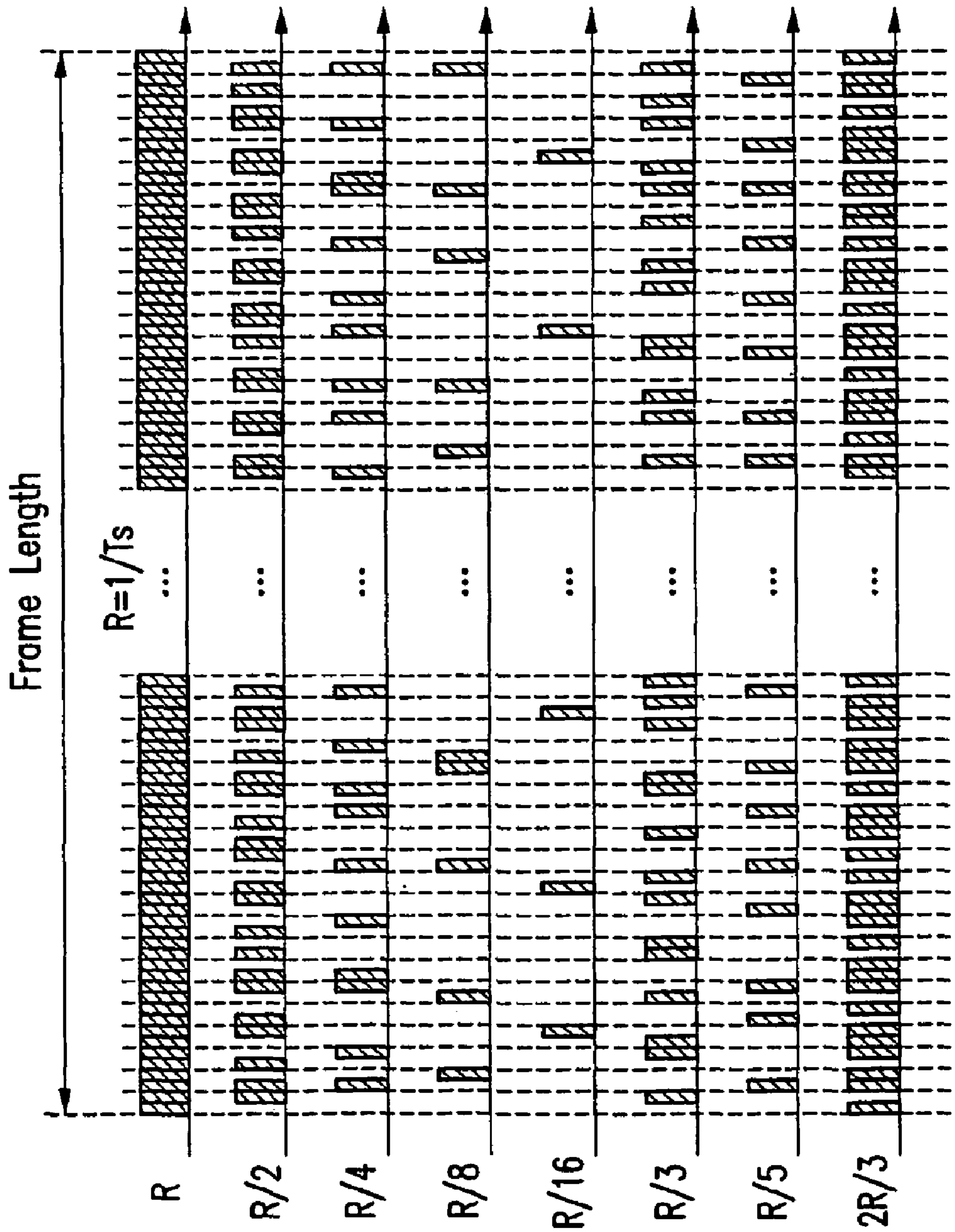
FIG. 14*d* is a signal diagram showing a transmit signal from the primary station in a sparse frame according to an embodiment of the present invention (irregular transmission time hopping)
Figure 14E:
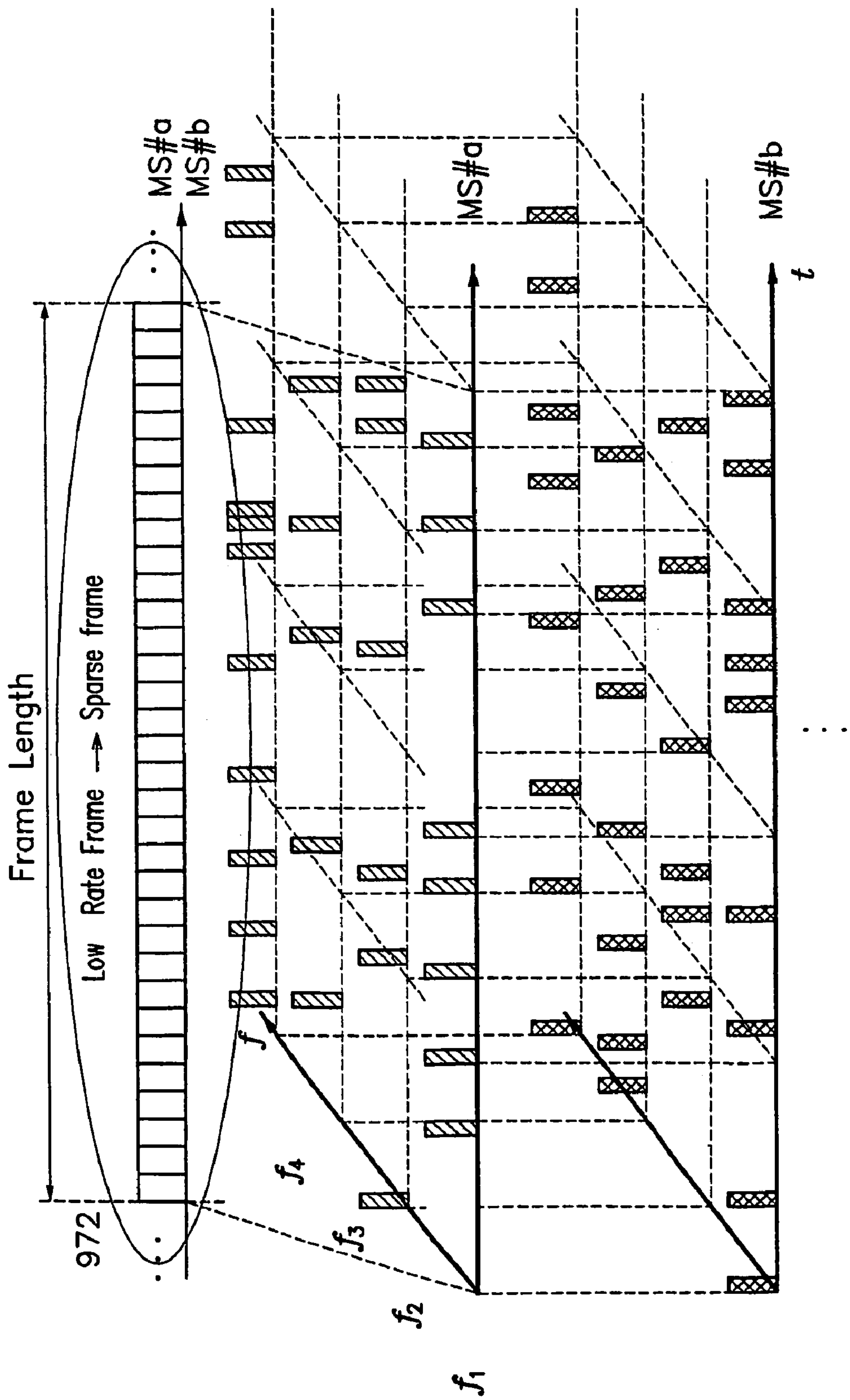
FIG. 14*e* is a signal diagram showing a transmit signal from the primary station in a sparse frame for the FHM (Frequency Hopping Multiplexing) system according to an embodiment of the present invention (irregular transmission time hopping)
Figure 14F:
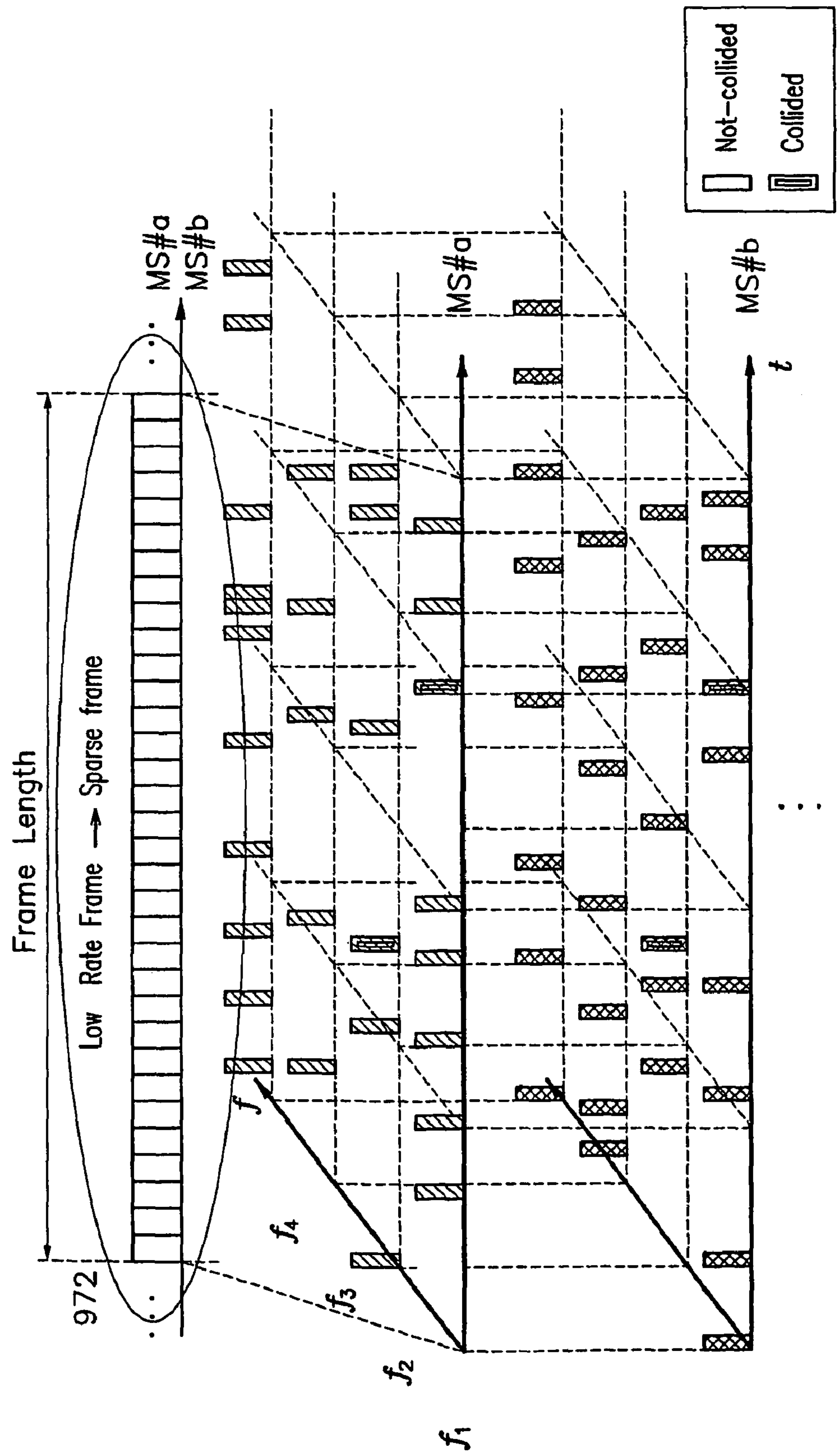
FIG. 14*f* is an illustration showing the case where a hopping pattern expressed in terms of the two-dimensional coordinates of transmission time and subcarrier is selected by multiple channels at the same time in FIG. 14*e* (the square defined by the double solid line is the collided data symbol)
Figure 14G:
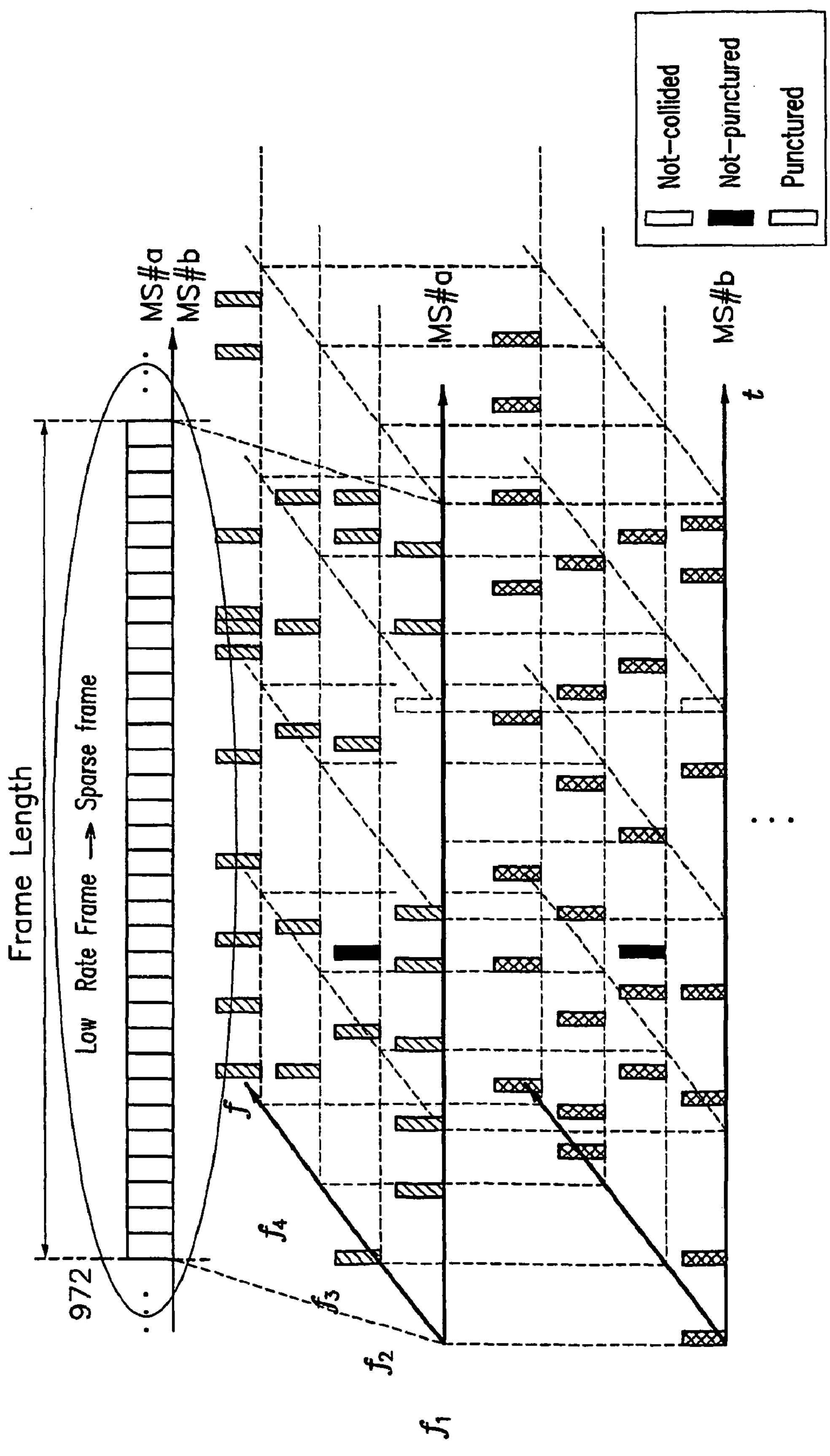
FIG. 14*g* is an illustration showing that the data symbols of the collided coordinates in FIG. 14*f* are compared with one another to determine whether to be transmitted (the black square means transmission; and the dotted line square means no transmission)

FIG. 14*e* shows a system that concurrently performs FHM (Frequency Hopping Multiplexing) and THM (Time Hopping Multiplexing) in sparse channels in accordance with an embodiment of the present invention, in which the secondary stations are distinguished by the pattern in the respective squares. FIG. 14*f* illustrates a collision that a multidimensional hopping pattern represented by a two-dimensional coordinate of transmission time and subcarrier is selected by a plurality of channels at the same time in FIG. 14*e*. In the figure, the double solid line square represents the position of a data symbol with a multidimensional hopping pattern collision, and the single solid line square represents the position of a data symbol without a multidimensional hopping pattern collision. FIG. 14*g* illustrates that data symbols of coordinates with a collision in FIG. 14*f* are compared with one another to finally determine whether to be transmitted. The black square represents data transmission with a multidimensional hopping pattern collision but the same data symbols for all channels involved in the collision. The dotted line square represents no data transmission with different data symbols for all channels involved in the collision.

Figure 4E:
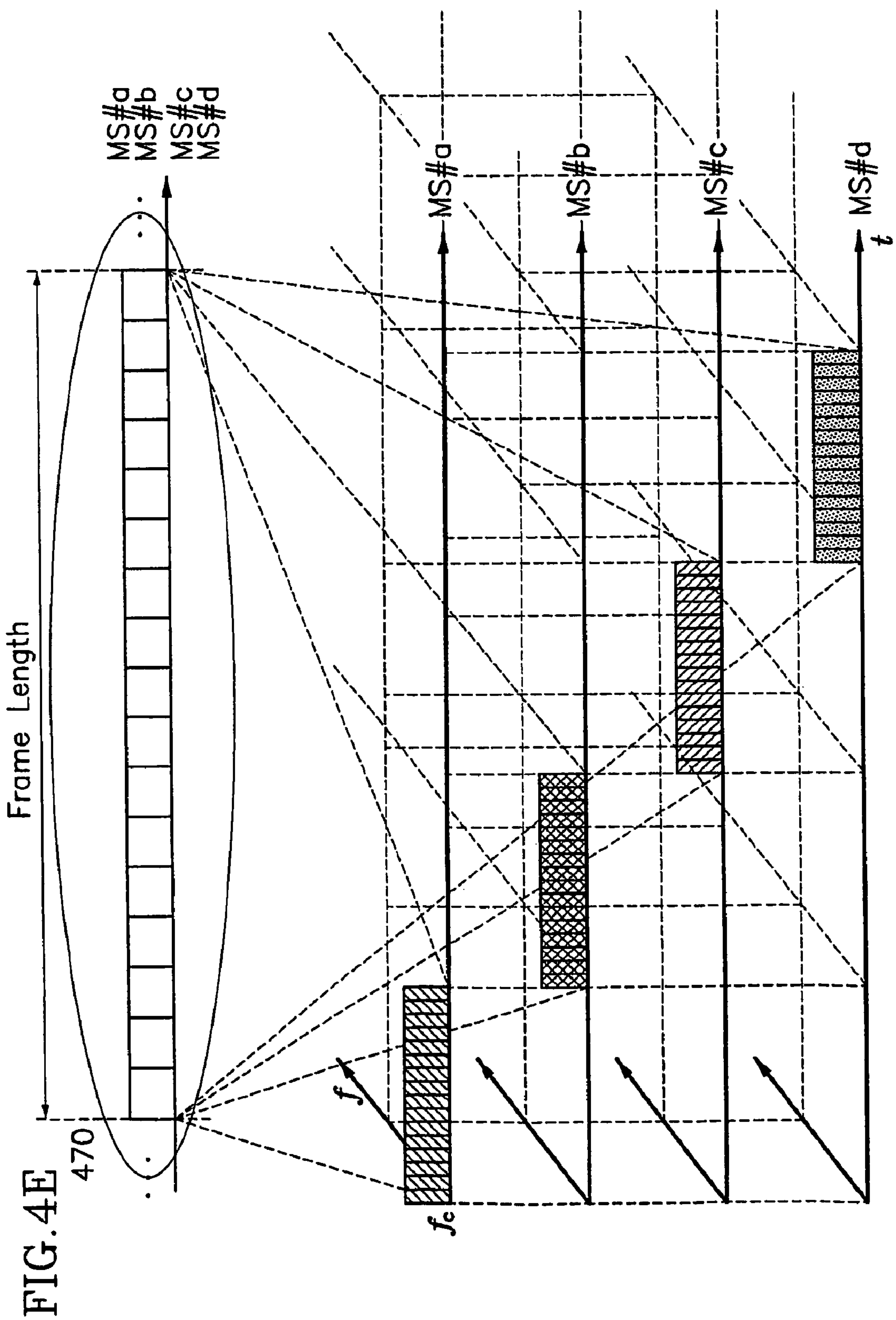
FIG. 4*e* is a signal diagram showing a transmit signal from the primary station according to the conventional TDM (Time Division Multiplexing) system.
Figure 4F:
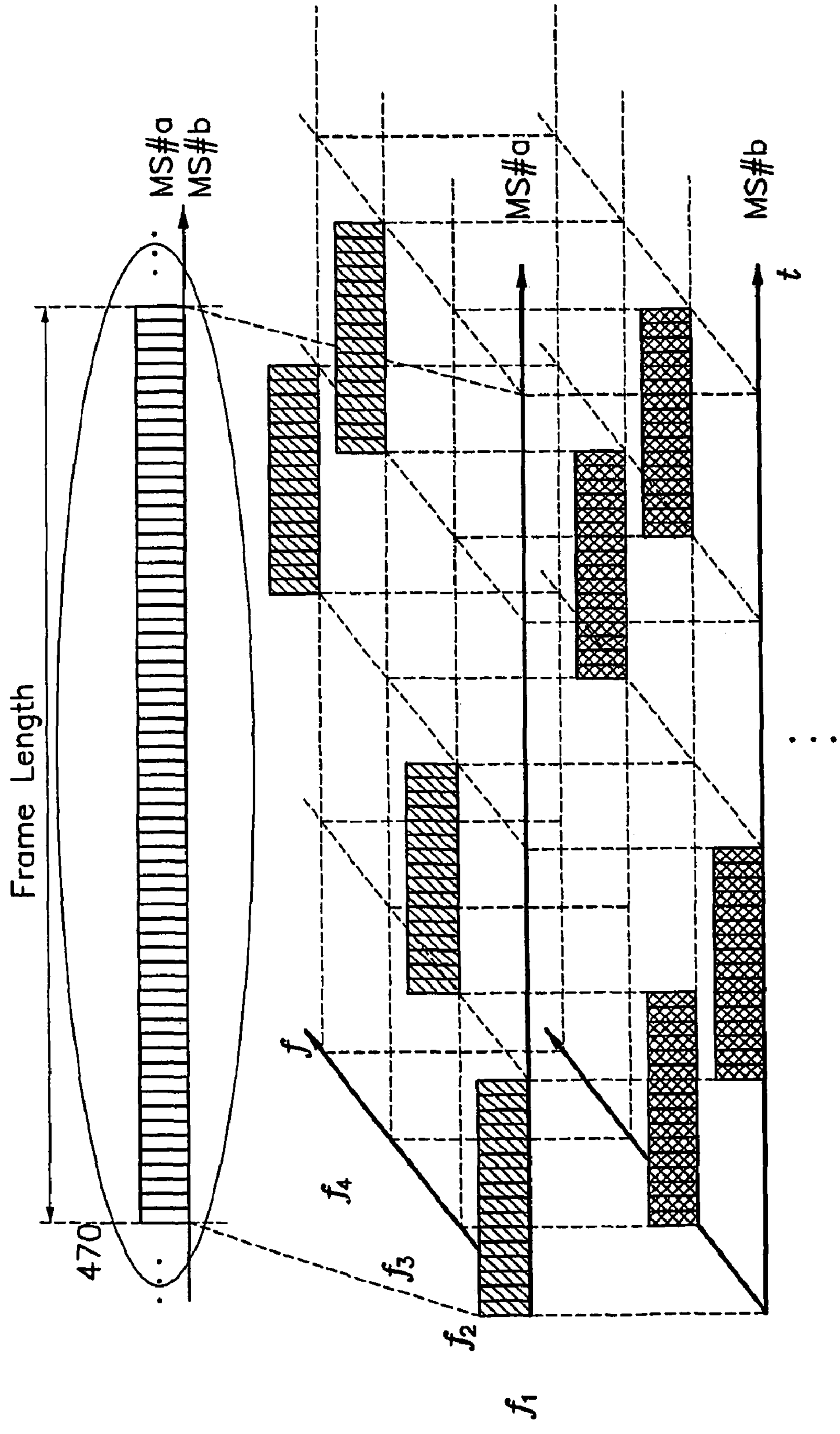
FIG. 4*f* is a signal diagram showing a transmit signal from the primary station according to the conventional TDM system (using a slot-based frequency hopping)
Figure 4G:
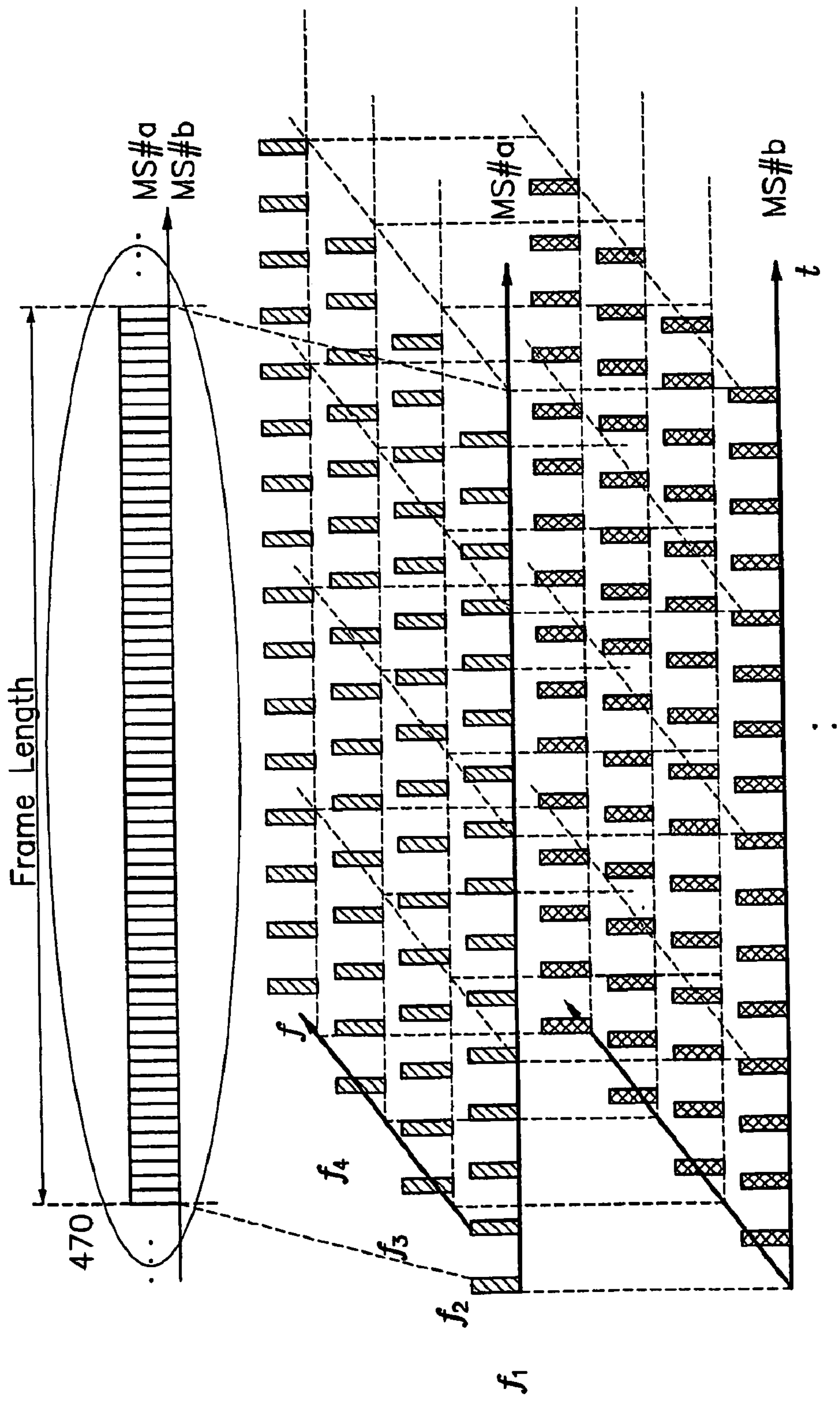
FIG. 4*g* is a signal diagram showing a transmit signal from the primary station according to the conventional FHM (Frequency Hopping Multiplexing) system for frequency diversity (using a symbol-based regular frequency hopping)
Figure 4H:
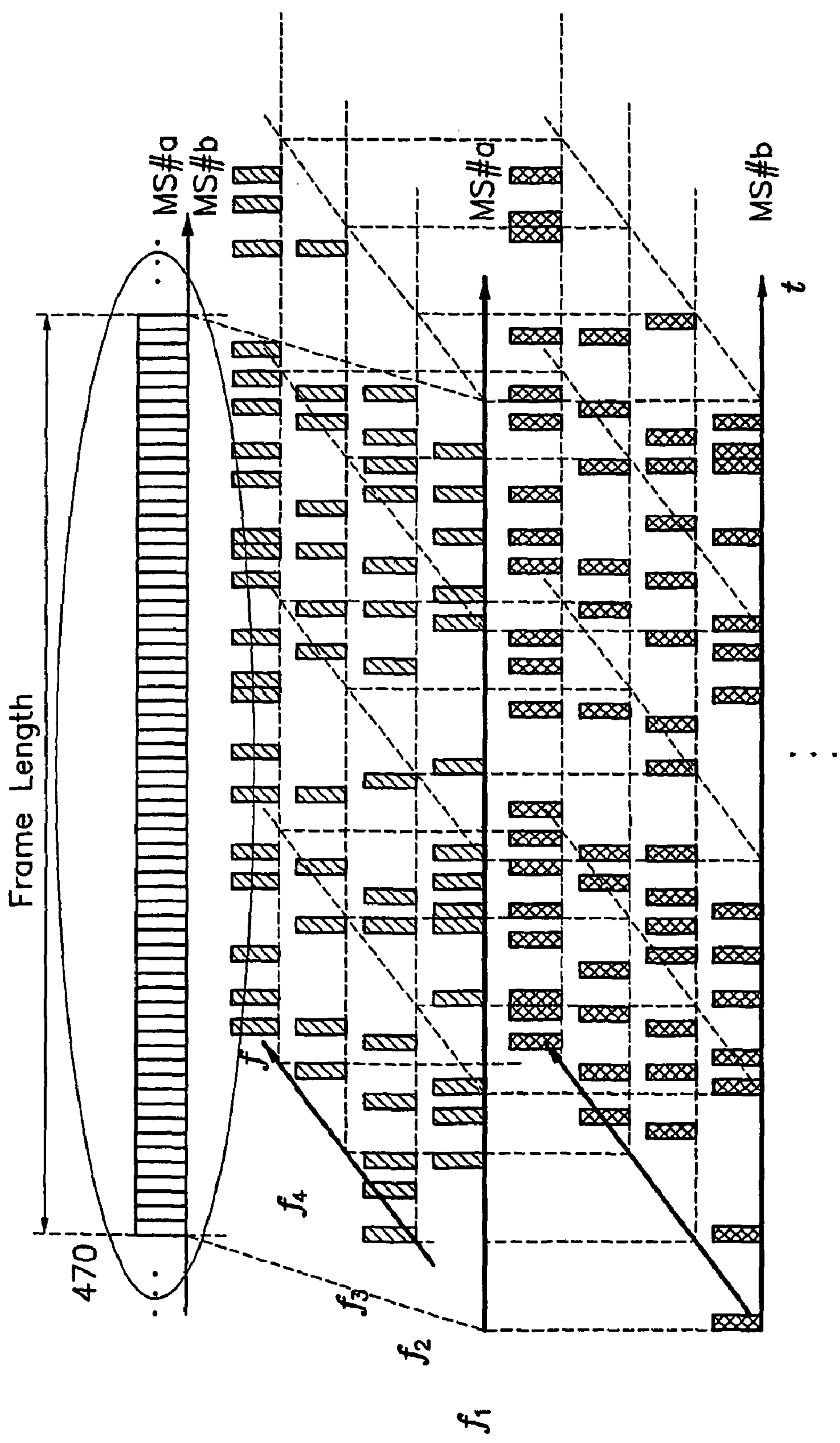
FIG. 4*h* is a signal diagram showing a transmit signal from the primary station according to the conventional FHM system for frequency diversity and prevention of unauthorized monitoring (using a symbol-based irregular frequency hopping)
Figure 4I:
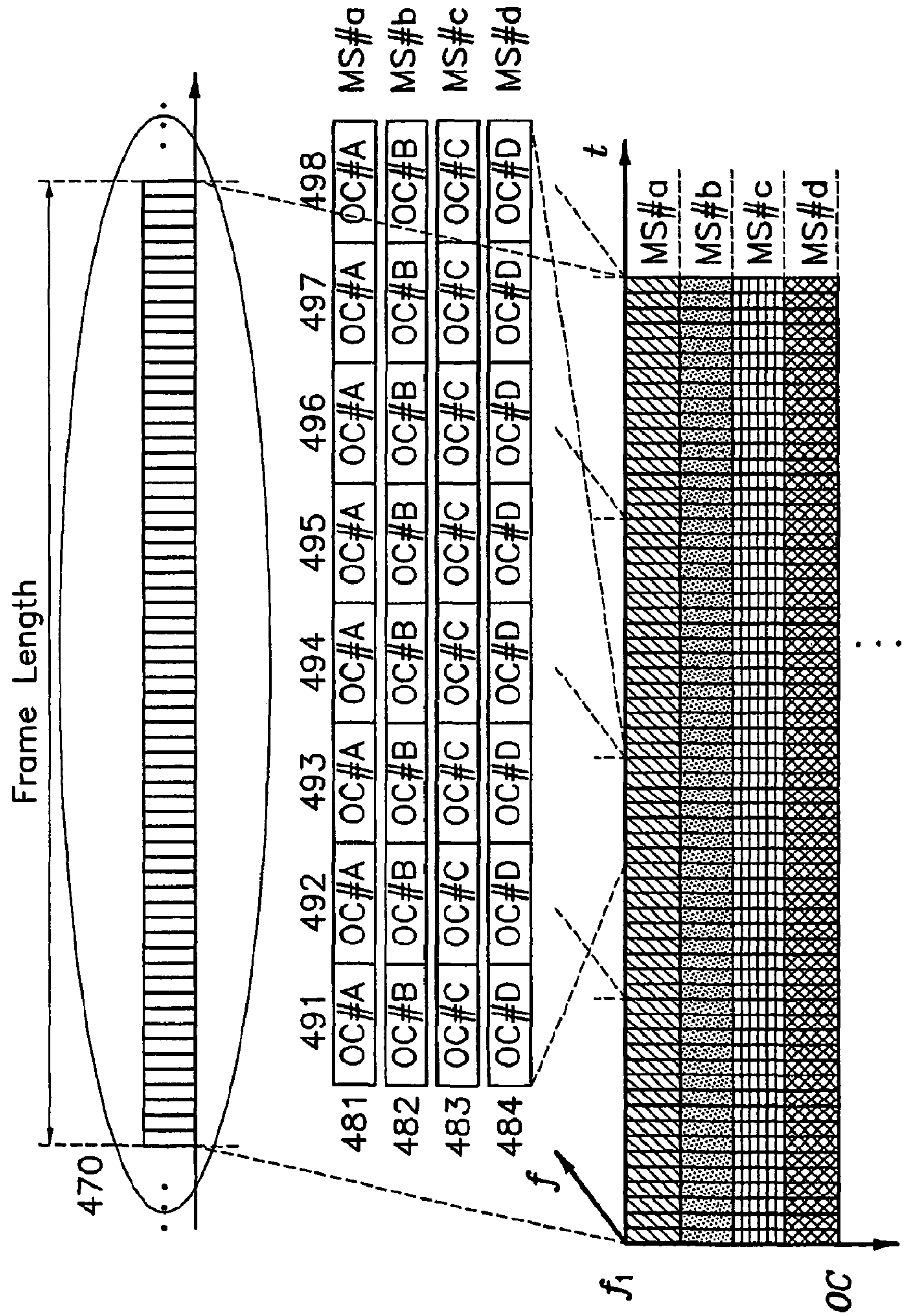
FIG. 4*i* is a signal diagram showing a transmit signal from the primary station according to the conventional OCDM (Orthogonal Code Division Multiplexing) system (using a channel-based fixed orthogonal code allocation method)
Figure 4J:
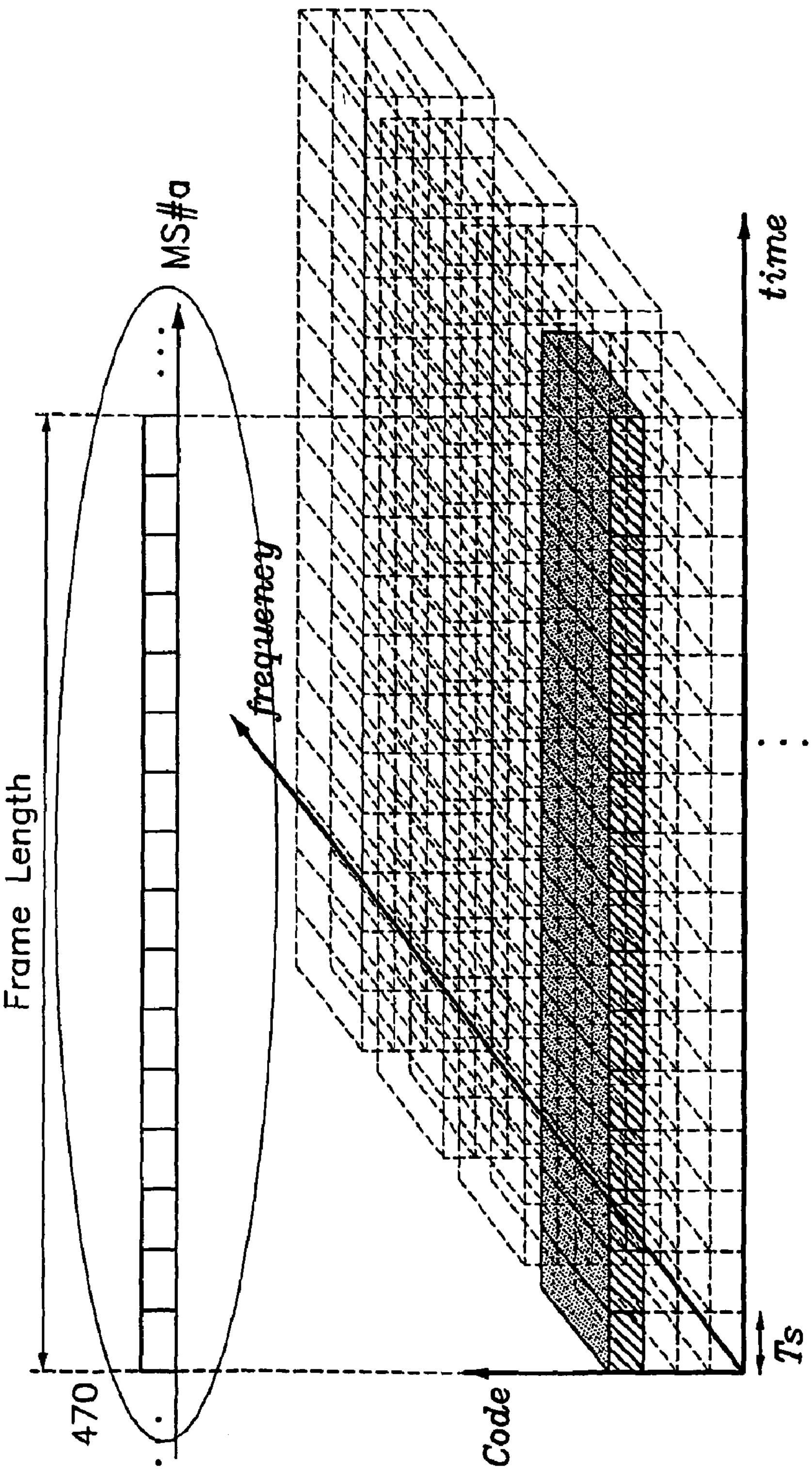
FIG. 4*j* is a signal diagram showing a transmit signal from the primary station according to the conventional ORDM (Orthogonal Resource Division Multiplexing) system (using a channel-based fixed orthogonal resource allocation method)
Figure 5:
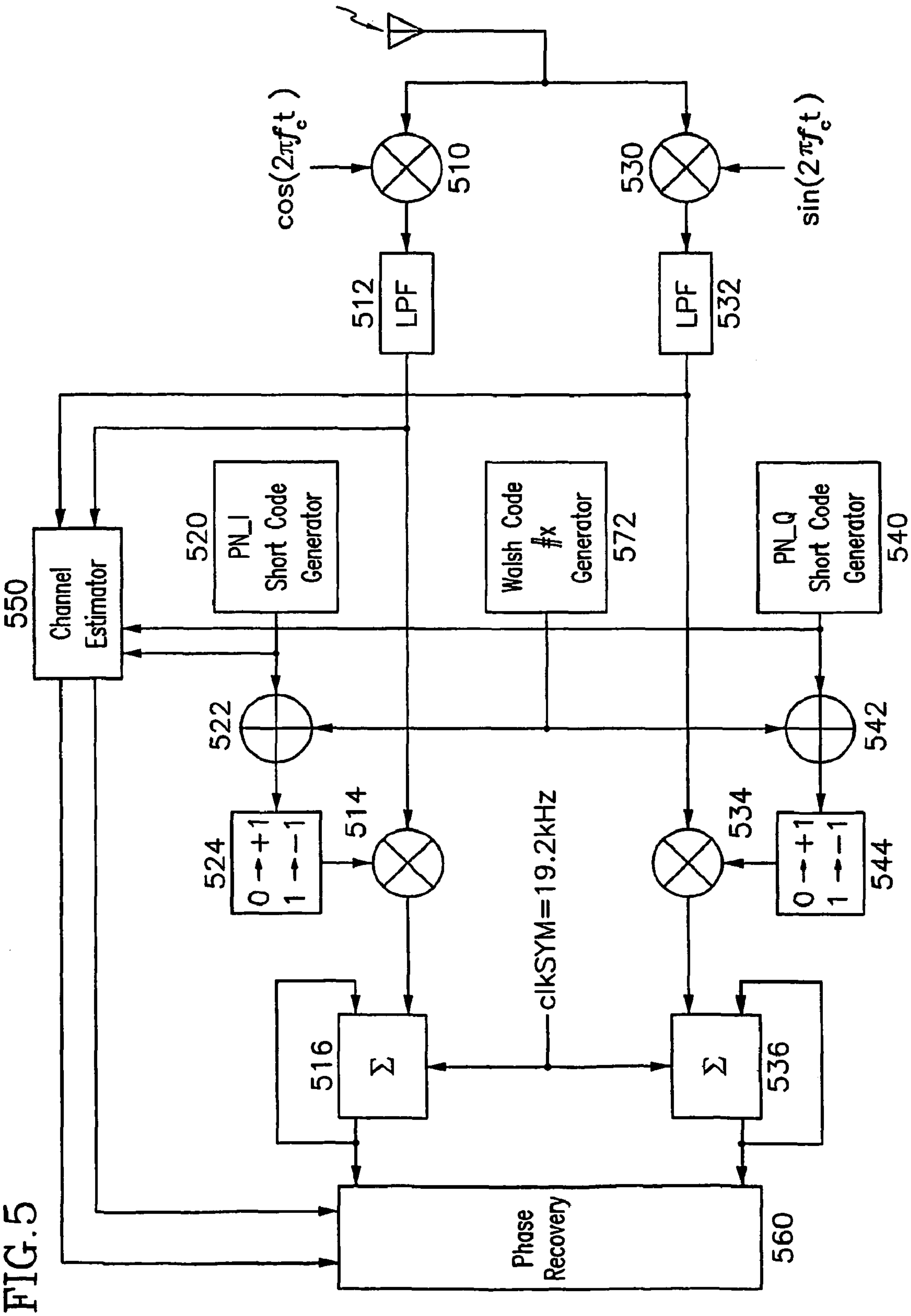
FIG. 5 is a schematic of a receiver in the secondary station for code division multiplexing according to the example of the prior art shown in FIG. 4*i;*
Figure 6:
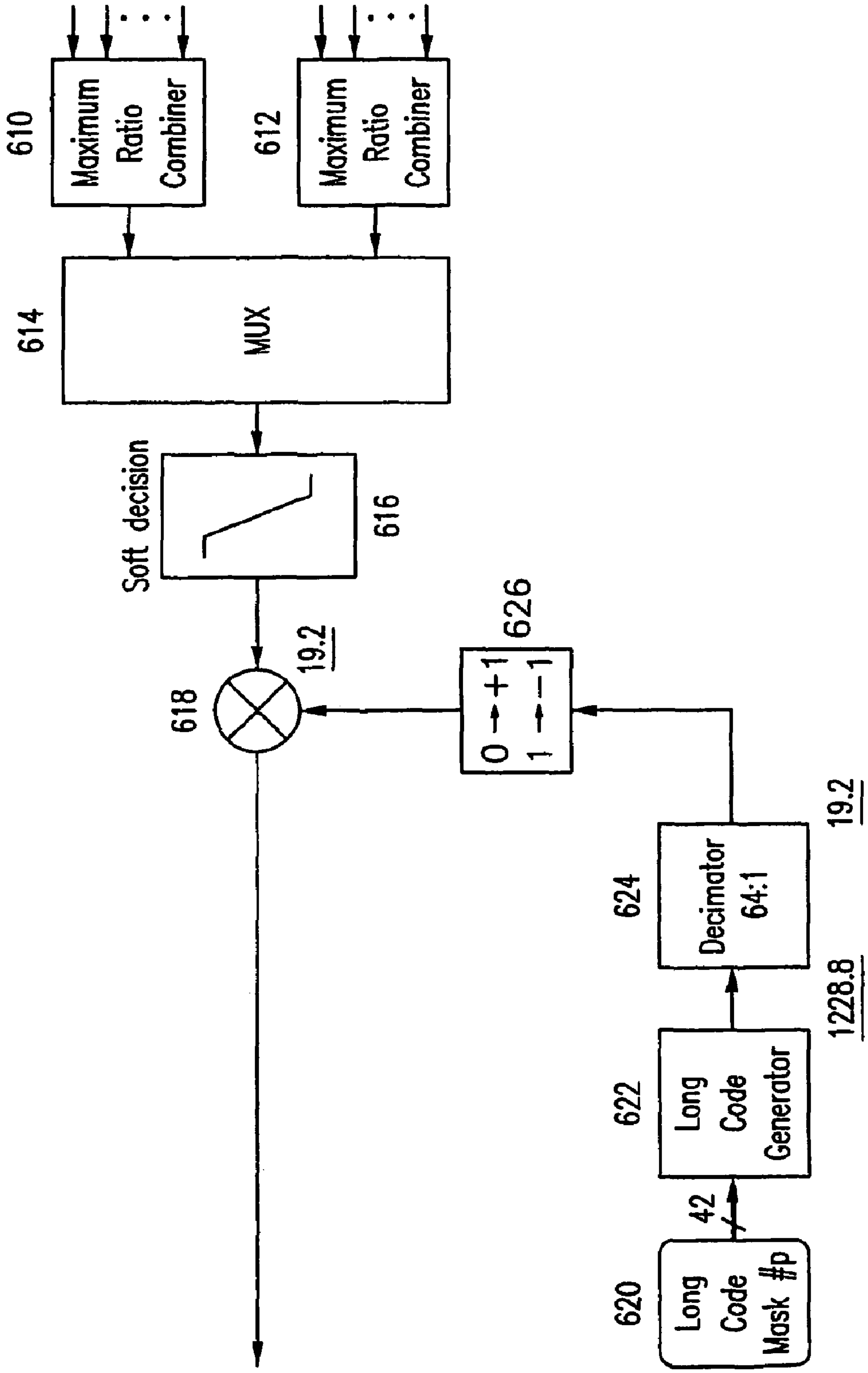
FIG. 6 is a schematic of a receiver in the secondary station showing the common components between the example of the prior art and the embodiment of the present invention.
Figure 7:
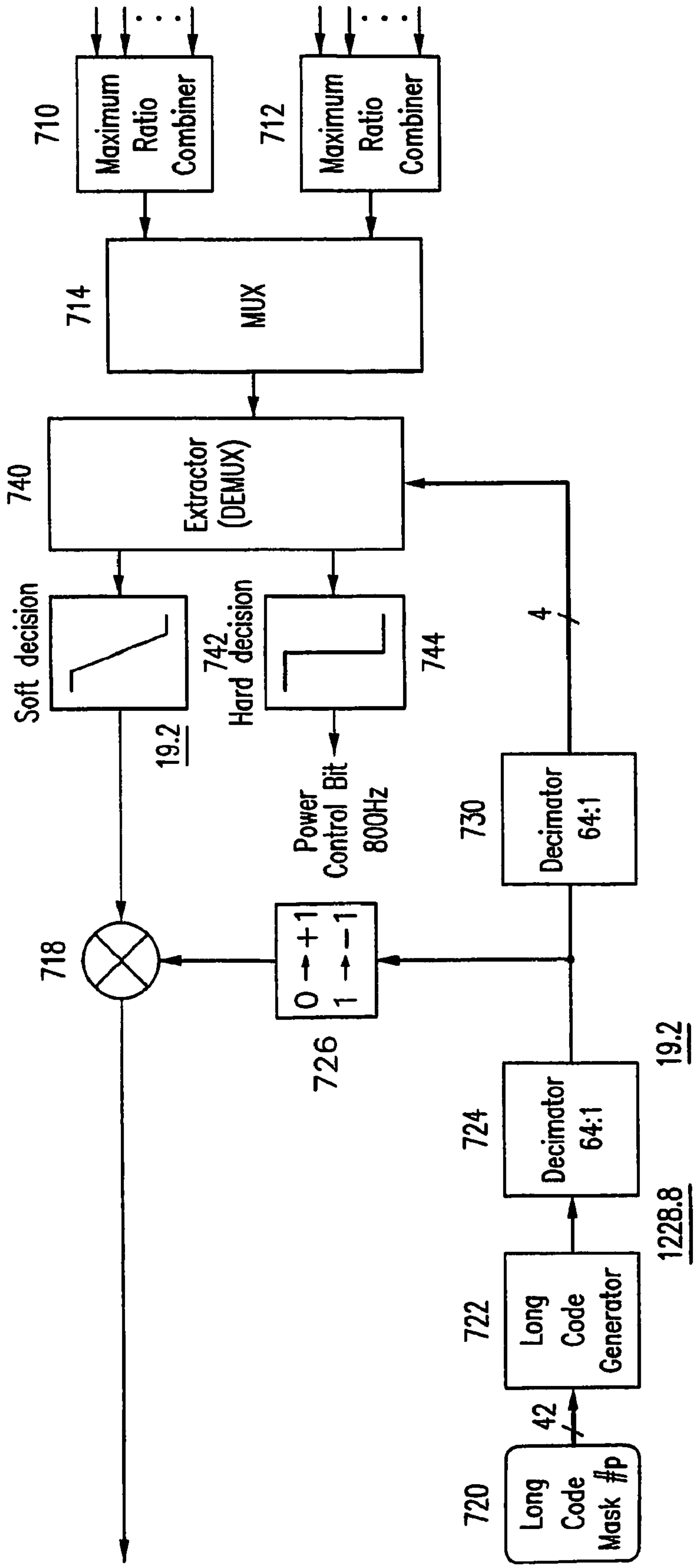
FIG. 7 is a schematic of a receiver in the secondary station according to an example of the prior art.
Figure 8:
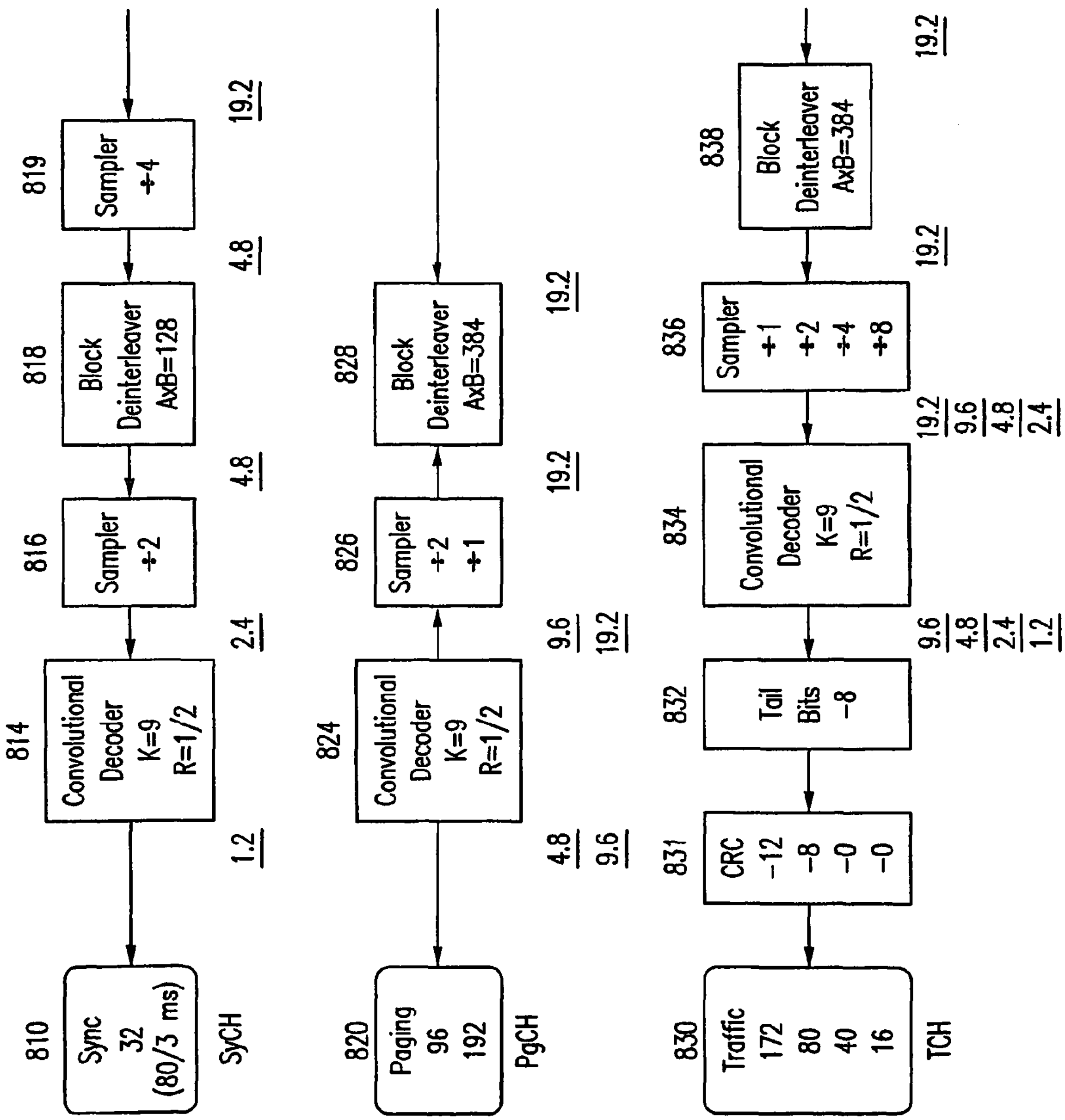
FIG. 8 is a schematic of a receiver in the secondary station showing the common components between the example of the prior art and the embodiment of the present invention.
Figure 14H:
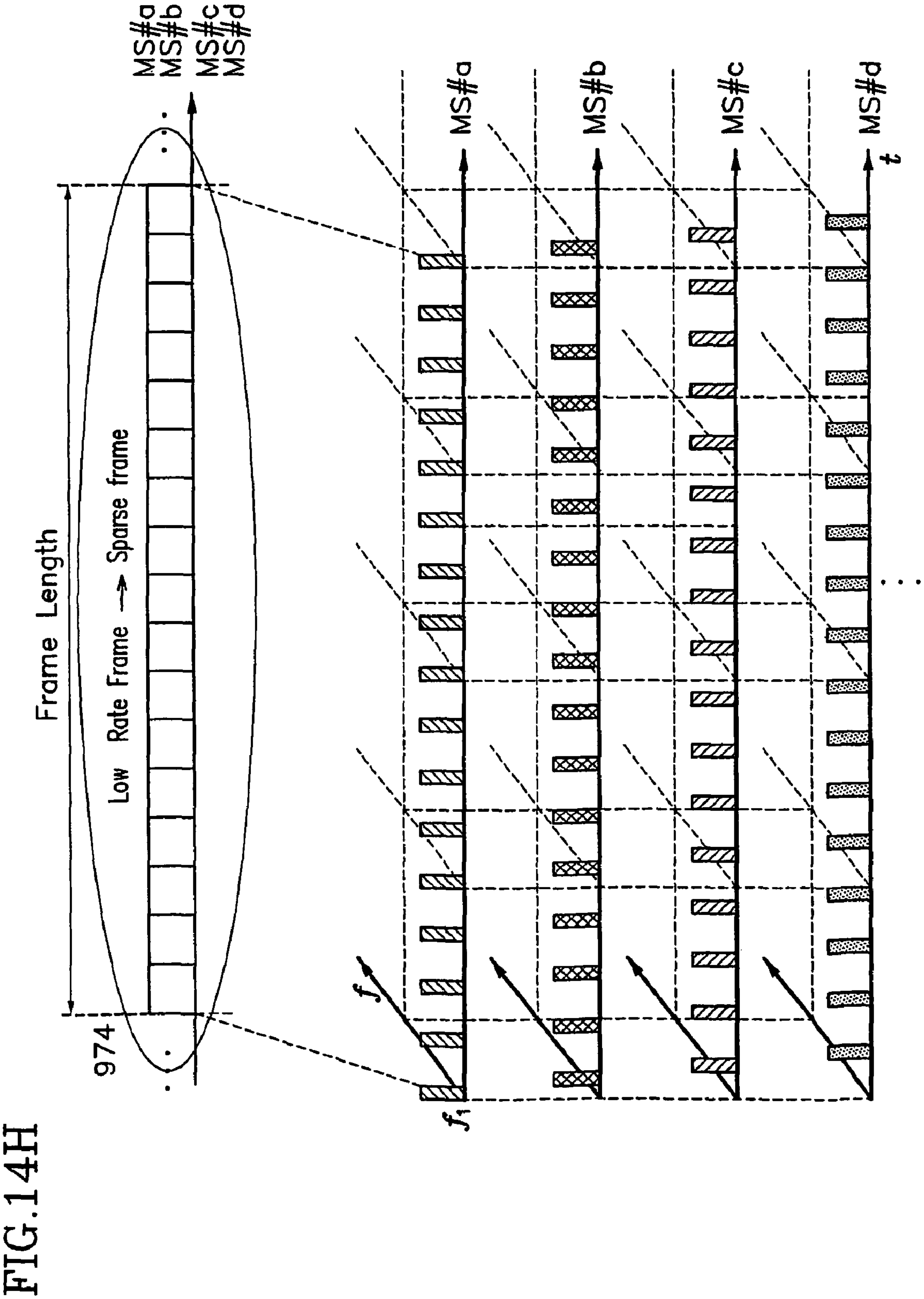
FIG. 14*h* is a signal diagram showing a transmit signal from the primary station in a sparse frame for time hopping multiplexing according to an embodiment of the present invention (regular transmission time hopping)

FIG. 14*h* is a signal diagram of a transmit signal from the primary station for symbol-based time division multiplexing in a sparse frame in accordance with an embodiment of the present invention. Unlike the time division multiplexing of FIG. 4*e* in the unit of time slots densely distributed in a specific interval of a frame, the time division multiplexing of FIG. 14*h* is performed in the unit of symbols uniformly distributed in the frame, thereby facilitating estimation of communication channels to the respective secondary stations and providing time diversity. The present invention involving a periodic hopping pattern is primarily aimed at channel estimation and time diversity as mentioned above rather than statistical multiplexing. So there is no independency among channels to the secondary stations, and the primary station allocates channels with reference to the allocation to the existing secondary stations during a call set up. Accordingly, the symbol-based time division multiplexing of FIG. 14*h* is preferred in the case where the instantaneous transmission rate of each channel is constant.

Figure 14I:
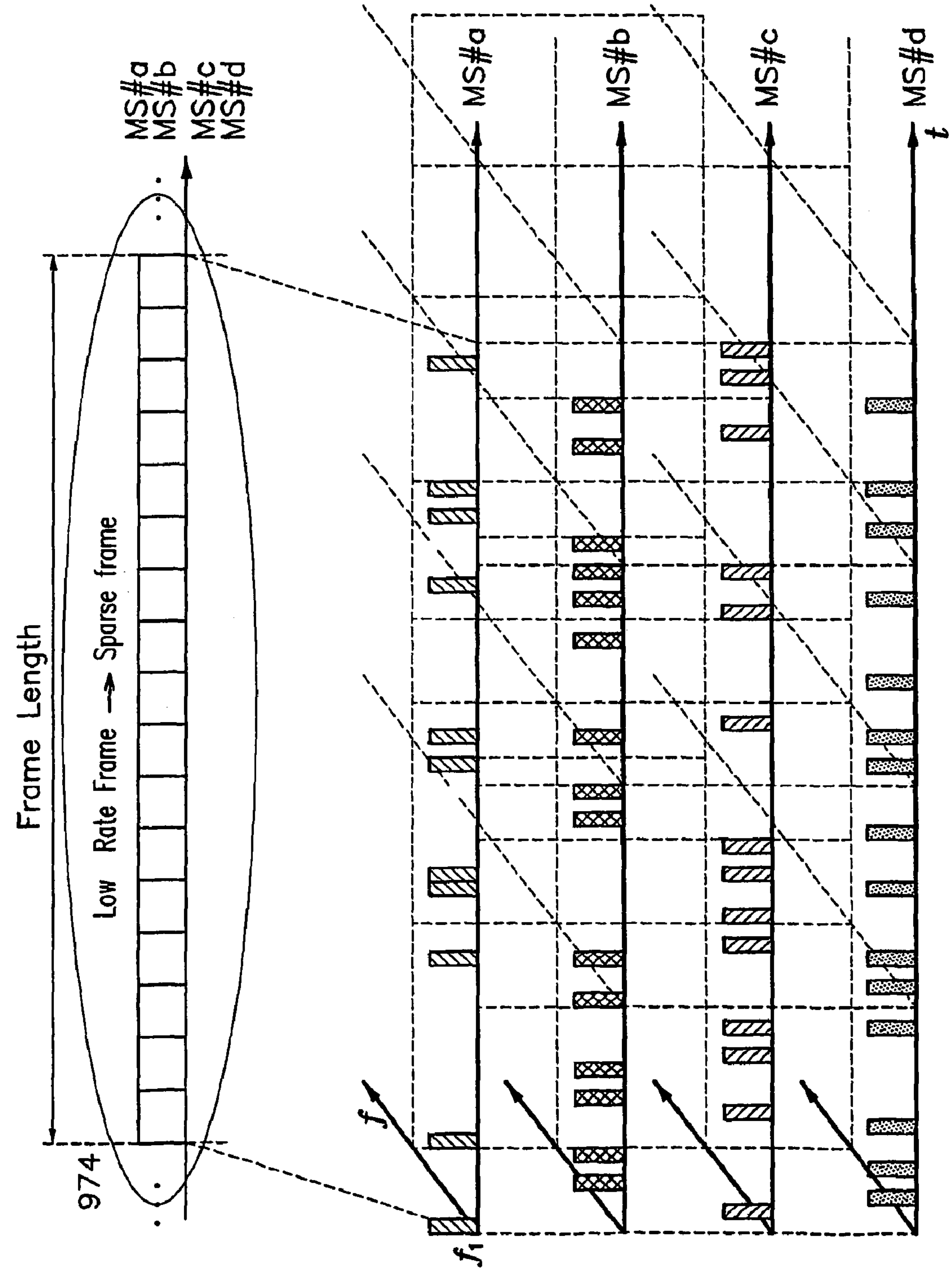
FIG. 14*i* is a signal diagram showing a transmit signal from the primary station in a sparse frame for time hopping multiplexing according to an embodiment of the present invention (irregular transmission time hopping)
Figure 14J:
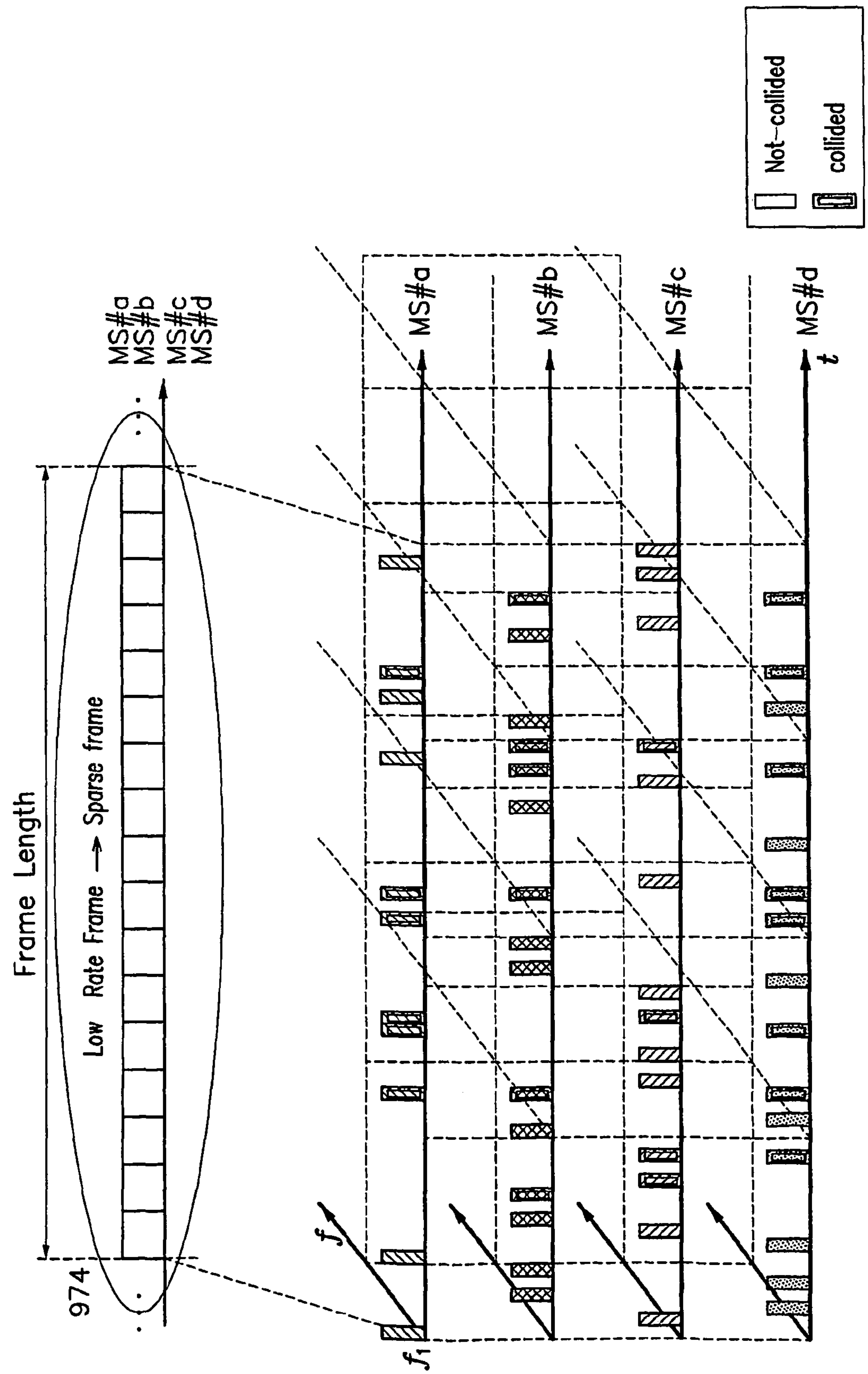
FIG. 14*j* is an illustration showing the case where a hopping pattern expressed in terms of the one-dimensional coordinates of transmission time is selected by multiple channels at the same time in FIG. 14*i* (the square defined by the double solid line is the collided data symbol)
Figure 14K:
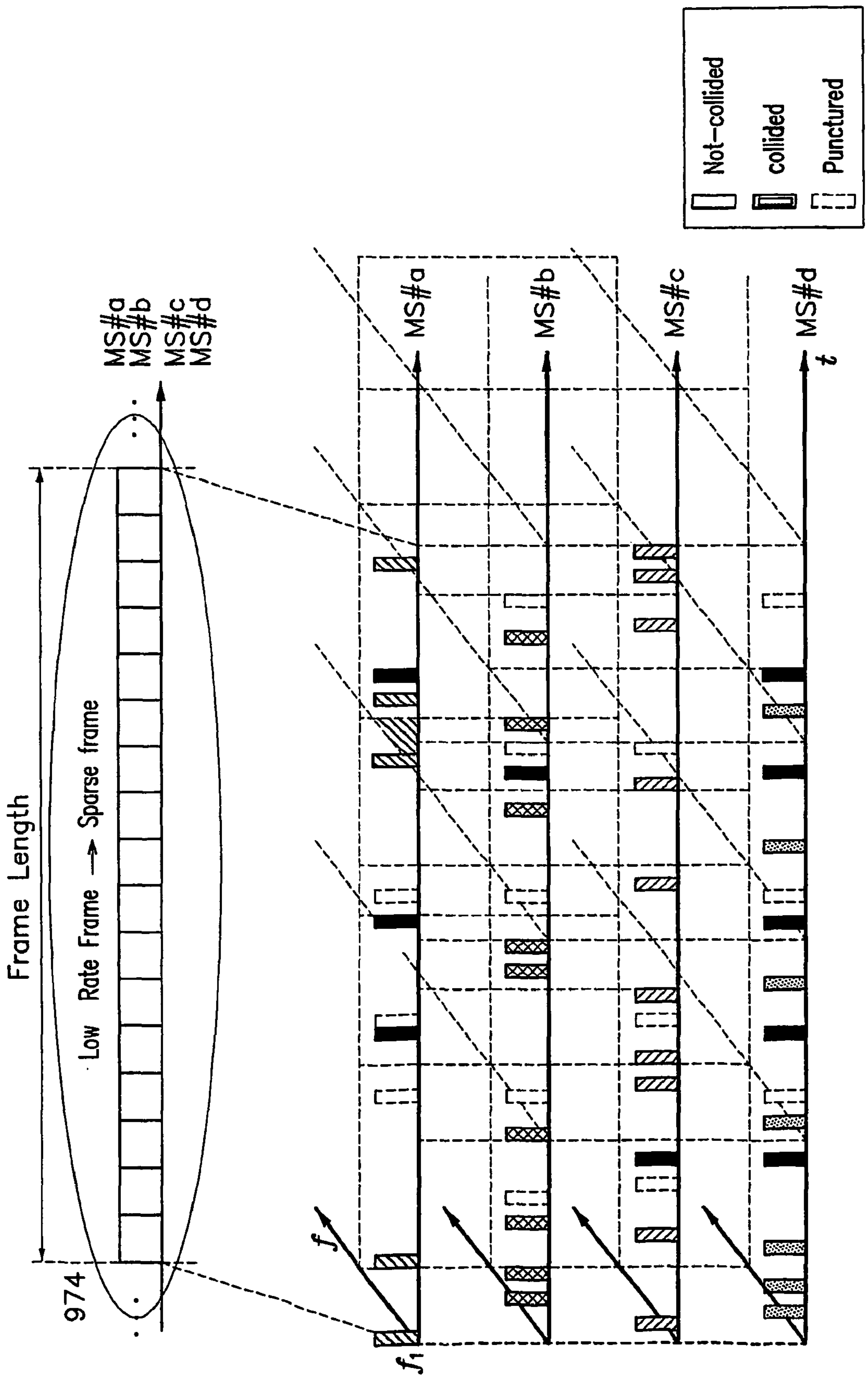
FIG. 14*k* is an illustration showing that the data symbols of the collided coordinates in FIG. 14*j* are compared with one another to determine whether to be transmitted (the black square means transmission; and the dotted line square means no transmission)

Contrary to FIG. 14*h*, FIG. 14*i* illustrates that the transmit data symbol interval of a channel to the secondary station is selected in a pseudo-random manner in order to achieve statistical multiplexing. The transmission time hopping patterns of the respective secondary stations are mutually independent. FIG. 14*j* illustrates a collision that a multidimensional hopping pattern represented by a one-dimensional coordinate of transmission time is selected by a plurality of channels at the same time in FIG. 14*i*. In the figure, the double solid line square represents the position of a data symbol with a multidimensional hopping pattern collision, and the single solid line square represents the position of a data symbol without a multidimensional hopping pattern collision. FIG. 14*k* illustrates that data symbols of coordinates with a collision in FIG. 14*j* are compared with one another to finally determine whether to be transmitted. The black square represents data transmission with a multidimensional hopping pattern collision but the same data symbols for all channels involved in the collision. The dotted line square represents no data transmission with different data symbols for all channels involved in the collision.

Figure 14L:
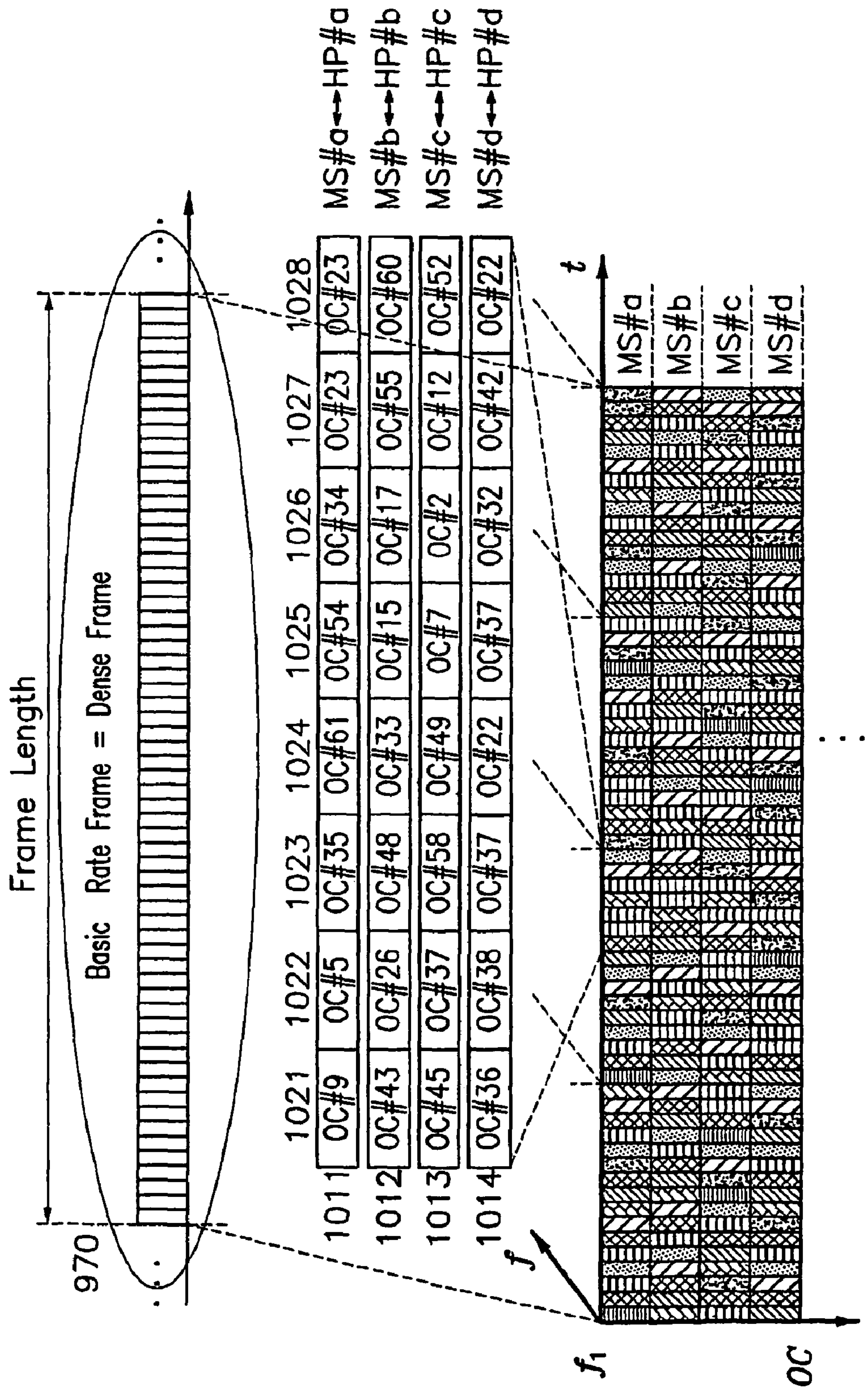
FIG. 14*l* is a signal diagram showing a transmit signal from the primary station in a frame (i.e., a dense frame) having a base transmission rate R for orthogonal code hopping multiplexing according to an embodiment of the present invention.

FIG. 14*l* illustrates orthogonal code hopping multiplexing as a special case of multidimensional orthogonal resource hopping multiplexing that orthogonal codes for band-spreading transmit data symbols of a channel to the secondary station are selected in a pseudo-random manner in order to achieve statistical multiplexing. The orthogonal code hopping patterns of the respective secondary stations are mutually independent. This is described in detail in Application No. 10-1999-0032187 by the inventor of this invention that discloses a system and method for orthogonal code hopping multiplexing.

Figure 14M:
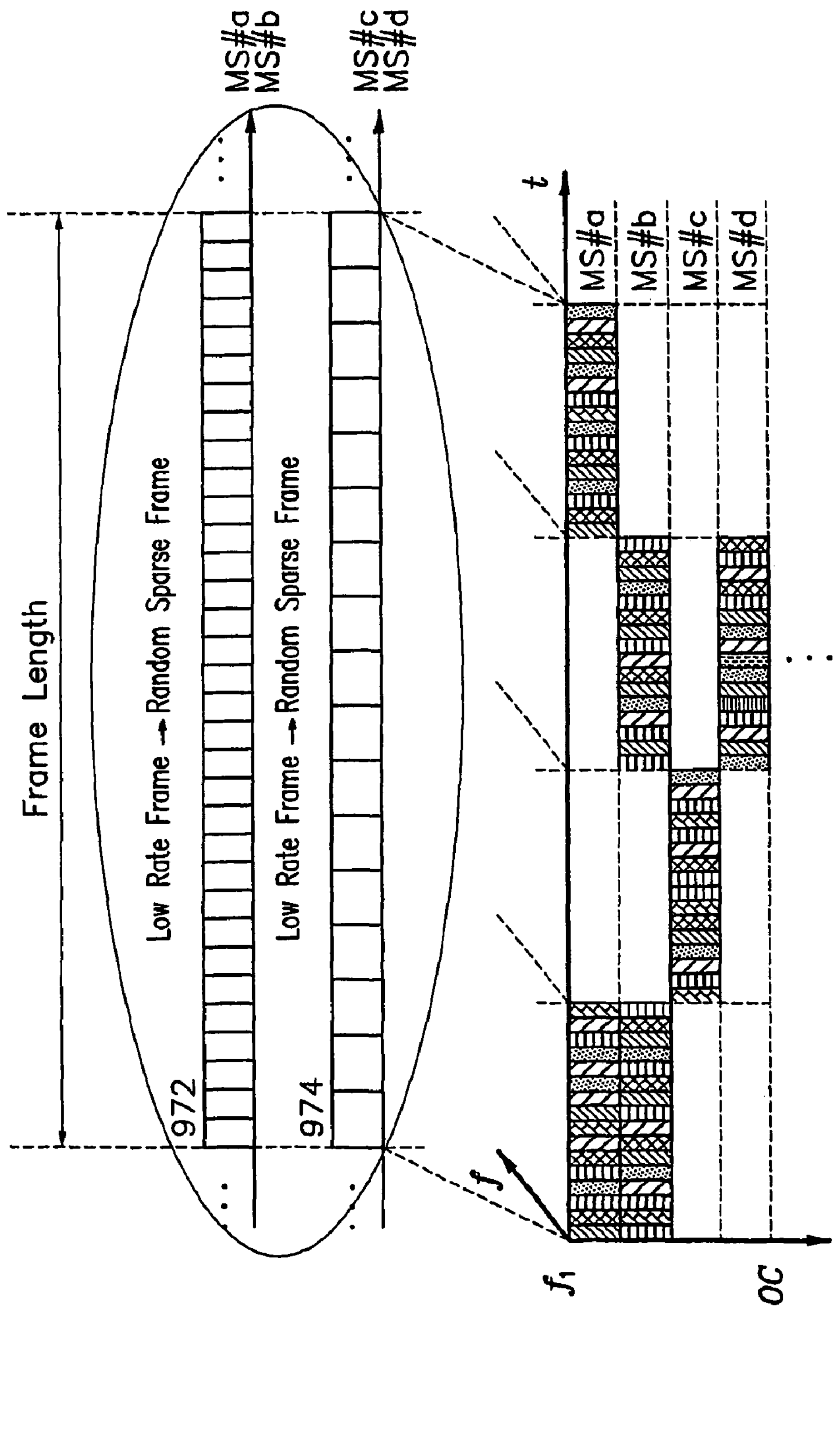
FIG. 14*m* is a signal diagram showing a transmit signal from the primary station in a sparse frame for time slot-based transmission time hopping multiplexing and orthogonal code hoping multiplexing according to an embodiment of the present invention.
Figure 14N:
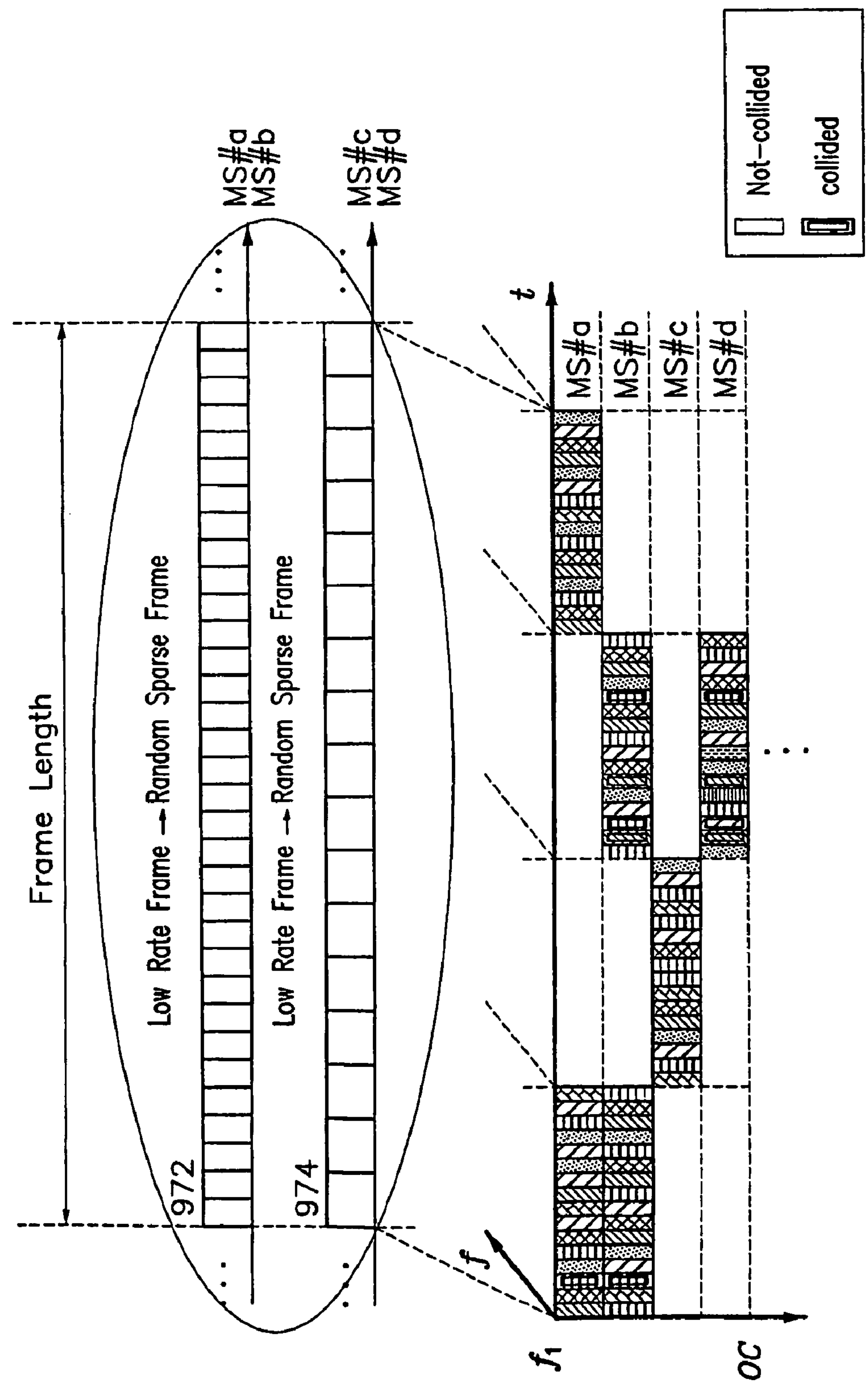
FIG. 14*n* is an illustration showing the case where a hopping pattern expressed in terms of the two-dimensional coordinates of transmission time and orthogonal code is selected by multiple channels at the same time in FIG. 14*m* (the square defined by the double solid line is the collided data symbol)
Figure 140:
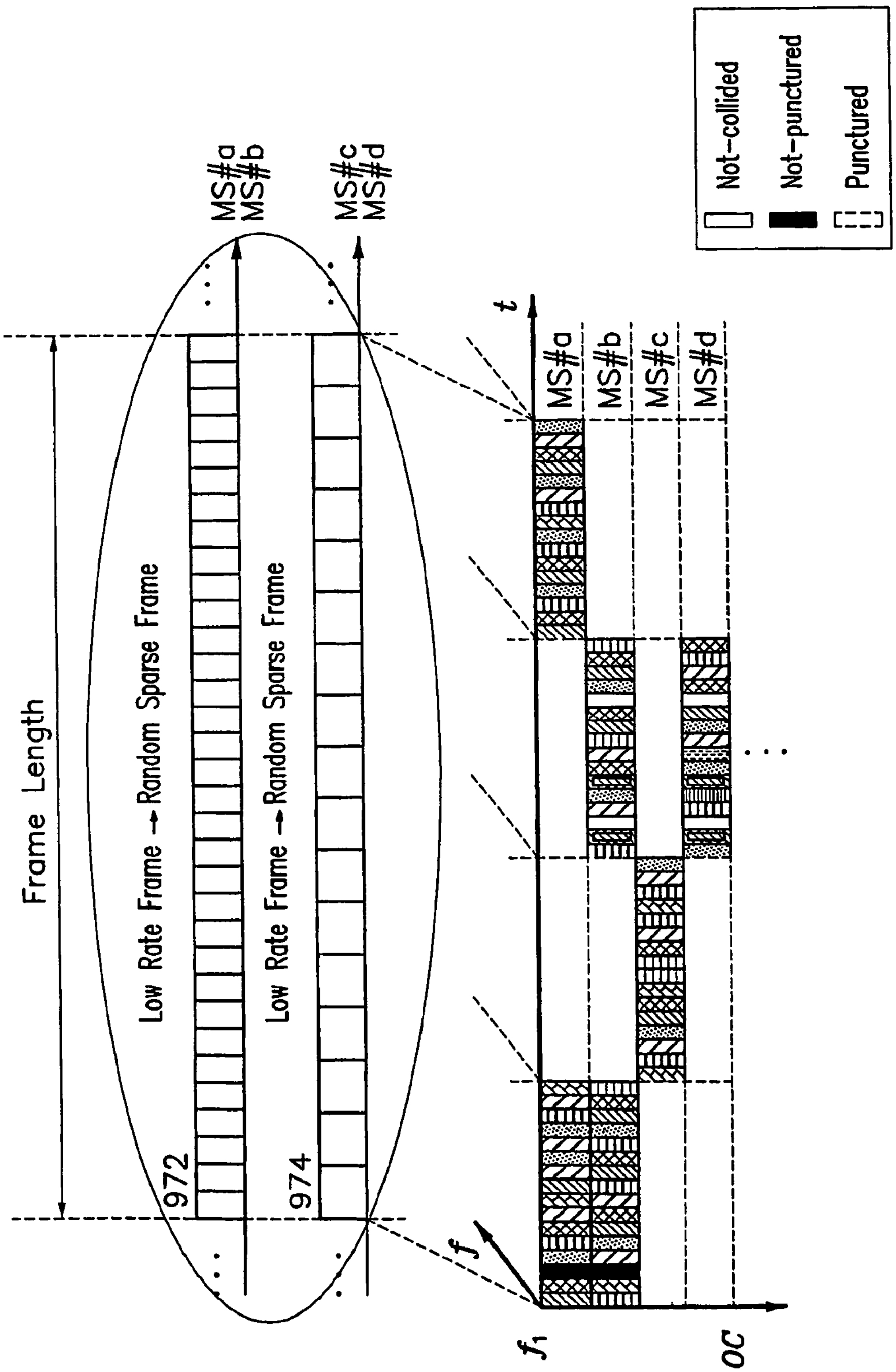

FIG. 14*m* is a signal diagram showing a transmit signal of the primary station for transmission time hopping multiplexing in the unit of time slots in combination with the orthogonal code hopping multiplexing of FIG. 141 according to an embodiment of the present invention. To achieve statistical multiplexing, orthogonal code symbols for band-spreading transmission time slots of the channel to each secondary station and the respective transmit data symbols are selected in a pseudo-random manner. The two-dimensional hopping patterns of transmission time and orthogonal code for the respective secondary stations are mutually independent. FIG. 14*n* illustrates a collision that a multidimensional hopping pattern represented by a two-dimensional coordinate of transmission time and orthogonal code is selected by a plurality of channels at the same time in FIG. 14*m*. In the figure, the double solid line square represents the position of a data symbol with a multidimensional hopping pattern collision, and the single solid line square represents the position of a data symbol without a multidimensional hopping pattern collision. FIG. 14*o* illustrates that data symbols of coordinates with a collision in FIG. 14*n* are compared with one another to finally determine whether to be transmitted. The black square represents data transmission with a multidimensional hopping pattern collision but the same data symbols for all channels involved in the collision. The dotted line square represents no data transmission with different data symbols for all channels involved in the collision.

Figure 14P:
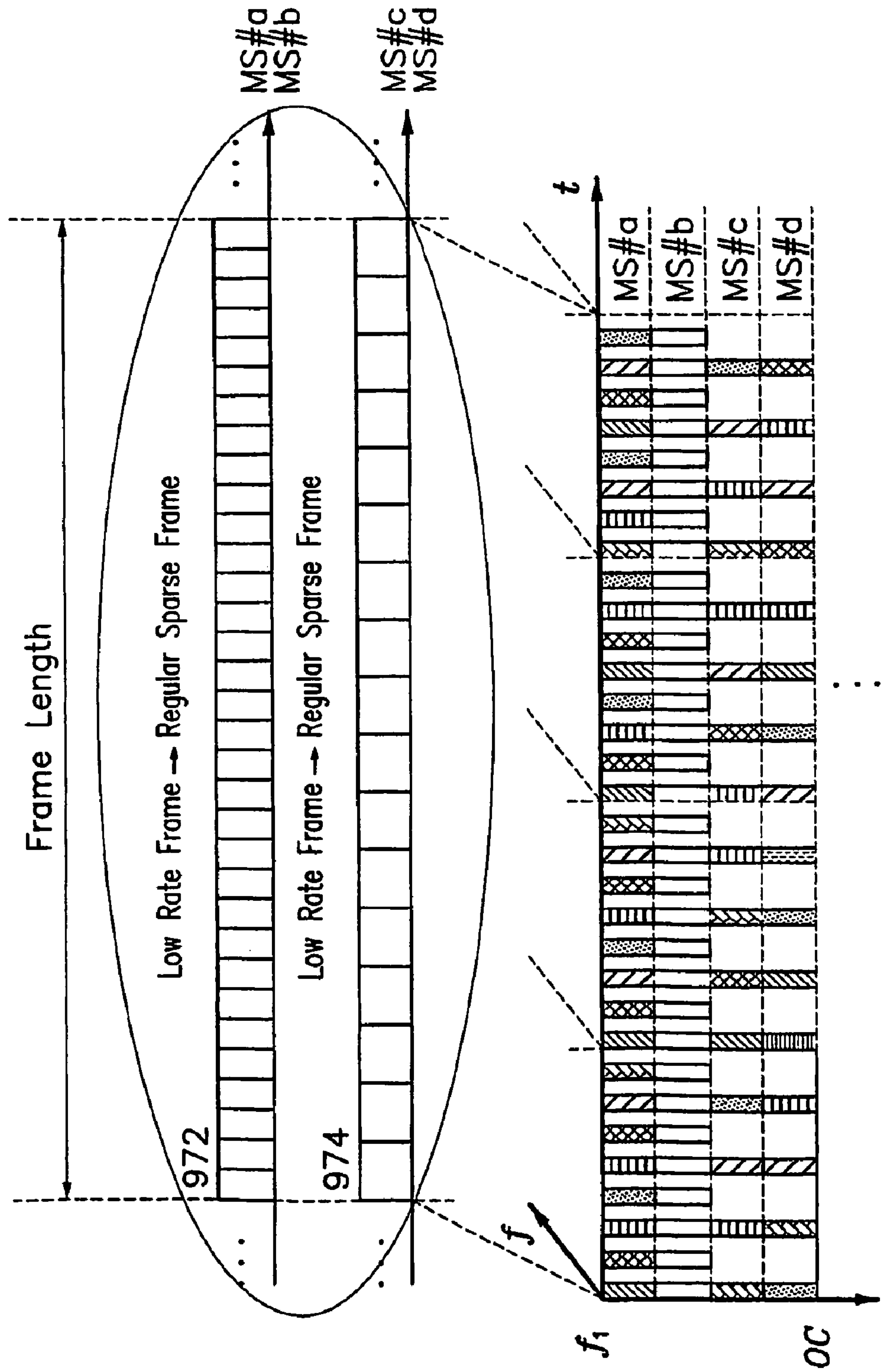
FIG. 14*p* is a signal diagram showing a transmit signal from the primary station in a sparse frame for symbol-based regular transmission time hopping multiplexing and orthogonal code hopping multiplexing according to an embodiment of the present invention (when the frame starting symbol is present at the same position)
Figure 14Q:
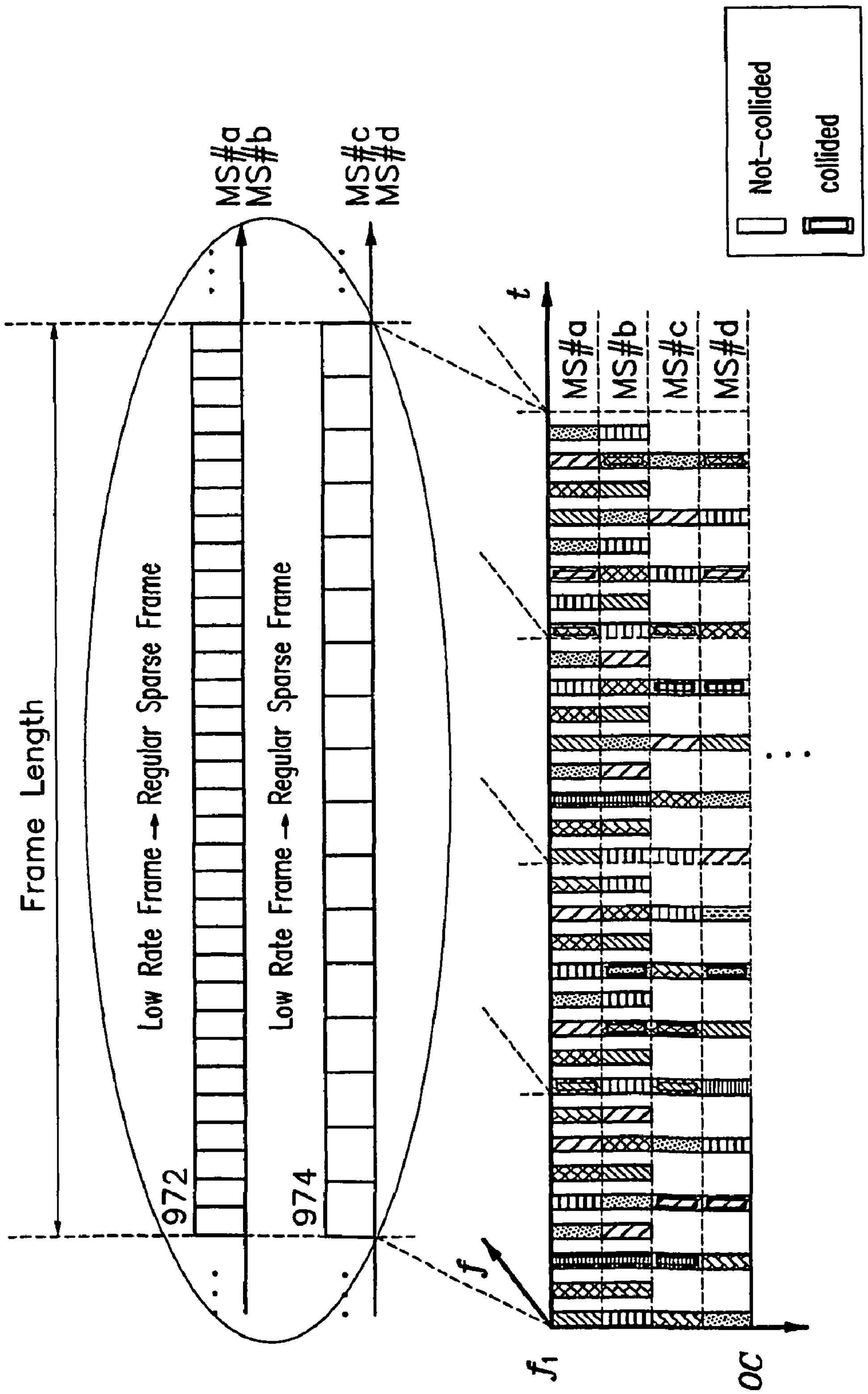
FIG. 14*q* is an illustration showing the case where a hopping pattern expressed in terms of the two-dimensional coordinates of transmission time and orthogonal code symbol is selected by multiple channels at the same time in FIG. 14*p* (the square defined by the double solid line is the collided data symbol)
Figure 14R:
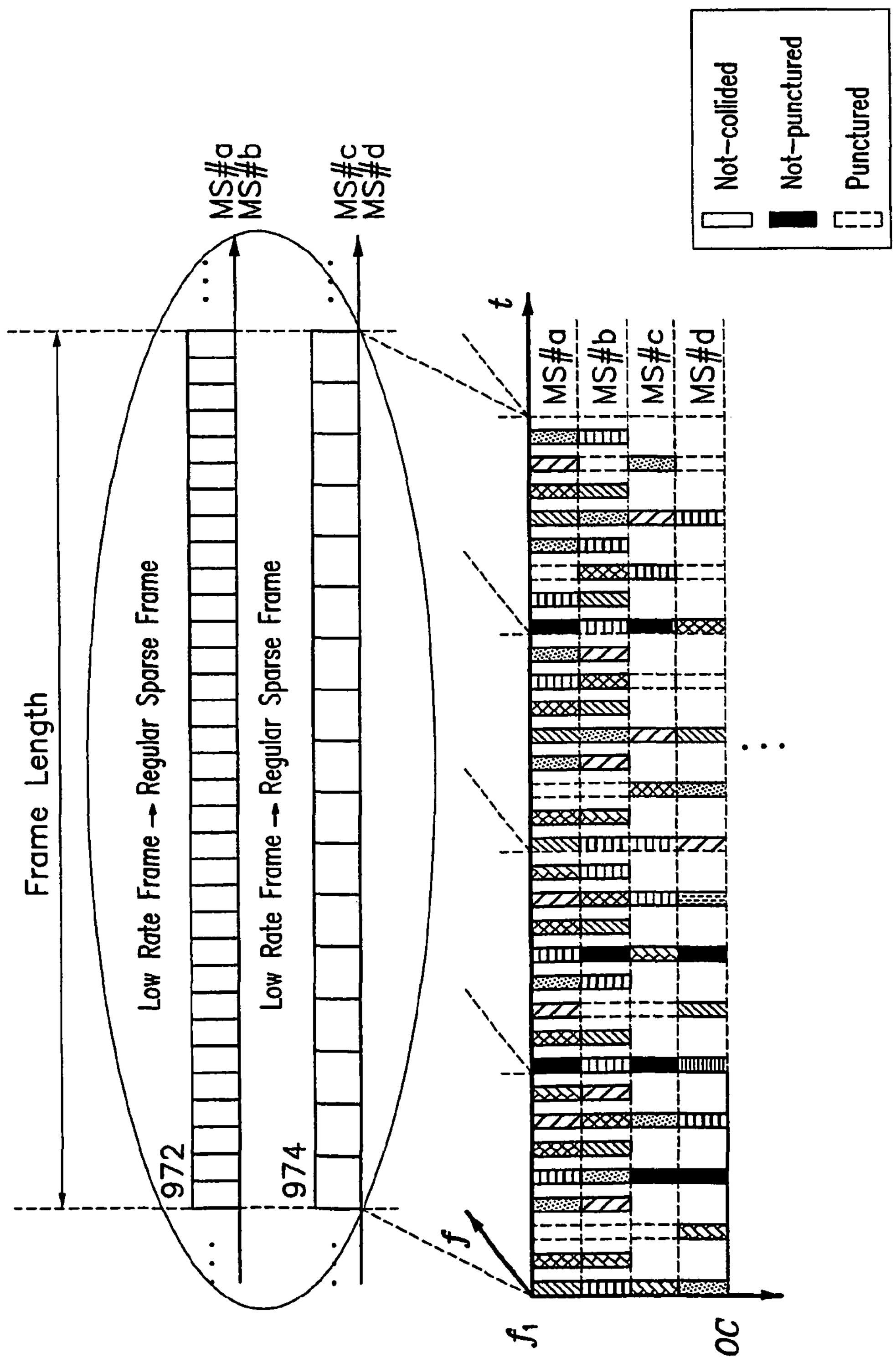
FIG. 14*r* is an illustration showing that the data symbols of the collided coordinates in FIG. 14*q* are compared with one another to determine whether to be transmitted (the black square means transmission; and the dotted line square means no transmission)

FIG. 14*p* is a signal diagram showing a transmit signal of the primary station for the transmission division multiplexing of FIG. 14*h* in combination with the orthogonal code hopping multiplexing of FIG. 14*l*. FIG. 14*h* is a structure incapable of acquiring a statistical multiplexing gain, and FIG. 14*l* as described above. But the statistical multiplexing can be achieved by using the orthogonal code hopping multiplexing of FIG. 14*l* capable of acquiring a statistical multiplexing gain. The position of the first transmit symbol to every secondary station is all the same irrespective of the transmission rate of each channel in the frame. Orthogonal code symbols for band-spreading the respective transmit data symbols of channels to each secondary station are selected in a pseudo-random manner. The one-dimensional hopping patterns of orthogonal code for the respective secondary stations are mutually independent. FIG. 14*q* illustrates a collision that a multidimensional hopping pattern represented by a one-dimensional coordinate of orthogonal code is selected by a plurality of channels at the same time in FIG. 14*o*. In the figure, the double solid line square represents the position of a data symbol with a multidimensional hopping pattern collision, and the single solid line square represents the position of a data symbol without a multidimensional hopping pattern collision. FIG. 14*r* illustrates that data symbols of coordinates with a collision in FIG. 14*q* are compared with one another to finally determine whether to be transmitted. The black square represents data transmission with a multidimensional hopping pattern collision but the same data symbols for all channels involved in the collision. The dotted line square represents no data transmission with different data symbols for all channels involved in the collision.

Figure 14S:
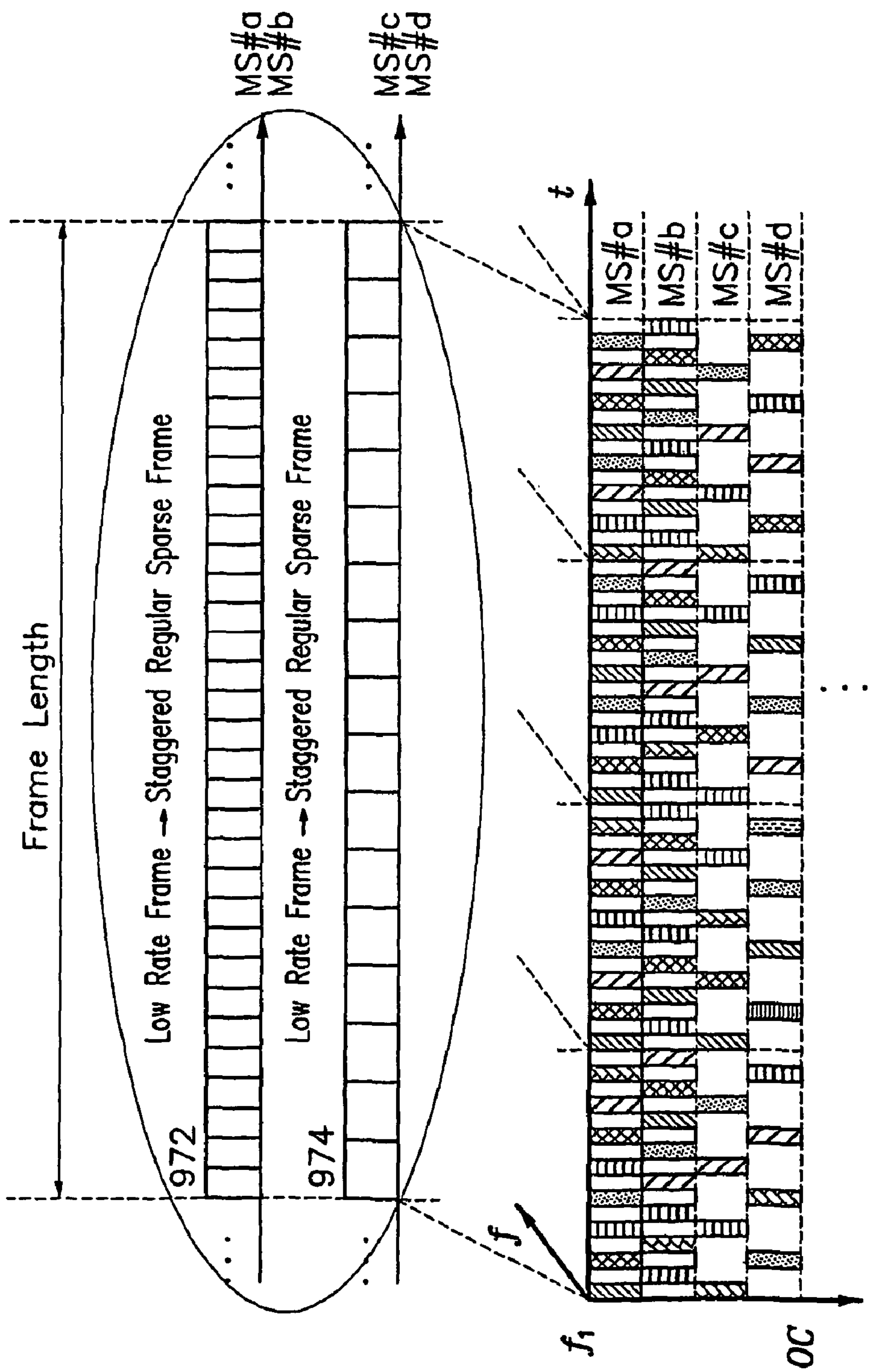
FIG. 14*s* is a signal diagram showing a transmit signal from the primary station in a sparse frame for symbol-based regular transmission time hopping multiplexing and orthogonal code hopping multiplexing according to an embodiment of the present invention (when the frame starting symbol is present at a staggered position.
Figure 14T:
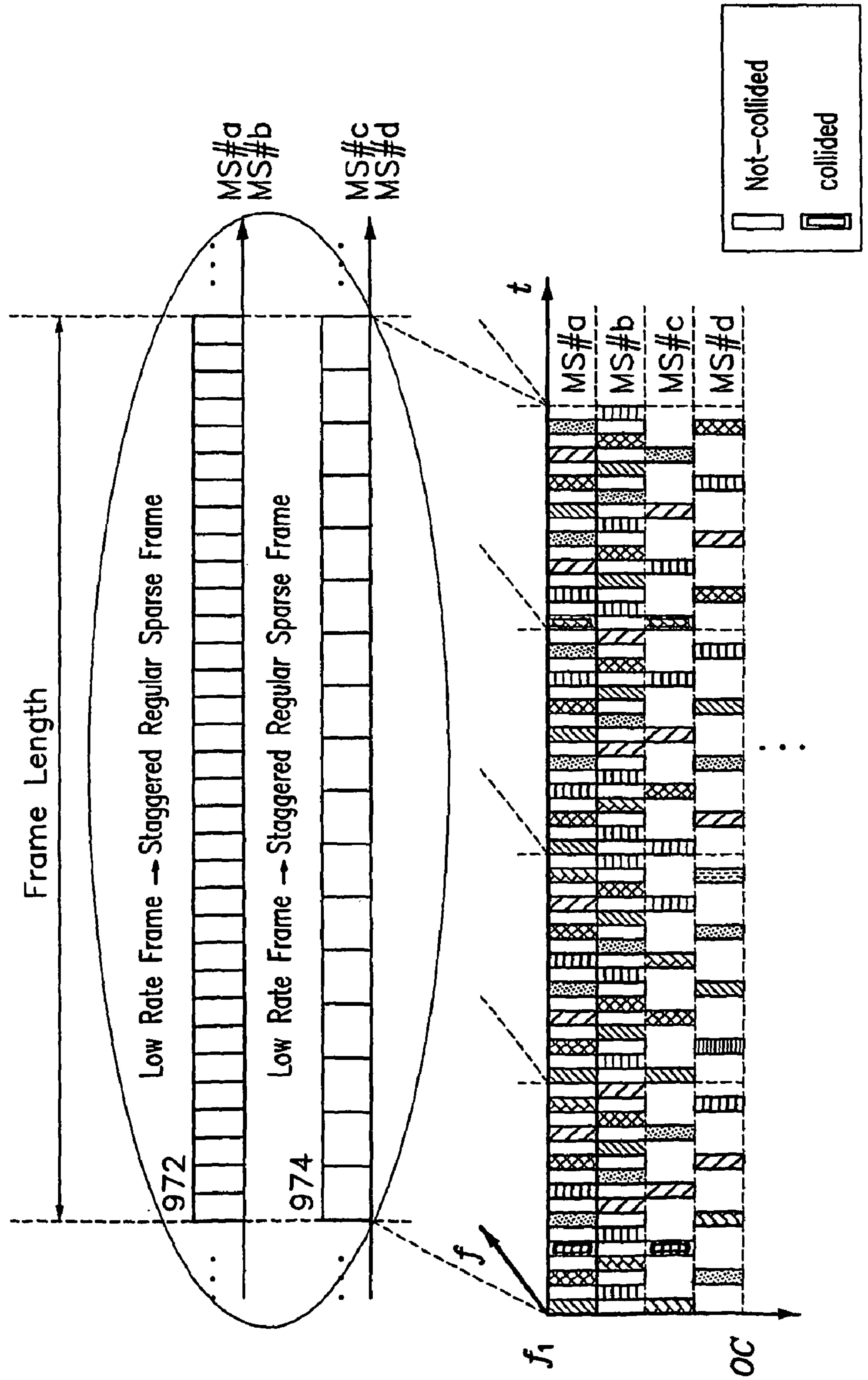
FIG. 14*t* is an illustration showing the case where a hopping pattern expressed in terms of the two-dimensional coordinates of transmission time and orthogonal code is selected by multiple channels at the same time in FIG. 14*s* (the square defined by the double solid line is the collided data symbol)
Figure 14U:
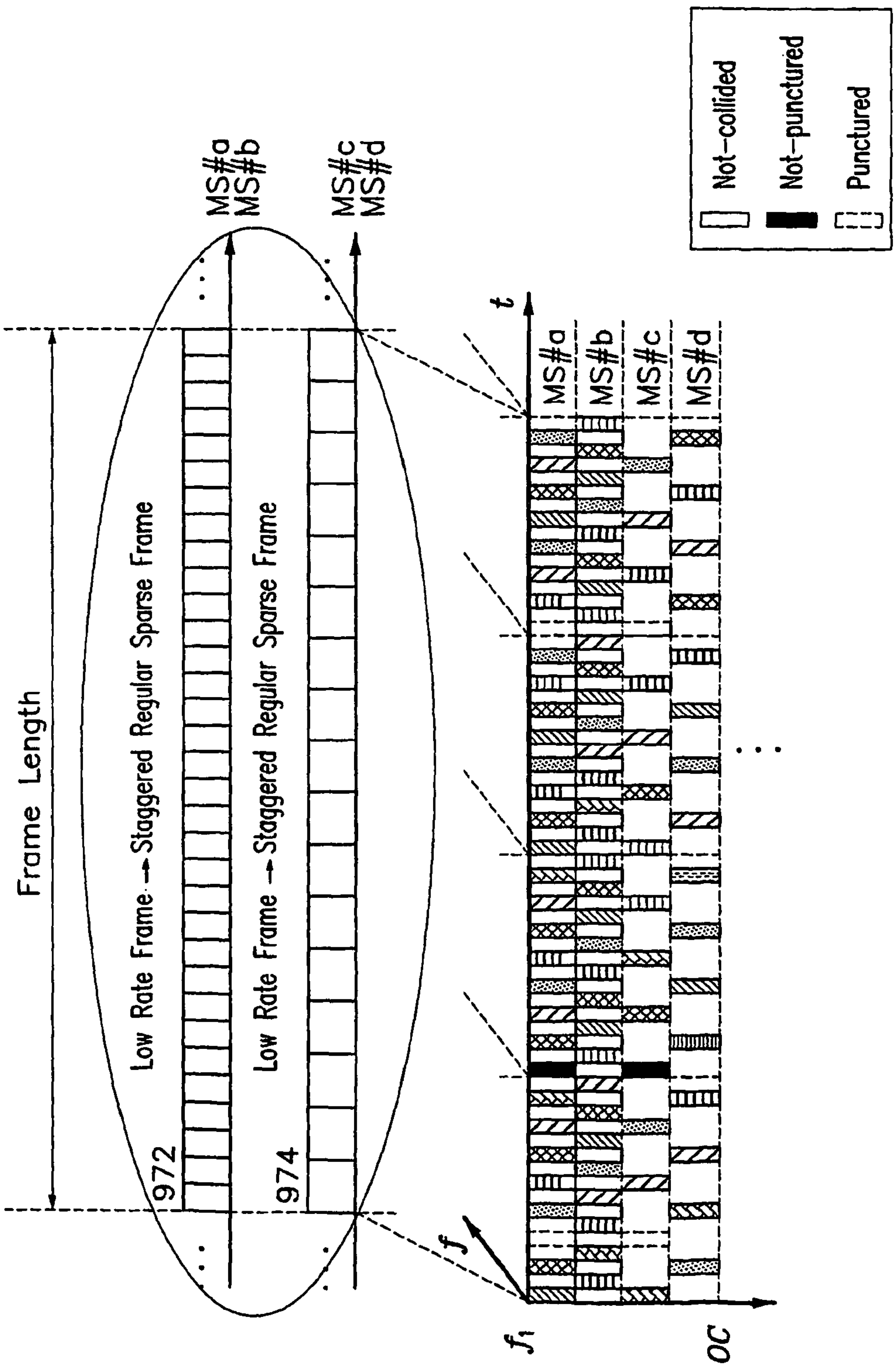
FIG. 14*u* is an illustration showing that the data symbols of the collided coordinates in FIG. 14*t* are compared with one another to determine whether to be transmitted (the black square means transmission; and the dotted line square means no transmission)

FIG. 14*s* is a modification of the time division and orthogonal code hopping multiplexing of FIG. 14*p*. The primary station arranges the first transmit symbols to the secondary stations staggered in the frame to maintain a balance of the transmission power. In the same way of FIG. 14*p*, orthogonal code symbols for band-spreading the respective transmit data symbols of channels to each secondary station are selected in a pseudo-random manner. The one-dimensional hopping patterns of orthogonal code for the respective secondary stations are mutually independent. FIG. 14*t* illustrates a collision that a multidimensional hopping pattern represented by a one-dimensional coordinate of orthogonal code is selected by a plurality of channels at the same time in FIG. 14*s*. In the figure, the double solid line square represents the position of a data symbol with a multidimensional hopping pattern collision, and the single solid line square represents the position of a data symbol without a multidimensional hopping pattern collision. FIG. 14*u* illustrates that data symbols of coordinates with a collision in FIG. 14*t* are compared with one another to finally determine whether to be transmitted. The black square represents data transmission with a multidimensional hopping pattern collision but the same data symbols for all channels involved in the collision. The dotted line square represents no data transmission with different data symbols for all channels involved in the collision.

Figure 14V:
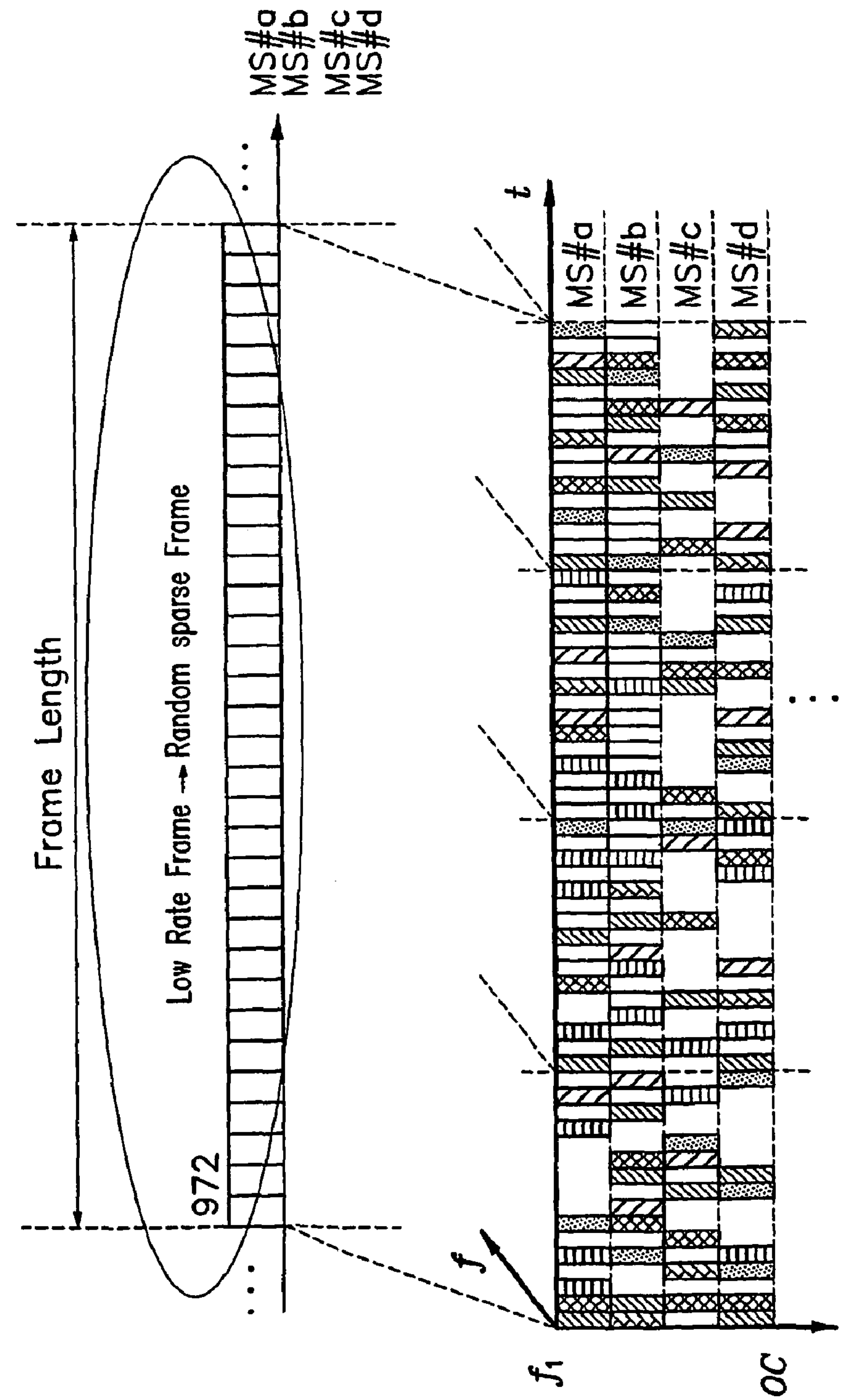
FIG. 14*v* is a signal diagram showing a transmit signal from the primary station in a sparse frame for channel-based irregular transmission time hopping multiplexing and orthogonal code hopping multiplexing in the unit of symbols according to an embodiment of the present invention.
Figure 14W:
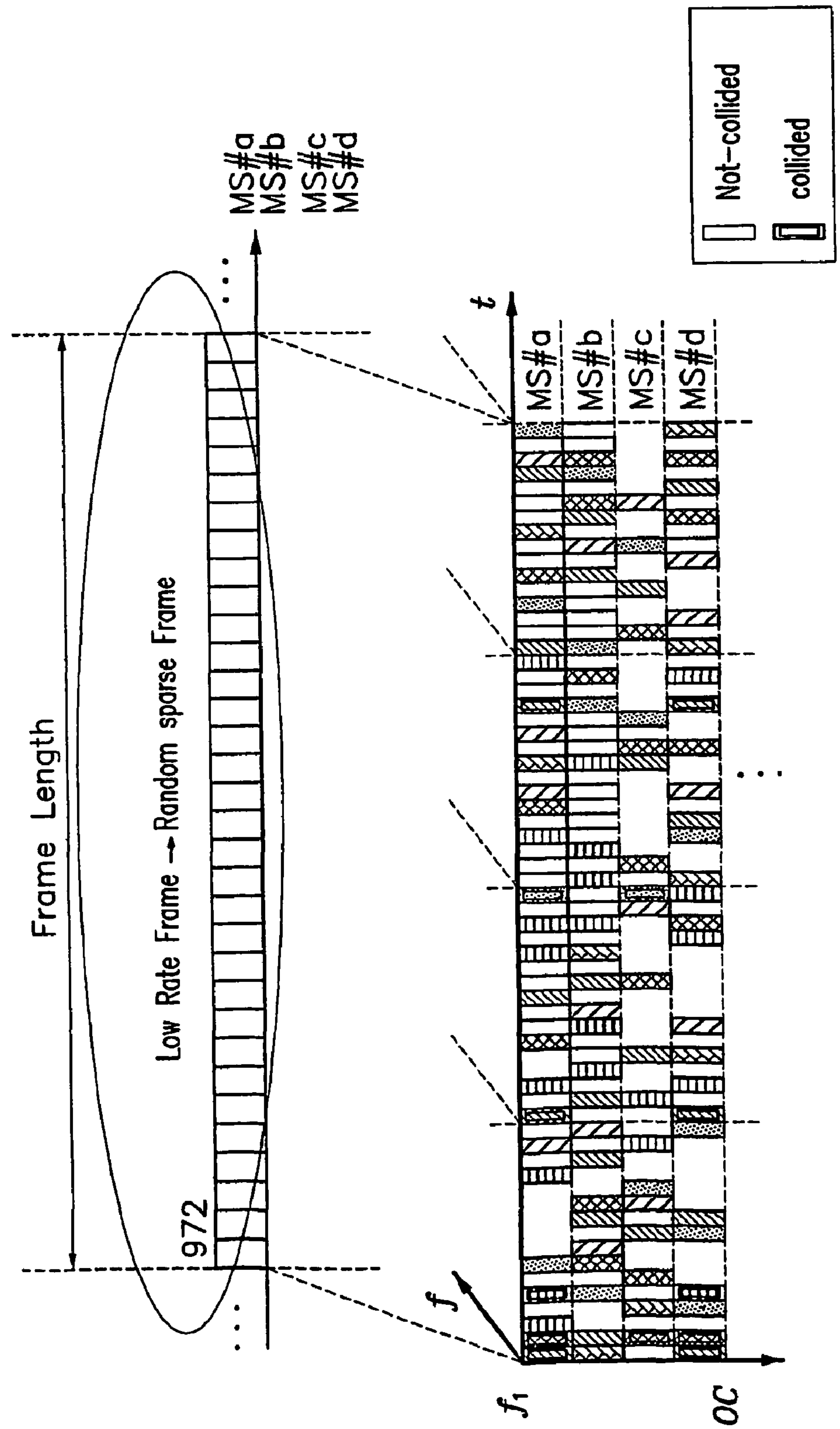
FIG. 14*w* is an illustration showing the case where a hopping pattern expressed in terms of the two-dimensional coordinates of transmission time and orthogonal code is selected by multiple channels at the same time in FIG. 14*v* (the square defined by the double solid line is the collided data symbol)
Figure 14X:
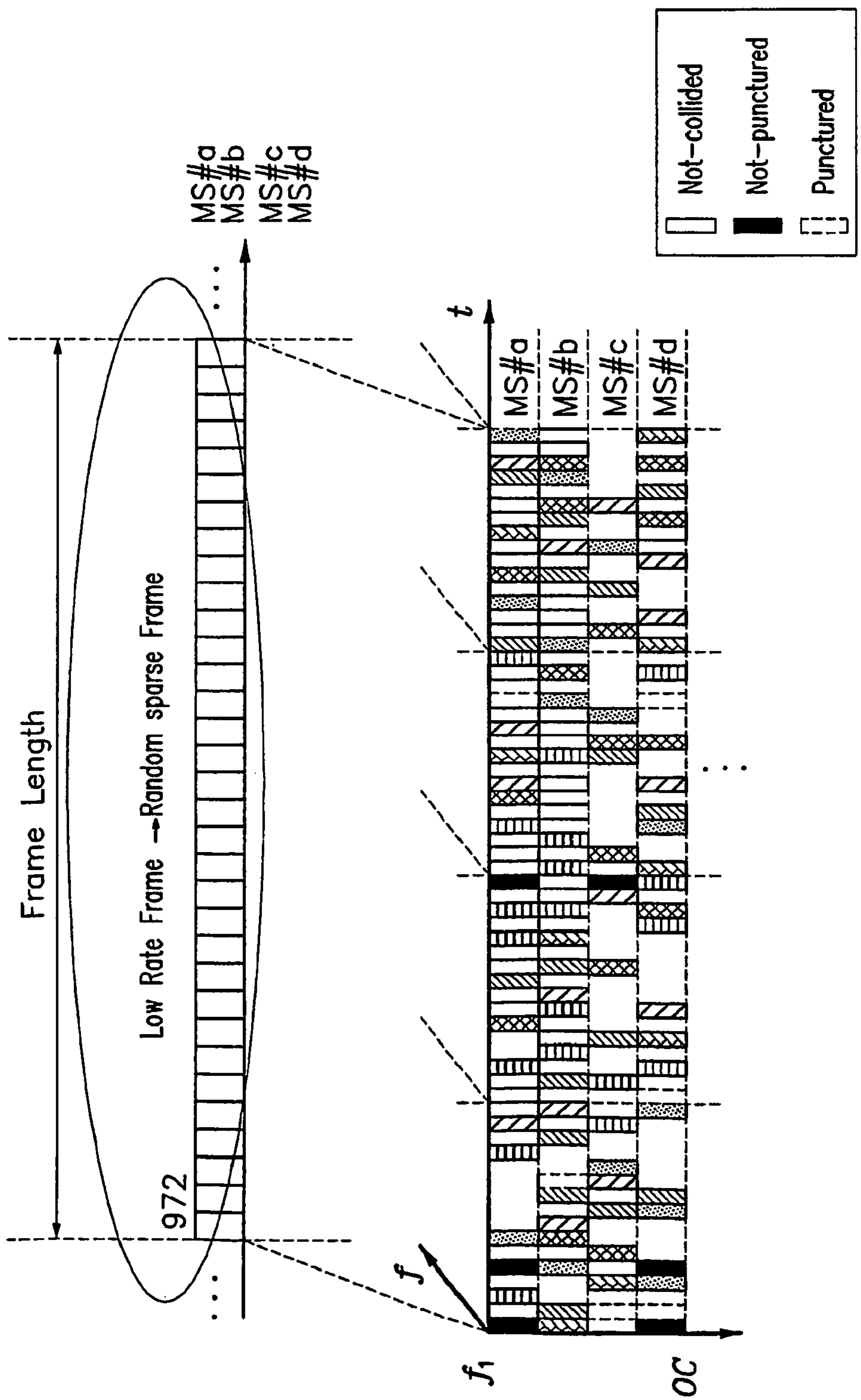
FIG. 14*x* is an illustration showing that the data symbols of the collided coordinates in FIG. 14*w* are compared with one another to determine whether to be transmitted (the black square means transmission; and the dotted line square means no transmission)

FIG. 14*v* is signal diagram showing a transmit signal of the primary station for the transmission time hopping multiplexing of FIG. 14*i* and the orthogonal code hopping multiplexing of FIG. 14*l*. This is a compound statistical multiplexing system that acquires a statistical multiplexing gain by both the transmission time hopping multiplexing of FIG. 14*i* and the orthogonal code hopping multiplexing of FIG. 14*l*. The transmission time of each channel in the frame and an orthogonal code symbol for band-spreading each transmit data symbol of the channel to each secondary station are selected in a pseudo-random manner by a multidimensional (i.e., two-dimensional) hopping pattern. The two-dimensional hopping patterns of transmission time and orthogonal code for the respective secondary stations are mutually independent. FIG. 14*w* illustrates a collision that a multidimensional hopping pattern represented by a two-dimensional coordinate of transmission time and orthogonal code is selected by a plurality of channels at the same time in FIG. 14*v*. In the figure, the double solid line square represents the position of a data symbol with a multidimensional hopping pattern collision, and the single solid line square represents the position of a data symbol without a multidimensional hopping pattern collision. FIG. 14*x* illustrates that data symbols of coordinates with a collision in FIG. 14*w* are compared with one another to finally determine whether to be transmitted. The black square represents data transmission with a multidimensional hopping pattern collision but the same data symbols for all channels involved in the collision. The dotted line square represents no data transmission with different data symbols for all channels involved in the collision.

Figure 14Y:
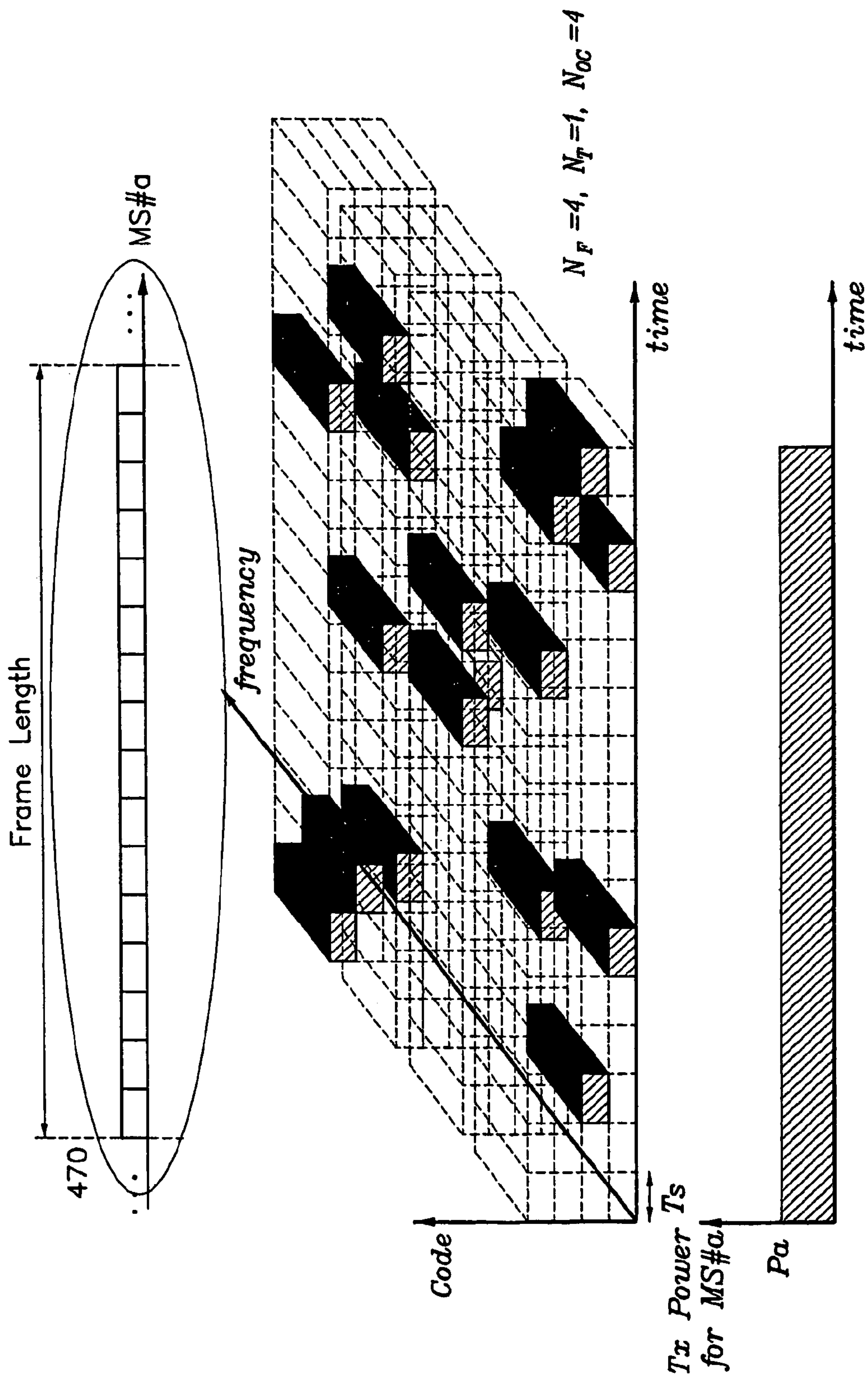
FIG. 14*y* is a signal diagram showing a transmit signal from the primary station in a sparse frame for channel-based irregular subcarrier frequency hopping multiplexing, transmission time hopping multiplexing and orthogonal code hopping multiplexing in the unit of symbols according to an embodiment of the present invention.
Figure 14Z:
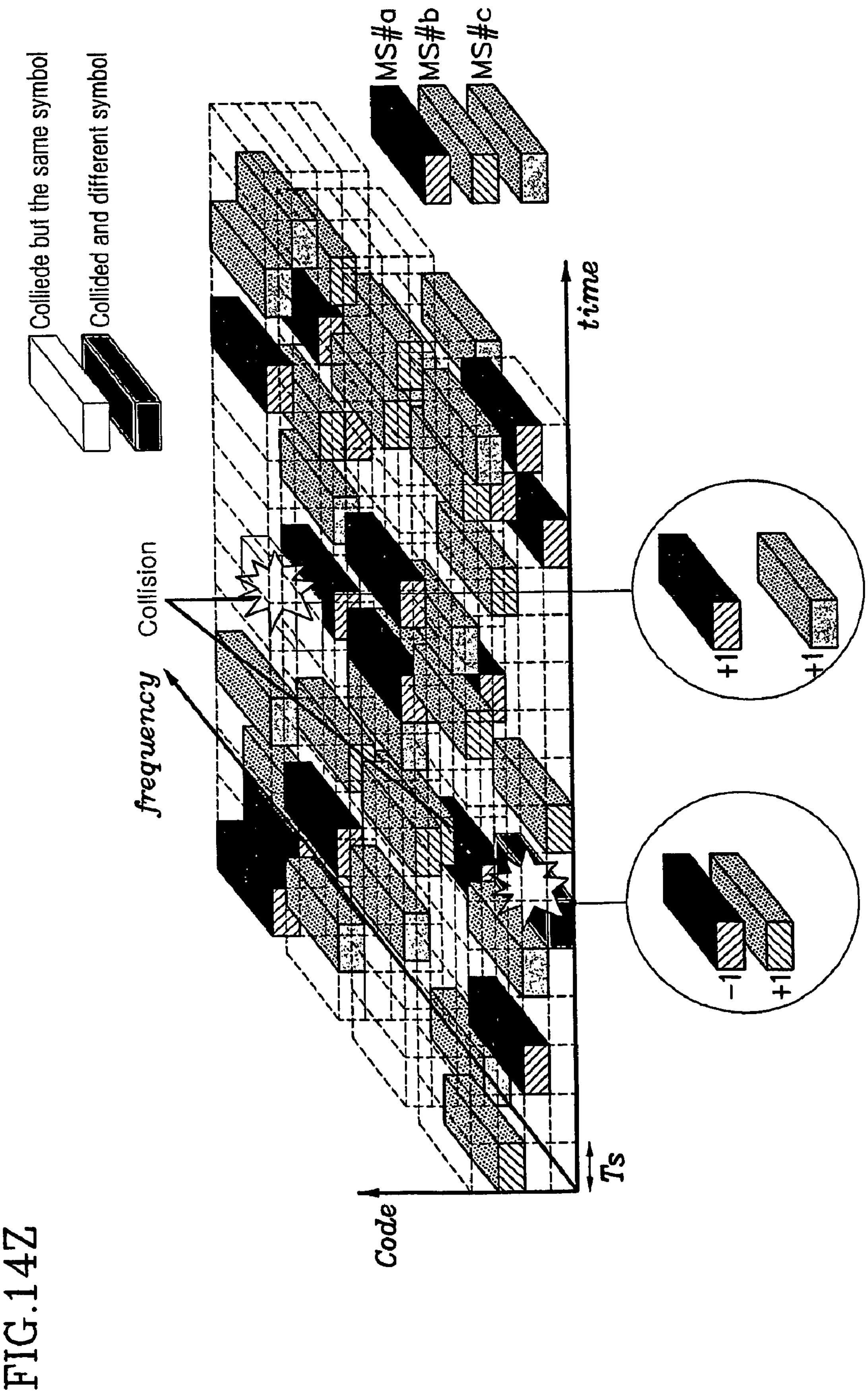
FIG. 14*z* is an illustration showing the case where a hopping pattern expressed in terms of the three-dimensional coordinates of subcarrier frequency, transmission time and orthogonal code is selected by multiple channels at the same time in FIG. 14*y* (the cuboid defined by the double solid line is the collided data symbol)
Figure 14A:
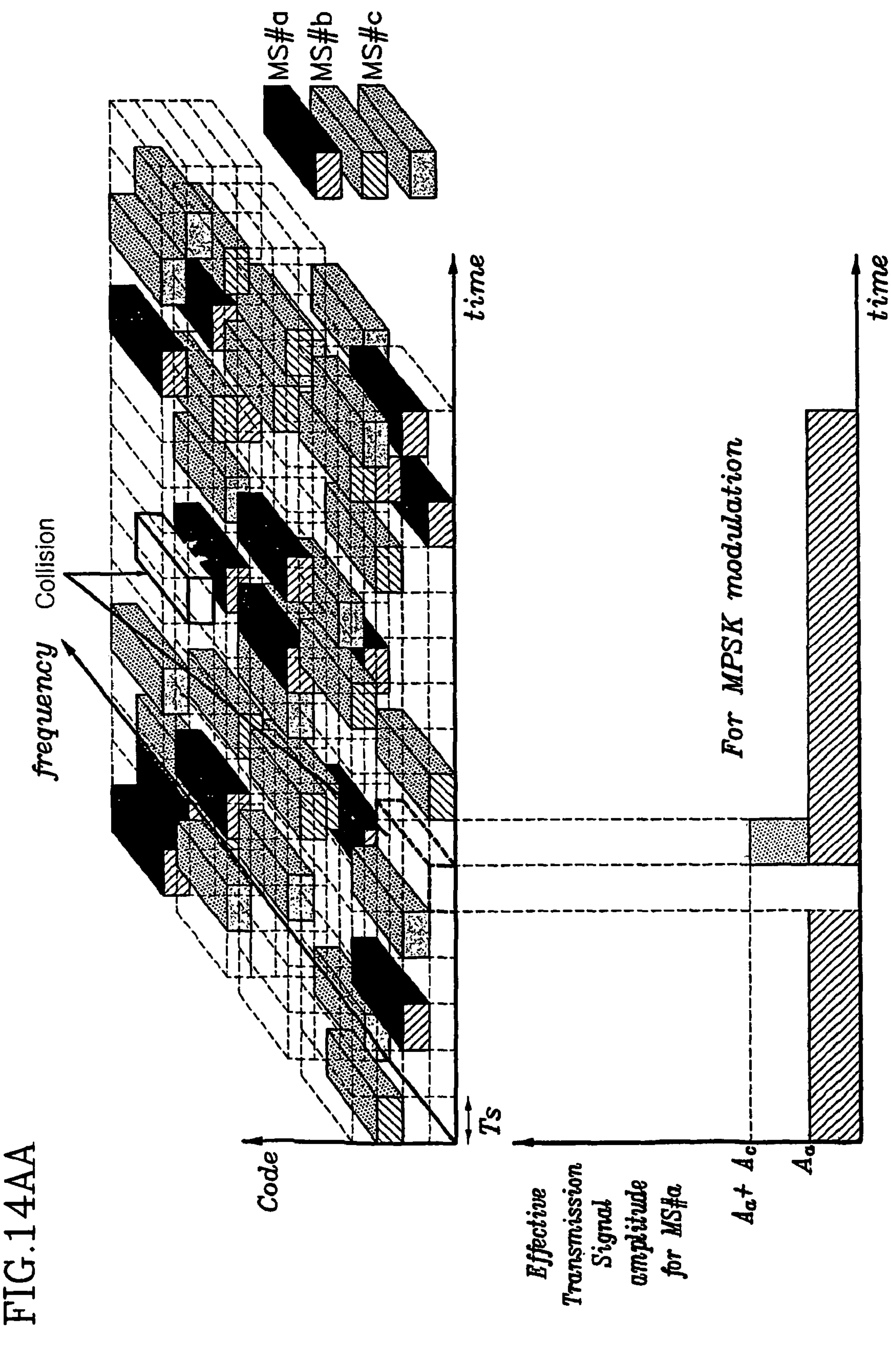

The statistical multiplexing using the two-dimensional hopping pattern of transmission time and orthogonal code as shown in FIG. 14*v* can be expanded to the statistical multiplexing using the three-dimensional hopping pattern of frequency, transmission time and orthogonal code as shown in FIG. 14*y*. FIG. 14*y* is a signal diagram showing a transmit signal from the primary station for channel-based irregular carrier frequency hopping multiplexing in the unit of symbols for a sparse frame, transmission time hopping multiplexing and orthogonal code hopping multiplexing in accordance with an embodiment of the present invention. FIG. 14*z* illustrates a collision that a multidimensional hopping pattern represented by a three-dimensional coordinate of carrier frequency, transmission time and orthogonal code is selected by a plurality of channels at the same time in FIG. 14*y*. In the figure, the heavy solid line cuboid represents the collided data symbol, the blank cuboid represents that the data symbol to be transmitted is matched, and the black cuboid represents that the data symbol to be transmitted is not matched. FIG. 14*aa* illustrates that data symbols of coordinates with a collision in FIG. 14*z* are compared with one another to finally determine whether to be transmitted. The blank cuboid represents data transmission, and the dotted line cuboid represents no data transmission with different data symbols for all channels involved in the collision.

A further expansion of the system proposed in the present invention enables statistical multiplexing by a hoping multiplexing of N-dimensional orthogonal resources represented as orthogonal resource 1, orthogonal resource 2, . . . , orthogonal resource N. The statistical multiplexing gain by the multidimensional resource hopping multiplexing can be analogized from the collision probability of the multidimensional hopping pattern and the non-transmission probability of the corresponding transmit data symbol. The likelihood of recovering the non-transmitted data symbol is dependent upon the channel encoding method. In this description, only the case of carrying information on the channel will be analyzed, because the case where information is not carried on the channel to the secondary station of interest is not worth analyzing. The following mathematic analysis is based on a control algorithm for the multidimensional hopping pattern collision shown in FIGS. 18 and 19. In FIG. 20, the mathematic analysis on the control algorithm for the multidimensional hopping pattern collision of FIG. 25 is too complicated and will not be described.

M=the number of channels allocated by the primary station;

N=the number of active channels in a given time interval;

α=channel activity (=average transmission rate per frame/basic transmission rate)

$\pi_i$=probability of transmitting data symbol i, where i□{0, 1, 2, . . . , s−1}; and s=the number of data symbols Example) For 8PSK, s=8; and for 16QAM, s=16.

1) Frequency Hopping Multiplexing $c_1$=the total number of subcarriers on the frequency axis in multidimensional hopping pattern (1) Hopping Pattern Collision Probability $$\sum_{N=2}^{M}\left\{1-\left(1-\frac{1}{c_1}\right)^{N-1}\right\}\binom{M-1}{N-1}\alpha^{N-1}(1-\alpha)^{M-N}$$ [Equation 1]

(2) Data Symbol Perforation (Transmission OFF) Probability $$\sum_{N=2}^{M}\left[\sum_{i=0}^{s-1}\left\{1-\left(1-\frac{1-\pi_i}{c_1}\right)^{N-1}\right\}\cdot\pi_i\right]\binom{M-1}{N-1}\alpha^{N-1}(1-\alpha)^{M-N}$$ [Equation 2]

(3) Data Symbol Perforation Probability for all the Same $\pi_i$ $$\sum_{N=2}^{M}\left\{1-\left(1-\frac{1-\frac{1}{s}}{c_1}\right)^{N-1}\right\}\binom{M-1}{N-1}\alpha^{N-1}(1-\alpha)^{M-N}$$ [Equation 3]

2) Transmission Time Hopping Multiplexing $c_2$=the total number of transmittable symbol intervals on the time axis in multidimensional hopping pattern (1) Hopping Pattern Collision Probability $$\sum_{N=2}^{M}\left\{1-\left(1-\frac{1}{c_2}\right)^{N-1}\right\}\binom{M-1}{N-1}\alpha^{N-1}(1-\alpha)^{M-N}$$ [Equation 4]

(2) Data Symbol Perforation Probability $$\sum_{N=2}^{M}\left[\sum_{i=0}^{s-1}\left\{1-\left(1-\frac{1-\pi_i}{c_2}\right)^{N-1}\right\}\cdot\pi_i\right]\binom{M-1}{N-1}\alpha^{N-1}(1-\alpha)^{M-N}$$ [Equation 5]

(3) Data Symbol Perforation Probability for all the Same $\pi_i$ $$\sum_{N=2}^{M}\left\{1-\left(1-\frac{1-\frac{1}{s}}{c_2}\right)^{N-1}\right\}\binom{M-1}{N-1}\alpha^{N-1}(1-\alpha)^{M-N}$$ [Equation 6]

3) Orthogonal Code Hopping Multiplexing $c_3$=the total number of orthogonal code symbols on the orthogonal code axis in multidimensional hopping pattern (1) Hopping Pattern Collision Probability $$\sum_{N=2}^{M}\left\{1-\left(1-\frac{1}{c_3}\right)^{N-1}\right\}\binom{M-1}{N-1}\alpha^{N-1}(1-\alpha)^{M-N}$$ [Equation 7]

(2) Data Symbol Perforation Probability $$\sum_{N=2}^{M}\left[\sum_{i=0}^{s-1}\left\{1-\left(1-\frac{1-\pi_i}{c_3}\right)^{N-1}\right\}\cdot\pi_i\right]\binom{M-1}{N-1}\alpha^{N-1}(1-\alpha)^{M-N}$$ [Equation 8]

(3) Data Symbol Perforation Probability for all the Same $\pi_i$ $$\sum_{N=2}^{M}\left\{1-\left(1-\frac{1-\frac{1}{s}}{c_3}\right)^{N-1}\right\}\binom{M-1}{N-1}\alpha^{N-1}(1-\alpha)^{M-N}$$ [Equation 9]

4) Frequency, Transmission Time and Orthogonal Code Hopping Multiplexing $c_1$=the total number of subcarriers on the frequency axis in multidimensional hopping pattern $c_2$=the total number of transmittable symbol intervals on the time axis in multidimensional hopping pattern $c_3$=the total number of orthogonal code symbols on the orthogonal code axis in multidimensional hopping pattern (1) Hopping Pattern Collision Probability $$\sum_{N=2}^{M}\left\{1-\left(1-\frac{1}{c_1+c_2+c_3}\right)^{N-1}\right\}\binom{M-1}{N-1}\alpha^{N-1}(1-\alpha)^{M-N}$$ [Equation 10]

(2) Data Symbol Perforation Probability $$\sum_{N=2}^{M}\left[\sum_{i=0}^{s-1}\left\{1-\left(1-\frac{1-\pi_i}{c_1+c_2+c_3}\right)^{N-1}\right\}\cdot\pi_i\right]\binom{M-1}{N-1}\alpha^{N-1}(1-\alpha)^{M-N}$$ [Equation 11]

(3) Data Symbol Perforation Probability for all the Same $\pi_i$ $$\sum_{N=2}^{M}\left\{1-\left(1-\frac{1-\frac{1}{s}}{c_1+c_2+c_3}\right)^{N-1}\right\}\binom{M-1}{N-1}\alpha^{N-1}(1-\alpha)^{M-N} \quad \text{[Equation 12]}$$

Figure 15:
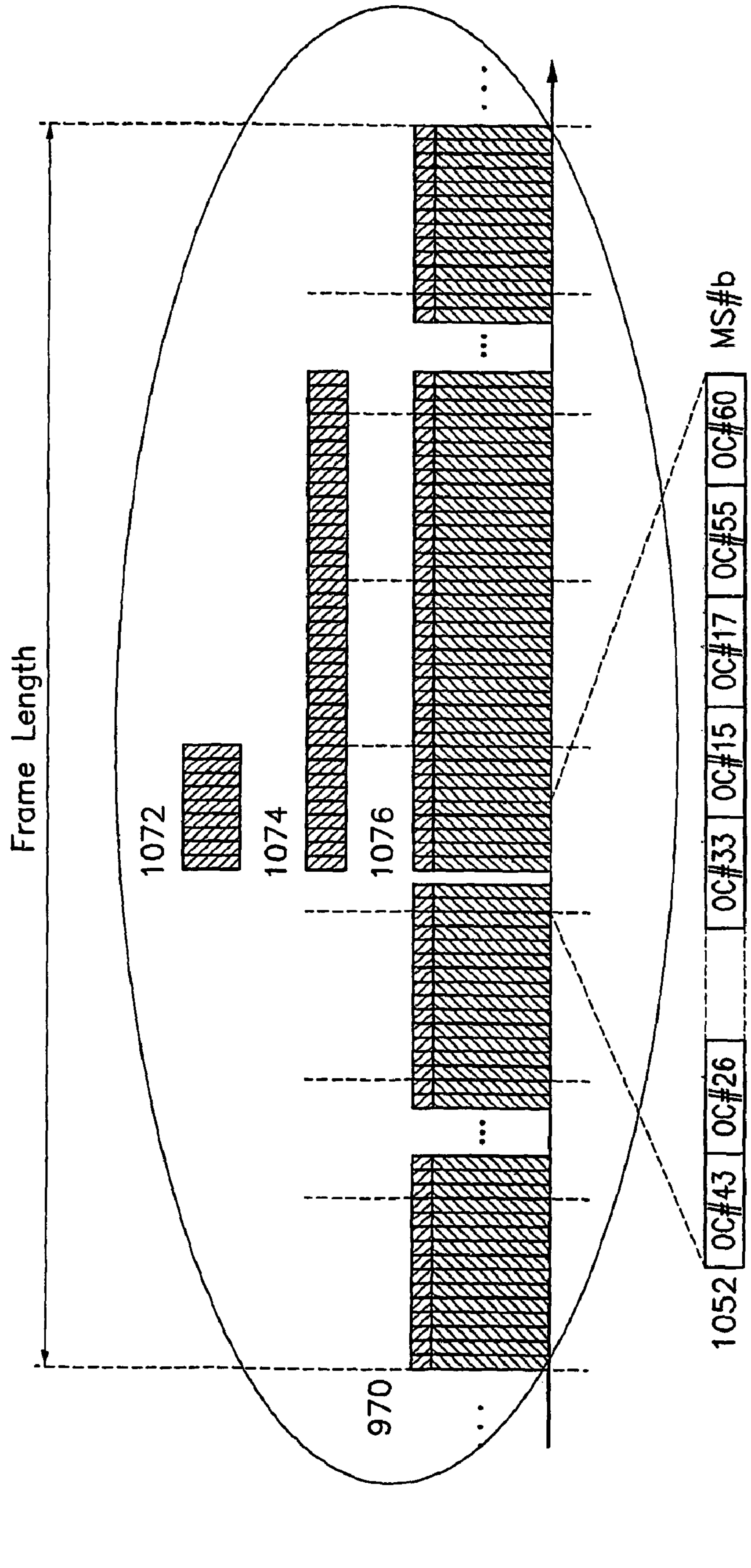
FIG. 15 shows that the transmission power of the primary station is increased for a predetermined interval of the frame including data symbols not transmitted so as to compensate for the average receiving energy requested by a channel decoder and thereby guarantee a desired communication quality when the transmission is stopped in a multidimensional hopping pattern conflict interval as shown in FIGS. 14*g*, 14*k*, 14*o*, 14*r*, 14*u*, 14*x* and 14*aa;*

FIG. 15 illustrates that the transmission power of the primary station is increased for a defined interval after a non-transmitted data symbol to compensate for the average received energy required by a channel decoder for the purpose of meeting a desired communication quality when transmission is stopped in a multidimensional hopping pattern collision interval as shown in FIGS. 14*g*, 14*k*, 14*o*, 14*r*, 14*u* and 14*x*. If it is possible to determine the number of data symbols damaged due to a multidimensional hopping pattern collision in the corresponding frame prior to the start time of the frame, the effect of the damage can be reduced with a maximized statistical multiplexing gain by previously adjusting the variation of the received energy caused by the damage as denoted by reference number 1076 of FIG. 15.

Figure 16:
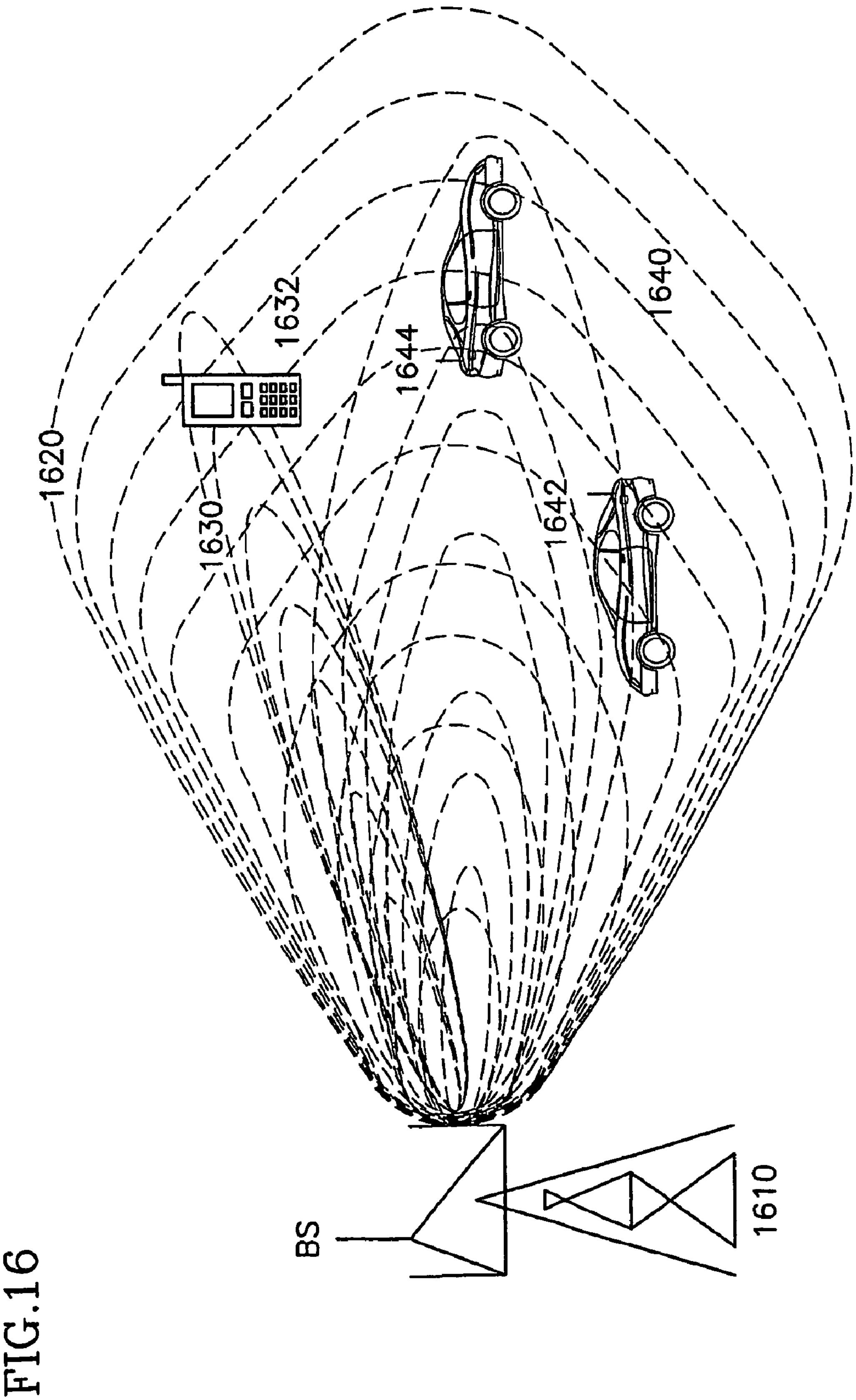
FIG. 16 is an illustration explaining that transmission is stopped due to a collision of multidimensional hopping patterns and that unmatched transmit data symbols is independently controlled by the respective transmit antenna beams of the primary station that secure spatial orthogonality.

Because of the multidimensional hopping pattern collision and unmatched transmit data symbols, transmission is stopped for a channel group present in the same transmitter antenna beam from the primary station. With a plurality of transmitter antenna beams 1120, 1130 and 1140 from the primary station as the smart antenna of FIG. 16, transmission is not stopped in the collision interval for channels 1132, 1142 and 1144 in the non-overlapped transmitter antenna beams 1130 and 1140 in spite of the multidimensional hopping pattern collision.

In the embodiment of the present invention, a loss of transmit data may occur intentionally in the multidimensional hopping pattern collision interval when the multidimensional orthogonal resource hopping multiplexing is performed with a pseudo-random hopping pattern. To reconstitute data present in the data loss interval at the receiver in this case, channel encoding at the transmitter and channel decoding at the receiver are necessarily used.

As described above, an intentional loss of transmit data is inevitable in the multidimensional orthogonal resource hopping multiplexing using channel-independent hopping patterns as adopted to maximize the statistical multiplexing gain. The following description will be given as to different algorithms for controlling a transmit signal from the primary station for reducing the effect of the data loss and thereby increasing the channel decoding gain at the receiver of the secondary stations.

Figure 17:
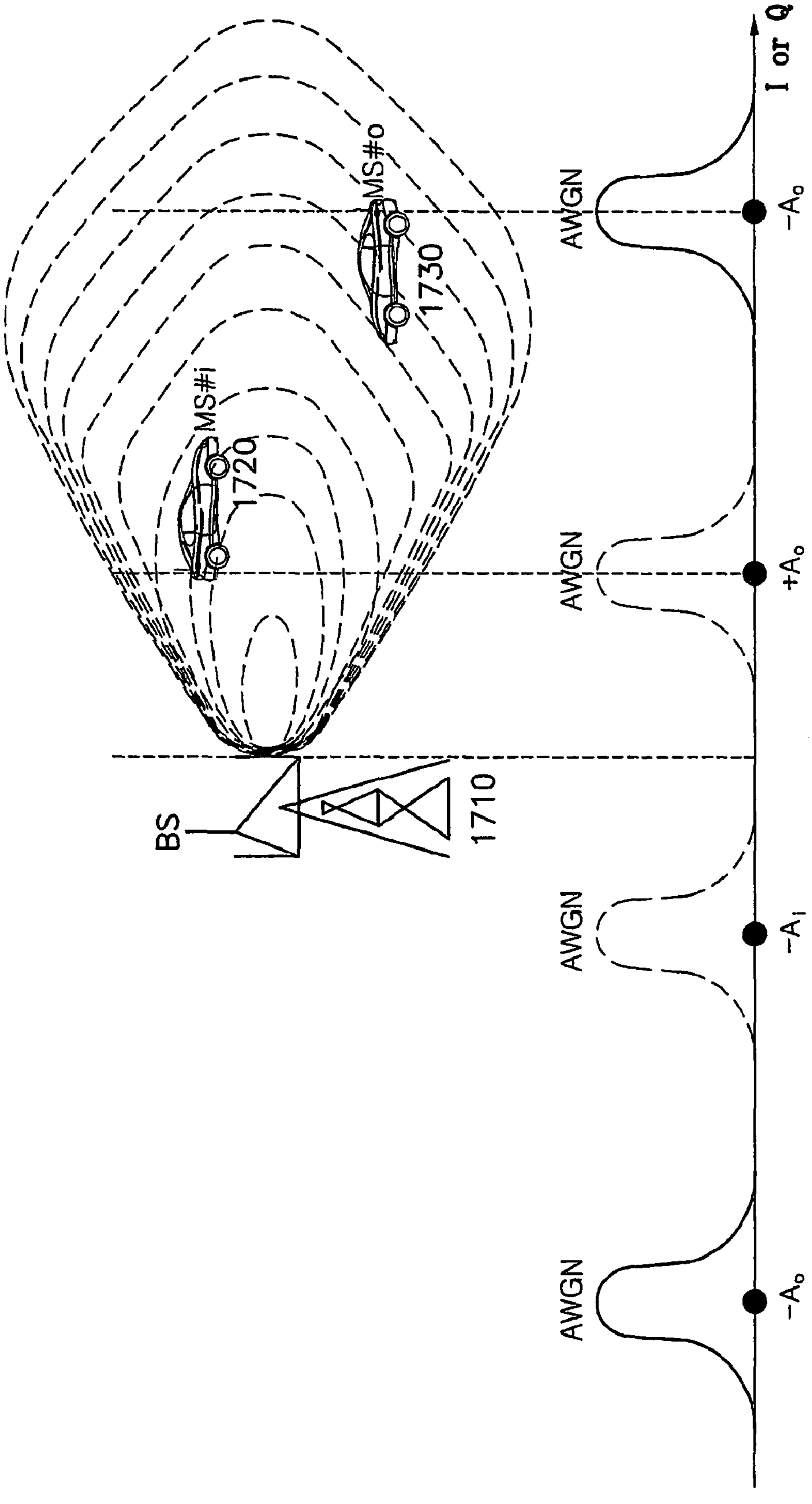
FIG. 17 is an illustration showing the difference in transmission power from the primary station between a secondary station near to the primary station for the same data service and a secondary station far from the primary station.

FIG. 17 shows the difference of transmission power from the primary station 1710 between a secondary station 1720 near the primary station and another secondary station 1730 far away from the primary station for the same data service. In the figure, the difference of transmission power from the primary station 1710 is illustrated simply according to the distance from the primary station to each secondary station. Actually, contrary to FIG. 17, the higher transmission power may be necessary to the secondary station 1720 nearer to the primary station according to a transmission power control of the primary station (open-loop transmission power control) or the secondary station (closed-loop transmission power control) based on the primary station's estimation using the intensity of the signal received from the secondary station so as to overcome fading. But this problem is not so significant to change the bottom line of the present invention. Expediently, it is assumed herein that the distance between the primary station and each secondary station is proportionate to the intensity of the transmission power from the primary station. The primary station 1710 sends a signal having an amplitude of $A_i$ (transmission power of $A_i^2$) to the nearer secondary station 1720 and a signal having an amplitude of $A_0$ (transmission power of $A_0^2$) to the secondary station 1730.

In the following description of FIGS. 18 to 25, signals are all considered as a complex number composed of real part (I-channel) and imaginary part (Q-channel). The description will be given primarily in regard to the real part (I-channel) but is the same to the imaginary part (Q-channel). The real part may be negative, zero, or positive. In each case, the I-channel transmit signal actually transferred during a multidimensional orthogonal resource hopping pattern collision can be determined as $A_I=+A_I^++A_I^-$, where $A_I^+$ is the sum of transmit signals for I-channels having a positive value during the collision; and $A_I^-$ is the sum of transmit signals for I-channels having a negative value during the collision. All the channels allowed to be connected by the primary station by the orthogonal wireless resource units in the unit of data symbol intervals must be included in any one set of $S^0$, $S^+$ and $S^-$. Here, S is the set of all the channels allowed to be connected by the primary station; $S^0$ is the set of channels included in the set S that are not selecting the corresponding orthogonal wireless resource; $S^+$ is the set of channels having a positive value among the channels selecting the orthogonal wireless resource; and $S^-$ is the set of channels having a negative value among the channels selecting the orthogonal wireless resource.

Figure 18A:
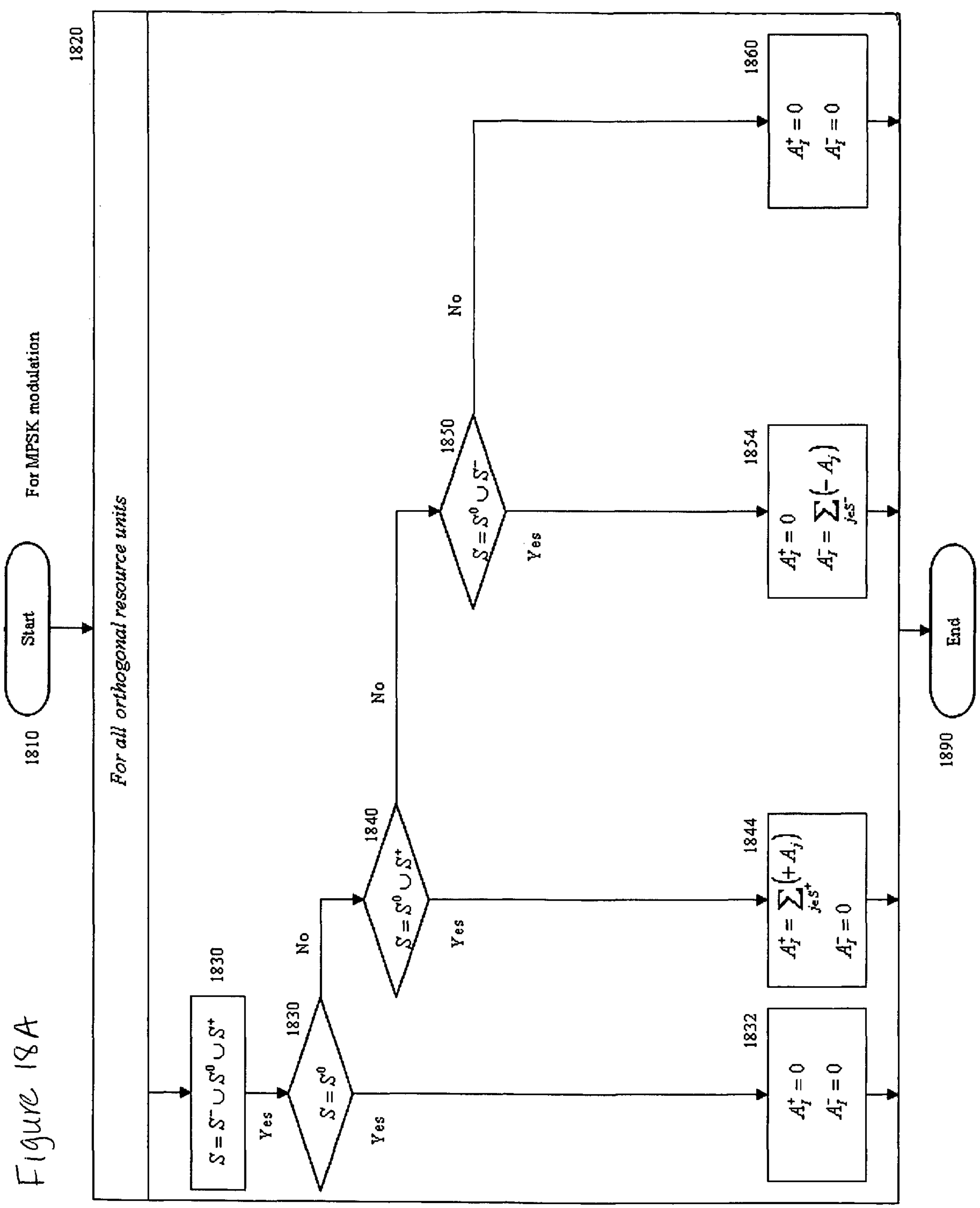
FIG. 18*a* is a flow chart showing a first method for determining a transmit signal by the respective orthogonal wireless resource units at a transmitter from the primary station to the secondary station according to an embodiment of the present invention (a bisectional method of transmission and perforating)

FIG. 18*a* is a flow chart showing the first method for determining a transmit signal by the respective orthogonal wireless resource units at a transmitter from the primary station to the secondary station according to an embodiment of the present invention. The first method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0\cup S^+$ (in step 1840), which means that all the channels selecting the orthogonal wireless resource unit have a positive value, the primary station transmits the orthogonal wireless resource unit having a value of $$A_I=\sum_{j\in S^+}(+A_j)\left(A_I^+=\sum_{j\in S^+}(+A_j),\text{ and }A_I^-=0\right).$$

For $S=S^0\cup S^-$ (in step 1850), which means that all the channels selecting the orthogonal wireless resource unit have a negative value, the primary station transmits the orthogonal wireless resource unit having a value of $$A_I=\sum_{j\in S^-}(-A_j)\left(A_I^+=0,\text{ and }A_I^-=\sum_{j\in S^-}(-A_j)\right).$$

For $S^+\neq\{\ \}$ and $S^-\neq\{\ \}$ (in step 1860), the I-channel transmit signal is set as $A_I=0$ ($A_I^+=0$, and $A_I^-=0$) so that the primary station does not transmit the orthogonal wireless resource unit.

Figure 18B:
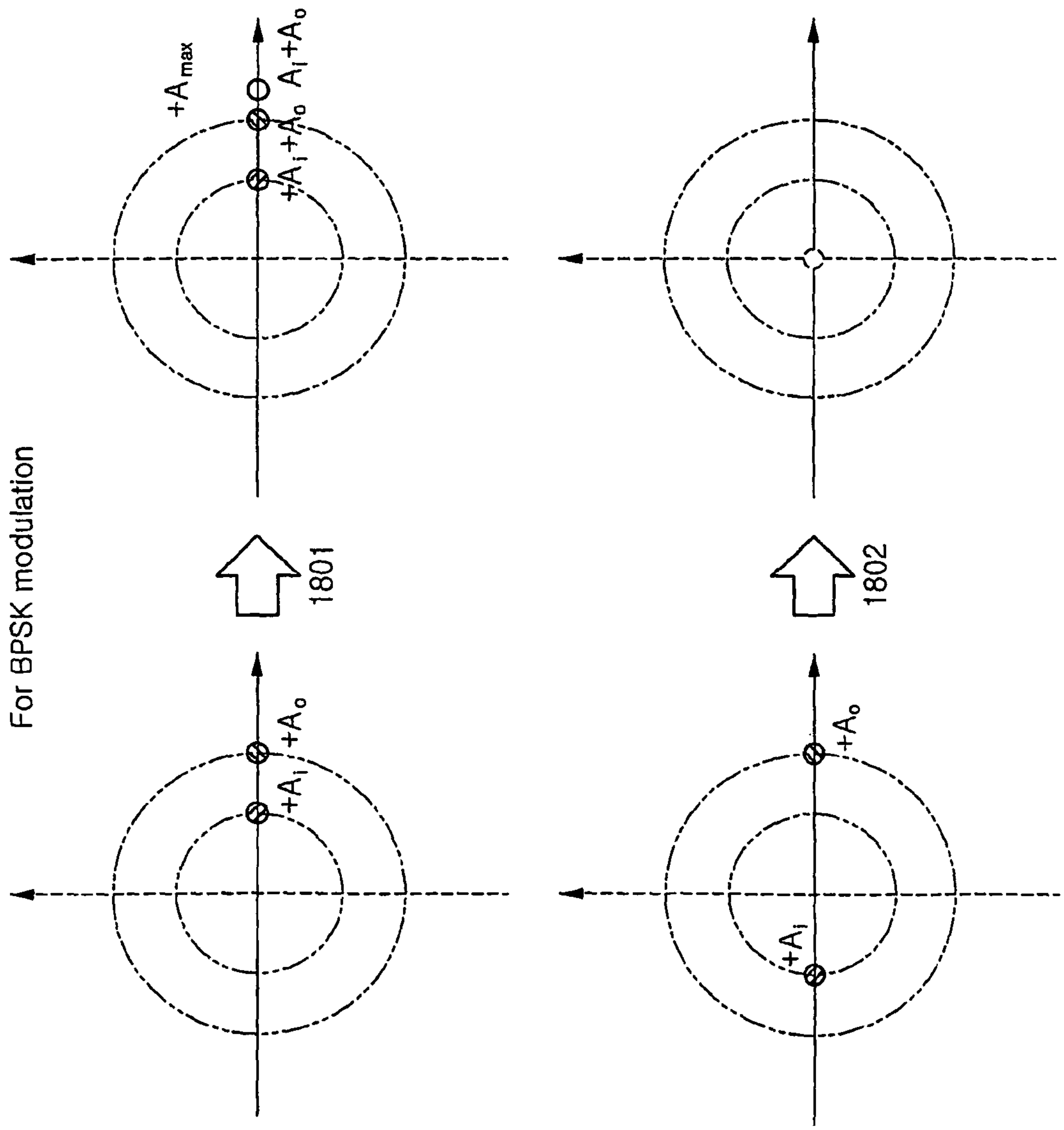
FIG. 18*b* illustrates the determination of the final transmit signal using the method of FIG. 18*a* in the case of a multidimensional orthogonal resource hopping pattern collision between two channels.

FIG. 18*b* illustrates the determination of the final transmit signal using the method of FIG. 18*a* in the case of a multidimensional orthogonal resource hopping pattern collision between two channels. Let the two channels select the same orthogonal wireless resource unit in the same data symbol interval. When the data symbol values are $+A_i$ and $+A_0$ ($A_i<A_0$), then the final data symbol value transferred by the orthogonal wireless resource unit is $A_I=0$ (in step 1802).

Figure 18C:
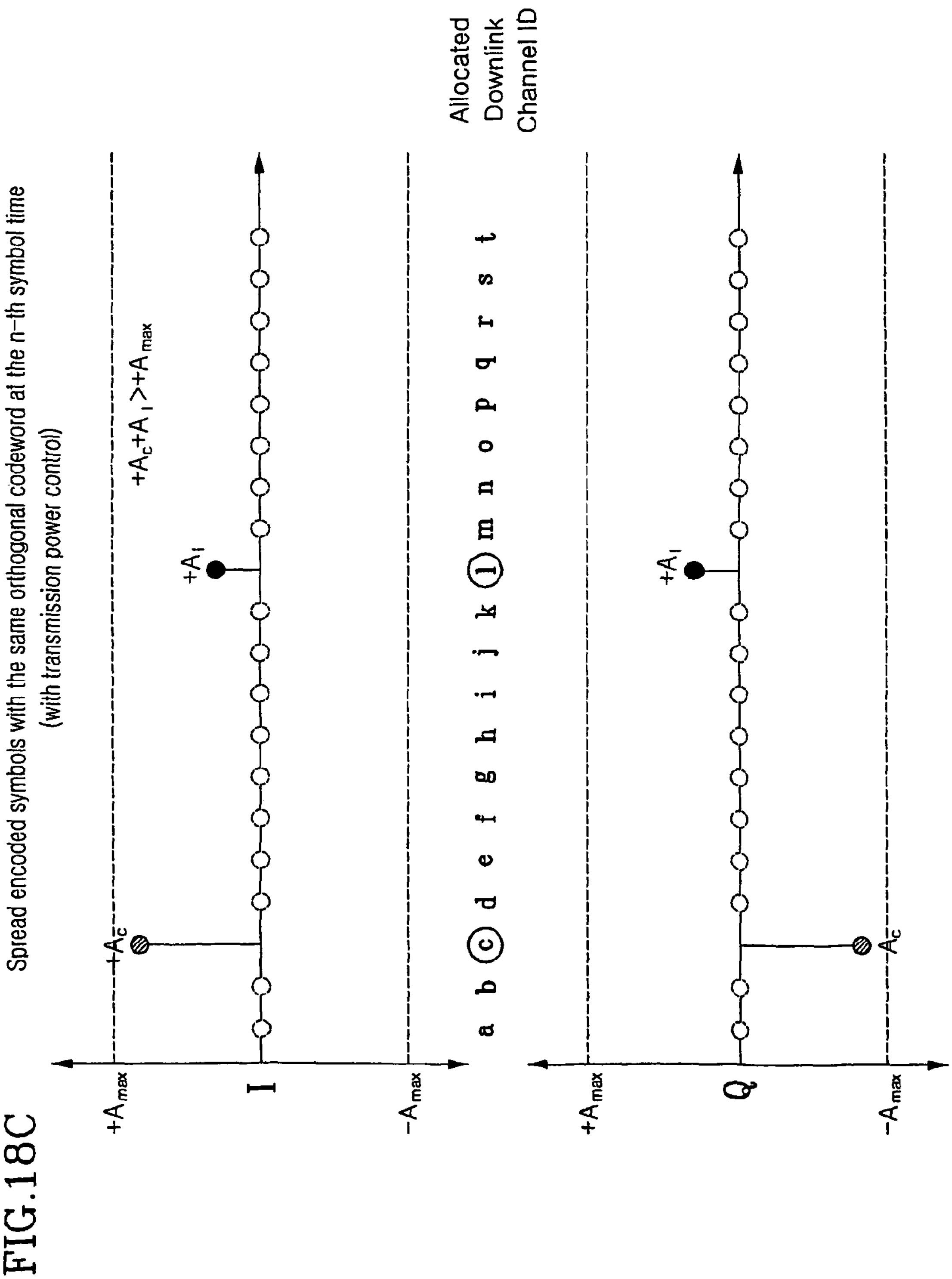
FIG. 18*c* illustrates a multidimensional orthogonal resource hopping pattern collision between two channels c and I for explaining the determination of the final transmit signal using the method of FIG. 18*a;*

FIG. 18*c* illustrates a multidimensional orthogonal resource hopping pattern collision between two channels c and I for explaining the determination of the final transmit signal using the method of FIG. 18*a*. For I-channels, $S^0=\{a, b, d, e, f, g, h, i, j, k, m, n, o, p, q, r, s, t\}$, $S^+=\{c, I\}$, and $S^-=\{\ \}=\phi$ (empty set). For Q-channels, $S^0=\{a, b, d, e, f, g, h, i, j, k, m, n, o, p, q, r, s, t\}$, $S^+=\{I\}$, and $S^-=\{c\}$.

Figure 18D:
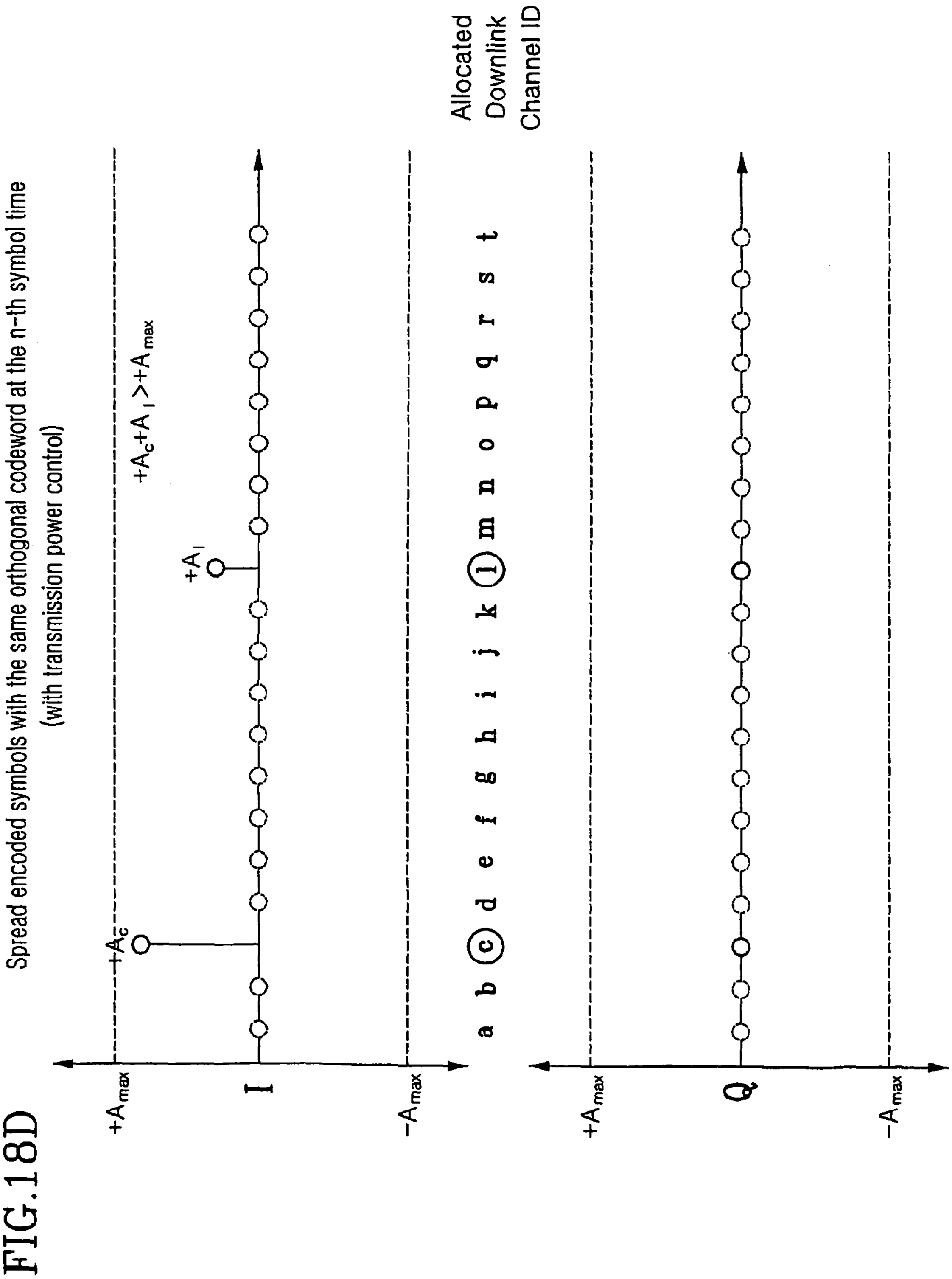
FIG. 18*d* illustrates the final transmit signal determined according to the algorithm of FIG. 18*a* in case of FIG. 18*c;*

FIG. 18*d* illustrates the final transmit signal determined according to the algorithm of FIG. 18*a* in case of FIG. 18*c*. For I-channels, $A_c+A_I>A_{max}$ but the orthogonal wireless resource unit has a value of $A_I=A_c+A_I(A_I^+=A_c+A_I$, and $A_I^-=0)$ by sending the original signals of channels c and I as they are. For Q-channels, the transmit signal of channel c has an opposite sign to that of channel I and the orthogonal wireless resource unit has a value of $A_Q=0$ ($A_Q^+=0$, and $A_Q^-=0$).

Figure 19A:
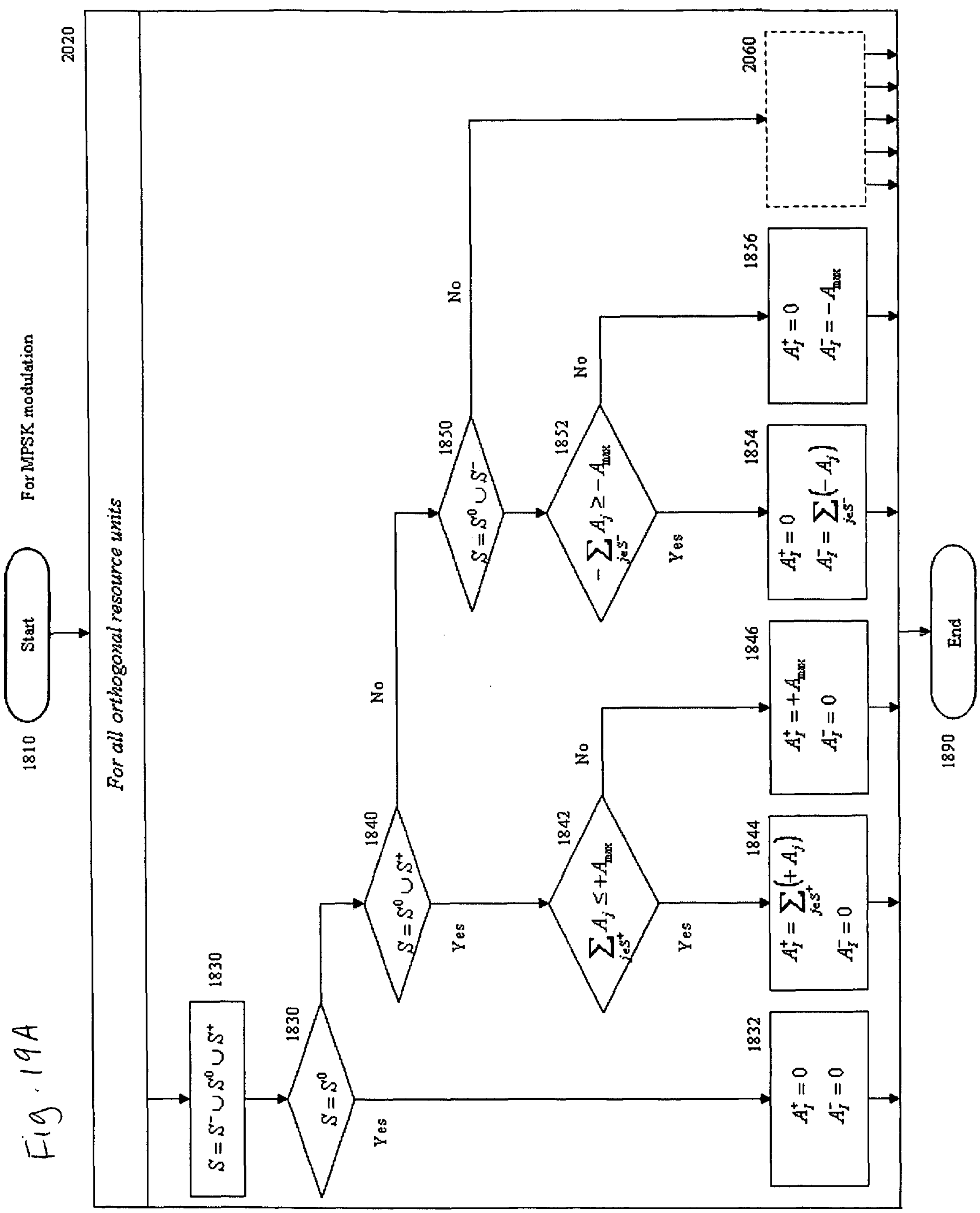
FIG. 19*a* is a flow chart showing a second method for determining a transmit signal by the respective orthogonal wireless resource units at a transmitter from the primary station to the secondary station according to an embodiment of the present invention (a method having a threshold value of transmission power)

FIG. 19*a* is a flow chart showing the second method for determining a transmit signal by the respective orthogonal wireless resource units at a transmitter from the primary station to the secondary station according to an embodiment of the present invention. The second method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0\cup S^+$ (in step 1840), it means that all the channels selecting the orthogonal wireless resource unit have a positive value. If $$\sum_{j\in S^+}(+A_j)\le +A_{max}(\text{in step 1842}),$$

then the primary station transmits the orthogonal wireless resource unit having a value of $$A_I=\sum_{j\in S^+}(+A_j)\left(A_I^+=\sum_{j\in S^+}(+A_j),\text{ and }A_I^-=0\right);$$

otherwise, the primary station transmits the orthogonal wireless resource unit having a value of $A_I=+A_{max}(A_I^+=+A_{max}$, and $A_I^-=0)$. For $S=S^0\cup S^-$ (in step 1850), it means that all the channels selecting the orthogonal wireless resource unit have a negative value. If $$\sum_{j\in S^-}(-A_j)\ge -A_{\max}(\text{in step 1852}),$$

then the primary station transmits the orthogonal wireless resource unit having a value of $$A_I=\sum_{j\in S^-}(-A_j)\left(A_I^+=0,\text{ and }A_I^-=\sum_{j\in S^-}(-A_j)\right);$$

otherwise, the primary station transmits the orthogonal wireless resource unit having a value of $A_I=-A_{max}(A_I^+=0$, and $A_I^-=+A_{max})$. For $S^+\neq\{\ \}$ and $S^-\neq\{\ \}$ (in step 1960), the I-channel transmit signal is set as $A_I=0$ ($A_I^+=0$, $A_I^-=0$) so that the primary station does not transmit the orthogonal wireless resource unit.

Figure 19B:
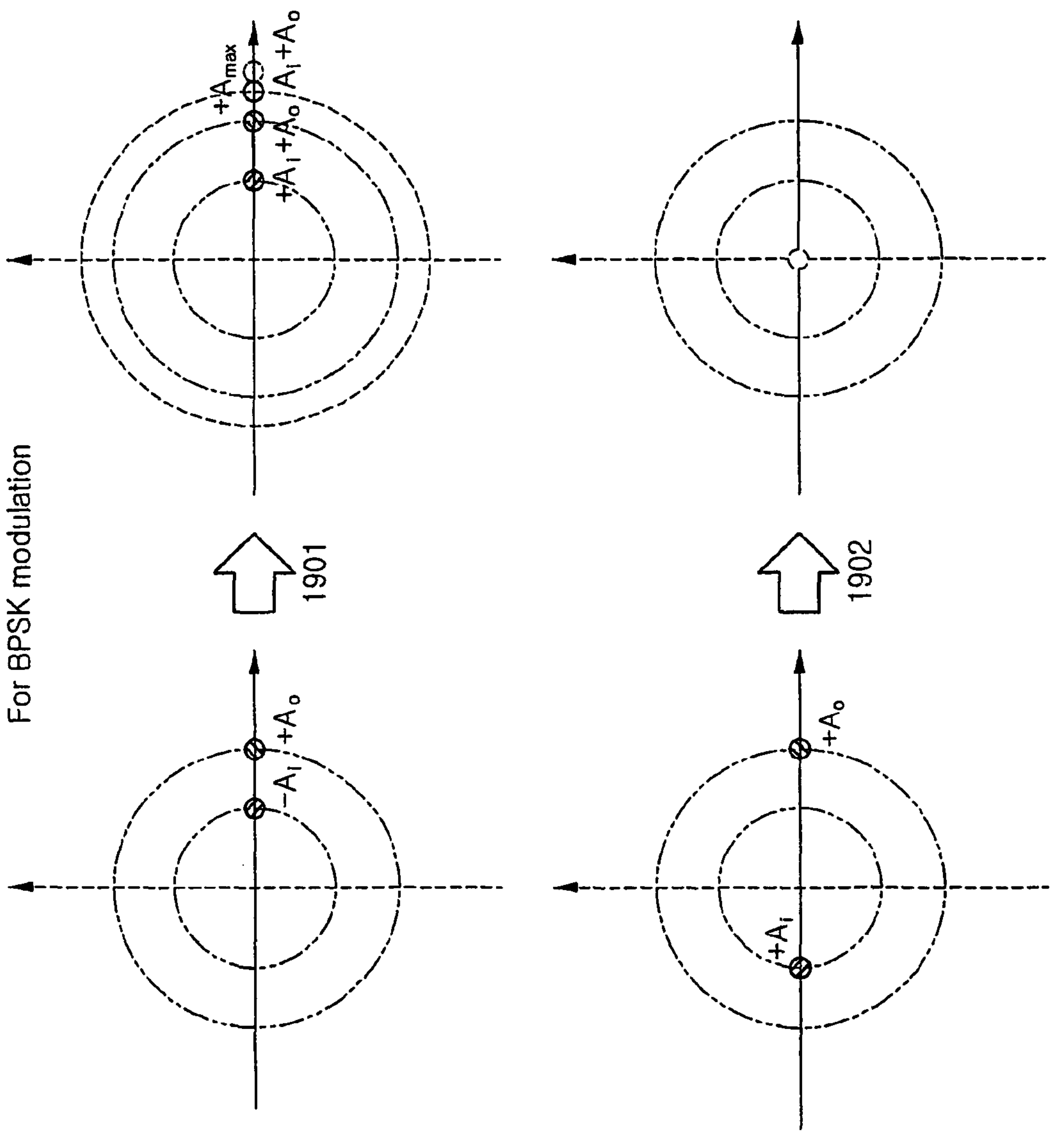
FIG. 19*b* illustrates the determination of the final transmit signal using the method of FIG. 19*a* in the case of a multidimensional orthogonal resource hopping pattern collision between two channels.

FIG. 19*b* illustrates the determination of the final transmit signal using the method of FIG. 19*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=+A_{max}$ because $A_i+A_0>+A_{max}$ (in step 1901). If the data symbol values are $-A_i$ and $+A_0$ ($A_i<A_0$), then the final data symbol value transferred by the orthogonal wireless resource unit is $A_I=0$ (in step 1902). Here, $A_{max}$ for curbing the increase of an unnecessary interference is determined as a system parameter.

Figure 19C:
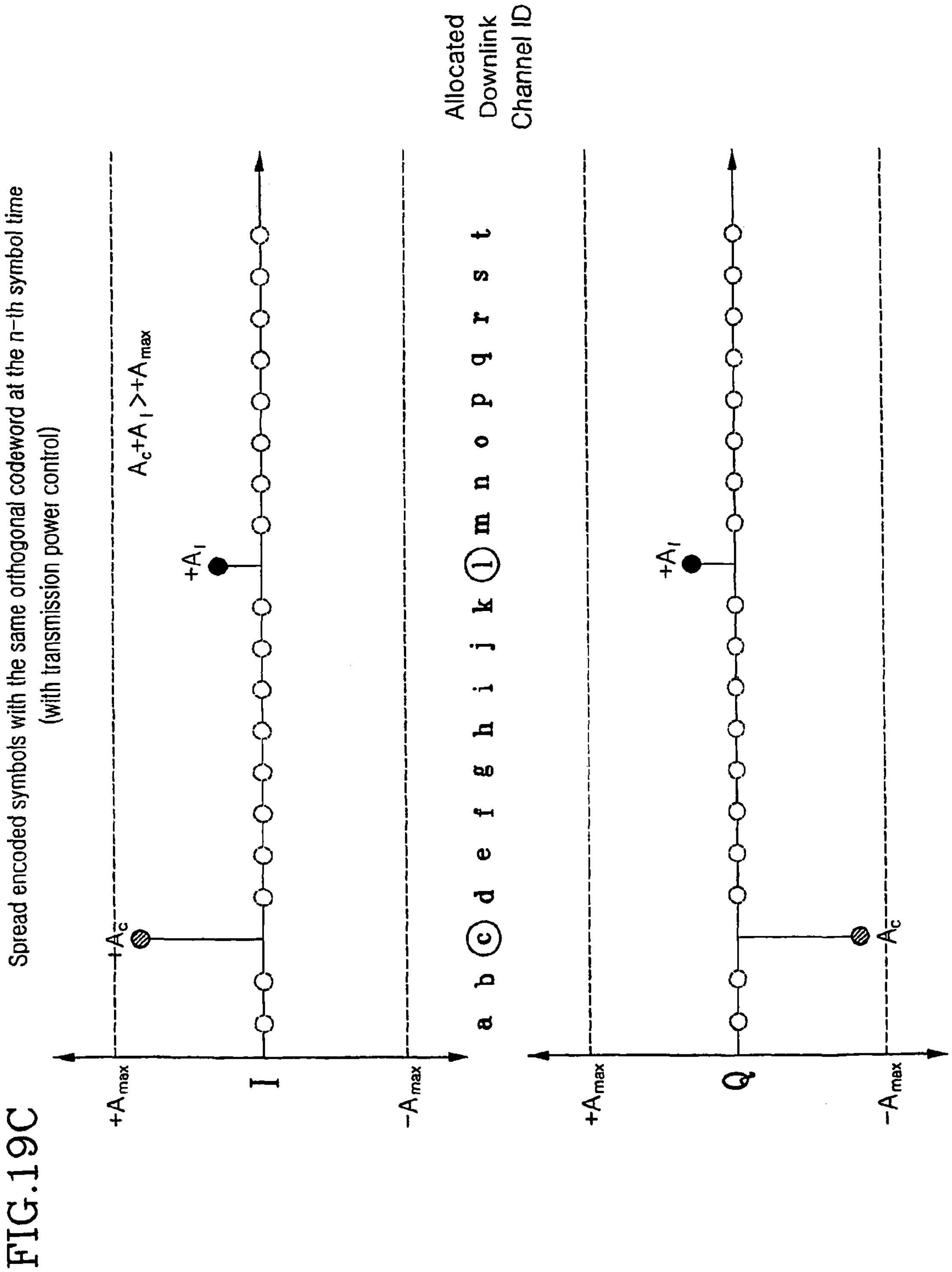
FIG. 19*c* illustrates a multidimensional orthogonal resource hopping pattern collision between two channels c and I for explaining the determination of the final transmit signal using the method of FIG. 19*a;*

FIG. 19*c* illustrates a multidimensional orthogonal resource hopping pattern collision between two channels c and I for explaining the determination of the final transmit signal using the method of FIG. 19*a*. For I-channels, $S^0=\{a, b, d, e, f, g, h, i, j, k, m, n, o, p, q, r, s, t\}$, $S^+=\{c, I\}$, and $S^-=\{\ \}=\phi$ (empty set). For Q-channels, $S^0=\{a, b, d, e, f, g, h, i, j, k, m, n, o, p, q, r, s, t\}$, $S^+=\{I\}$, and $S^-=\{c\}$.

Figure 19D:
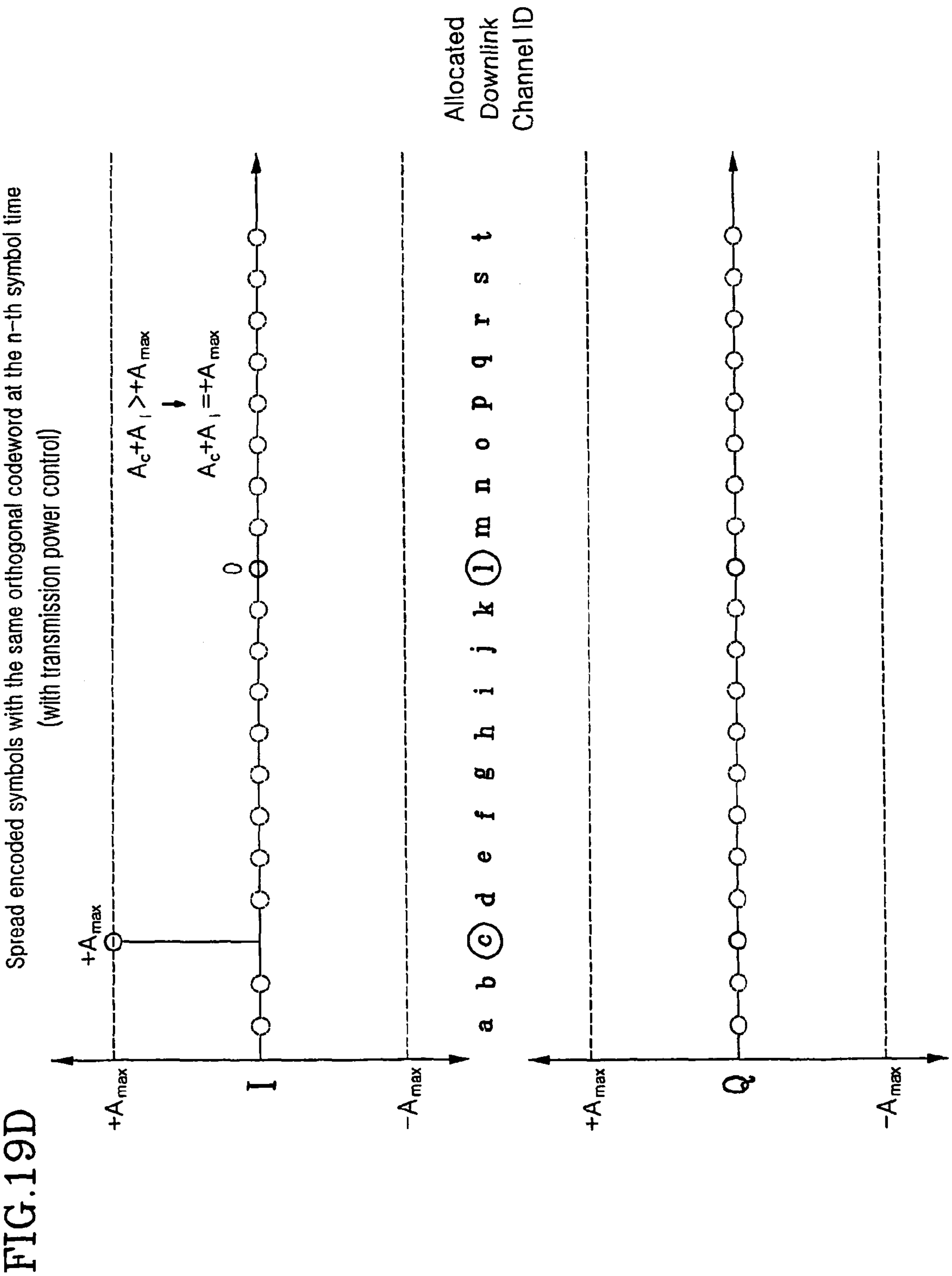
FIG. 19*d* illustrates the final transmit signal determined according to the algorithm of FIG. 19*a* in case of FIG. 19*c;*

FIG. 19*d* illustrates the final transmit signal determined according to the algorithm of FIG. 19*a* in case of FIG. 19*c*. For I-channels, $+A_c+A_I>A_{max}$ but the orthogonal wireless resource unit has a value of $A_I=+A_{max}(A_I^+=+A_{max}$, and $A_I^-=0)$ by sending the original signals of channels c and I as they are. For Q-channels, the transmit signal of channel c has an opposite sign to that of channel I and the orthogonal wireless resource unit has a value of $A_Q=0(A_Q^+=0$, and $A_Q^-=0)$.

FIG. 20*a* is a flow chart showing the third method for determining a transmit signal by the respective orthogonal wireless resource units at a transmitter from the primary station to the secondary station according to an embodiment of the present invention. The third method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0\cup S^+$ (in step 1840), it means that all the channels selecting the orthogonal wireless resource unit have a positive value. If $$\sum_{j\in S^+}(+A_j)\le +A_{max}(\text{in step 1842}),$$

then the primary station transmits the orthogonal wireless resource unit having a value of $$A_I=\sum_{j\in S^+}(+A_j)\left(A_I^+=\sum_{j\in S^+}(+A_j),\text{ and }A_I^-=0\right);$$

otherwise, the primary station transmits the orthogonal wireless resource unit having a value of $A_I=+A_{max}(A_I^+=A_{max}$, and $A_I^-=0)$. For $S=S^0\cup S^-$ (in step 1850), it means that all the channels selecting the orthogonal wireless resource unit have a negative value. If $$\sum_{j\in S^-}(-A_j)\geq -A_{max}\text{(in step 1852)},$$

then the primary station transmits the orthogonal wireless resource unit having a value of $$A_I=\sum_{j\in S^-}(-A_j)\left(A_I^+=0,\text{ and }A_I^-=\sum_{j\in S^-}(-A_j)\right);$$

otherwise, the primary station transmits the orthogonal wireless resource unit having a value of $A_I=-A_{max}$($A_I^+=0$, and $A_I^-=+A_{max}$). For $S^+\neq\{\ \}$ and $S^-\neq\{\ \}$ (in step 2060), the reference value is determined as the larger one ($\max\{\min\{A_i, i\in S^+\}\min\{A_i, i\in S^-\}\}$) of the smallest amplitude having a positive value ($\min\{A_i, i\in S^+\}$) and the smallest amplitude having a negative value ($\min\{A_i, i\in S^-\}$) (in step 2062). If the smaller one is the smallest amplitude having a positive value ($\max\{\min\{A_i, i\in S^+\}\min\{A_i, i\in S^-\}\}=\min\{A_i, i\in S^+\}$), then a set of channels having a negative value and an amplitude of less than $\theta\cdot\min\{A_i, i\in S^+\}$ is defined as $S^*$ ($0\leqq\theta\leqq1$). If $S^*$ is an empty set (in step 2081), then the I-channel transmit signal is set as $A_I=0$ ($A_I^+=0, A_I^-=0$) so that the primary station does not transmit the orthogonal wireless resource unit (in step 2089). If the sum of the amplitudes of all the channels in $S^*$ is less than $\theta\cdot\min\{A_i, i\in S^+\}$ (in step 2083), then the primary station transmits the orthogonal wireless resource unit having a value of $$A_I=\sum_{j\in S^-}(-A_j)\left(A_I^+=0\text{ and }A_I^-=\sum_{j\in S^-}(-A_j)\right)\text{ (in step 2083)};$$

otherwise, the primary station transmits the orthogonal wireless resource unit having a value of $A_I=-\theta\cdot\min\{A_i, i\in S^+\}$ ($A_I^+=0$, and $A_I^-=-\theta\cdot\min\{A_i,\in S^*\}$) (in step 2087). If the smaller one is the smallest amplitude having a negative value ($\max\{\min\{A_i,\in S^+\}\min\{A_i,\in S^-\}\}=\min\{A_i,\in S^-\}$), then a set of channels having a positive value and an amplitude of less than $\theta\cdot\min\{A_i,\in S^-\}$ is defined as $S^*$. If $S^*$ is an empty set (in step 2082), then the I-channel transmit signal is set as $A_I=0$ ($A_I^+=0, A_I^-=0$) so that the primary station does not transmit the orthogonal wireless resource unit (in step 2089). If the sum of the amplitudes of all the channels in $S^*$ is less than $\theta\cdot\min\{A_i,\in S^-\}$ (in step 2084), then the primary station transmits the orthogonal wireless resource unit having a value of $$A_I\sum_{j\in S^*}(+A_j)\left(A_I^+=\sum_{j\in S^*}(+A_j)\text{ and }A_I^-=0\right)\text{ (in step 2086)};$$

otherwise, the primary station transmits the orthogonal wireless resource unit having a value of $A_I=+\theta\cdot\min\{A_i,\in S^-\}$ ($A_I^+=\theta\cdot\min\{A_i,\in S^*\}$ and $A_I^-=0$) (in step 2088).

Figure 20B:
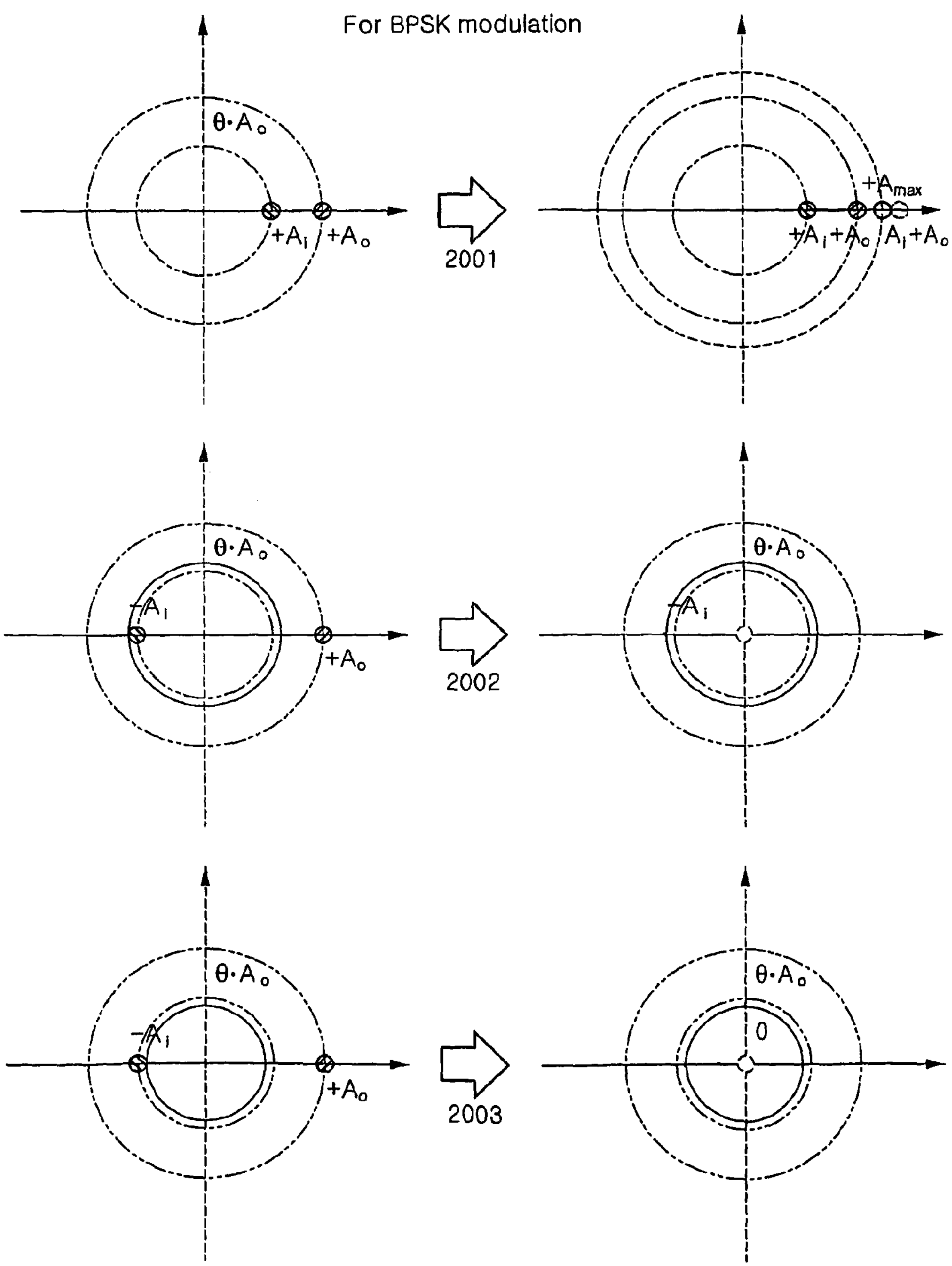
FIG. 20*b* illustrates the determination of the final transmit signal using the method of FIG. 20*a* in the case of a multidimensional orthogonal resource hopping pattern collision between two channels.

FIG. 20*b* illustrates the determination of the final transmit signal using the method of FIG. 20*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=A_{max}$ because $A_i+A_0>+A_{max}$ (in step 2001). If the data symbol values are $-A_i$ and $+A_0$ ($A_i<A_0$), then the final data symbol value transferred by the orthogonal wireless resource unit is $A_I=-A_i$ ($A_I^+=0$, and $A_I^-=-A_i$) for $A_i\leqq+\theta A_0$ (in step 2002), and $A_I=0$ ($A_I^+=0$, and $A_I^-=0$) for $A_i>+\theta A_0$ (in step 2003). Here, $A_{max}$ for curbing the increase of an unnecessary interference and $\theta$ for determining whether to perforate are given as a system parameter. independently by I- and Q-channels. The determination of $A_{max}$ and $\theta$ is affected by $|\min\{A_i, i\in S^+\}-\min\{A_i, i\in S^-\}|$ of the I- and Q-channels.

Figure 20C:
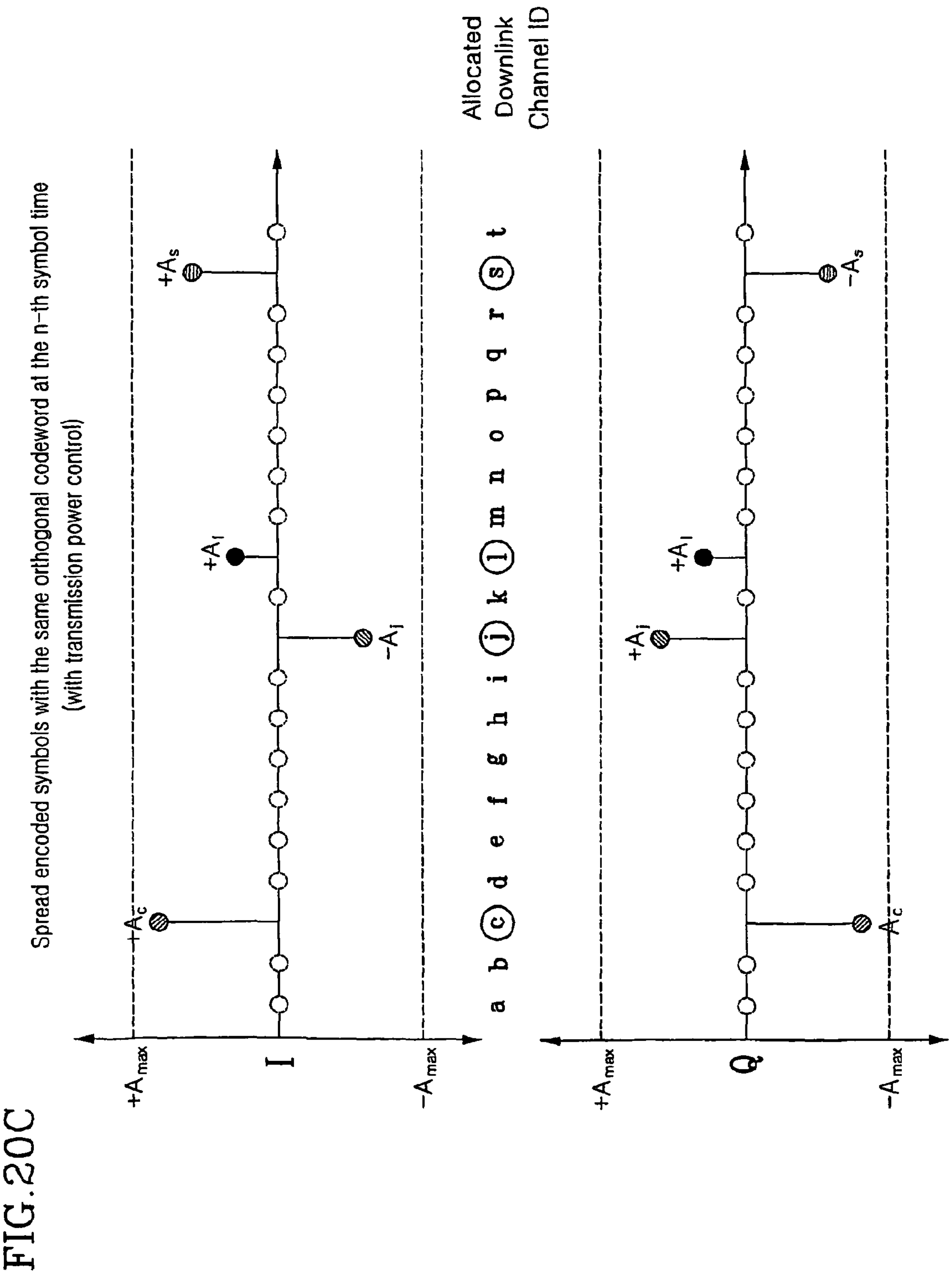
FIG. 20*c* illustrates a multidimensional orthogonal resource hopping pattern collision among four channels c, j, I and s for explaining the determination of the final transmit signal using the method of FIG. 20*a;*

FIG. 20*c* illustrates a multidimensional orthogonal resource hopping pattern collision among four channels c, j, I and s for explaining the determination of the final transmit signal using the method of FIG. 20*a*. For I-channels, $S^0=\{a, b, d, e, f, g, h, i, j, k, m, n, o, p, q, r, t\}$, $S^+=\{c, I, s\}$, and $S^-=\{j\}$. For Q-channels, $S^0=\{a, b, d, e, f, g, h, i, j, k, m, n, o, p, q, r, t\}$, $S^+=\{j, I\}$, and $S^-=\{c, s\}$.

Figure 20D:
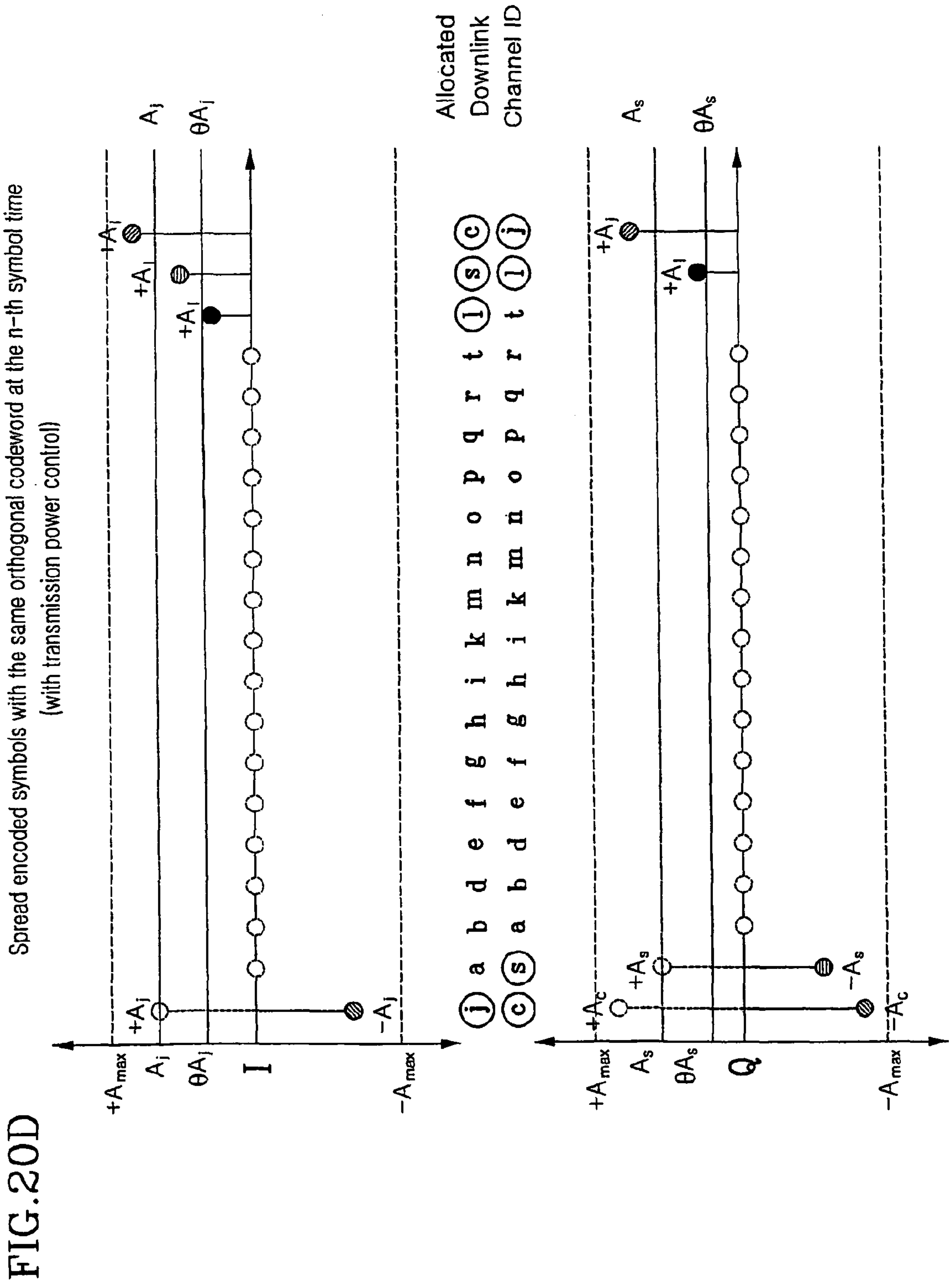
FIG. 20*d* shows a channel arrangement for comparing the amplitudes of channels selecting the orthogonal wireless resource unit in case of FIG. 20*c;*

FIG. 20*d* shows a channel arrangement for comparing the amplitudes of channels selecting the orthogonal wireless resource unit in case of FIG. 20*c*. For I-channels, the reference value determined by the steps 2062 and 2070 is the size of the j-th channel ($-A_j$). For Q-channels, the reference value determined by the steps 2062 and 2070 is the size of the s-th channel ($-A_s$).

Figure 20E:
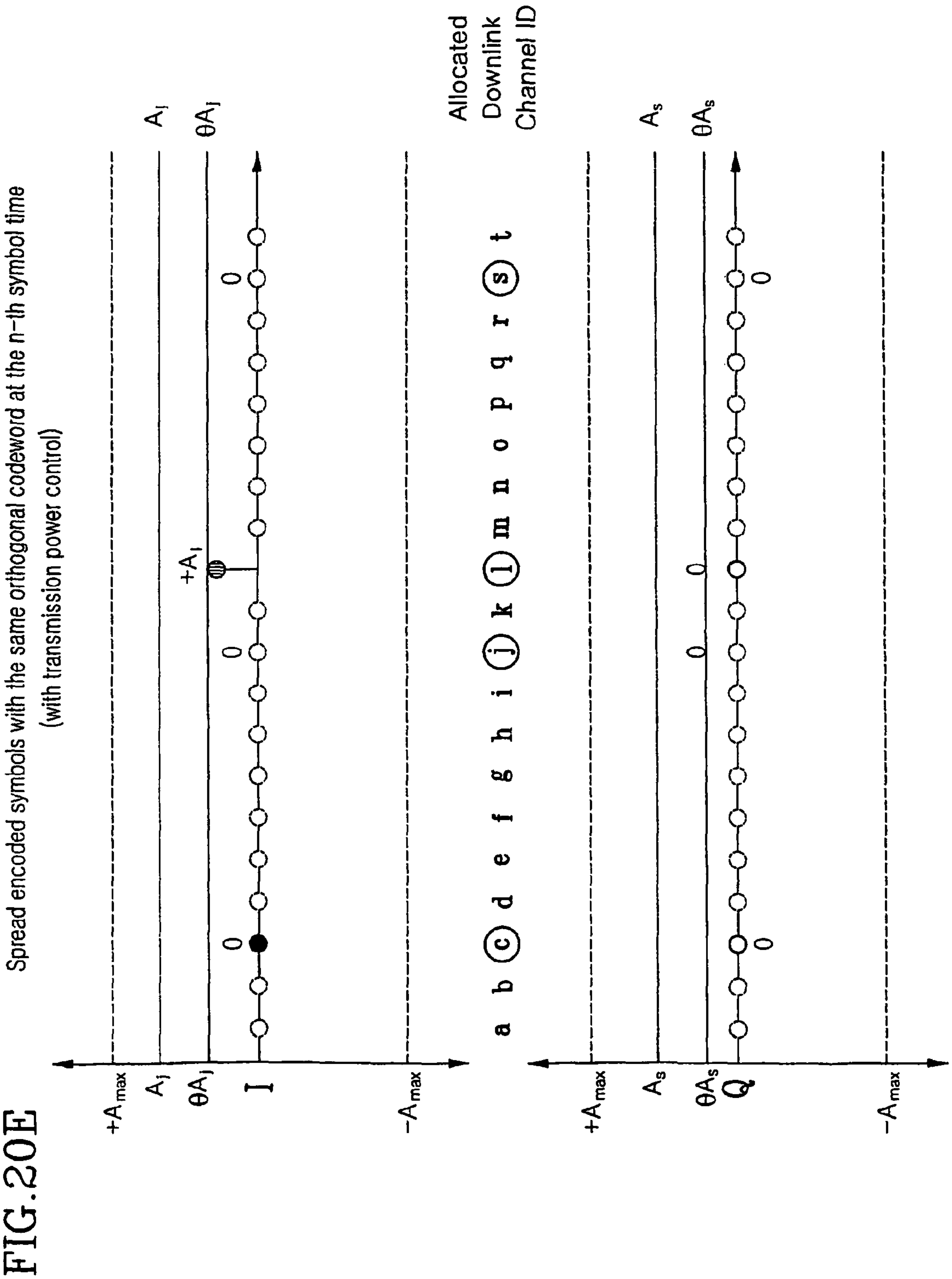
FIG. 20*e* illustrates the final transmit signal determined according to the algorithm of FIG. 20*a* in case of FIG. 20*c;*

FIG. 20*e* illustrates the final transmit signal determined according to the algorithm of FIG. 20*a* in case of FIG. 20*c*. For I-channels, the channel having a value of less than $\theta A_j$ is the I-th channel, and thus the orthogonal wireless resource unit has a value of $A_I=+A_I$($A_I^+=+A_I$, and $A_I^-=0$). In FIG. 20*e*, the channels c, j and s are OFF ($A_c=0$, $A_j=0$, and $A_s=0$) and only the channel I is ON (transmission) ($A_I\neq0$). But the amplitude of each channel is not important as long as the sum of the amplitudes satisfies $A_c+A_j+A_I+A_s=A_I$. For Q-channels, there is no channel having a value of less than $\theta A_s$, and thus the orthogonal wireless resource unit has a value of $A_Q=0$ ($A_Q^+=0$, and $A_Q^-=0$).

FIG. 21*a* is a flow chart showing the fourth method for determining a transmit signal by the respective orthogonal wireless resource units at a transmitter from the primary station to the secondary station according to an embodiment of the present invention. The fourth method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0\cup S^+$ (in step 1840), it means that all the channels selecting the orthogonal wireless resource unit have a positive value. If $$\sum_{j\in S^+}(+A_j)\leq +A_{max}\text{ (in step 1842)},$$

then the primary station transmits the orthogonal wireless resource unit having a value of $$A_I = \sum_{j \in S^+} (+A_j) \left( A_I^+ = \sum_{j \in S^+} (+A_j), \text{ and } A_I^- = 0 \right);$$

otherwise, the primary station transmits the orthogonal wireless resource unit having a value of $A_I=+A_{max}(A_I^+=+A_{max}$, and $A_I^-=0)$. For $S=S^0 \cup S^-$ (in step 1850), it means that all the channels selecting the orthogonal wireless resource unit have a negative value. If $$\sum_{j \in S^-} (-A_j) \geq -A_{max} \text{ (in step 1852)},$$

then the primary station transmits the orthogonal wireless resource unit having a value of $$A_I = \sum_{j \in S^-} (-A_j) \left( A_I^+ = 0, \text{ and } A_I^- = \sum_{j \in S^-} (-A_j) \right);$$

otherwise, the primary station transmits the orthogonal wireless resource unit having a value of $A_I=-A_{max}(A_I^+=0$, and $A_I^-=+A_{max})$. For $S^+ \neq \{\ \}$ and $S^- \neq \{\ \}$ (in step 2160), the reference value is determined as the larger one ($\max\{\min\{A_i, i \in S^+\}\min\{A_i, i \in S^-\}\}$) of the smallest amplitude having a positive value ($\min\{A_i, i \in S^+\}$) and the smallest amplitude having a negative value ($\min\{A_i, i \in S^-\}$) (in step 2062). If the smaller one is the smallest amplitude having a positive value ($\max\{\min\{A_i, i \in S^+\}\min\{A_i, i \in S^-\}\}=\min\{A_i, i \in S^+\}$), then a set of channels having a negative value and an amplitude of less than $\theta \cdot \min\{A_i, i \in S^+\}$ is defined as $S^*$ ($0 \leqq \theta \leqq 1$). If $S^*$ is an empty set (in step 2081), then the I-channel transmit signal is set as $A_I=0$ ($A_I^+=0, A_I^-=0$) so that the primary station does not transmit the orthogonal wireless resource unit (in step 2089). If $S^*$ is not an empty set, then the primary station transmits the orthogonal wireless resource unit having the largest amplitude $A_I=-\max\{A_i, i \in S^*\}(A_I^+=0$, and $A_I^-=-\max\{A_i, i \in S^*\})$ in the set $S^*$ (in step 2187). If the smaller one is the smallest amplitude having a negative value ($\max\{\min\{A_i, i \in S^+\}\min\{A_i, i \in S^-\}\}=\min\{A_i, i \in S^-\}$, then a set of channels having a positive value and an amplitude of less than $\theta \cdot \min\{A_i, i \in S^-\}$ is defined as $S^*$. If $S^*$ is an empty set (in step 2082), then the I-channel transmit signal is set as $A_I=0$ ($A_I^+=0, A_I^-=0$) so that the primary station does not transmit the orthogonal wireless resource unit (in step 2089). If $S^*$ is not an empty set, then the primary station transmits the orthogonal wireless resource unit having the largest amplitude in the set $S^*$, that is, $A_I=+\max\{A_i, i \in S^*\}(A_I^+=+\max\{A_i, i \in S^*\}$, and $A_I^-=0)$ (in step 2188).

Figure 21B:
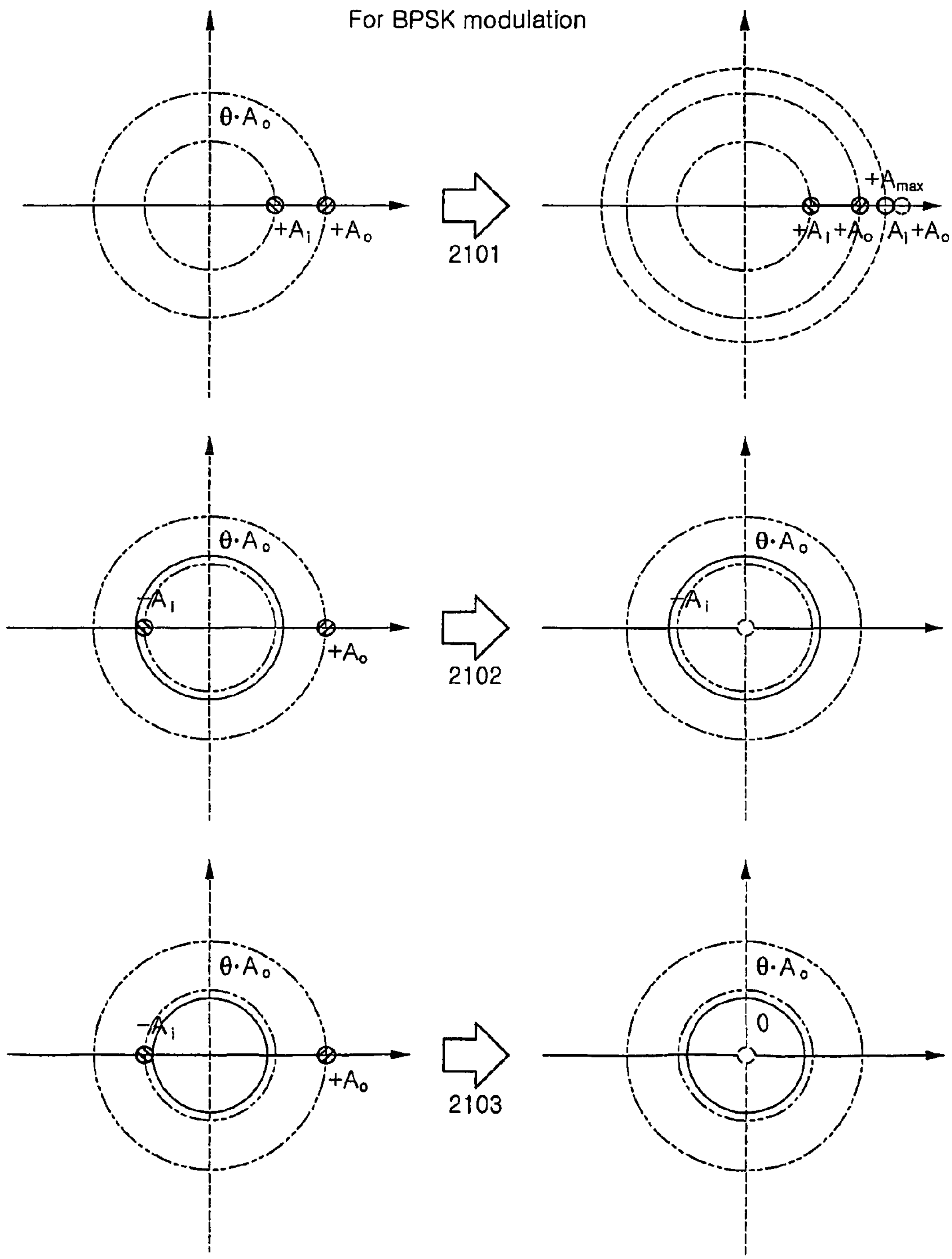
FIG. 21*b* illustrates the determination of the final transmit signal using the method of FIG. 21*a* in the case of a multidimensional orthogonal resource hopping pattern collision between two channels.

FIG. 21*b* illustrates the determination of the final transmit signal using the method of FIG. 21*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=+A_{max}$ because $A_i+A_0>+A_{max}$ (in step 2101). If the data symbol values are $-A_i$ and $+A_0$ ($A_i<A_0$), then the final data symbol value transferred by the orthogonal wireless resource unit is $A_I=-A_i$ ($A_I^+=0$, and $A_I^-=-A_i$) because $A_i \leqq +\theta A_0$ and $A_I=\max\{A_i, i \in S^*\}$ (in step 2102). For $A_i>+\theta A_0$, the set $S^*$ is an empty set and $A_I=0$ ($A_I^+=0$, and $A_I^-=0$) (in step 2103). Here, $A_{max}$ for curbing the increase of an unnecessary interference and $\theta$ for determining whether to perforate are given as a system parameter.

Figure 21C:
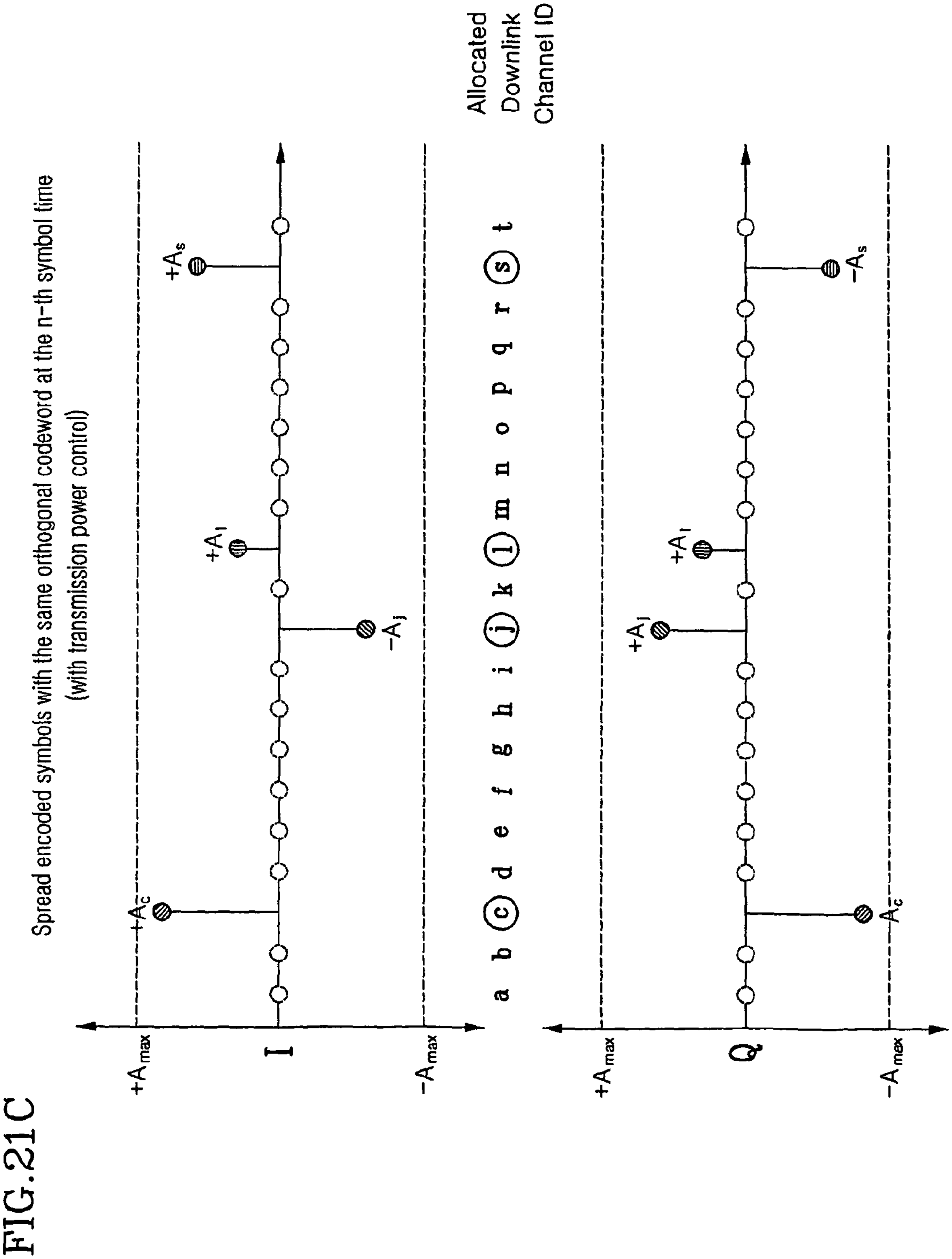
FIG. 21*c* illustrates a multidimensional orthogonal resource hopping pattern collision among four channels c, j, I and s for explaining the determination of the final transmit signal using the method of FIG. 21*a;*

FIG. 21*c* illustrates a multidimensional orthogonal resource hopping pattern collision among four channels c, j, I and s for explaining the determination of the final transmit signal using the method of FIG. 21*a*. For I-channels, $S^0=\{a, b, d, e, f, g, h, i, k, m, n, o, p, q, r, t\}$, $S^+=\{c, I, s\}$, and $S^-=\{j\}$. For Q-channels, $S^0=\{a, b, d, e, f, g, h, i, k, m, n, o, p, q, r, t\}$, $S^+=\{j, l\}$, and $S^-=\{c, s\}$.

Figure 21D:
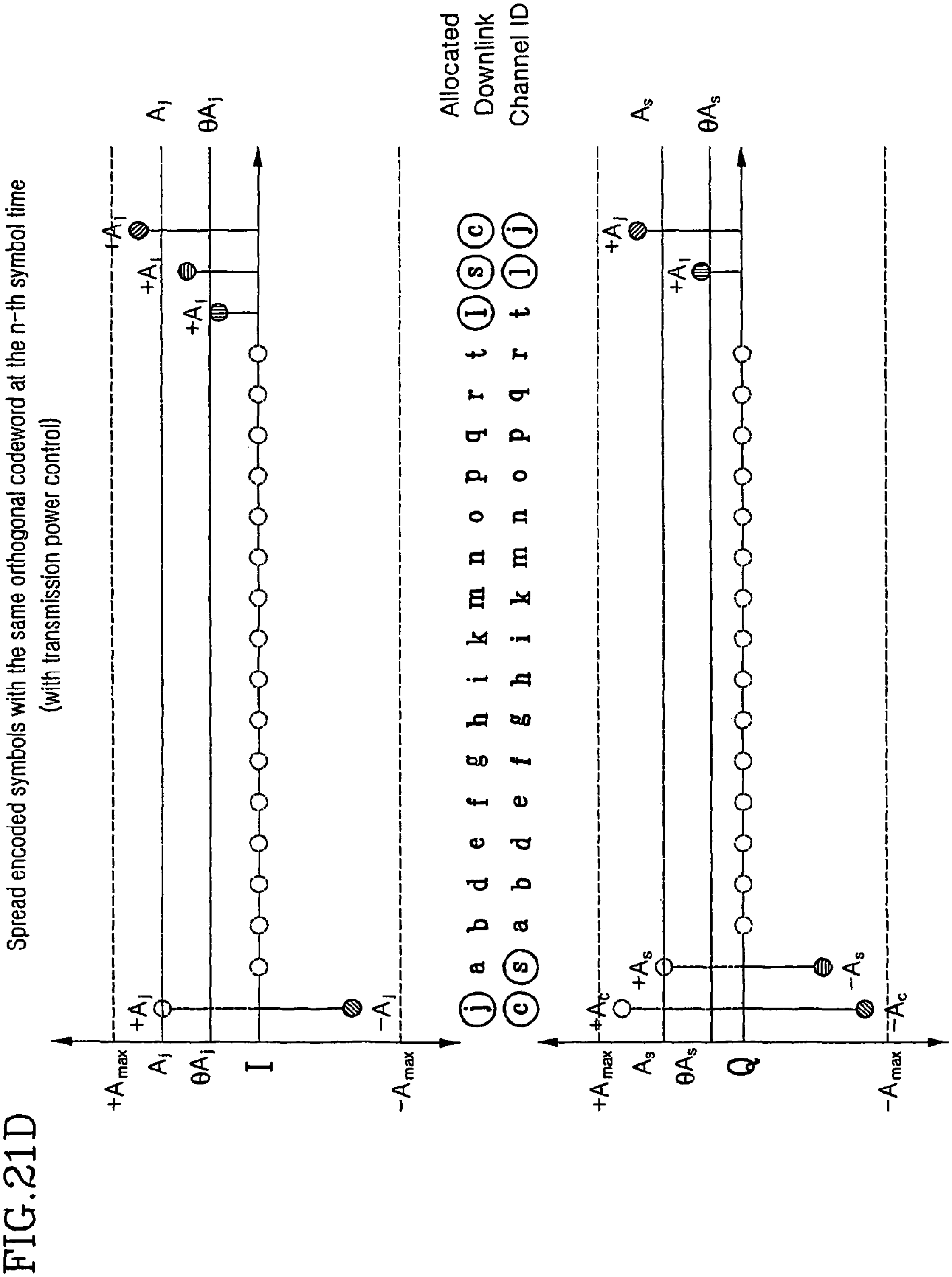
FIG. 21*d* shows a channel arrangement for comparing the amplitudes of channels selecting the orthogonal wireless resource unit in case of FIG. 21*c;*

FIG. 21*d* shows a channel arrangement for comparing the amplitudes of channels selecting the orthogonal wireless resource unit in case of FIG. 21*c*. For I-channels, the reference value determined by the steps 2062 and 2070 is the size of the j-th channel ($-A_j$). For Q-channels, the reference value determined by the steps 2062 and 2070 is the size of the s-th channel ($-A_s$).

Figure 21E:
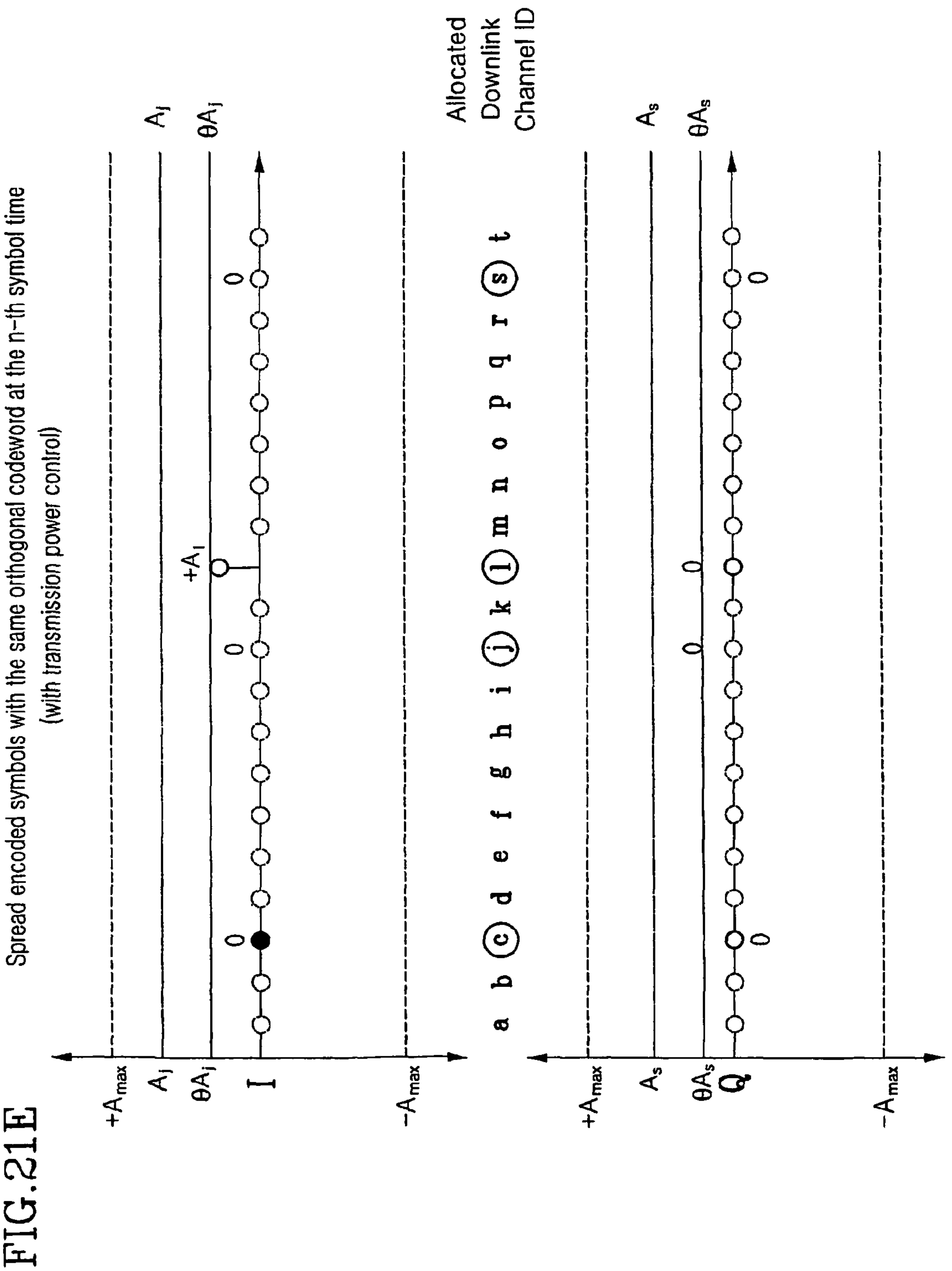
FIG. 21*e* illustrates the final transmit signal determined according to the algorithm of FIG. 21*a* in case of FIG. 21*c;*

FIG. 21*e* illustrates the final transmit signal determined according to the algorithm of FIG. 21*a* in case of FIG. 21*c*. For I-channels, the channel having the largest value less than $\theta A_j$ is the I-th channel, and thus the orthogonal wireless resource unit has a value of $A_I=+A_I(A_I^+=+A_I$, and $A_I^-=0)$. In FIG. 21*e*, the channels c, j and s are OFF ($A_c=0$, $A_j=0$, and $A_s=0$) and only the channel I is ON (transmission) ($A_I \neq 0$). But the amplitude of each channel is not important as long as the sum of the amplitudes satisfies $A_c+A_j+A_I+A_s=A_I$. For Q-channels, $S^*$ is an empty set, and thus the orthogonal wireless resource unit has a value of $A_Q=0(A_Q^+=0$, and $A_Q^-=0)$.

FIG. 22*a* is a flow chart showing the fifth method for determining a transmit signal by the respective orthogonal wireless resource units at a transmitter from the primary station to the secondary station according to an embodiment of the present invention. The fifth method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0 \cup S^+$ (in step 1840), it means that all the channels selecting the orthogonal wireless resource unit have a positive value. If $$\sum_{j \in S^+} (+A_j) \leq A_{max} \text{ (in step 1842)},$$

then the primary station transmits the orthogonal wireless resource unit having a value of $$A_I = \sum_{j \in S^+} (+A_j) \left( A_I^+ = \sum_{j \in S^+} (+A_j), \text{ and } A_I^- = 0 \right);$$

otherwise, the primary station transmits the orthogonal wireless resource unit having a value of $A_I=+A_{max}(A_I^+=+A_{max}$, and $A_I^-=0)$. For $S=S^0 \cup S^-$ (in step 1850), it means that all the channels selecting the orthogonal wireless resource unit have a negative value. If $$\sum_{j\in S^-}(-A_j) \ge -A_{max}\text{(in step 1852)},$$

then the primary station transmits the orthogonal wireless resource unit having a value of $$A_I = \sum_{j\in S^-}(-A_j)\left(A_I^+ = 0, \text{ and } A_I^- = \sum_{j\in S^-}(-A_j)\right);$$

otherwise, the primary station transmits the orthogonal wireless resource unit having a value of $A_I=-A_{max}(A_I^+=0$, and $A_I^-=+A_{max})$. For $S^+\neq\{\ \}$ and $S^-\neq\{\ \}$ (in step 2260), the reference value is determined as the larger one ($\max\{\min\{A_i, i\in S^+\}\min\{A_i, i\in S^-\}\}$) of the smallest amplitude having a positive value ($\min\{A_i, i\in S^+\}$) and the smallest amplitude having a negative value ($\min\{A_i, i\in S^-\}$) (in step 2062). If the smaller one is the smallest amplitude having a positive value ($\max\{\min\{A_i, i\in S^+\}\min\{A_i, i\in S^-\}\}=\min\{A_i, i\in S^+\}$), (in step 2070), then $A_I^+$ and $A_I^-$ are initialized as $A_I^+=0$ and $A_I^-=0$ (in step 2271), and the channel having a negative value and the largest amplitude smaller than $\theta\cdot\min\{A_i, i\in S^+\}$ is designated as $A_I^-$ (in steps 2273 and 2283). The primary station in this case transmits the orthogonal wireless resource unit having a value of $A_I=A_I^++A_I^-$. If the smaller one is the smallest amplitude having a negative value ($\max\{\min\{A_i, i\in S^+\}\min\{A_i, i\in S^-\}\}=\min\{A_i, i\in S^-\}$), then $A_I^+$ and $A_I^-$ are initialized as $A_I^+=0$ and $A_I^-=0$ (in step 2272), and the channel having a negative value and the largest amplitude smaller than $\theta\cdot\min\{A_i, i\in S^-\}$ is designated as $A_I^+$ (in step 2274). The primary station in this case transmits the orthogonal wireless resource unit having a value of $A_I=A_I^++A_I^-$.

Figure 22B:
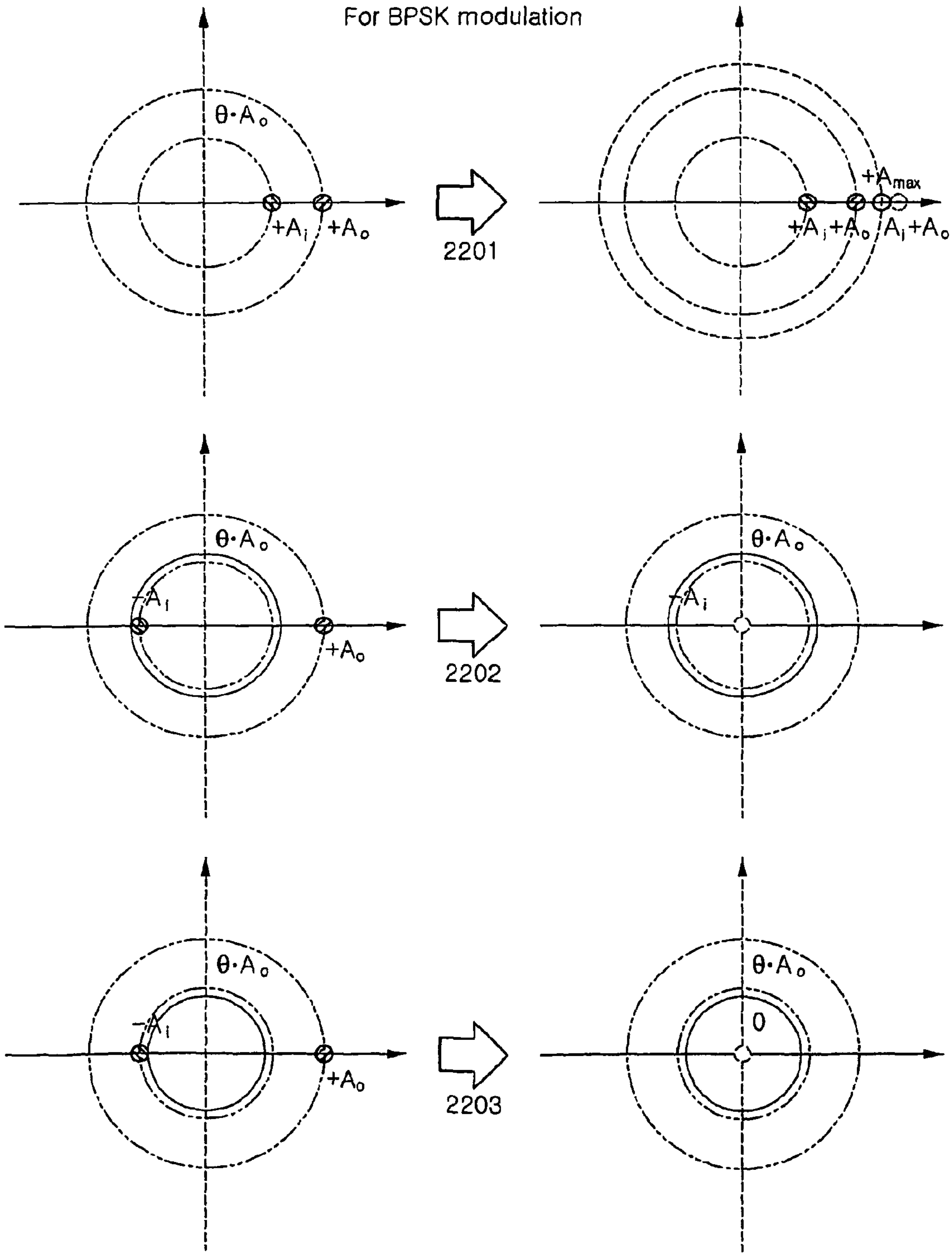
FIG. 22*b* illustrates the determination of the final transmit signal using the method of FIG. 22*a* in the case of a multidimensional orthogonal resource hopping pattern collision between two channels.

FIG. 22*b* illustrates the determination of the final transmit signal using the method of FIG. 22*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=+A_{max}$ because $A_i+A_0>+A_{max}$ (in step 2201). If the data symbol values are $-A_i$ and $+A_0$ ($A_i<A_0$), then the final data symbol value transferred by the orthogonal wireless resource unit is $A_I=-A_i$ ($A_I^+=0$, and $A_I^-=-A_i$) because $A_i\leqq+\theta A_0$ and $A_i$ is the maximum ($A_i=\max\{A_i, i\in S^*\}$) (in step 2202). For $A_i>+\theta A_0$, $A_I=0$ ($A_I^+=0$, and $A_I^-=0$) (in step 2203). Here, $A_{max}$ for curbing the increase of an unnecessary interference and $\theta$ for determining whether to perforate are given as a system parameter.

Figure 22C:
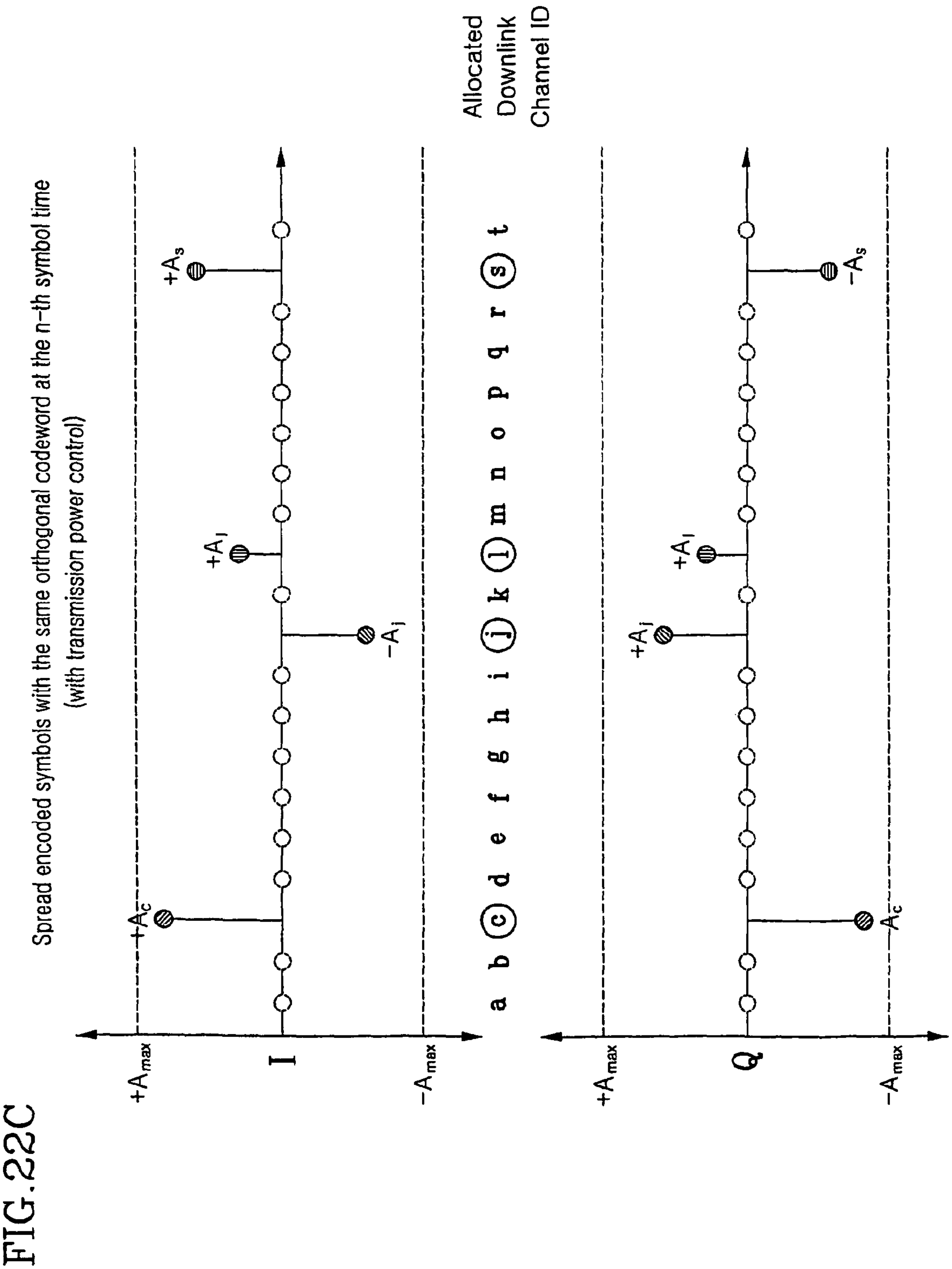
FIG. 22*c* illustrates a multidimensional orthogonal resource hopping pattern collision among four channels c, j, I and s for explaining the determination of the final transmit signal using the method of FIG. 22*a;*

FIG. 22*c* illustrates a multidimensional orthogonal resource hopping pattern collision among four channels c, j, I and s for explaining the determination of the final transmit signal using the method of FIG. 22*a*. For I-channels, $S^0$={a, b, d, e, f, g, h, i, k, m, n, o, p, q, r, t}, $S^+$={c, I, s}, and $S^-$={j}. For Q-channels, $S^0$={a, b, d, e, f, g, h, i, k, m, n, o, p, q, r, t}, $S^+$={j, I}, and $S^-$={c, s}.

Figure 22D:
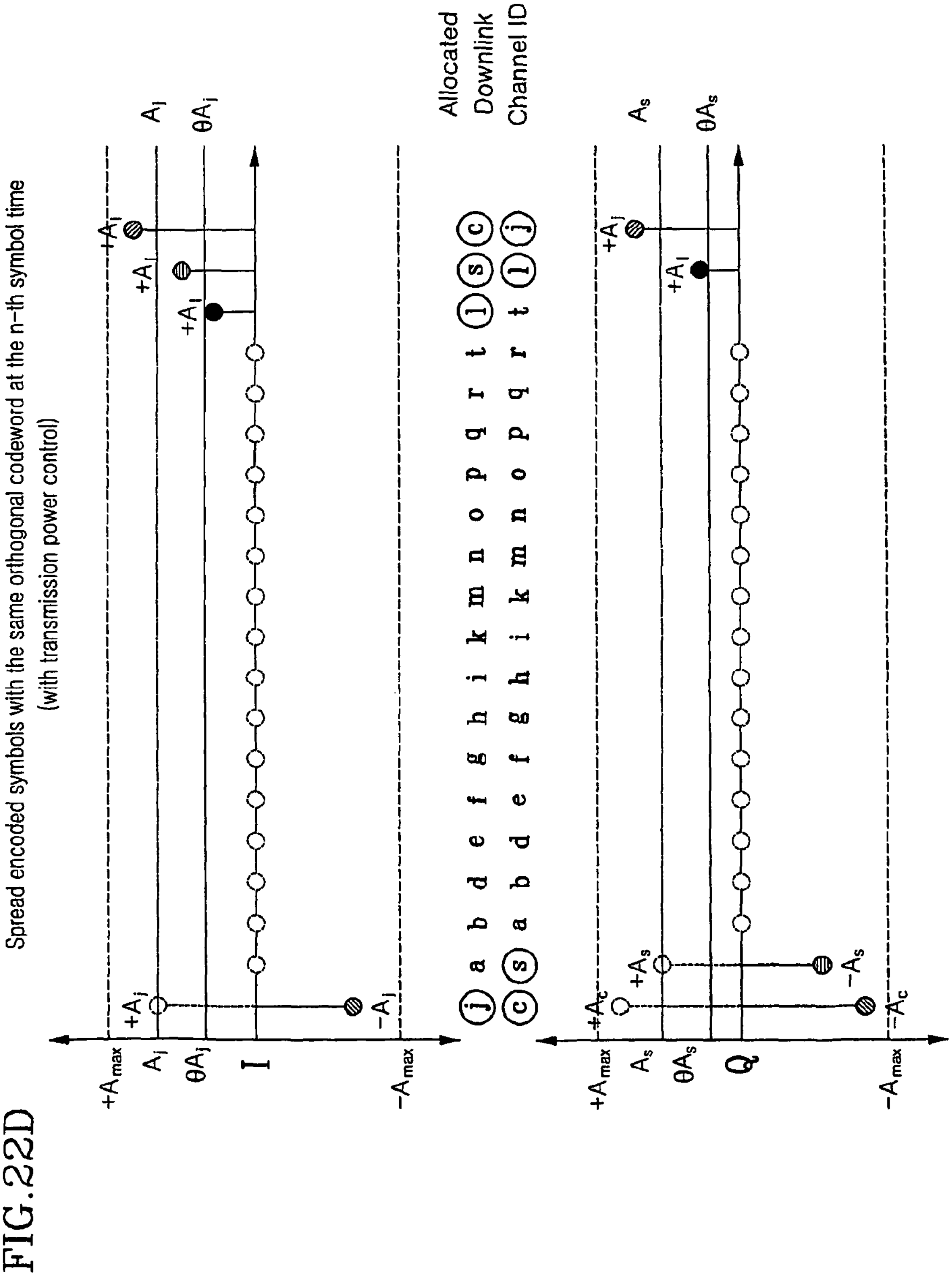
FIG. 22*d* shows a channel arrangement for comparing the amplitudes of channels selecting the orthogonal wireless resource unit in case of FIG. 22*c;*

FIG. 22*d* shows a channel arrangement for comparing the amplitudes of channels selecting the orthogonal wireless resource unit in case of FIG. 22*c*. For I-channels, the reference value determined by the steps 2062 and 2070 is the size of the j-th channel ($-A_j$). For Q-channels, the reference value determined by the steps 2062 and 2070 is the size of the s-th channel ($-A_s$).

Figure 22E:
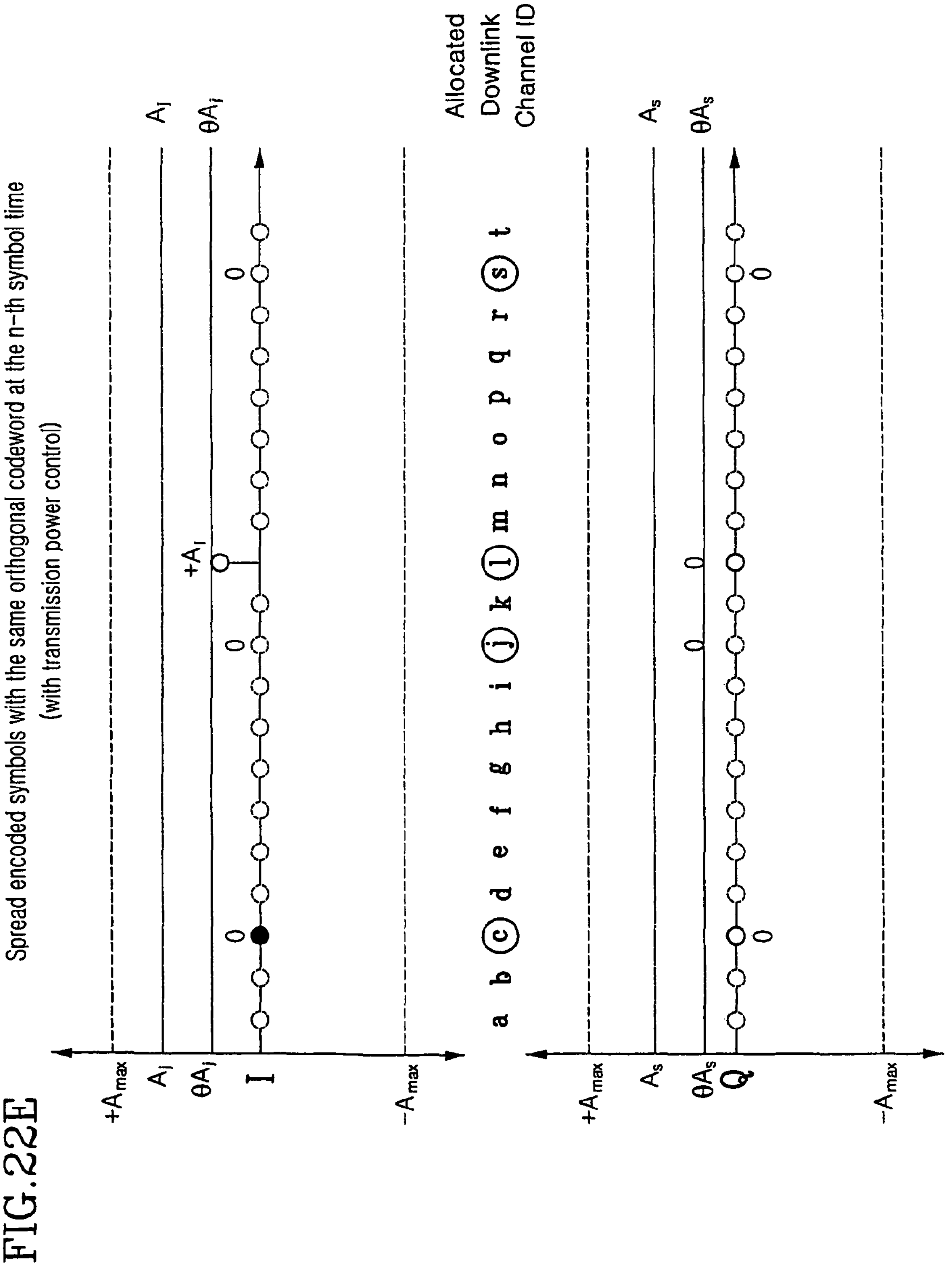
FIG. 22*e* illustrates the final transmit signal determined according to the algorithm of FIG. 22*a* in case of FIG. 22*c;*

FIG. 22*e* illustrates the final transmit signal determined according to the algorithm of FIG. 22*a* in case of FIG. 22*c*. For I-channels, the channel having the largest value less than $\theta A_j$ is the I-th channel, and thus the orthogonal wireless resource unit has a value of $A_I=+A_I(A_I^+=+A_I$, and $A_I^-=0)$. In FIG. 22*e*, the channels c, j and s are OFF ($A_c=0$, $A_j=0$, and $A_s=0$) and only the channel I is ON (transmission) ($A_I\neq0$). But the amplitude of each channel is not important as long as the sum of the amplitudes satisfies $A_c+A_j+A_I+A_s=A_I$. For Q-channels, there is no channel having a value of less than $\theta A_s$, and thus the orthogonal wireless resource unit has a value of $A_Q=0$ ($A_Q^+=0$, and $A_Q^-=0$).

FIG. 23*a* is a flow chart showing the sixth method for determining a transmit signal by the respective orthogonal wireless resource units at a transmitter from the primary station to the secondary station according to an embodiment of the present invention. The sixth method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0\cup S^+$ (in step 1840), it means that all the channels selecting the orthogonal wireless resource unit have a positive value. If $$\sum_{j\in S^+}(+A_j) \le +A_{max}\text{(in step 1842)},$$

then the primary station transmits the orthogonal wireless resource unit having a value of $$A_I = \sum_{j\in S^+}(+A_j)\left(A_I^+ = \sum_{j\in S^+}(+A_j), \text{ and } A_I^- = 0\right);$$

otherwise, the primary station transmits the orthogonal wireless resource unit having a value of $A_I=+A_{max}(A_I^+=+A_{max}$, and $A_I^-=0)$. For $S=S^0\cup S^-$ (in step 1850), it means that all the channels selecting the orthogonal wireless resource unit have a negative value. If $$\sum_{j\in S^-}(-A_j) \ge -A_{max}\text{(in step 1852)},$$

then the primary station transmits the orthogonal wireless resource unit having a value of $$A_I = \sum_{j\in S^-}(-A_j)\left(A_I^+ = 0, \text{ and } A_I^- = \sum_{j\in S^-}(-A_j)\right);$$

otherwise, the primary station transmits the orthogonal wireless resource unit having a value of $A_I=+A_{max}(A_I^+=0$, and $A_I^-=A_{max})$. For $S^+\neq\{\ \}$ and $S^-\neq\{\ \}$ (in step 2360), the reference value is determined as the larger one ($\max\{\min\{A_i, i\in S^+\}\min\{A_i, i\in S^-\}\}$) of the smallest amplitude having a positive value ($\min\{A_i, i \in S^+\}$) and the smallest amplitude having a negative value ($\min\{A_i, i \in S^-\}$) (in step 2062). If the smaller one is the smallest amplitude having a positive value ($\max\{\min\{A_i, i \in S^+\}\min\{A_i, i \in S^-\}\}=\min\{A_i, i \in S^+\}$), then a set of channels having a negative value and an amplitude of less than $\theta \cdot \min\{A_i, i \in S^+\}$ is defined as S* ($0 \leqq \theta \leqq 1$). If S* is an empty set (in step 2081), then the I-channel transmit signal is set as $A_I=0$ ($A_I^+=0$, $A_I^-=0$) so that the primary station does not transmit the orthogonal wireless resource unit (in step 2089). If S* is not an empty set (in step 2081), then the primary station transmits the orthogonal wireless resource unit having the largest amplitude $A_I=-\theta \cdot \min\{A_i, i \in S^+\}$($A_I^+=0$, and $A_I^-=-\theta \min\{A_i, \in S^*\}$) (in step 2387). If the smaller one is the smallest amplitude having a negative value ($\max\{\min\{A_i, i \in S^+\}\min\{A_i, i \in S^-\}\}=\min\{A_i, i \in S^-\}$), then a set of channels having a negative value and an amplitude of less than $\theta \cdot \min\{A_i, i \in S^-\}$ is defined as S. If S* is an empty set (in step 2082), then the I-channel transmit signal is set as $A_I=0$ ($A_I^+=0$, $A_I^-=0$) so that the primary station does not transmit the orthogonal wireless resource unit (in step 2089). If S* is not an empty set, then the primary station transmits the orthogonal wireless resource unit having a value $A_I=+\theta \min\{(A_i, i \in S^-\}$($A_I^+ + \theta \min\{A_i, i \in S^*\}$, and $A_I^-=0$) (in step 2388).

Figure 23B:
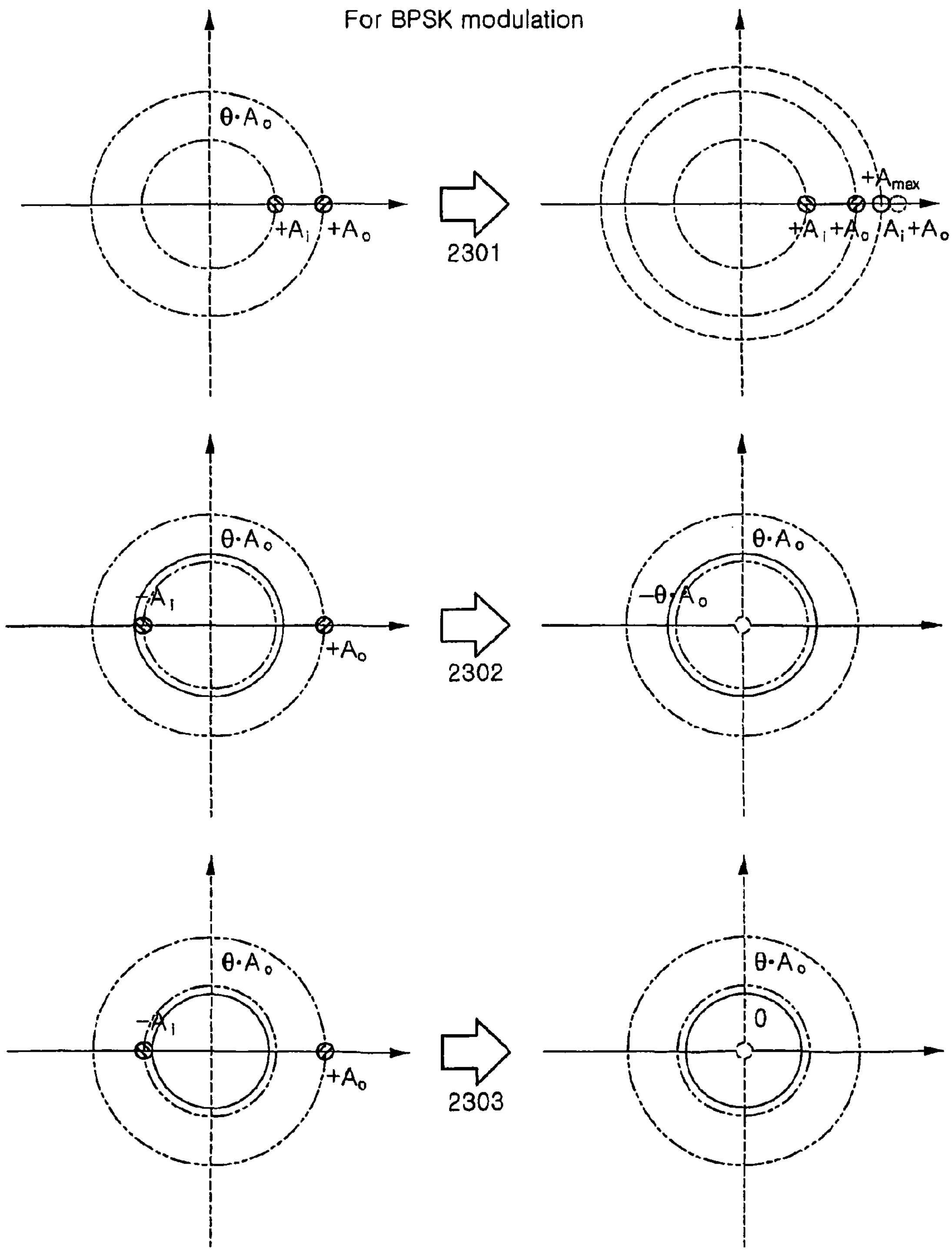
FIG. 23*b* illustrates the determination of the final transmit signal using the method of FIG. 23*a* in the case of a multidimensional orthogonal resource hopping pattern collision between two channels.

FIG. 23*b* illustrates the determination of the final transmit signal using the method of FIG. 23*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=+A_{max}$ because $A_i+A_0>+A_{max}$ (in step 2301). If the data symbol values are $-A_i$ and $+A_0$ ($A_i<A_0$), then the final data symbol value transferred by the orthogonal wireless resource unit is $A_I=+\theta A_0$ ($A_I^+=0$, and $A_I^-=-\theta A_0$ (in step 2302), and $A_I=0$ ($A_I^+=0$, and $A_I^-=0$) for $A_i>+\theta A_0$ (in step 2303). Here, $A_{max}$ for curbing the increase of an unnecessary interference and θ for determining whether to perforate are given as a system parameter.

Figure 23C:
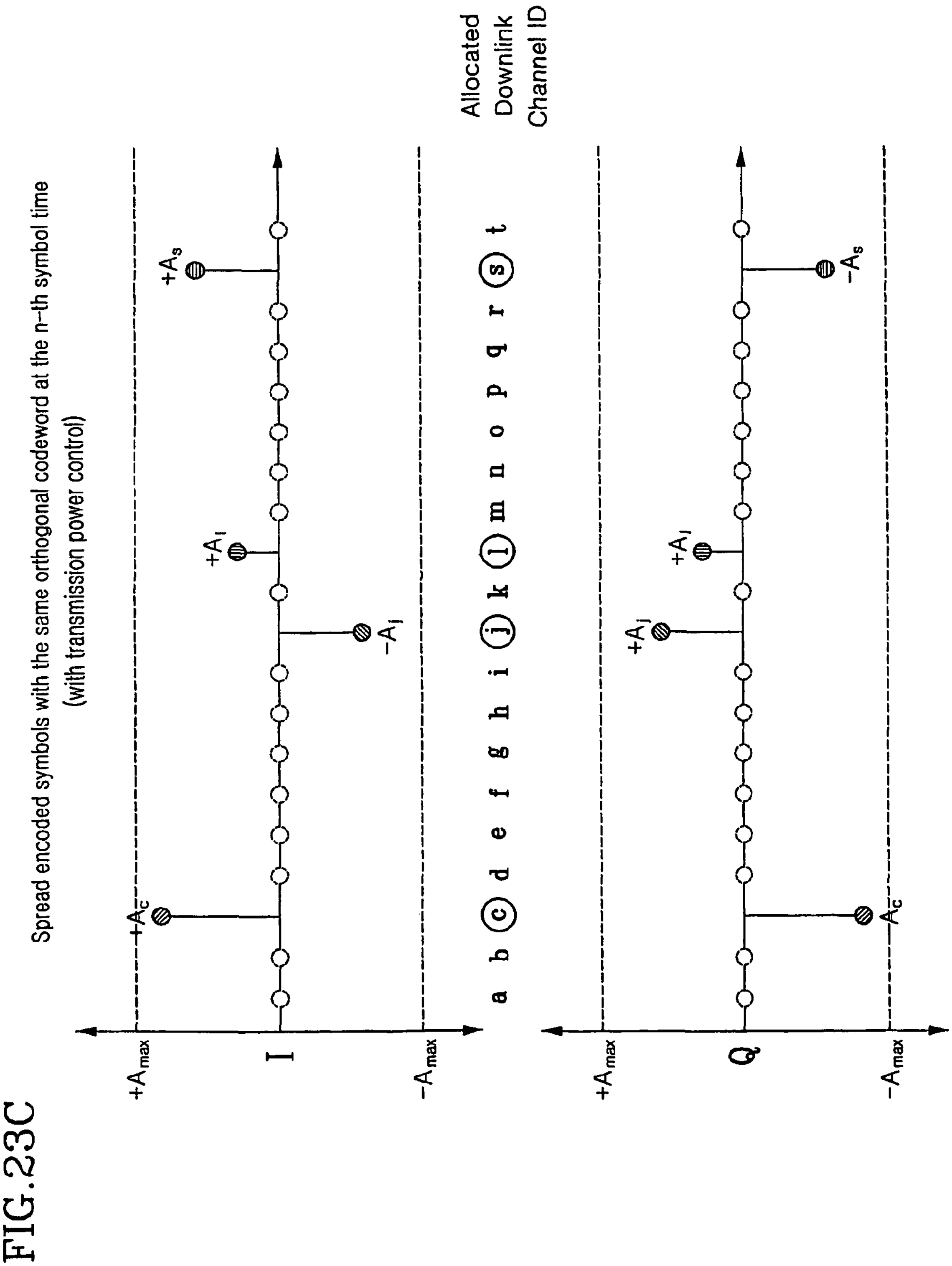
FIG. 23*c* illustrates a multidimensional orthogonal resource hopping pattern collision among four channels c, j, I and s for explaining the determination of the final transmit signal using the method of FIG. 23*a;*

FIG. 23*c* illustrates a multidimensional orthogonal resource hopping pattern collision among four channels c, j, I and s for explaining the determination of the final transmit signal using the method of FIG. 23*a*. For I-channels, $S^0=\{a, b, d, e, f, g, h, i, k, m, n, o, p, q, r, t\}$, $S^+=\{c, I, s\}$, and $S^-=\{j\}$. For Q-channels, $S^0=\{a, b, d, e, f, g, h, i, k, m, n, o, p, q, r, t\}$, $S^+=\{j, I\}$, and $S^-=\{c, s\}$.

Figure 23D:
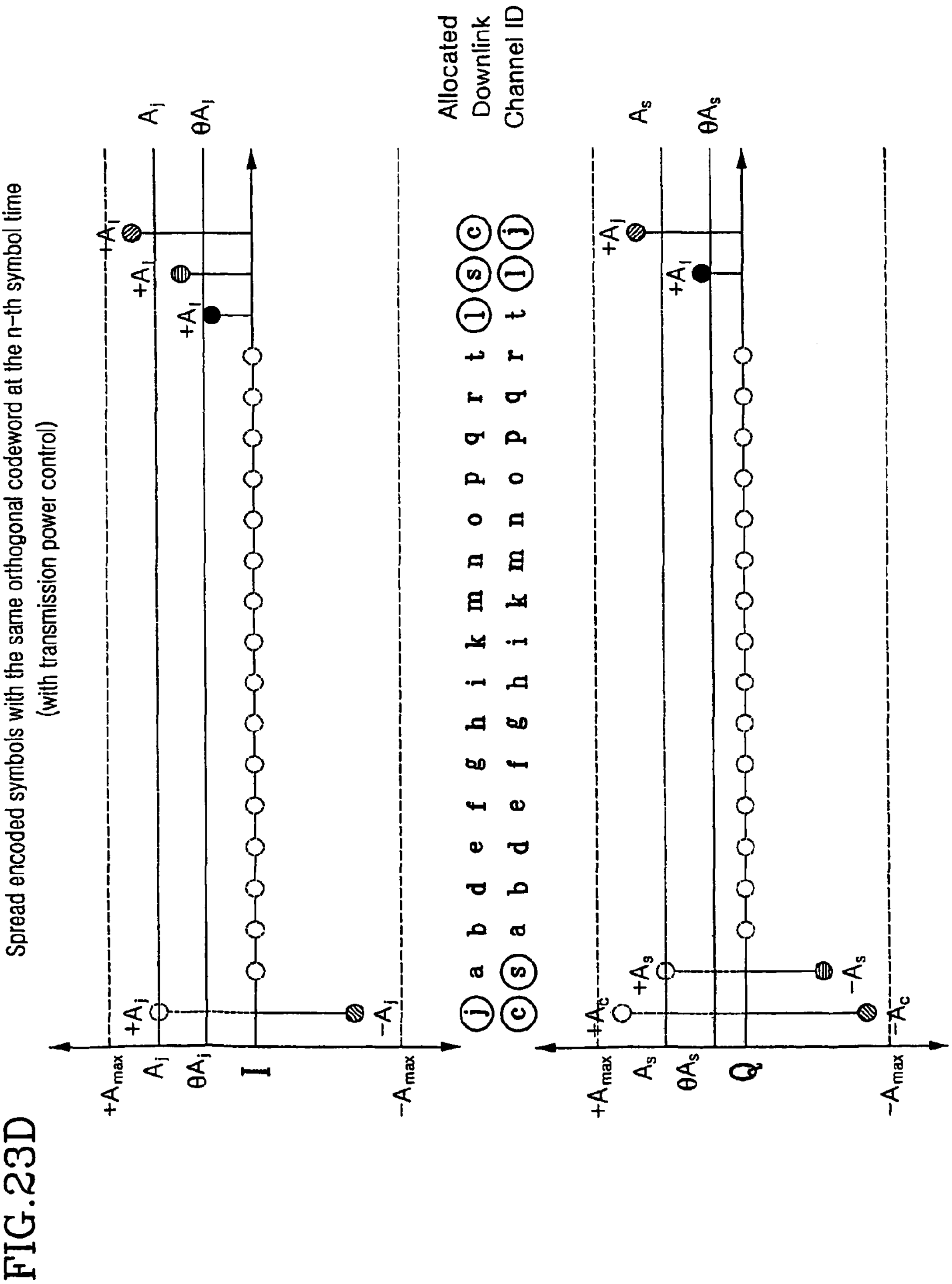
FIG. 23*d* shows a channel arrangement for comparing the amplitudes of channels selecting the orthogonal wireless resource unit in case of FIG. 23*c*.

FIG. 23*d* shows a channel arrangement for comparing the amplitudes of channels selecting the orthogonal wireless resource unit in case of FIG. 23*c*. For I-channels, the reference value determined by the steps 2062 and 2070 is the size of the j-th channel ($-A_j$). For Q-channels, the reference value determined by the steps 2062 and 2070 is the size of the s-th channel ($-A_s$).

Figure 23E:
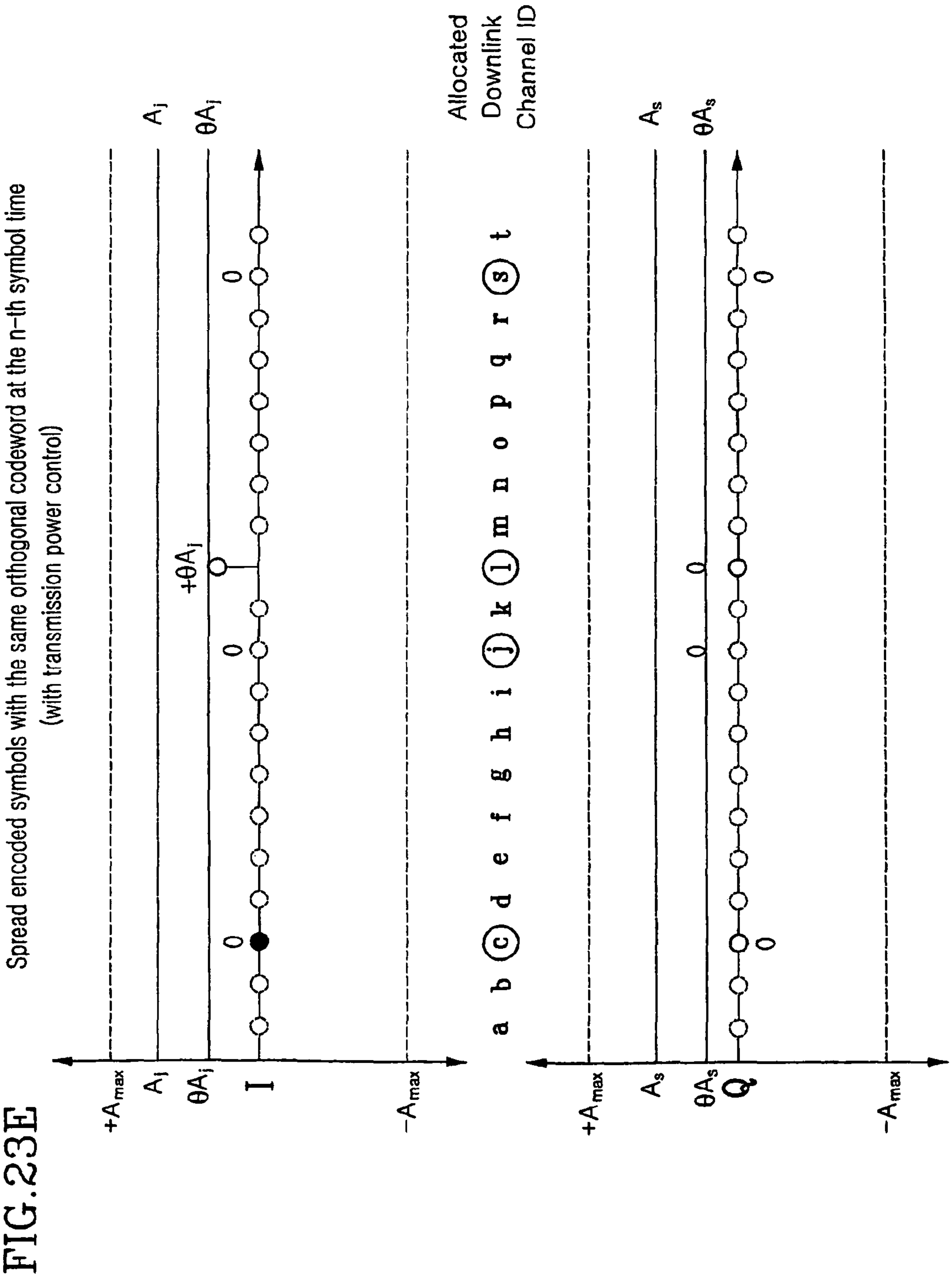
FIG. 23*e* illustrates the final transmit signal determined according to the algorithm of FIG. 23*a* in case of FIG. 23*c;*

FIG. 23*e* illustrates the final transmit signal determined according to the algorithm of FIG. 23*a* in case of FIG. 23*c*. For I-channels, there is a channel (the I-th channel) having the largest value less than $\theta A_j$, and thus the orthogonal wireless resource unit has a value of $A_I=+\theta A_I$($A_I^+=+\theta A_I$, and $A_I^-=0$), In FIG. 23*e*, the channels c, j and s are OFF ($A_c=0$, $A_j=0$, and $A_s=0$) and only the channel I is ON (transmission) ($A_I \neq 0$). But the amplitude of each channel is not important as long as the sum of the amplitudes satisfies $A_c+A_j+A_I+A_s=+\theta A_j$. For Q-channels, there is no channel having a value of less than $\theta A_s$, and thus the orthogonal wireless resource unit has a value of $A_Q=0$ ($A_Q^+=0$, and $A_Q^-=0$).

FIG. 24*a* is a flow chart showing the seventh method for determining a transmit signal by the respective orthogonal wireless resource units at a transmitter from the primary station to the secondary station according to an embodiment of the present invention. The seventh method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0 \cup S^+$ (in step 1840), it means that all the channels selecting the orthogonal wireless resource unit have a positive value. If $$\sum_{j \in S^+} (+A_j) \leq +A_{max} \text{(in step 1842)},$$

then the primary station transmits the orthogonal wireless resource unit having a value of $$A_I = \sum_{j \in S^+} (+A_j) \left( A_I^+ = \sum_{j \in S^+} (+A_j), \text{ and } A_I^- = 0 \right);$$

otherwise, the primary station transmits the orthogonal wireless resource unit having a value of $A_I=+A_{max}$($A_I^+=+A_{max}$, and $A_I^-=0$). For $S=S^0 \cup S^-$ (in step 1850), it means that all the channels selecting the orthogonal wireless resource unit have a negative value. If $$\sum_{j \in S^-} (-A_j) \geq -A_{max} \text{(in step 1852)},$$

then the primary station transmits the orthogonal wireless resource unit having a value of $$A_I = \sum_{j \in S^-} (-A_j) \left( A_I^+ = 0, \text{ and } A_I^- = \sum_{j \in S^-} (-A_j) \right);$$

otherwise, the primary station transmits the orthogonal wireless resource unit having a value of $A_I=-A_{max}$($A_I^+=0$, and $A_I^-=+A_{max}$). For $S^+ \neq \{\ \}$ and $S^- \neq \{\ \}$ (in step 2460), the reference value is determined as the larger one ($\max\{\min\{A_i, i \in S^+\}\min\{A_i, i \in S^-\}\}$) of the smallest amplitude having a positive value ($\min\{A_i, i \in S^+\}$) and the smallest amplitude having a negative value ($\min\{A_i, i \in S^-\}$) (in step 2062). Let the smaller one be the smallest amplitude having a positive value ($\max\{\min\{A_i, i \in S^+\}\min\{A_i, i \in S^-\}\}=\min\{A_i, i \in S^+\}$). If the sum $$\sum_{j \in S^-} (-A_j)$$

of all channels having a negative value is greater than $-\theta \cdot \min\{A_i, i \in S^+\}$ (in step 2481), then the primary station transmits the orthogonal wireless resource unit having a value $$A_I = \sum_{j \in S^-} (-A_j) \left( A_I^+ = 0, \text{ and } A_I^- = \sum_{j \in S^-} (-A_j) \right) \text{(in step 2483)};$$

otherwise, the primary station transmits the orthogonal wireless resource unit having a value $A_I=-\theta \min\{A_i, i \in S^+\}$ ($A_I^+=0$, and $A_I^-=-\theta\min\{A_i, i\in S^+\}$) (in step 2485). Let the smaller one be the smallest amplitude having a negative value ($\max\{\min\{A_i, i\in S^+\}\min\{A_i, i\in S^-\}\}=\min\{A_i, i\in S^-\}$). If the sum $$\sum_{j\in S^+}(+A_j)$$

of all channels having a positive value is less than $\theta\cdot\min\{A_i, i\in S^-\}$ (in step 2482), then the primary station transmits the orthogonal wireless resource unit having a value $$A_I=\sum_{j\in S^+}(+A_j)\left(A_I^+=\sum_{j\in S^+}(+A_j),\ \text{and}\ A_I^-=0\right)\text{(in step 2484)};$$

otherwise, the primary station transmits the orthogonal wireless resource unit having a value $A_I=+\theta\min\{A_i, \in S^-\}$ ($A_I^+=+\theta\cdot\min\{A_i, \in S^-\}$, and $A_I^-=0$) (in step 2486).

Figure 24B:
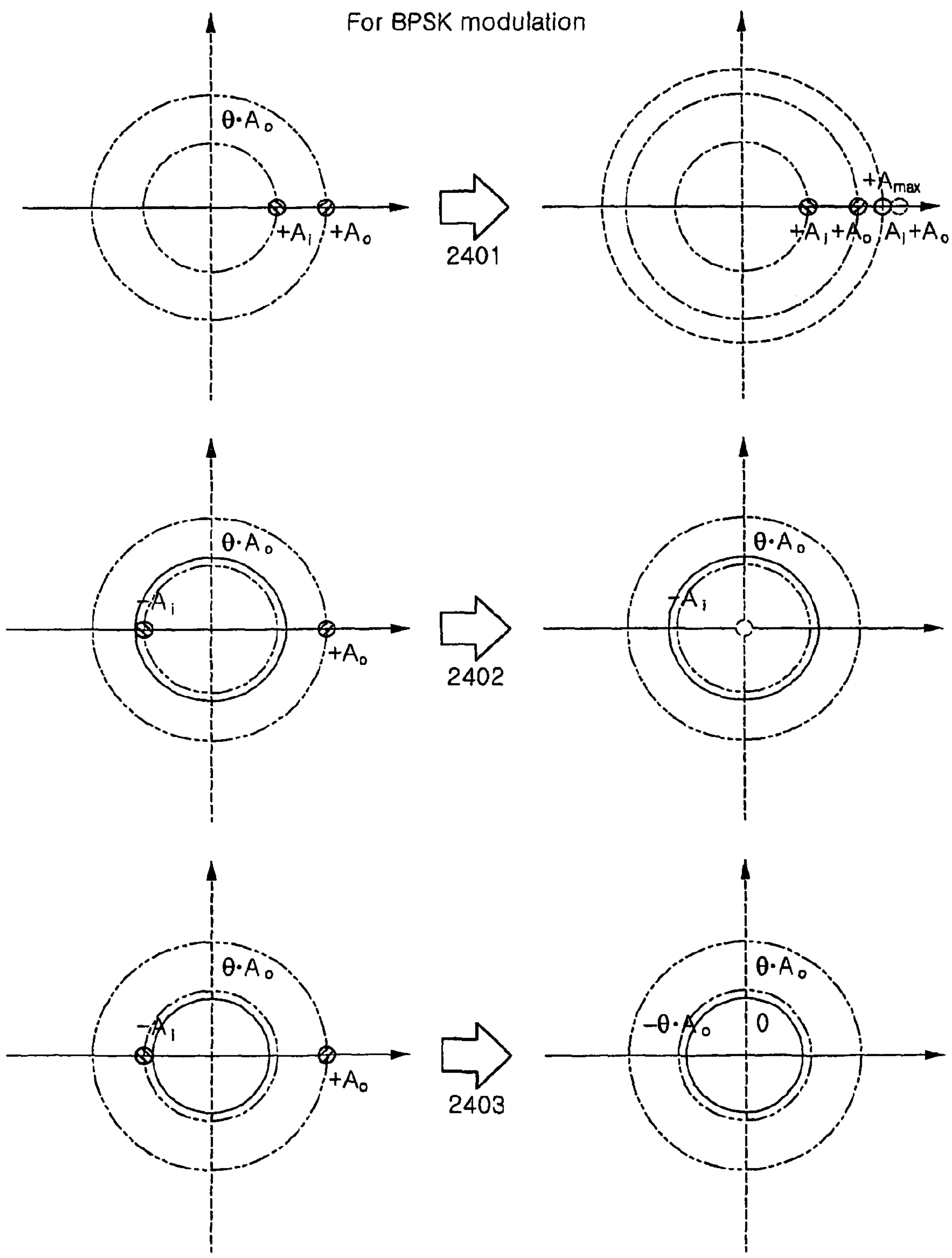
FIG. 24*b* illustrates the determination of the final transmit signal using the method of FIG. 24*a* in the case of a multidimensional orthogonal resource hopping pattern collision between two channels.

FIG. 24*b* illustrates the determination of the final transmit signal using the method of FIG. 24*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=+A_{max}$ because $A_i+A_0>+A_{max}$ (in step 2401). If the data symbol values are $-A_i$ and $+A_0$ ($A_i<A_0$), then the final data symbol value transferred by the orthogonal wireless resource unit is $A_I=-A_i$ ($A_I^+=0$, and $A_I^-=-A_i$) for $-A_i\geqq-\theta A_0$ (in step 2402), and $A_I=-\theta A_0$ ($A_I^+=0$, and $A_I^-=-\theta A_0$) for $-A_i<-\theta A_0$ (in step 2403). Here, $A_{max}$ for curbing the increase of an unnecessary interference and $\theta$ for determining whether to perforate are given as a system parameter.

Figure 24C:
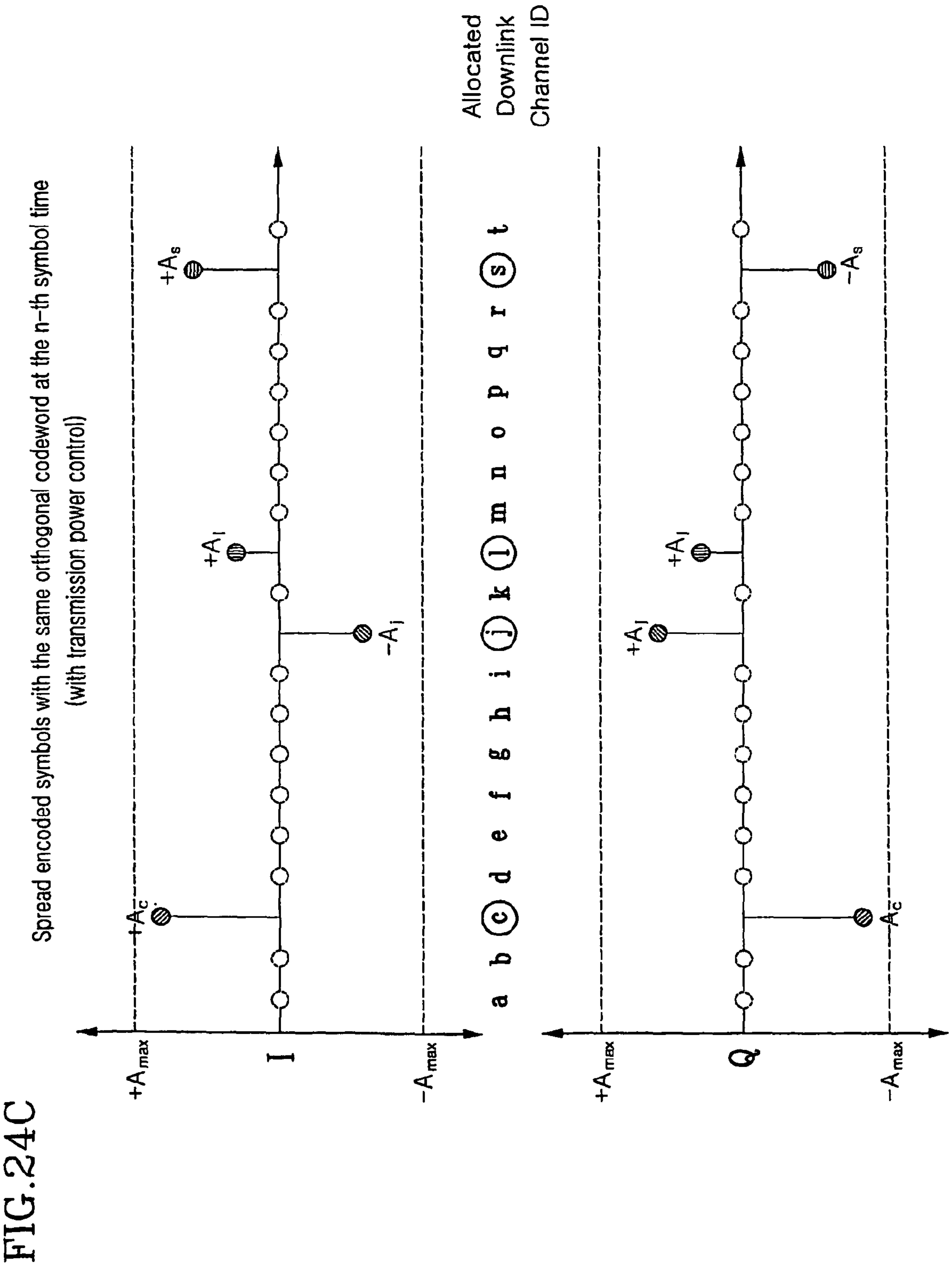
FIG. 24*c* illustrates a multidimensional orthogonal resource hopping pattern collision among four channels c, j, I and s for explaining the determination of the final transmit signal using the method of FIG. 24*a;*

FIG. 24*c* illustrates a multidimensional orthogonal resource hopping pattern collision among four channels c, j, I and s for explaining the determination of the final transmit signal using the method of FIG. 24*a*. For I-channels, $S^0=\{a, b, d, e, f, g, h, i, k, m, n, o, p, q, r, t\}$, $S^+=\{c, I, s\}$, and $S^-=\{j\}$. For Q-channels, $S^0=\{a, b, d, e, f, g, h, i, k, m, n, o, p, q, r, t\}$, $S^+=\{j, I\}$, and $S^-=\{c, s\}$.

Figure 24D:
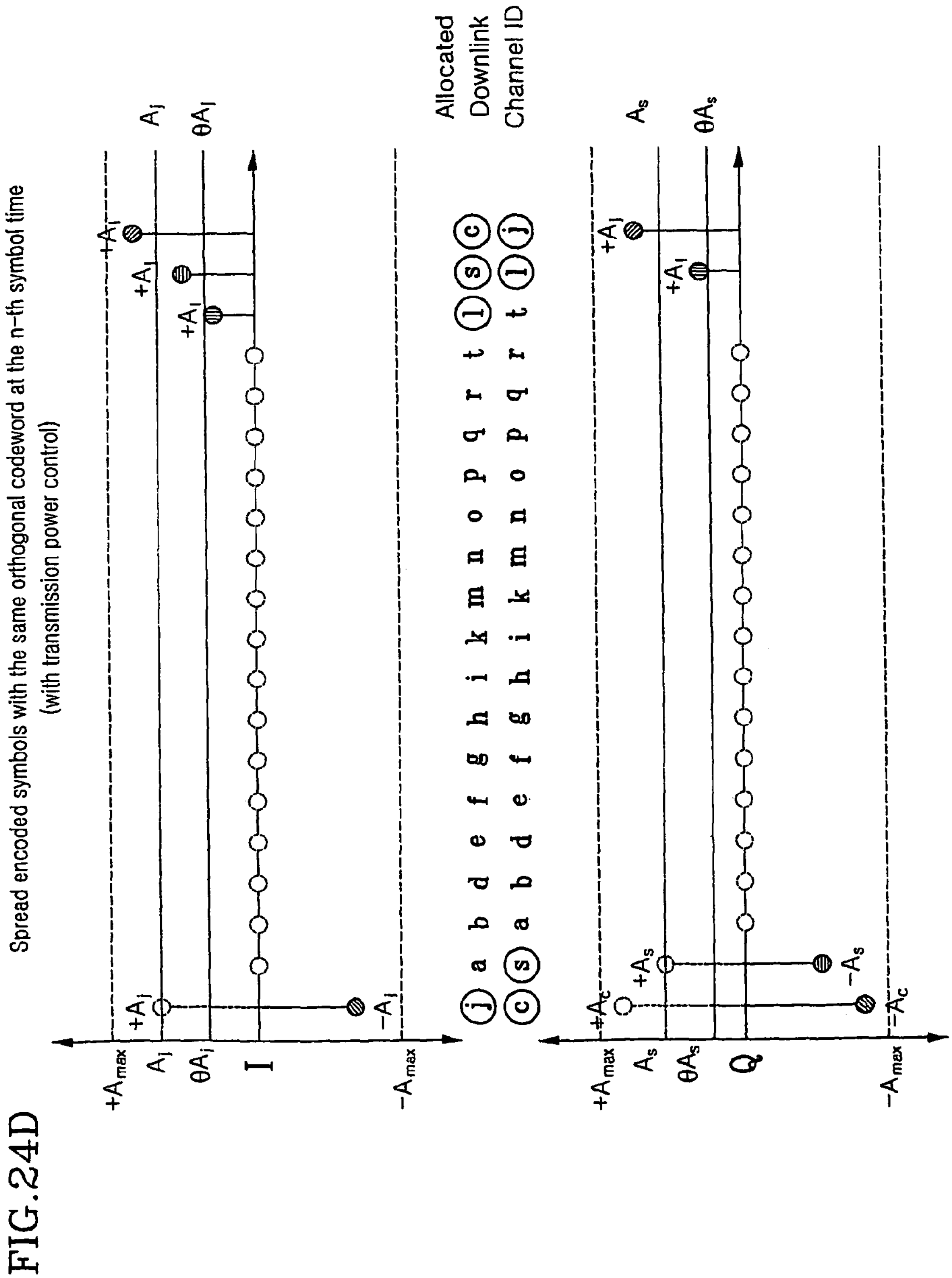
FIG. 24*d* shows a channel arrangement for comparing the amplitudes of channels selecting the orthogonal wireless resource unit in case of FIG. 24*c;*

FIG. 24*d* shows a channel arrangement for comparing the amplitudes of channels selecting the orthogonal wireless resource unit in case of FIG. 24*c*. For I-channels, the reference value determined by the steps 2062 and 2070 is the size of the j-th channel ($-A_j$). For Q-channels, the reference value determined by the steps 2062 and 2070 is the size of the s-th channel ($-A_s$).

Figure 24E:
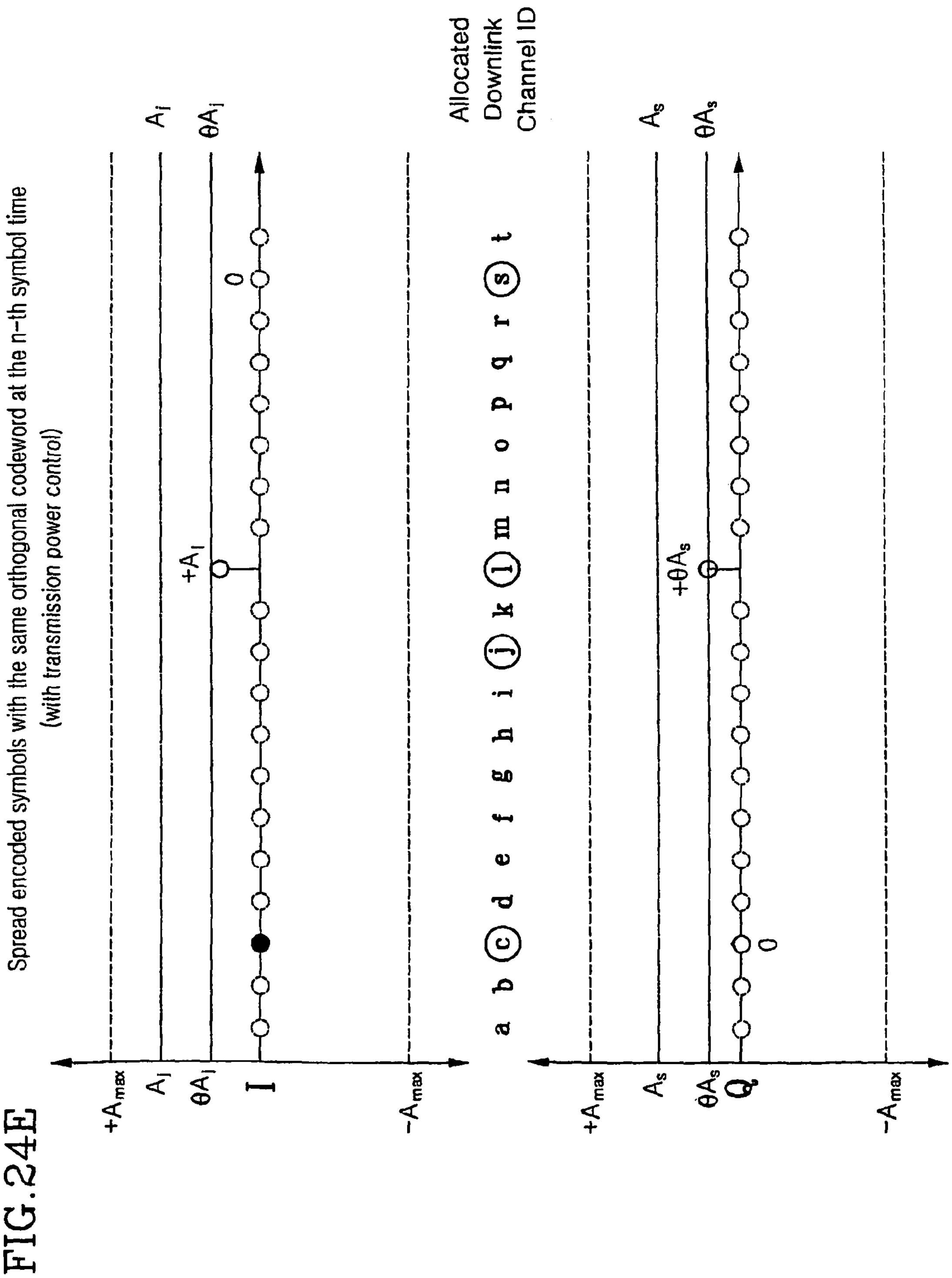
FIG. 24*e* illustrates the final transmit signal determined according to the algorithm of FIG. 24*a* in case of FIG. 24*c;*

FIG. 24*e* illustrates the final transmit signal determined according to the algorithm of FIG. 24*a* in case of FIG. 24*c*. For I-channels, there is a channel (the I-th channel) having the largest value less than $\theta A_j$, and thus the orthogonal wireless resource unit has a value of $A_I=+A_I(A_I^+=+A_I$, and $A_I^-=0)$,In FIG. 24*e*, the channels c, j and s are OFF ($A_c=0$, $A_j=0$, and $A_s=0$) and only the channel I is ON (transmission) ($A_I\neq 0$). But the amplitude of each channel is not important as long as the sum of the amplitudes satisfies $A_c+A_j+A_I+A_s=A_I$. For Q-channels, there is no channel having a value of less than $\theta A_s$, but the orthogonal wireless resource unit has a value of $A_Q=\theta A_s$ ($A_Q^+=+\theta A_s$, and $A_Q^-=0$).

FIG. 25*a* is a flow chart showing the eighth method for determining a transmit signal by the respective orthogonal wireless resource units at a transmitter from the primary station to the secondary station according to an embodiment of the present invention. The eighth method can be described as follows. For $S=S^0$ (in step 1830), which means that the orthogonal wireless resource unit is not selected by any channel, the I-channel transmit signal is set as $A_I=0$ ($A_I^+=0$, and $A_I^-=0$) so that the primary station does not transmit the orthogonal wireless resource unit. For $S=S^0\cup S^+$ (in step 1840), it means that all the channels selecting the orthogonal wireless resource unit have a positive value. If $$\sum_{j\in S^+}(+A_j)\leq +A_{max}\text{(in step 1842)},$$

then the primary station transmits the orthogonal wireless resource unit having a value of $$A_I=\sum_{j\in S^+}(+A_j)\left(A_I^+=\sum_{j\in S^+}(+A_j),\ \text{and}\ A_I^-=0\right);$$

otherwise, the primary station transmits the orthogonal wireless resource unit having a value of $A_I=+A_{max}(A_I^+=+A_{max}$, and $A_I^-=0)$. For $S=S^0\cup S^-$ (in step 1850), (in step 1850), it means that all the channels selecting the orthogonal wireless resource unit have a negative value. If $$\sum_{j\in S^-}(-A_j)\geq -A_{max}\text{ (in step 1852)},$$

then the primary station transmits the orthogonal wireless resource unit having a value of $$A_I=\sum_{j\in S^-}(-A_j)\left(A_I^+=0,\ \text{and}\ A_I^-=\sum_{j\in S^-}(-A_j)\right);$$

otherwise, the primary station transmits the orthogonal wireless resource unit having a value of $A_I=-A_{max}(A_I^+=0$, and $A_I^-=+A_{max})$. For $S^+\neq\{\ \}$ and $S^-\neq\{\ \}$ (in step 2560), the reference value is determined as the larger one ($\max\{\min\{A_i, i\in S^+\}\min\{A_i, i\in S^-\}\}$) of the smallest amplitude having a positive value ($\min\{A_i, i\in S^+\}$) and the smallest amplitude having a negative value ($\min\{A_i, i\in S^-\}$) (in step 2062). If the smaller one is the smallest amplitude having a positive value ($\max\{\min\{A_i, i\in S^+\}\min\{A_i, i\in S^-\}\}=\min\{A_i, i\in S^+\}$), then the primary station transmits the orthogonal wireless resource unit having a value $A_I=-\theta\min\{A_i, i\in S^+\}(A_I^+=0$, and $A_I^-=-\theta\min\{A_i, \in S^*\})$ (in step 2585). If the smaller one is the smallest amplitude having a negative value ($\max\{\min\{A_i, i\in S^+\}\min\{A_i, i\in S^-\}\}=\min\{A_i, i\in S^-\}$), then the primary station transmits the orthogonal wireless resource unit having a value $A_I=+\theta\min\{A_i, \in S^-\}(A_I^+=\theta\cdot\min\{A_i, \in S^*\}$ and $A_I^-=0)$ (in step 2586).

FIG. 25*b* illustrates the determination of the final transmit signal using the method of FIG. 25*a* in the case of a multidimensional orthogonal resource hopping pattern collision between two channels. Let the two channels select the same orthogonal wireless resource unit in the same data symbol interval. If the data symbol values are $+A_i$ and $+A_0$ ($A_i<A_0$), then the final data symbol value transferred by the orthogonal wireless resource unit is $A_I=+A_{max}$ because $A_i+A_0>+A_{max}$ (in step 2501). If the data symbol values are $-A_i$ and $+A_0$ ($A_i<A_0$), then the final data symbol value transferred by the orthogonal wireless resource unit is $A_I=-\theta A_0$ ($A_I^+=0$, and $A_I^-=-\theta A_0$) (in step 2502). If $A_i>+\theta A_0$, then $A_I=-\theta A_0$ ($A_I^+=0$, and $A_I^-=-\theta A_0$) (in step 2503). Here, $A_{max}$ for curbing the increase of an unnecessary interference and θ for determining whether to perforate are given as a system parameter.

FIG. 25*c* illustrates a multidimensional orthogonal resource hopping pattern collision among four channels c, j, I and s for explaining the determination of the final transmit signal using the method of FIG. 25*a*. For I-channels, $S^0=\{a, b, d, e, f, g, h, i, k, m, n, o, p, q, r, t\}$, $S^+=\{c, I, s\}$, and $S^-=\{j\}$. For Q-channels, $S^0=\{a, b, d, e, f, g, h, i, k, m, n, o, p, q, r, t\}$, $S^+=\{j, I\}$, and $S^-=\{c, s\}$.

FIG. 25*d* shows a channel arrangement for comparing the amplitudes of channels selecting the orthogonal wireless resource unit in case of FIG. 25*c*. For I-channels, the reference value determined by the steps 2062 and 2070 is the size of the j-th channel ($-A_j$). For Q-channels, the reference value determined by the steps 2062 and 2070 is the size of the s-th channel ($-A_s$).

FIG. 25*e* illustrates the final transmit signal determined according to the algorithm of FIG. 25*a* in case of FIG. 25*c*. For I-channels, the orthogonal wireless resource unit has a value of $A_I=+\theta A_j$($A_I^+=+\theta A_j$, and $A_I^-=0$). In FIG. 25*e*, the channels c, j and s are OFF ($A_c=0$, $A_j=0$, and $A_s=0$) and only the channel I is ON (transmission) ($A_I\neq 0$). But the amplitude of each channel is not important as long as the sum of the amplitudes satisfies $A_c+A_j+A_I+A_s=+\theta A_j$. For Q-channels, there is no channel having a value of less than $\theta A_s$, but the orthogonal wireless resource unit has a value of $A_Q=+\theta A_s$ ($A_Q^+=+\theta A_s$, and $A_Q^-=0$).

FIG. 26 illustrates that a transmitter from the primary station to the secondary station uses a soft hand-off to compensate for the disadvantageous aspect of the first to eighth transmit signal determination methods by the respective orthogonal wireless resource units on a secondary station positioned at an area (e.g., a cell boundary) having a relatively weak received signal from the primary station in accordance with an embodiment of the present invention. During a soft hand-off of the secondary station 2670 in communication using the multidimensional orthogonal resource hopping multiplexing, the transmit signal control proposed in FIGS. 18 to 25 is independently performed on wireless links 2671 and 2672 from the primary stations A and B 2610 and 2620. Therefore, even when the perforation probability $P_P^A$ of the wireless link 2671 from the primary station A 2710 is greater than the reference value $\theta_P$, the final perforation probability $P_P=P_P^A \cdot P_P^B$ may be less than $\theta_P$, because of the perforation probability $P_P^B$ of the wireless link 2672 from the secondary station B 2620, thereby reducing the relative disadvantage of the secondary station located at the cell boundary.

FIG. 27*a* illustrates an example of the prior art 2730 and an embodiment of the present invention 2740 for orthogonal resource division multiplexing of all output bits from a systematic channel encoder 2710 without distinguishing systematic bits, which are the same as input bits, from parity bits generated from a channel encoder. FIG. 27*b* illustrates, as the embodiment of FIG. 27*a*, an example of the prior art 2732 and an embodiment of the present invention 2742 for orthogonal resource hopping multiplexing of all output bits from a turbo encoder 2712. Typically, among the output bits of the systematic channel encoder, the systematic bits not providing time diversity are more sensitive to errors than the parity bits providing time diversity. Therefore, the use of the pure orthogonal resource hopping multiplexing, which method has a possibility of perforating, on both systematic and parity bits possibly deteriorates the quality of decoded signals from a systematic channel decoder of the receiver.

FIG. 27*c* illustrates that the systematic bits, which are the same as input bits, among the output bits of the systematic channel encoder are subject to an orthogonal resource division multiplexing 2751, the parity bits generated from the systematic channel encoder being subject to an orthogonal resource hopping multiplexing 2752. FIG. 27*d* illustrates the embodiment of FIG. 27*c* that temporally distinguishes an orthogonal resource division multiplexing region 2761 from an orthogonal resource hopping multiplexing region 2762. Let a set of all orthogonal wireless resource units be divided into two subsets A and B. The orthogonal wireless resource units of the subset A are used for the orthogonal resource division multiplexing, while those of the subset B are used for the orthogonal resource hopping multiplexing. FIG. 27*e* illustrates that the systematic bits, which are the same as input bits, among the output bits of the turbo encoder are subject to an orthogonal resource division multiplexing 2734, the parity bits generated from the systematic channel encoder being subject to an orthogonal resource hopping multiplexing 2744. The output bits of the channel encoder 2712 may be more or less than the bits necessary to the modulator because of a limited bandwidth. So, rate matchers 2716 and 2718 are used to match the number of output bits of the channel encoder 2712 to the number of bits necessary to the modulator.

FIG. 28*a* illustrates in FIG. 4*c* that the collision probability or the perforation probability of frame-based multidimensional orthogonal resource hopping patterns are compared with a reference value in accordance with an embodiment of the present invention. As the instantaneous activity of an authorized channel in the frame denoted by a black arrow is increased to above an average activity, the collision probability $p_c$ of the multidimensional pattern of secondary stations MS#1, MS#2, MS#3, MS#4, . . . during orthogonal resource hopping multiplexing communication, or the perforation probability $p_p$ exceeds a reference value $\theta_c$ or $\theta_p$, respectively, thereby deteriorating the quality of channels involved in transmission in the frame. FIG. 28*b* illustrates that the primary station intentionally does not transmit the whole or a part of the transmit frame to a least influenced secondary station so that the collision probability or the perforation probability of the multidimensional orthogonal resource hopping pattern should be less than the reference value. The channel in which the whole or a part of the transmit frame is not intentionally transmitted can be determined by a system designer according to the following standards:

(1) A channel with a lower quality requirement is not transmitted in preference to one with a higher quality requirement;

(2) A channel operated by ARQ (Automatic Repeat reQuest) is not transmitted in preference to one not operated by ARQ;

(3) Among channels operated by ARQ, a channel with a smaller number of retransmissions is not transmitted in preference to one with a larger number of retransmissions;

(4) A channel with higher transmission power is not transmitted in preference to one with lower transmission power;

(5) A channel with a smaller number of consecutive transmitted frames not transmitted in preference to one with a larger number of consecutive transmitted frames; and (6) A channel in soft handoff is not transmitted later than one not in soft handoff. This is because all the base stations involved in the soft handoff are difficult to control at the same time and, as previously described, the secondary station located at the cell boundary is disadvantageous relative to ones near the primary station.

The system designer may apply the above-stated standards inversely according to circumstances. In some cases, the primary station may cancel channel allocation preferentially for less influenced channels out of the range not transferring several frames so as to lower the collision probability $p_c$ or the perforation probability $p_p$ of the multidimensional hopping pattern than a reference value $\theta_c$ or $\theta_p$, respectively.

FIG. 29*a* illustrates that orthogonal wireless resource units for multidimensional orthogonal resource hopping multiplexing in a broad sense according to an embodiment of the present invention are divided into a set of orthogonal wireless resource units for orthogonal resource hopping multiplexing in a narrow sense and a set of orthogonal wireless resource units for orthogonal resource division multiplexing. The channels multiplexed by the orthogonal resource hopping multiplexing in a narrow sense use orthogonal wireless resource units denoted by a circle, and those multiplexed by the orthogonal resource division multiplexing use orthogonal wireless resource units denoted by a square. The orthogonal wireless resource units are denoted by multidimensional coordinates composed of frequency, time, and orthogonal code. For example, let the frequency component, the time component and the orthogonal code component be expressed by binary numbers "010", "0101" and "11011", respectively. Then the multidimensional coordinates are denoted by a binary vector (010, 0101, 11011) or a binary number "010010111011". The channels to the secondary stations MS#a and MS#b served by the multidimensional orthogonal resource hopping multiplexing in a narrow sense select orthogonal resource units according to the hopping patterns denoted by a solid line and a dotted line, respectively.

FIG. 29*b* illustrates that the channel with a fixedly allocated orthogonal wireless resource unit for multidimensional orthogonal resource hopping multiplexing in a narrow sense according to an embodiment of the present invention is relative to a channel with an orthogonal wireless resource unit allocated according to a hopping pattern. In the upper figure, the channel to the secondary station MS#α selects an orthogonal wireless resource unit circumscribed by a thin solid line to transmit data according to a time-varying hopping pattern, and the channel to the secondary station MS#β fixedly uses an orthogonal wireless resource unit 2933 circumscribed by a bold solid line to transmit data according to a time-invariant hopping pattern. In the lower figure, it appears as if the channel to the secondary station MS#β carries data according to the time-varying hopping pattern, when viewing the channel to the secondary station MS#β from the secondary station MS# α. Namely, the selection of an orthogonal wireless resource unit according to a time-varying hopping pattern is relative to the selection of an orthogonal wireless resource unit according to a time-invariant hopping pattern.

FIG. 29*c* is a conceptual diagram sequentially showing the steps of channel request, wireless resource allocation and channel termination in the orthogonal resource division multiplexing according to an example of the prior art and the multidimensional orthogonal resource hopping multiplexing according to an embodiment of the present invention. Reference number 2940 shows the steps of channel request, wireless resource allocation and channel termination based on an orthogonal resource division multiplexing using six orthogonal wireless resource units each denoted by a square. Once an orthogonal resource division multiplexing channel is requested (or received) and there are orthogonal wireless resource units available, a wireless resource manager allocates one of the available orthogonal wireless resource units. Without any orthogonal wireless resource unit available, the wireless resource manager does not accept the corresponding channel. If the used orthogonal wireless resource unit is released upon termination of the channel, then the released orthogonal wireless resource unit is available for allocation. Reference number 2950 shows the steps of channel request, wireless resource allocation and channel termination based on an orthogonal resource hopping multiplexing in a narrow sense using seven orthogonal wireless resource units each denoted by a circle. If the number of requested orthogonal resource hoping multiplexing channels in a narrow sense is equal to or less than the number of orthogonal wireless resource units available, then the channel is fixedly allocated with the orthogonal wireless resource unit as an orthogonal resource division multiplexing channel so as to substantially avoid a hopping pattern collision. In a moment that the number of requested orthogonal resource hoping multiplexing channels in a narrow sense exceeds the number of orthogonal wireless resource units available, the allocated channels select the orthogonal wireless resource unit according to the hopping pattern to transmit data. If the orthogonal wireless resource unit fixedly allocated to the channel is released upon termination of the channel, it is then allocated to an orthogonal resource hopping multiplexing channel first requested subsequent to the terminated channel. This is a wireless resource operation method based on the concept of FIG. 29*b*.

FIG. 29*d* is a conceptual diagram sequentially showing the steps of channel request, wireless resource allocation, mode conversion, and channel termination in the multidimensional orthogonal resource hopping multiplexing in a narrow sense according to another embodiment of the present invention. Reference numbers 2960 and 2970 show the steps of channel request, wireless resource allocation, mode conversion, and channel termination based on an orthogonal resource hopping multiplexing in a narrow sense using seven orthogonal wireless resource units each denoted by a circle. The FCFC (First Come First Change) of the reference number 2960 is partly the same as the reference number 2950 in FIG. 29*c*. If the number of requested orthogonal resource hoping multiplexing channels in a narrow sense is equal to or less than the number of orthogonal wireless resource units available, then the channel is fixedly allocated with the orthogonal wireless resource unit as an orthogonal resource division multiplexing channel so as to substantially avoid a hopping pattern collision. In a moment that the number of requested orthogonal resource hoping multiplexing channels in a narrow sense exceeds the number of orthogonal wireless resource units available, the allocated channels select the orthogonal wireless resource unit according to the hopping pattern to transmit data. Unlike the reference number 2950 in FIG. 29*c*, if the orthogonal wireless resource unit fixedly allocated to the channel is released upon termination of the channel, it is then allocated to a most early served one of the orthogonal resource hopping multiplexing channels being served until the moment of release rather than the orthogonal resource hopping multiplexing channel first requested subsequent to the terminated channel. Then the orthogonal resource hopping multiplexing channel is subject to mode conversion to fixedly use the allocated orthogonal wireless resource unit for data transmission.

The LCFC (Last Come First Change) of the reference number 2970 is partly the same as the reference number 2950 in FIG. 29*c*. If the number of requested orthogonal resource hoping multiplexing channels in a narrow sense is equal to or less than the number of orthogonal wireless resource units available, then the channel is fixedly allocated with the orthogonal wireless resource unit as an orthogonal resource division multiplexing channel so as to substantially avoid a hopping pattern collision. In a moment that the number of requested orthogonal resource hoping multiplexing channels in a narrow sense exceeds the number of orthogonal wireless resource units available, the allocated channels select the orthogonal wireless resource unit according to the hopping pattern to transmit data. Unlike the reference number 2950 in FIG. 29*c*, if the orthogonal wireless resource unit fixedly allocated to the channel is released upon termination of the channel, it is then allocated to a most lately served one of the orthogonal resource hopping multiplexing channels being served until the moment of release rather than the orthogonal resource hopping multiplexing channel first requested subsequent to the terminated channel. Then the orthogonal resource hopping multiplexing channel is subject to mode conversion to fixedly use the allocated orthogonal wireless resource unit for data transmission. The priority may be determined differently according to residual service time, residual transmit data amount, quality requirement, transmission power, and client rank.

Also in the present invention, if the number of requested orthogonal resource hoping multiplexing channels in a narrow sense is equal to or less than the number of orthogonal wireless resource units available, then the channel is fixedly allocated with the orthogonal wireless resource unit as an orthogonal resource division multiplexing channel, so as to substantially avoid a hopping pattern collision. In a moment that the number of requested orthogonal resource hoping multiplexing channels in a narrow sense exceeds the number of orthogonal wireless resource units available, the allocated channels select the orthogonal wireless resource unit according to the hopping pattern to transmit data.

FIG. 30*a* is a conceptual diagram of a division mode in the multidimensional orthogonal resource hopping multiplexing in a narrow sense according to an embodiment of the present invention. The division mode is substantially similar to the conventional orthogonal resource division multiplexing so long as the number of allocated channels is less than that of orthogonal wireless resource units. Accordingly, there is no collision of multidimensional orthogonal resource hopping patterns and hence no perforating of transmit data symbols. Let $N_{OR}$ be the number of orthogonal wireless resource units and $\overline{v}$ be the average channel activity. It can be seen that the collision probability $p_c$ of multidimensional orthogonal resource hopping patterns, the perforation probability $p_p$ of transmit data symbols, and the number of allocable channels M have nothing to do with the average channel activity $\overline{v}$ as follows.

$$p_c = 0$$
$$p_p = 0$$
$$M \le N_{OR}$$

The division mode can be easily applied to the system having more than one-bit information, such as MPSK (M>4) or MQAM (M>4), which is inferior in power efficiency to BPSK or QPSK but excellent in band efficiency, as well as the system having one-bit information (two values) in which the transmit data symbol has a value of "+1" or "−1", such as BPSK or QPSK (for the respective I- and Q-channels) excellent in power efficiency. In the system having a limited frequency band, channels less than or equal to the number of orthogonal wireless resource units $N_{OR}$ are allocated and the power efficiency deteriorates with an increase in the required transmit data rate of each channel. Nevertheless, the system employs a modulation method excellent in band efficiency and thereby transmits more data in a short time. Because of the restricted data rate allowable in the limited frequency band, the modulation with a high band efficiency is switched to the modulation with a high power efficiency in a moment that the number of allocated channels M exceeds the number of orthogonal wireless resource units $N_{OR}$, thereby increasing the processing capacity of the system.

FIG. 30*b* is a conceptual diagram of a hopping mode in a hopping mode in the multidimensional orthogonal resource hopping multiplexing in a narrow sense according to an embodiment of the present invention. In the hopping mode, the channels are distinguished with independent orthogonal resource hopping patterns irrespective of whether or not the number of allocated channels is greater than that of orthogonal wireless resource units, so that a collision may occur even when the number of channels is less than that of orthogonal wireless resource units. Moreover, when the average activity of the channels is low, the number of allocated channels is greater than the number of wireless resource units $N_{OR}$ due to channel encoding. Nevertheless, a loss of the signal-to-interference ratio required to meet a wanted quality such as BER (Bit Error Rate) or FER (Frame Error Rate) is not so significant. Let $N_{OR}$ be the number of orthogonal wireless resource units and $\overline{v}$ be the average channel activity of the channels. The collision probability $p_c$ of multidimensional orthogonal resource hopping patterns, the perforation probability $p_p$ of transmit data symbols, and the number of allocable channels M have the following correlation, where s represents the number of modulation symbols in the I- or Q-channel):

$$p_c = 1 - \left\{1 - \frac{\overline{v}}{N_{OR}}\right\}^{M-1}$$
$$p_p = 1 - \left\{1 - \frac{s-1}{s} \cdot \frac{\overline{v}}{N_{OR}}\right\}^{M-1}$$

For BPSK or QPSK (for the respective I- or Q-channels) modulation, the perforation probability $p_p$ of transmit data symbols (where s=2) is given by:

$$p_p = 1 - \left\{1 - \frac{\overline{v}}{2N_{OR}}\right\}^{M-1}$$

The number of channels M accepted in the hopping mode for statistical multiplexing can be determined as follows according to a given maximum allowable collision probability $p_c^{max}$ of multidimensional orthogonal resource hopping patterns and a given maximum allowable perforation probability $p_p^{max}$ of transmit data symbols:

$$M \le 1 + \frac{In(1 - p_c^{max})}{In\left(1 - \frac{\overline{v}}{N_{OR}}\right)}$$
$$M \le 1 + \frac{In(1 - p_c^{max})}{In\left(1 - \frac{s-1}{s} \cdot \frac{\overline{v}}{N_{OR}}\right)}$$

For BPSK or QPSK (for the respective I- or Q-channels) modulation, the number M of accepted channels (where s=2) is given by:

$$M \le 1 + \frac{In(1 - p_c^{max})}{In\left(1 - \frac{\overline{v}}{2N_{OR}}\right)}$$

As can be seen from the above equations, the hopping mode is applicable to the system having more than one-bit information (s>2), such as MPSK (M>4) or MQAM (M>4) excellent in band efficiency, and also to BPSK or QPSK (for the respective I- and Q-channels) modulation excellent in power efficiency, in which case the perforation probability $p_p$ of transmit data symbols can be minimized.

FIG. 30*c* is a conceptual diagram of a hybrid mode in the multidimensional orthogonal resource hopping multiplexing in a narrow sense according to an embodiment of the present invention. The hybrid mode is a mixed mode of the division mode of FIG. 30*a* and the hopping mode of FIG. 30*b*. Namely, the system operates in the division mode of FIG. 30*a* to avoid a collision between orthogonal resource hopping patterns (perforating of transmit data symbols does not occurs because there is no collision) while the number of allocated channels M is less than the number of orthogonal wireless resource units $N_{OR}$. The system enters the hopping mode of FIG. 30*b* for distinguishing channels with channel-independent orthogonal in a moment that the number of allocated channels M exceeds the number of orthogonal wireless resource units $N_{OR}$. Let $N_{OR}$ be the number of orthogonal wireless resource units and $\overline{v}$ be the average channel activity of channels. The collision probability $p_c$ of multidimensional orthogonal resource hopping patterns, the perforation probability $p_p$ of transmit data symbols, and the number of allocable channels M have the correlation as follows (where s represents the number of modulation symbols in I- or Q-channels):

(a) For $M \leqq N_{OR}$, $$p_c = 0$$

$$p_p = 0$$

(b) For $M > N_{OR}$, $$p_c = \frac{N_{OR}}{M}\left\{1-\left(1-\frac{\overline{v}}{N_{OR}}\right)^{M-N_{OR}}\right\} + \frac{M-N_{OR}}{M}\left\{1-\left(1-\frac{\overline{v}}{N_{OR}}\right)^{M-1}\right\}$$

$$p_p = \frac{N_{OR}}{M}\left\{1-\left(1-\frac{s-1}{s}\cdot\frac{\overline{v}}{N_{OR}}\right)^{M-N_{OR}}\right\} + \frac{M-N_{OR}}{M}\left\{1-\left(1-\frac{s-1}{s}\cdot\frac{\overline{v}}{N_{OR}}\right)^{M-1}\right\}$$

For BPSK or QPSK (for the respective I- or Q-channels) modulation, the perforation probability $p_p$ of transmit data symbols (where s=2) is given by:

$$p_p = \frac{N_{OR}}{M}\left\{1-\left(1-\frac{\overline{v}}{2N_{OR}}\right)^{M-N_{OR}}\right\} + \frac{M-N_{OR}}{M}\left\{1-\left(1-\frac{\overline{v}}{2N_{OR}}\right)^{M-1}\right\}$$

The number of channels accepted by the hopping mode for statistical multiplexing can be calculated by substituting the maximum allowable collision probability $p_c^{max}$ of multidimensional orthogonal resource hopping patterns and the maximum allowable perforation probability $p_c^{max}$ of transmit data symbols into the above equation for numerical analysis.

It can be seen that the hybrid mode selectively has the advantages of the division mode and the hopping mode. The modulation method poor in power efficiency but excellent in band efficiency is used only in the division mode and the modulation method excellent in power efficiency is used in the hopping mode as the number of channels is increased. The hybrid mode is operated by the wireless orthogonal resource operating methods of FIGS. 29*a* to 29*d* to acquire a higher performance.

FIG. 30*d* is a conceptual diagram of a group mode for a single channel in the multidimensional orthogonal resource hopping multiplexing in a narrow sense according to an embodiment of the present invention. The group mode is the improved form of the hybrid mode of FIG. 30*c*. The group mode is the same as the division mode of FIG. 30*a* and the hybrid mode of FIG. 30*c* while the number of allocated channels M is less than the number of orthogonal wireless resource units $N_{OR}$. In the hybrid mode of FIG. 30*c*, the system enters the hopping mode of FIG. 30*b* for distinguishing channels with channel-independent orthogonal in a moment that the number of allocated channels M exceeds the number of orthogonal wireless resource units $N_{OR}$. Unlike the hybrid mode, the group mode of FIG. 30*d* involves dividing channels into groups, each of which includes channels as many as the number of orthogonal wireless resource units $N_{OR}$, so that there is only a collision among channels of a different group without a collision of orthogonal resource hopping patterns among channels in each group. Accordingly, the orthogonal resource hopping patterns of channels in a same group are not mutually independent, but the hopping pattern of one group is independent to the hopping pattern of another group. Namely, the first group OG#0 includes 0-th to $(N_{OR}-1)$-th channels, and the second group OG#1 includes $N_{OR}$-th to $(2N_{OR}-1)$-th channels. Let $N_{OR}$ be the number of orthogonal wireless resource units and $\overline{v}$ be the average channel activity of channels. The collision probability $p_c$ of multidimensional orthogonal resource hopping patterns, the perforation probability $p_p$ of transmit data symbols, and the number of allocable channels M have the correlation as follows (where s represents the number of modulation symbols in I- or Q-channels):

(a) For $M \leqq N_{OR}$, $$p_c = 0$$

$$p_p = 0$$

(b) For $M > N_{OR}$, $$p_c = \left\lfloor\frac{M}{N_{OR}}\right\rfloor\frac{N_{OR}}{M}\left\{1-\left(1-\frac{\overline{v}}{N_{OR}}\right)^{M-N_{OR}}\right\} + \frac{M-\left\lfloor\frac{M}{N_{OR}}\right\rfloor N_{OR}}{M}\left\{1-\left(1-\frac{\overline{v}}{N_{OR}}\right)^{\left\lfloor\frac{M}{N_{OR}}\right\rfloor N_{OR}}\right\}$$

$$p_p = \left\lfloor\frac{M}{N_{OR}}\right\rfloor\frac{N_{OR}}{M}\left\{1-\left(1-\frac{s-1}{s}\cdot\frac{\overline{v}}{N_{OR}}\right)^{M-N_{OR}}\right\} + \frac{M-\left\lfloor\frac{M}{N_{OR}}\right\rfloor N_{OR}}{M}\left\{1-\left(1-\frac{s-1}{s}\cdot\frac{\overline{v}}{N_{OR}}\right)^{\left\lfloor\frac{M}{N_{OR}}\right\rfloor N_{OR}}\right\}$$

For BPSK or QPSK (for the respective I- or Q-channels) modulation, the perforation probability $p_p$ of transmit data symbols (where s=2) is given by:

$$p_p = \left[\frac{M}{N_{OR}}\right]\frac{N_{OR}}{M}\left\{1-\left(1-\frac{\overline{v}}{2N_{OR}}\right)^{M-N_{OR}}\right\} + \frac{M-\left[\frac{M}{N_{OR}}\right]N_{OR}}{M}\left\{1\left(1-\frac{\overline{v}}{2N_{OR}}\right)^{\left[\frac{M}{N_{OR}}\right]N_{OR}}\right\}$$

The number of channels accepted by the hopping mode for statistical multiplexing can be calculated by substituting the maximum allowable collision probability $p_c^{max}$ of multidimensional orthogonal resource hopping patterns and the maximum allowable perforation probability $p_c^{max}$ of transmit data symbols into the above equation for numerical analysis.

The group mode is intended to reduce a collision of orthogonal resource hopping patterns caused in the hopping mode at a moment that the number of channels exceeds that of wireless orthogonal resource units in the hybrid mode of FIG. 30*c*, and the perforation probability of transmit data symbols.

FIG. 30*e* is a conceptual diagram of a group mode for multiple channels in the multidimensional orthogonal resource hopping multiplexing in a narrow sense according to an embodiment of the present invention. The group mode of FIG. 30*e* has the equivalent function of FIG. 30*d* in the case where one orthogonal channel from the primary station is allocated to the secondary station. Contrarily, when a plurality of orthogonal channels from the primary station are allocated to the secondary station, the multiple channels are not independent in activity to one another and a collision occurs even in the first group OG#0 including 0-th to ($N_{OR}$−1)-th channels. But the group mode of FIG. 30*e* disperses the consecutive collision probability between the secondary stations of multiple channels in a different group and uniformly distributes the collision of orthogonal resource hopping patterns over all the channels.

As described above, the present invention improves the weak points of the simple perforating method previously suggested by the inventor of this invention when the hopping patterns of multidimensional orthogonal resources are collided between mutually independent channels and the data symbols to be transmitted are different from one another during the collision as is usual in the statistical orthogonal multiplexing system based on the multidimensional orthogonal resource hopping method in which a plurality of communication channels synchronized with one another via a single medium.

The present invention also subdivides a bisectional processing method of transmission and perforating during a hopping pattern collision of the multidimensional orthogonal resources so as to enhance the performance of a system using a multidimensional orthogonal resource hopping multiplexing, thereby reducing the perforation probability.

The present invention also uses a soft handoff to reduce the perforation probability of the secondary station located at a cell boundary that is relatively disadvantageous.

In addition, the present invention divides the output bits of a systematic channel encoder into systematic bits and parity bits, and transmits the systematic bits by an orthogonal division multiplexing, which method has no risk of a loss caused by a collision, and the parity bits by an orthogonal resource hopping multiplexing, thereby lowering the required bit energy to satisfy quality requirement such as a required BER (Bit Error Rate).

The present invention stops frame transmission in the order of starting from a least influenced channel when an instantaneous collision rate in a specific frame of the multidimensional hopping pattern exceeds a reference collision rate, thereby enhancing the performance of the entire system.

Furthermore, the present invention stops channel allocation in the order of starting from a least influenced channel when an instantaneous collision rate of the multidimensional hopping pattern successively exceeds a reference collision rate, thereby enhancing the performance of the entire system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A digital communication method, which is to perform a statistical multiplexing by allocating communication channels from a primary station to a plurality of secondary stations in synchronization based on a multidimensional orthogonal resource hopping method, the digital communication method comprising:

(a) determining, by the primary station, whether or not signs of transmit data symbols are matched, when a collision between hopping patterns of multidimensional orthogonal resources occurs, the transmit data symbols being data symbols for all channels involved in the collision;

(b) transmitting all the data symbols, when the signs of the transmit data symbols are matched; and (c) determining, by the primary station, data symbols to be transmitted according to the amplitudes of the transmit data symbols when the signs of the transmit data symbols are not matched, and perforating the transmit data symbols except the determined data symbols.

2. The digital communication method as claimed in claim 1, wherein the hopping patterns of the multidimensional orthogonal resources are mutually independent by the respective secondary stations.

3. The digital communication method as claimed in claim 1, wherein the multidimensional orthogonal resources have coordinates represented by "orthogonal resource #1, orthogonal resource #2, . . . , orthogonal resource #N".

4. The digital communication method as claimed in claim 3, wherein the multidimensional orthogonal resources include frequency, time and orthogonal code that secure orthogonality.

5. The digital communication method as claimed in claim 4, wherein the multidimensional orthogonal resources with a collision of hopping patterns are limited in the total transmit signal amplitude from the primary station.

6. The digital communication method as claimed in claim 1, wherein the step (b) classifies the channels into a set $S^0$ of channels allocated but not transmitted in the units of the orthogonal wireless resource, a set $S^+$ of channels having a positive data symbol transmitted in the units of the orthogonal wireless resource, and a set $S^-$ of channels having a negative data symbol transmitted in the units of the orthogonal wireless resource, and determines data symbols to be transmitted in the units of the orthogonal wireless resource.

7. The digital communication method as claimed in claim 6, wherein the step (b) comprises:

comparing the transmit signal amplitudes of two channels having a minimum transmit signal amplitude in each set, when neither the set $S^+$ nor the set $S^-$ is an empty set; and determining data symbols to be transmitted in the units of the orthogonal wireless resource using the channel of the larger transmit signal amplitude as a reference value.

8. The digital communication method as claimed in claim 7, further comprising:

controlling a transmission power of all channels in the set including the channel determined as the reference value to zero.

9. The digital communication method as claimed in claim 7, further comprising:

sending the transmit signal value of a channel having the largest transmit signal amplitude and a size of less than or equal to a multiple of the reference value in the units of the orthogonal wireless resource, among the transmit signal amplitudes of channels in the set not including the channel determined as the reference value.

10. The digital communication method as claimed in claim 7, further comprising:

sending a transmit signal value having the sign of the channel, included in the set not including the channel determined as the reference value, and an amplitude being a multiple of the reference value in the units of the orthogonal wireless resource.

11. The digital communication method as claimed in claim 7, further comprising:

sending the sum of channels included in the set not including the channel determined as the reference value in the units of the orthogonal wireless resource.

12. The digital communication method as claimed in claim 11, further comprising:

comparing the sum of channels included in the set not including the channel determined as the reference value with a multiple of the reference value, and sending a value having the smaller amplitude in the units of the orthogonal wireless resource.

13. A digital communication method, which is to perform a statistical multiplexing by allocating communication channels from a primary station to a plurality of secondary stations in synchronization based on a multidimensional orthogonal resource hopping method, the digital communication method comprising:

(a) determining, by the primary station, the instantaneous collision rate in a specific frame of a multidimensional hopping pattern; and (b) stopping, by the primary station, frame transmission in the order of starting from a least influenced channel, when the instantaneous collision rate exceeds a reference collision rate.

14. The digital communication method as claimed in claim 13, wherein the step (b) comprises:

intentionally stopping frame transmission in the order of starting from a channel with the lowest quality requirement to a channel with the highest quality requirement.

15. The digital communication method as claimed in claim 13, wherein the step (b) comprises:

intentionally stopping frame transmission in the order of starting from channels operated by automatic repeat request to channels not operated by automatic repeat request.

16. The digital communication method as claimed in claim 15, wherein for channels operated by automatic repeat request, the frame transmission is intentionally stopped in the order of starting from a channel with the smallest number of retransmissions to a channel with the largest number of transmissions frequency.

17. The digital communication method as claimed in claim 13, wherein the step (b) comprises:

intentionally stopping frame transmission for the channel having higher transmission power in preference to the channel having lower transmission power.

18. The digital communication method as claimed in claim 13, wherein the step (b) comprises:

intentionally stopping frame transmission in the order of starting from the channel having the smallest number of consecutive transmitted frames to the channel having the largest number of consecutive transmitted frames.

19. The digital communication method as claimed in claim 13, wherein the step (b) comprises:

intentionally stopping frame transmission in the order of starting from channels being in soft handoff to channels not being in soft handoff.

20. A digital communication system, which is to perform a statistical multiplexing by allocating communication channels from a primary station to a plurality of secondary stations in synchronization based on a multidimensional orthogonal resource hopping method, the digital communication system comprising:

means for generating a multidimensional hopping pattern;

means for selecting a corresponding orthogonal resource in a set of orthogonal resources and modulating data symbols according to the output of the multidimensional hopping pattern generating means;

collision detecting and control means for monitoring whether or not a collision of the multidimensional hopping patterns occurs, and comparing transmit data symbols to the secondary stations in an interval of the collision to determine whether or not signs of the transmit data symbols are matched; and transmission power control means for compensating for a transmission-stopped part caused by a collision of the multidimensional hopping patterns and the unmatched transmit data symbols, and a loss of average received energy, wherein the collision detecting and control means transmits all the data symbols when the signs of the transmit data symbols are matched, and wherein the collision detecting and control means determines data symbols to be transmitted according to the amplitudes of the transmit data symbols when the signs of the transmit data symbols are not matched and perforates the transmit data symbols except the determined data symbols.

21. The digital communication system as claimed in claim 20, wherein the multidimensional orthogonal resource hopping patterns are mutually independent by the respective secondary stations.

22. The digital communication system as claimed in claim 20, wherein the primary station determines the number of allocated channels according to channel activity.

23. The digital communication system as claimed in claim 20, wherein the orthogonal wireless resource unit includes frequency, time and orthogonal code that secure orthogonality.

24. The digital communication system as claimed in claim 20, wherein the orthogonal wireless resource unit with a collision of hopping patterns is limited in total transmit signal amplitude from the primary station.

25. The digital communication system as claimed in claim 20, wherein the collision detection and control means controls transmit signals of each orthogonal wireless resource unit according to transmit data symbols of a channel involved in the hopping pattern collision of the multidimensional orthogonal resources and transmit signal amplitudes of the channel, the collision detection and control means determining the signs of data symbols transmitted in the units of the orthogonal wireless resource of the channel having hopping pattern collisions, the collision detection and control means classifying the channels into a set $S^0$ of channels allocated but not transmitted in the units of the orthogonal wireless resource, a set $S^+$ of channels having a positive data symbol transmitted in the units of the orthogonal wireless resource, and a set $S^-$ of channels having a negative data symbol transmitted in the units of the orthogonal wireless resource, and determining data symbols to be transmitted in the units of the orthogonal wireless resource.

26. The digital communication system as claimed in claim 25, wherein the collision detection and control means compares the transmit signal amplitudes of two channels having a minimum transmit signal amplitude in each set, when neither the set $S^+$ nor the set $S^-$ is an empty set, the collision detection and control means determining data symbols to be transmitted in the units of the orthogonal wireless resource using the channel with the larger transmit signal amplitude as a reference value.

27. The digital communication system as claimed in claim 26, wherein the power control means controls the transmission power of all channels in the set including the channel determined as the reference value to zero.

28. The digital communication system as claimed in claim 26, wherein the collision detection and control means sends the transmit signal value of a channel having the largest transmit signal amplitude and a size of less than or equal to a multiple of the reference value in the units of the orthogonal wireless resource, among the transmit signal amplitudes of channels in the set not including the channel determined as the reference value.

29. The digital communication system as claimed in claim 26, wherein the collision detection control means sends a transmit signal value having the sign of the channel, included in the set not including the channel determined as the reference value, and an amplitude being a multiple of the reference value in the units of the orthogonal wireless resource.

30. The digital communication system as claimed in claim 26, wherein the collision detection and control means sends the sum of channels included in the set not including the channel determined as the reference value in the units of the orthogonal wireless resource.

31. The digital communication system as claimed in claim 30, wherein the collision detection and control means compares the sum of channels included in the set not including the channel determined as the reference value with a multiple of the reference value, and sends a value having a smaller amplitude in the units of the orthogonal wireless resource.

* * * * *